(12) United States Patent
Westerman et al.

(10) Patent No.: US 10,162,452 B2
(45) Date of Patent: Dec. 25, 2018

(54) DEVICES AND METHODS FOR PROCESSING TOUCH INPUTS BASED ON THEIR INTENSITIES

(71) Applicant: Apple Inc., Cupertino, CA (US)

(72) Inventors: Wayne C. Westerman, San Francisco, CA (US); Marcos Alonso Ruiz, San Francisco, CA (US); Jonathan R. Dascola, San Francisco, CA (US); Olivier D. R. Gutknecht, San Francisco, CA (US); Peter L. Hajas, Santa Cruz, CA (US); Chanaka G. Karunamuni, San Jose, CA (US); Kenneth L. Kocienda, San Jose, CA (US); Kevin E. Ridsdale, Cupertino, CA (US); Sophia Teutschler, San Francisco, CA (US); Nicole M. Wells, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/867,823

(22) Filed: Sep. 28, 2015

(65) Prior Publication Data

US 2017/0045982 A1 Feb. 16, 2017

Related U.S. Application Data

(63) Continuation of application No. 14/866,992, filed on Sep. 27, 2015.
(Continued)

(51) Int. Cl.
*G09G 5/00* (2006.01)
*G06F 3/041* (2006.01)
(Continued)

(52) U.S. Cl.
CPC .......... *G06F 3/0416* (2013.01); *G06F 3/0414* (2013.01); *G06F 3/0482* (2013.01);
(Continued)

(58) Field of Classification Search
CPC ..................................... G06F 3/041–3/04897
See application file for complete search history.

(56) References Cited

U.S. PATENT DOCUMENTS

| 4,674,044 A | 6/1987 | Kalmus et al. |
| 4,750,135 A | 6/1988 | Boilen |

(Continued)

FOREIGN PATENT DOCUMENTS

| AU | 2016100649 A4 | 6/2016 |
| CN | 1658150 | 8/2005 |

(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

(Continued)

*Primary Examiner* — Hang Lin
(74) *Attorney, Agent, or Firm* — Morgan, Lewis & Bockius LLP

(57) ABSTRACT

An electronic device with a display, a touch-sensitive surface, and one or more sensors to detect intensity of contacts with the touch-sensitive surface displays a first user interface of a first software application, detects an input on the touch-sensitive surface while displaying the first user interface, and, in response to detecting the input while displaying the first user interface, performs a first operation in accordance with a determination that the input satisfies intensity input criteria including that the input satisfies a first intensity (Continued)

threshold, and performs a second operation in accordance with a determination that the input satisfies pan criteria including that the input has moved across the touch-sensitive surface by at least a predefined distance.

51 Claims, 99 Drawing Sheets

Related U.S. Application Data

(60) Provisional application No. 62/215,621, filed on Sep. 8, 2015, provisional application No. 62/213,589, filed on Sep. 2, 2015, provisional application No. 62/203,387, filed on Aug. 10, 2015.

(51) Int. Cl.
  *G06F 3/0488* (2013.01)
  *G06F 3/0482* (2013.01)
  *G06F 3/0484* (2013.01)

(52) U.S. Cl.
  CPC ........ *G06F 3/0488* (2013.01); *G06F 3/04842* (2013.01); *G06F 3/04883* (2013.01); *G06F 2203/04105* (2013.01)

(56) References Cited

U.S. PATENT DOCUMENTS

| | | | |
|---|---|---|---|
| 4,864,520 | A | 9/1989 | Setoguchi et al. |
| 4,903,201 | A | 2/1990 | Wagner |
| 5,038,284 | A | 8/1991 | Kramer |
| 5,077,665 | A | 12/1991 | Silverman et al. |
| 5,101,353 | A | 3/1992 | Lupien et al. |
| 5,136,501 | A | 8/1992 | Silverman et al. |
| 5,184,120 | A | 2/1993 | Schultz |
| 5,270,922 | A | 12/1993 | Higgins |
| 5,297,031 | A | 3/1994 | Gutterman et al. |
| 5,297,032 | A | 3/1994 | Trojan et al. |
| 5,374,787 | A | 12/1994 | Miller et al. |
| 5,428,730 | A | 6/1995 | Baker et al. |
| 5,455,965 | A | 10/1995 | Shaughnessy et al. |
| 5,463,722 | A | 10/1995 | Venolia |
| 5,510,813 | A | 4/1996 | Makinwa et al. |
| 5,555,354 | A | 9/1996 | Strasnick et al. |
| 5,559,301 | A | 9/1996 | Bryan, Jr. et al. |
| 5,590,265 | A | 12/1996 | Nakazawa |
| 5,627,914 | A | 5/1997 | Pagallo |
| 5,689,651 | A | 11/1997 | Lozman |
| 5,695,400 | A | 12/1997 | Fenell, Jr. et al. |
| 5,710,896 | A | 1/1998 | Seidl |
| 5,717,438 | A | 2/1998 | Kim et al. |
| 5,717,725 | A | 2/1998 | Campana, Jr. |
| 5,719,796 | A | 2/1998 | Chen |
| 5,727,165 | A | 3/1998 | Ordish et al. |
| 5,774,877 | A | 6/1998 | Patterson, Jr. et al. |
| 5,775,996 | A | 7/1998 | Othmer et al. |
| 5,793,301 | A | 8/1998 | Patterson, Jr. et al. |
| 5,793,360 | A | 8/1998 | Fleck et al. |
| 5,793,377 | A | 8/1998 | Moore |
| 5,797,002 | A | 8/1998 | Patterson, Jr. et al. |
| 5,801,692 | A | 9/1998 | Muzio et al. |
| 5,805,144 | A | 9/1998 | Scholder et al. |
| 5,805,167 | A | 9/1998 | Van Cruyningen |
| 5,809,267 | A | 9/1998 | Moran et al. |
| 5,819,293 | A | 10/1998 | Comer et al. |
| 5,820,463 | A | 10/1998 | O'Callaghan |
| 5,825,352 | A | 10/1998 | Bisset et al. |
| 5,844,560 | A | 12/1998 | Crutcher et al. |
| 5,845,266 | A | 12/1998 | Lupien et al. |
| 5,872,922 | A | 2/1999 | Hogan et al. |
| 5,880,733 | A | 3/1999 | Horvitz et al. |
| 5,910,882 | A | 6/1999 | Burrell |
| 5,915,245 | A | 6/1999 | Patterson, Jr. et al. |
| 5,924,082 | A | 7/1999 | Silverman et al. |
| 5,924,083 | A | 7/1999 | Silverman et al. |
| 5,946,647 | A | 8/1999 | Miller et al. |
| 5,946,667 | A | 8/1999 | Tull, Jr. et al. |
| 5,953,708 | A | 9/1999 | Midorikawa et al. |
| 5,963,923 | A | 10/1999 | Garber |
| 6,002,397 | A | 12/1999 | Jaaskelainen, Jr. |
| 6,012,046 | A | 1/2000 | Lupien et al. |
| 6,014,643 | A | 1/2000 | Minton |
| 6,031,989 | A | 2/2000 | Cordell |
| 6,035,287 | A | 3/2000 | Stallaert et al. |
| 6,072,488 | A | 6/2000 | Mcfarland |
| 6,088,019 | A | 7/2000 | Rosenberg |
| 6,088,027 | A | 7/2000 | Konar et al. |
| 6,098,051 | A | 8/2000 | Lupien et al. |
| 6,111,575 | A | 8/2000 | Martinez et al. |
| 6,115,043 | A | 9/2000 | Levine et al. |
| 6,121,960 | A | 9/2000 | Carroll et al. |
| 6,131,087 | A | 10/2000 | Luke et al. |
| 6,134,535 | A | 10/2000 | Belzberg |
| 6,180,894 | B1 | 1/2001 | Chao et al. |
| 6,195,647 | B1 | 2/2001 | Martyn et al. |
| 6,208,329 | B1 | 3/2001 | Ballare |
| 6,208,340 | B1 | 3/2001 | Amin et al. |
| 6,219,034 | B1 | 4/2001 | Elbing et al. |
| 6,227,743 | B1 | 5/2001 | Robb |
| 6,229,542 | B1 | 5/2001 | Miller |
| 6,243,080 | B1 | 6/2001 | Molne |
| 6,247,000 | B1 | 6/2001 | Hawkins et al. |
| 6,252,594 | B1 | 6/2001 | Xia et al. |
| 6,266,684 | B1 | 7/2001 | Kraus et al. |
| 6,272,474 | B1 | 8/2001 | Garcia |
| 6,278,982 | B1 | 8/2001 | Korhammer et al. |
| 6,282,521 | B1 | 8/2001 | Howorka |
| 6,323,846 | B1 | 11/2001 | Westerman et al. |
| 6,347,997 | B1 | 2/2002 | Armstrong |
| 6,377,940 | B2 | 4/2002 | Tilfors et al. |
| 6,396,523 | B1 | 5/2002 | Segal et al. |
| 6,396,962 | B1 | 5/2002 | Haffey et al. |
| 6,400,303 | B2 | 6/2002 | Armstrong |
| 6,405,180 | B2 | 6/2002 | Tilfors et al. |
| 6,408,282 | B1 | 6/2002 | Buist |
| 6,411,998 | B1 | 6/2002 | Bryant et al. |
| 6,429,846 | B2 | 8/2002 | Rosenberg et al. |
| 6,448,977 | B1 | 9/2002 | Braun et al. |
| 6,456,778 | B2 | 9/2002 | Armstrong |
| 6,459,424 | B1 | 10/2002 | Resman |
| 6,459,442 | B1 | 10/2002 | Edwards et al. |
| 6,469,691 | B1 | 10/2002 | Armstrong |
| 6,470,078 | B1 | 10/2002 | Armstrong |
| 6,489,975 | B1 | 12/2002 | Patil et al. |
| 6,489,978 | B1 | 12/2002 | Gong et al. |
| 6,504,527 | B1 | 1/2003 | Armstrong |
| 6,512,530 | B1 | 1/2003 | Rzepkowski et al. |
| 6,512,761 | B1 | 1/2003 | Schuster et al. |
| 6,532,000 | B2 | 3/2003 | Armstrong |
| 6,551,357 | B1 | 4/2003 | Madduri |
| 6,559,831 | B1 | 5/2003 | Armstrong |
| 6,563,487 | B2 | 5/2003 | Martin et al. |
| 6,567,102 | B2 | 5/2003 | Kung |
| 6,570,557 | B1 | 5/2003 | Westerman et al. |
| 6,583,798 | B1 | 6/2003 | Hoek et al. |
| 6,590,568 | B1 | 7/2003 | Astala et al. |
| 6,659,861 | B1 | 12/2003 | Faris et al. |
| 6,661,438 | B1 | 12/2003 | Shiraishi et al. |
| 6,670,952 | B2 | 12/2003 | Jaeger et al. |
| 6,677,932 | B1 | 1/2004 | Westerman |
| 6,735,307 | B1 | 5/2004 | Volckers |
| 6,750,890 | B1 | 6/2004 | Sugimoto |
| 6,772,132 | B1 | 8/2004 | Kemp, II et al. |
| 6,822,635 | B2 | 11/2004 | Shahoian et al. |
| 6,831,666 | B1 | 12/2004 | Kreis |
| 6,891,551 | B2 | 5/2005 | Keely et al. |
| 6,904,405 | B2 | 6/2005 | Suominen |
| 6,906,697 | B2 | 6/2005 | Rosenberg |
| 6,919,927 | B1 | 7/2005 | Hyodo |
| 6,954,899 | B1 | 10/2005 | Anderson |
| 7,036,088 | B2 | 4/2006 | Tunney |
| 7,058,146 | B2 | 6/2006 | Paulraj et al. |

(56) References Cited

U.S. PATENT DOCUMENTS

| | | |
|---|---|---|
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |
| 7,471,284 B2 | 12/2008 | Bathiche et al. |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,552,397 B2 | 6/2009 | Holecek et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,629,966 B2 | 12/2009 | Anson |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Lutter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,271,900 B2 | 9/2012 | Walizaka et al. |
| 8,279,180 B2 | 10/2012 | Hotelling et al. |
| 8,325,398 B2 | 12/2012 | Satomi et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,479,122 B2 | 7/2013 | Hotelling et al. |
| 8,482,535 B2 | 7/2013 | Pryor |
| 8,499,243 B2 | 7/2013 | Yuki |
| 8,504,946 B2 | 8/2013 | Williamson et al. |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,032,321 B1 | 5/2015 | Cohen et al. |
| 9,046,999 B1 | 6/2015 | Teller et al. |
| 9,058,186 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |

(56) References Cited

U.S. PATENT DOCUMENTS

| | | |
|---|---|---|
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0140740 A1 | 10/2002 | Chen |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0122779 A1 | 7/2003 | Martin et al. |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0022138 A1 | 1/2005 | Tunney |
| 2005/0039141 A1 | 2/2005 | Burke et al. |
| 2005/0073961 A1 | 4/2005 | Paik et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1* | 6/2006 | Rimas-Ribikauskas ..................... G06F 3/0414 345/173 |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0224989 A1 | 10/2006 | Pettiross et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152959 A1 | 7/2007 | Peters |
| 2007/0152980 A1 | 7/2007 | Kocienda et al. |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |

(56) References Cited

U.S. PATENT DOCUMENTS

| | | |
|---|---|---|
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270182 A1 | 11/2007 | Gulliksson et al. |
| 2007/0270186 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2007/0299923 A1 | 12/2007 | Skelly et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Chou |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0197635 A1 | 8/2009 | Kim et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293007 A1 | 11/2009 | Duarte et al. |
| 2009/0293009 A1 | 11/2009 | Meserth et al. |
| 2009/0295739 A1 | 12/2009 | Nagara |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0061637 A1 | 3/2010 | Mochizuki et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0090988 A1 | 4/2010 | Park |
| 2010/0110082 A1 | 5/2010 | Myrick et al. |
| 2010/0111434 A1 | 5/2010 | Madden |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |

(56) References Cited

U.S. PATENT DOCUMENTS

| | | |
|---|---|---|
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0035145 A1 | 2/2011 | Yamasaki |
| 2011/0035662 A1 | 2/2011 | King et al. |
| 2011/0043652 A1 | 2/2011 | King et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0102340 A1 | 5/2011 | Martin et al. |
| 2011/0102829 A1 | 5/2011 | Jourdan |
| 2011/0107272 A1 | 5/2011 | Aguilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167369 A1 | 7/2011 | van Os |
| 2011/0167382 A1 | 7/2011 | Van Os |
| 2011/0169765 A1 | 7/2011 | Aono |
| 2011/0175826 A1 | 7/2011 | Moore et al. |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 * | 10/2011 | Griffin .................. G06F 3/041 345/174 |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296333 A1 | 12/2011 | Bateman et al. |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |

(56) References Cited

U.S. PATENT DOCUMENTS

| | | |
|---|---|---|
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0144330 A1 | 6/2012 | Flint |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1* | 7/2012 | Cha ..................... G06F 1/1694 345/619 |
| 2012/0179967 A1 | 7/2012 | Hayes |
| 2012/0180001 A1 | 7/2012 | Griffin et al. |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0014057 A1 | 1/2013 | Reinpoldt et al. |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0097564 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0125039 A1 | 5/2013 | Murata |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0194480 A1 | 8/2013 | Fukata et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222333 A1 | 8/2013 | Miles et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |

(56) References Cited

U.S. PATENT DOCUMENTS

| | | |
|---|---|---|
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307792 A1 | 11/2013 | Andres et al. |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0335373 A1 | 12/2013 | Tomiyasu |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0105277 A1 | 4/2014 | Bivolarsky et al. |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139456 A1 | 5/2014 | Wigdor et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 11/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |

(56) References Cited

U.S. PATENT DOCUMENTS

| | | | |
|---|---|---|---|
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0085385 A1 | 3/2016 | Gao et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0124699 A1 | 5/2017 | Lane |
| 2017/0139565 A1 | 5/2017 | Choi |
| 2018/0024681 A1 | 1/2018 | Bernstein et al. |
| 2018/0188920 A1 | 7/2018 | Bernstein et al. |
| 2018/0275862 A1 | 9/2018 | Khoe et al. |

FOREIGN PATENT DOCUMENTS

| | | |
|---|---|---|
| CN | 1661556 | 8/2005 |
| CN | 1808362 A | 7/2006 |
| CN | 1955906 | 5/2007 |
| CN | 101102573 | 1/2008 |
| CN | 101118469 A | 2/2008 |
| CN | 101202866 A | 6/2008 |
| CN | 101222704 A | 7/2008 |
| CN | 101241397 A | 8/2008 |
| CN | 201107762 | 8/2008 |
| CN | 101320303 A | 12/2008 |
| CN | 100524183 | 8/2009 |
| CN | 101593077 A | 12/2009 |
| CN | 101650615 A | 2/2010 |
| CN | 101727268 | 6/2010 |
| CN | 101809526 A | 8/2010 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102214038 A | 10/2011 |
| CN | 102349038 A | 2/2012 |
| CN | 102385478 A | 3/2012 |
| CN | 102438092 A | 5/2012 |
| CN | 102483677 A | 5/2012 |
| CN | 102646013 A | 8/2012 |
| CN | 102662573 A | 9/2012 |
| CN | 102841677 A | 12/2012 |
| CN | 103097992 A | 5/2013 |
| CN | 103186345 A | 7/2013 |
| CN | 103518176 A | 1/2014 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1 406 150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | 58-182746 | 10/1983 |
| JP | H06-161647 A | 6/1994 |
| JP | H07-98769 A | 4/1995 |
| JP | H07-104915 | 4/1995 |
| JP | H07-151512 A | 6/1995 |
| JP | H08-227341 A | 9/1996 |
| JP | H09-269883 A | 10/1997 |

(56) References Cited

FOREIGN PATENT DOCUMENTS

| | | |
|---|---|---|
| JP | H09-330175 A | 12/1997 |
| JP | H11-203044 A | 7/1999 |
| JP | 2000-148348 A | 5/2000 |
| JP | 2001-202192 A | 7/2001 |
| JP | 2001-306207 A | 11/2001 |
| JP | 2002-041023 A | 2/2002 |
| JP | 2002-149312 A | 5/2002 |
| JP | 2002-268867 A | 9/2002 |
| JP | 2002-286489 A | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |
| JP | 2005-309933 A | 11/2005 |
| JP | 2006-185443 A | 7/2006 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-516348 A | 5/2008 |
| JP | 2008-146453 A | 6/2008 |
| JP | 2008-537615 A | 9/2008 |
| JP | 2008 305174 A | 12/2008 |
| JP | 2009-500761 | 1/2009 |
| JP | 2009-110243 A | 5/2009 |
| JP | 2009-129171 A | 6/2009 |
| JP | 2009-211704 A | 9/2009 |
| JP | 2009-217543 A | 9/2009 |
| JP | 2009-217815 A | 9/2009 |
| JP | 2009-294688 A | 12/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-197848 A | 10/2011 |
| JP | 2011-221640 A | 11/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-118993 A | 6/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014/140112 A | 7/2014 |
| JP | 2014-519109 A | 8/2014 |
| JP | 2014-529137 A | 10/2014 |
| JP | 2015-153420 A | 8/2015 |
| KR | 2006-0071353 | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0014095 A | 2/2010 |
| KR | 2010-0023637 | 3/2010 |
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 20120103670 A | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| RU | 2007145218 A | 7/2009 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/042309 A1 | 4/2006 |
| WO | WO 2006/073020 A1 | 7/2006 |
| WO | WO 2006/094308 A2 | 9/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |

(56) References Cited

FOREIGN PATENT DOCUMENTS

| | | |
|---|---|---|
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/032598 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2012/153555 A1 | 11/2012 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Alzona, "Full Screen Maximization with RightZoom," http://www.brighhub.com/computing/mac-platform/articles/31024.aspx>, Mar. 31, 2009, 6 pages.

Apple Inc., "iPhone User Guide for iPhone and iPhone 3G," http://manuals.info.apple.com/en_US/iPhone_User_Guide.pdf, Jul. 11, 2008, 154 pages.

Ask.MetaFilter, "Enable Screen Resize?" ask. Metafilter.com, Jan. 29, 2006, http://ask.metafilter.com/31720/Enable-screen-resize, 4 pages.

Awduche et al., "Synchronized Broadcast in Cellular Networks," 2nd Telecommunications R&D Conference in Massachusetts, Mar. 1996, 12 pages.

Azundris, "A Fire in the Sky," http://web.archive.org/web/20140722062639/http://blog.azundrix.com/archives/168-A-fire-in-the-sky.html, Jul. 22, 2014, 8 pages.

Bautisa, "Microsoft Mathematics Tutorial 7—The Ink Input", <URL:http://mathandmultimedia.com/2012/05/23/microsoft-math-tutorial-7-ink>, May 23, 2012, 3 pages.

cvil.ly—a design blog, Interesting Touch Interactions on Windows 8, http://cvil.ly/2011/06/04/interesting-touch-interactions-on-windows-8/, Jun. 4, 2011, 3 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.

Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.

Davidson, et al., "Extending 2D Object Arrangement with Pressure-Sensitive Layering Cues", Proceedings of the 21st Annual ACM Symposium on User Interface Software and Technology, Oct. 19, 2008, 4 pages.

Deeter, "DigiStamp Signs Strategic Partnership with European Trust Center EuroSignCard to Safeguard Monetary Transactions in Financial Sector," http://proquest.umi.com/, Mar. 14, 2001, 2 pages.

Dilger, "Inside Apple's iPad: Multitasking," Appleinsider.com, <http://www.appleinsider.com/articles/10/02/18/inside_apples_ipad_multitasking.html >, Feb. 17, 2010, 3 pages.

Fahey, "The iPad Blows Up iPhone Apps Read Good," Kotaku http://kotaku.com/5458316/the-ipad-blows-up-iphone-apps-rel-good, Jan. 27, 2010, 3 pages.

Fehily, "Visual QuickStart Guide: Microsoft Windows 7," Peachpit Press, 9 pages.

Flowplayer, "Slowmotion: Flowplayer," https://web.archive.org/web/20150226191526/http://flash.flowplayer.org/plugins/streaming/slowmotion.html, Feb. 26, 2015, 4 pages.

Forlines, et al., "Glimpse: a Novel Input Model for Multi-level Devices", Chi '05 Extended Abstracts on Human Factors in Computing Systems, Apr. 2, 2005, 4 pages.

Gorman, "Hands-On With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.

Harris, "Windows 8 Consumer Preview: Product Demo," https://www.youtube.com/watch?feature=[;auer-embedded&v=jDYAQmQ-phX8, Feb. 28, 2012, 3 pages.

Harrison, "Stylus-Based Interface with Full Mouse Emulation", IBM Technical Disclosure Bulletin, vol. 34, No. 10B, Mar. 1, 1992, 3 pages.

HTC, "HTC One (M7)," Wikipedia, the free encyclopedia, https://en.wikipedia.org/wiki/HTC_One_(M7), Mar. 2013, 20 pages.

HTC, "User Manual—PDA Phone—HTC_P3050 Touch," http://web.archive.org/web/20101228223033/http://www.comparecellular.com, Nov. 2, 2007, 154 pages.

iCIMS Recruiting Software, "Blackberry Playbook Review," http://www.tested.com/tech.tablets/5749-blackberry-playbook-review/, 2015, 11 pages.

Jade et al., "Apple's iPhone 4.0 to Support Multitasking via Expose-like Interface," AppleInsider.com, Mar. 31, 2010, 4 pages.

Jade et al., "Apple's iPhone 4.0 Software to Deliver Multitasking Support," AppleSider.com, Mar. 11, 2010, 3 pages.

Kishore, "Make the OS X Maximize Button Work like Windows," http://www.switchingtomac.com/making-the-switch/make-the-os-x-maximize-buttom-work-like-windows/, May 5, 2009, 11 pages.

MacRumors, "Fit to Screen Buttom Poll for Mac / Windows Users," http://forums.macrumors.com/showthread.php?t=615215>, Dec. 11, 2008, 15 pages.

MacRumors, "Window, Fit to Screen?," http://forums.macrumors.com/showthread.php?t=439783>, Feb. 22, 2008, 5 pages.

McRitchie, "Internet Explorer Right-Click Menus," http://web.archive.org/web-201405020/http://dmcritchie.mvps.org/ie/rightie6.htm, May 2, 2014, 10 pages.

MetaFilter Network Inc., "Enable Screen Resize?", http://ask.metafilter.com/31720/Enable-screen-resize>, Jan. 29, 2006, 4 paes.

Mick, "Iphone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.

Minsky, "Computational Haptics the Sandpaper System for Synthesizing Texture for a Force-Feedback Display," Massachusetts Institute of Technology, Jun. 1978, 217 pages.

Moth, "Share Code—Write Code Once for Both Mobile and Desktop Apps," MSDN Magazine, Jul. 2007, http://msdn.microsoft.com/en-us/magazine/cc163387.aspx, 8 pages.

Newman, "Sprint's HTC EVO 4G: 5 Killer Features," pcworld, http://www.pcworld.com/article/192286/sprints_htc_evo_4g_5_killer_features.html, Mar. 24, 2010, 3 pages.

(56) References Cited

OTHER PUBLICATIONS

Nickinson, "Review: The New HTC Sense Interface on Android Phones," Android Central, Feb. 22, 2010, http://www.androidcentral.com/review-new-htc-sense-android-phone, 10 pages.

Nilsson, "Design Guidelines for Mobile Applications," SINTEF ICT, Jun. 2008, 73 pages.

Nilsson et al., "Design Patterns for User Interface for Mobile Applications," Advances in Engineering Software, Elsevier Science, Oxford, GB vol. 40, No. 12, Dec. 1, 2009, 11 pages.

O'Hara, et al., "Pressure-Sensitive Icons", ip.com Journal, Jun. 1, 1990, 2 pages.

Pallenberg, "Wow, the new iPad had gestures." https://plus.google.com/+SaschaPallenberg/posts/aaJtJogu8ac, Mar. 7, 2012, 2 pages.

Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.

Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.

Reiger, "Effective Design for Multiple Screen Sizes," mobiForge, http://mobiforge.com/designing/story/effective-design-multiple-screen-sizes, Jan. 2009, 12 pages.

Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.

Robertson et al., "The Task Gallary: A 3D Window Manager," Redmond, WA, Sep. 12, 1999, 8 pages.

Savoy, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.

Seffah et al., Multi-devices "Multiple" User Interfaces: Development Models and Research Opportunities, The Journal of Systems Software, www.sciencedirect.com, Dec. 25, 2003, 14 pages.

Siracusa, "Antacid Tablet," http://arstechnica.com/staff/2010/01/antacid-tablet/>, Jan. 1, 2010, 3 pages.

Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011, 10 pages.

Sony, "Sony Xperia Z1", Wikipedia, the free encyclopodia, https://en.wikipedia.org/wiki/Sony_Xperia_Z1, Sep. 2013, 10 pages.

Tidwell, "Designing Interfaces," O'Reilly Media, Inc., USA, Nov. 2005, 348 pages.

Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.

Windows,"Stupid Geek Tricks: Tile or Cascade Multiple Windows in Windows 7," How to Geek, Feb. 18, 2010, 3 pages.

YouTube, "Blackberry Playbook bezel interaction," https://www.youtube.com/watch?v=YGkzFqnOwXl, Jan. 10, 2011, 2 pages.

Office Action, dated May 22, 2012, received in U.S. Appl. No. 12/888,381, 18 pages.

Final Office Action, dated Nov. 19, 2012, received in U.S. Appl. No. 12/888,381, 14 pages.

Office Action, dated Dec. 10, 2013, received in U.S. Appl. No. 12/888,381, 13 pages.

Notice of Allowance, dated Oct. 21, 2014, received in U.S. Appl. No. 12/888,381, 8 pages.

Notice of Allowance, dated Feb. 17, 2015, received in U.S. Appl. No. 12/888,381, 5 pages.

Notice of Allowance (corrected), dated Apr. 9, 2015, received in U.S. Appl. No. 12/888,381, 2 pages.

Office Action, dated Aug. 8, 2013, received in Australian Patent Application No. 2010350740, 3 pages.

Office Action, dated Aug. 28, 2012, received in Chinese Patent Application No. 201010602688.2, which corresponds with U.S. Appl. No. 12/888,381, 6 pages.

Office Action, dated May 24, 2013, received in Chinese Patent Application No. 201010602688.2, which corresponds with U.S. Appl. No. 12/888,381, 7 pages.

Office Action, dated Aug. 6, 2013, received in European Patent Application No. 10760867.1, which corresponds with U.S. Appl. No. 12/888,381, 4 pages.

Office Action, dated Dec. 6, 2013, received in Japanese Patent Application No. 2013-503722, which corresponds with U.S. Appl. No. 12/888,381, 2 pages.

Office Action, dated May 10, 2012, received in U.S. Appl. No. 12/888,382, 9 pages.

Final Office Action, dated Nov. 15, 2012, received in U.S. Appl. No. 12/888,382, 11 pages.

Office Action, dated Dec. 10, 2013, received in U.S. Appl. No. 12/888,382, 12 pages.

Notice of Allowance, dated Oct. 31, 2014, received in U.S. Appl. No. 12/888,382, 5 pages.

Notice of Allowance, dated Feb. 13, 2015, received in U.S. Appl. No. 12/888,382, 6 pages.

Office Action, dated May 17, 2012, received in U.S. Appl. No. 12/888,384, 15 pages.

Final Office Action, dated Nov. 7, 2012, received in U.S. Appl. No. 12/888,384, 14 pages.

Office Action, dated May 16, 2012, received in U.S. Appl. No. 12/888,386, 12 pages.

Final Office Action, dated Nov. 8, 2012, received in U.S. Appl. No. 12/888,386, 13 pages.

Office Action, dated Jan. 23, 2013, received in U.S. Appl. No. 12/888,389, 11 pages.

Final Office Action, dated Sep. 12, 2013, received in U.S. Appl. No. 12/888,389, 10 pages.

Notice of Allowance, dated Sep. 8, 2014, received in U.S. Appl. No. 12/888,389, 13 pages.

Notice of Allowance, dated Feb. 11, 2015, received in U.S. Appl. No. 12/888,389, 13 pages.

Notice of Allowance, dated Jun. 15, 2012, received in U.S. Appl. No. 12/888,391, 23 pages.

Office Action, dated Jun. 28, 2013, received in U.S. Appl. No. 13/077,524, 17 pages.

Office Action, dated Apr. 4, 2013, received in U.S. Appl. No. 12/789,426, 8 pages.

Office Action, dated Feb. 12, 2014, received in U.S. Appl. No. 13/077,524, 13 pages.

Notice of Allowance, dated May 27, 2015, received in U.S. Appl. No. 13/077,524, 9 pages.

Notice of Allowance, dated Sep. 15, 2015, received in U.S. Appl. No. 13/077,524, 9 pages.

Office Action, dated Mar. 19, 2013, received in U.S. Appl. No. 13/333,909, 18 pages.

Office Action, dated Dec. 5, 2013, received in U.S. Appl. No. 13/333,909, 24 pages.

Notice of Allowance, dated Mar. 31, 2014, received in U.S. Appl. No. 13/333,909. 20 pages.

Office Action, dated Dec. 17, 2015, received in U.S. Appl. No. 14/536,426, 28 pages.

Office Action, dated Jul. 15, 2015, received in Australian Patent Application No. 2013259606, which corresponds with U.S. Appl. No. 14/536,426, 3 pages.

Office Action, dated Nov. 18, 2015, received in Australian Patent Application No. 2015101231, which corresponds with U.S. Appl. No. 14/536,426, 3 pages.

Office Action, dated Mar. 4, 2016, received in Japanese Patent Application No. 2015-511644, which corresponds with U.S. Appl. No. 14/536,426, 3 pages.

Office Action, dated Feb. 1, 2016, received in Australian Patent Application No. 2013368441, which corresponds with U.S. Appl. No. 14/608,926, 3 pages.

Notice of Allowance, dated Mar. 30, 2016, received in Australian Patent Application No. 2013368441, which corresponds with U.S. Appl. No. 14/608,926, 1 page.

(56) References Cited

OTHER PUBLICATIONS

Office Action, dated Mar. 14, 2016, received in Japanese Patent Application No. 2015-549392, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated Nov. 12, 2015, received in European Patent Application No. 13724102.2, which corresponds with U.S. Appl. No. 14/536,646, 6 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Office Action, dated Apr. 5, 2016, received in Korean Patent Application No. 10-2015-7018448, which corresponds with U.S. Appl. No. 14/536,141, 6 pages.
Office Action, dated Jul. 9, 2015, received in Australian Patent Application No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Aug. 10, 2015, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jan. 7, 2016, received in European Patent Application No. 13724107.1, which corresponds with U.S. Appl. No. 14/052,515, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Nov. 23, 2015, received in U.S. Appl. No. 14/183,316, 17 pages.
Office Action, dated Dec. 18, 2015, received in U.S. Appl. No. 14/183,347, 6 pages.
Office Action, dated Mar. 31, 2016, received in U.S. Appl. No. 14/864,737, 17 pages.
Office Action, dated Apr. 5, 2016, received in Danish Patent Application No. 201500577, which corresponds with U.S. Appl. No. 14/864,737, 7 pages.
Certificate of Grant, dated Mar. 24, 2016, received in Australian Patent Application No. 2016100254, which corresponds with U.S. Appl. No. 14/866,981, 1 page.

Office Action, dated Mar. 18, 2016, received in Danish Patent Application No. 201500575, which corresponds with U.S. Appl. No. 14/866,981, 9 pages.
Certificate of Grant, dated Mar. 24, 2016, received in Australian Patent Application No. 2016100251, which corresponds with U.S. Appl. No. 14/866,159, 1 page.
Office Action, dated Mar. 9, 2016, received in Danish Patent Application No. 201500574, which corresponds with U.S. Appl. No. 14/866,159, 11 pages.
Certificate of Grant, dated Mar. 24, 2016, received in Australian Patnet Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Office Action, dated Mar. 28, 2016, received in U.S. Appl. No. 14/869,899, 17 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14,864,580, 29 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.

(56) References Cited

OTHER PUBLICATIONS

Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Mar. 18, 2016, received in Danish Patent Application No. 201500594, which corresponds with U.S. Appl. No. 14/867,823, 10 pages.
Office Action, dated Mar. 21, 2016, received in Danish Patent Application No. 201500598, which corresponds with U.S. Appl. No. 14/867,892, 9 pages.
Certificate of Grant, dated Mar. 24, 2016, received in Australian Patent Application No. 20161002253, which corresponds with U.S. Appl. No. 14/867,990, 1 page.
Office Action, dated Mar. 18, 2016, received in Danish Patent Application No. 201500581, which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 12/888,381, 9 pages.
International Preliminary Search Report on Patentability, dated Oct. 9, 2012, received in International Patent Application No. PCT/US2010/050057, which corresponds with U.S. Appl. No. 12/888,381, 6 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, which corresponds with U.S. Appl. No. 14/608,942, 7 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
Invitation to Pay Additional Fees dated Apr. 17, 2014, received in International Application No. PCT/US2013/069484, which corresponds with U.S. Appl. No. 14/608,965, 7 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.

(56) References Cited

OTHER PUBLICATIONS

International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, which corresponds with U.S. Appl. No. 14/608,985, 7 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
b-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.

Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
IBM et al., "Pressure-Sensitive Icons", IBM Technical Disclosure Bulletin, vol. 33, No. 1B, Jun. 1, 1990, 3 pages.
iPodHacks142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Laurie, "The Power of the Right Click," http://vlaurie.com/right-click/customize-context-menu.html, 2002-2016, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.

(56) References Cited

OTHER PUBLICATIONS

Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated May 31, 2016, received in European Patent Application No. 13724102.2 (5846EP), which corresponds with U.S. Appl. No. 14/536,646, 5 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Notice of Allowance, dated Mar. 11, 2016, received in Australian Patent Application No. 2013368443, which corresponds with U.S. Appl. No. 14/536,141, 2 pages.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Jun. 15, 2016, received in Australian Patent Application No. 2013259630, which corresponds with U.S. Appl. No. 14/536,203, 3 pages.
Office Action, dated Feb. 15, 2016, received in Japanese Patent Application No. 2015-511650, which corresponds with U.S. Appl. No. 14/536,203, 5 pages.

Notice of Allowance, dated Aug. 5, 2016, received in Japanese Patent Application No. 2015-511650, which corresponds with U.S. Appl. No. 14/536,203, 4 pages.
Notice of Allowance, dated Sep. 1, 2016, received in Korean Patent Application No. 2014-7034520, which corresponds with U.S. Appl. No. 14/536,203, 5 pages.
Office Action, dated Jul. 22, 2016, received in European Office Action No. 13798465.4, which corresponds with U.S. Appl. No. 14/608,965, 8 pages.
Notice of Allowance, dated Jun. 28, 2016, received in Australian Patent Application No. 2013259637, which corresponds with U.S. Appl. No. 14/536,267, 3 pages.
Notice of Allowance, dated Sep. 1, 2016, received in Korean Patent Application No. 2014-7034530, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Aug. 22, 2016, received in European Patent Application No. 13724107.1, which corresponds with U.S. Appl. No. 14/536,291, 7 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.

(56) References Cited

OTHER PUBLICATIONS

Innovation (Unexamined) Patent, dated Aug. 4, 2016, received in Australian Patent Application No. 2016101201, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action, dated Sep. 2, 2016, received in Australian Patent Application No. 201500588, which corresponds with U.S. Appl. No. 14/868,078, 4 pages.
Office Action, dated May 9, 2016, received in U.S. Appl. No. 14/863,432, 26 pages.
Office Action, dated Aug. 19, 2016, received in Australian Patent Application No. 2016100647, which corresponds with U.S. Appl. No. 14/863,432, 5 pages.
Patent, dated Aug. 8, 2016, received in Australian Patent Application 2016100653, corresponds with U.S. Appl. No. 14/866,511, 1 page.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Final Office Action, dated Jul. 29, 2016, received in U.S. Appl. No. 14/866,992, 35 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Office Action (Search Report), dated Apr. 8, 2016, received in Danish Patent Application No. 201500584, which corresponds with U.S. Appl. No. 14/864,580, 9 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Intention to Grant, dated Jun. 10, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Certificate of Exam, dated Jul. 21, 2016, received in Australian Patent Application No. 2016100652, which corresponds with U.S. Appl. No. 14/866,989, 1 page.
Intention to Grant, dated Jun. 10, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Innovation (Unexamined) Patent, dated Aug. 25, 2016, received in Australian Patent Application No. 2016101433, which corresponds with U.S. Appl. No. 14/871,236, 1 page.
Office Action and Search Report, dated May 26, 2016, received in Danish Patent Application No. 201500595, which corresponds with U.S. Appl. No. 14/871,236, 14 pages.
Innovation (Unexamined) Patent, dated Aug. 25, 2016, received in Australian Patent Application No. 2016101436, which corresponds with U.S. Appl. No. 14/871,236, 1 pages.
Office Action and Search Report, dated Jun. 9, 2016, received in Danish Patent Application No. 201500596, which corresponds with U.S. Appl. No. 14/870,882, 9 pages.
Grant, dated Jun. 21, 2016, received in Danish Patent Application No. 201500597, which corresponds with U.S. Appl. No. 14/871,227, 2 pages.
Innovation Patent, dated Aug. 25, 2016, received in Australian Patent Application No. 2016101435, which corresponds with U.S. Appl. No. 14/871,462, 1 page.
Grant, dated Aug. 30, 2016, received in Danish Patent Application No. 201500600, which corresponds with U.S. Appl. No. 14/871,462, 2 pages.
Office Action, dated Apr. 29, 2016, received in U.S. Appl. No. 14/867,823, 28 pages.
Office Action, dated Sep. 7, 2016, received in Danish Patent Application No. 201500594, which corresponds with U.S. Appl. No. 14/867,823, 4 pages.
Office Action, dated May 10, 2016, received in U.S. Appl. No. 14/867,892, 28 pages.
Office Action, Sep. 14, 2016, received in Danish Patent Application No. 201500598, which corresponds with U.S. Appl. No. 14/867,892, 4 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Certificate of Registration, dated Jun. 16, 2016, received in German Patent No. 202016001489.8, which corresponds with U.S. Appl. No. 14/867,990, 3 pages.
Extended European Search Report, dated Nov. 6, 2015, received in European Patent Application No. 15183980.0, which corresponds with U.S. Appl. No. 14/536,426, 7 pages.
International Search Report and Written Opinion, dated Jul. 21, 2016, received in International Patent Application No. PCT/US2016/019913, which corresponds with U.S. Appl. No. 14/868,078, 16 pages.

(56) References Cited

OTHER PUBLICATIONS

International Search Report and Written Opinion, dated Aug. 29, 2016, received in International Patent Application No. PCT/US2016/021400, which corresponds with U.S. Appl. No. 14/869,899, 51 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPhoneOperatior, "Wasser Liveeffekt fur Homescreen & Lockscreen—Aquaboard (Cydia)", http://www.youtube.com/watch?v=fG9YMF-mB0Q, Sep. 22, 2012, 3 pages.
Kiener, "Force Touch on iPhone", https://www.youtube.com/watch?v=CEMmnsU5fC8, Aug. 4, 2015, 4 pages.
Kost, "LR3—Deselect All Images But One", Julieanne Kost's Blog, blogs.adobe.com/jkost/2011/12/lr3-deselect-all-images-but-one.html, Dec. 22, 2011, 1 page.
Matthew, "How to Preview Photos and Images From Right-Click Context Menue in Windows [Tip], https://dottech.org/159009/add-image-preview-in-windows-context-menu-tip", Jul. 4, 2014, 5 pages.
Microsoft, "Lumia—How to Personalize Your Start Screen", https://www.youtube.com/watch?v=6Gl5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Mar. 15, 2017, received in U.S. Appl. No. 14/535,671, 13 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Certificate of Grant, dated Sep. 15, 2016, received in Australian Patent Australian Patent Application No. 2013259606, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14,536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Office Action, dated Mar. 29, 2017, received in Australian patent Application No. 2016201303, which corresponds with U.S. Appl. No. 14/608,942, 3 pages.
Office Action, dated Oct. 7, 2016, received in European Patent Application No. 13798464.7, which corresponds with U.S. Appl. No. 14/608,942, 7 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Office Action, dated Feb. 6, 2017, received in Korean Patent Application No. 2016-7033834, which corresponds with U.S. Appl. No. 14/536,203, 4 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Certificate of Grant, dated Oct. 21, 2016, received in Australian Patent Application No. 2013259637, which corresponds with U.S. Appl. No. 14/536,267, 3 pages.

(56) References Cited

OTHER PUBLICATIONS

Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 20161206015641 30, which corresponds with U.S. Appl. No. 14/536,267, 4 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Office Action, dated Sep. 29, 2016, received in Australian Patent Application No. 2016101481, which corresponds with U.S. Appl. No. 14/536,291, 3 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Dec. 5, 2016, received in Danish Patent Application No. 201500575, which corresponds with U.S. Appl. No. 14/866,981, 3 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.

Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Office Action, dated Apr. 13, 2017, received in U.S. Appl. No. 14/866,992, 34 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Office Action, dated May 2, 2017, received in U.S. Appl. No. 14/856,517, 34 pages.
Notice of Allowance, dated Oct. 24, 2016, received in U.S. Appl. No. 14/857,645, 6 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Notice of Allowance, dated Nov. 8, 2016, received in Chinese Patent Application No. 201620470247.4, which corresponds with U.S. Appl. No. 14/864,580, 3 pages.

(56) References Cited

OTHER PUBLICATIONS

Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Certificate of Examination, dated Dec. 8, 2016, received in Australian Patent Application No. 2016100292, which corresponds with U.S. Appl. No. 14/866,361, 1 page.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Patent, dated Sep. 26, 2016, received in Danish Patent Application No. 201500597, which corresponds with U.S. Appl. No. 14/871,227, 7 pages.
Office Action, dated Mar. 24, 2017, received in Japanese Patent Application No. 2016-533201, which corresponds with U.S. Appl. No. 14/871,227, 6 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Office Action, dated Mar. 13, 2017, received in Japanese Patent Application No. 2016-183289, which corresponds with U.S. Appl. No. 14/871,462, 5 pages.
Final Office Action, dated Nov. 2, 2016, received in U.S. Appl. No. 14/867,892, 48 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Final Office Action, dated May 1, 2017, received in U.S. Appl. No. 15/136,782, 18 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.

(56) References Cited

OTHER PUBLICATIONS

International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Sood, "MultitaskingGestures", http://cydia.saurik.com/package/org.thebigboxx.multitaskinggestures/, Mar. 3, 2014, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "Multitasking Gestures: Zephyr Like Gestures on iOS", https://www.youtube.com/watch?v=Jcod-f7Lw0I, Jan. 27, 2014, 3 pages.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated May 15, 2017, received in Australian Patent Application No. 2016216580, which corresponds with U.S. Appl. No. 14/536,426, 3 pages.
Final Office Action, dated Aug. 25, 2017, received in U.S. Appl. No. 14/536,464, 30 pages.
Office Action, dated May 4, 2017, received in Chinese Patent Application No. 201380068414.1, which corresponds with U.S. Appl. No. 14/608,926, 5 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Patent, dated May 26, 2017, received in European Patent Application No. 13724102.2, which corresponds with U.S. Appl. No. 14/536,646, 1 page.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Notice of Allowance, dated May 12, 2017, received in U.S. Appl. No. 14/608,942, 10 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Office Action, dated Jun. 12, 2017, received in Danish Patent Application No. 201500582, which corresponds with U.S. Appl. No. 14/863,432, 5 pages.
Grant, dated Jul. 21, 2016, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Notice of Allowance, dated Apr. 27, 2017, received in U.S. Appl. No. 14/866,489, 27 pages.

(56) References Cited

OTHER PUBLICATIONS

Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated May 5, 2017, received in Danish Patent Application No. 201500584, which corresponds with U.S. Appl. No. 14/864,580, 3 pages.
Office Action, dated May 5, 2017, received in Danish Patent Application No. 201500585, which corresponds with U.S. Appl. No. 14/864,627, 4 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Aug. 4, 2017, received in Japanese Patent Application No. 2016-533201, which corresponds with U.S. Appl. No. 14/871,227, 6 pages.
Office Action, dated Apr. 20, 2017, received in Chinese Patent Application No. 201621044346.2, which corresponds with U.S. Appl. No. 14/871,462, 3 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Office Action, dated May 4, 2017, received in Danish Patent Application No. 201500598, which corresponds with U.S. Appl. No. 14/867,892, 4 pages.
Final Office Action, dated Aug. 18, 2017, received in U.S. Appl. No. 14/869,873, 20 pages.
Final Office Action, dated Jun. 2, 2017, received in U.S. Appl. No. 15/081,771, 17 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
YouTube, "Recentz—Recent Apps in a Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Office Action, dated Sep. 25, 2017, received in U.S. Appl. No. 14/536,644, 29 pages.
Office Action, dated Oct. 19, 2017, received in U.S. Appl. No. 14/608,926, 14 pages.
Office Action, dated Aug. 22, 2017, received in Korean Patent Application No. 2017-7018250, which corresponds with U.S. Appl. No. 14/608,926, 2 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Notice of Allowance, dated Sep. 20, 2017, received in U.S. Appl. No. 14/536,141, 10 pages.
Office Action, dated Oct. 25, 2017, received in Chinese Patent Application No. 201380035977.0, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.

(56) References Cited

OTHER PUBLICATIONS

Office Action, dated Sep. 13, 2017, received in European Patent Application No. 16177863.4, which corresponds with U.S. Appl. No. 14/536,267, 6 pages.
Notice of Allowance, dated Nov. 17, 2017, received in Japanese Patent Application No. 2016-125839, which corresponds with U.S. Appl. No. 14/536,267, 5 pages.
Notice of Allowance, dated Sep. 1, 2017, received in Korean Patent Application No. 2016-7029533, which corresponds with U.S. Appl. No. 14/536,267, 4 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Notice of Allowance, dated Sep. 19, 2017, received in Chinese Patent Application No. 201380068399.0, which corresponds with U.S. Appl. No. 14/608,985, 3 pages.
Summons, dated Oct. 6, 2017, received in European Patent Application No. 13811032.5, which corresponds with U.S. Appl. No. 14/608,985, 6 pages.
Notice of Allowance, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated Sep. 1, 2017, received in Australian Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Patent, dated Aug. 18, 2017, received in Japanese Patent Application No. 2016558214, which corresponds with U.S. Appl. No. 14/866,511, 3 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Final Office Action, dated Nov. 15, 2017, received in U.S. Appl. No. 14/856,519, 31 pages.
Office Action, dated Sep. 22, 2017, received in Japanese Patent Application No. 2017-029201, which corresponds with U.S. Appl. No. 14/857,636 8 pages.
Final Office Action, dated Oct. 11, 2017, received in U.S. Appl. No. 14/857,700, 13 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Sep. 1, 2017, received in U.S. Appl. No. 14/870,754, 22 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Sep. 1, 2017, received in U.S. Appl. No. 14/870,988, 14 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Office Action, dated Aug. 29, 2017, received in Korean Patent Application No. 2017-7014536, which corresponds with U.S. Appl. No. 15/081,771, 5 pages.
Notice of Allowance, dated Oct. 20, 2017, received in U.S. Appl. No. 15/136,782, 9 pages.
Notice of Allowance, dated Jul. 6, 2017, received in U.S. Appl. No. 15/231,745, 18 pages.
Patent, dated Oct. 30, 2017, received in Danish Patent Application No. 201670593, which corresponds with U.S. Appl. No. 15/231,745, 3 pages.
Office Action, dated Oct. 16, 2017, received in Danish Patent Application No. 201770710, 10 pages.
Office Action, dated Aug. 30, 2017, received in U.S. Appl. No. 15/655,749, 22 pages.
Office Action, dated Oct. 31, 2017, received in U.S. Appl. No. 15/723,069, 7 pages.
Extended European Search Report, dated Oct. 17, 2017, received in European Patent Application No. 17184437.6, Which corresponds with U.S. Appl. No. 14/868,078, 8 pages.
Extended European Search Report, dated Oct. 10, 2017, received in European Patent Application No. 17188507.2, which corresponds with U.S. Appl. No. 14/866,361, 9 pages.
Extended European Search Report, dated Sep. 11, 2017, received in European Patent Application No. 17163309.2, which corresponds with U.S. Appl. No. 14/866,987, 8 pages.
Intention to Grant, dated Jul. 6, 2018, received in European Patent Application No. 13795391.5, which corresponds with U.S. Appl. No. 14/536,426, 5 pages.

(56) References Cited

OTHER PUBLICATIONS

Certificate of Grant, dated Jul. 5,2018, received in Australian patent Application No. 2016201303, which corresponds with U.S. Appl. No. 14/608,942, 4 pages.
Notice of Acceptance, dated Jul. 19, 2018, received in Australian Patent Application No. 2016238917, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Certificate of Grant, dated Jun. 28, 2018, received in Australian Patent Application No. 2016204411, which corresponds with U.S. Appl. No. 14/536,267, 4 pages.
Office Action, dated Jul. 19, 2018, received in Russian Patent Application No. 2017131408, which corresponds with U.S. Appl. No. 14/871,236, 8 pages.
Certificate of Grant, dated Jun. 28, 2018, received in Australian Patent Application No. 2018200705, which corresponds with U.S. Appl. No. 15/272,327, 4 pages.
Certificate of Grant, dated Jun. 28, 2018, received in Australian Patent Application No. 2016304832, which corresponds with U.S. Appl. No. 15/272,345, 4 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new]WMP12 with Taskbar Toolbar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Easton-Ellett, "Three Free Cydia Utilizes To Remove iOS Notifitcation Badges", http://www.ijailbreak.com/cydia/three-free-cydia-utilities-to-remove-ios-notification-badges, Apr. 14, 2012, 2 pages.
IPhoneHacksTV, "Confero allows you to easily manage your Badge notifications—iPhone Hacks", youtube, https://wwwyoutube.com/watch?v=JCk61pnL4SU, Dec. 26, 2014, 3 pages.
MacKenzie et al., "The Tactile Touchpad", Chi '97 Extended Abstracts on Human Factors in Computing Systems Looking to the Future, Chi '97, Mar. 22, 1997, 5 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Oh, et al., "Moving Objects with 2D Input Devices in CAD Systems and Destop Virtual Environments", Proceedings of Graphics Interface 2005, 8 pages, May 2005.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Stewart, et al., "Characteristics of Pressure-Based Input for Mobile Devices", Proceedings of the SIGCHI Conference on Human Factors in Computing Systems, Apr. 2010, 10 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Android Lollipop Lock-Screen Notification Tips", https://www.youtube.corn/watch?v=LZTxHBOwz1U, Nov. 13, 2014. 3 pages.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671 21 pages.
Final Office Action, dated Feb. 22, 2018, received in U.S. Appl. No. 14/608,895, 20 pages.
Notice of Allowance, dated Jun. 26, 2018, received in U.S. Appl. No. 14/608,895, 9 pages.
Office Action, dated Mar. 9, 2018, received in European Patent Application No. 13795391.5, which corresponds with U.S. Appl. No. 14/536,426, 4 pages.
Final Office Action, dated Feb. 26, 2018, received in U.S. Appl. No. 14/536,235, 13 pages.
Notice of Allowance, dated Nov. 30, 2017, received in U.S. Appl. No. 14/536,367, 9 pages.
Notice of Allowance, dated May 16, 2018, received in U.S. Appl. No. 14/536,367, 5 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Notice of Allowance, dated May 10, 2018, received in Chinese Patent Application No. 201380035982.1, which corresponds with U.S. Appl. No. 14/536,426, 2 pages.
Intention to Grant, dated Mar. 9, 2018, received in European Patent Application No. 15183980.0, which corresponds with U.S. Appl. No. 14/536,426, 5 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8. 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Final Office Action, dated Jun. 22, 2018, received in U.S. Appl. No. 14/536,464, 32 pages.
Final Office Action, dated May 3, 2018, received in U.S. Appl. No. 14/536,644, 28 pages.
Final Office Action, dated Jun. 6, 2018, received in U.S. Appl. No. 14/608,926, 19 pages.
Notice of Acceptance, dated Dec. 20, 2017, received in Australian Patent Application No. 2016201451, which corresponds with U.S. Appl. No. 14/608,926, 3 pages.
Certificate of Grant, dated May 3, 2018, received in Australian Patent Application No. 2016201451, which corresponds with U.S. Appl. No. 14/608,926, 1 page.
Notice of Allowance, dated Feb. 8, 2018, received in Chinese Patent Application No. 201380068414.1, which corresponds with U.S. Appl. No. 14/608,926, 2 pages.
Patent, dated May 4, 2018, received in Chinese Patent Application No. 201380068414.1, which corresponds with U.S. Appl. No. 14/608,926, 4 pages.
Oral Summons, dated Feb. 13, 2017, received in European Patent Application No. 13795392.3, which corresponds with U.S. Appl. No. 14/608,926, 11 pages.
Patent, dated Apr. 27, 2018, received in Japanese Patent Application No. 2017-024234, which corresponds with U.S. Appl. No. 14/608,926, 3 pages.
Notice of Allowance, dated Dec. 29, 2017, received in Korean Patent Application No. 2017-7018250, which corresponds with U.S. Appl. No. 14/608,926, 3 pages.
Office Action, dated Feb. 2, 2018, received in Chinese Patent Application NO. 201380035893.7, which corresponds with U.S. Appl. No. 14/536,141, 5 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Feb. 28, 2018, received in U.S. Appl. No. 14/536,166, 5 pages.

(56) References Cited

OTHER PUBLICATIONS

Notice of Allowance, dated Apr. 4, 2018, received in Chinese Patent Application No. 201380035977.0, which corresponds with U.S. Appl. No. 14/536,203, 3 pages.
Office Action, dated Dec. 6, 2017, received in European Patent Application NO. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Patent, dated Jan. 23, 2018, received in Korean Patent Application No. 2016-7033834, which corresponds with U.S. Appl. No. 14/536,203, 4 pages.
Office Action, dated Jul. 2, 2018, received in U.S. Appl. No. 14/608,965, 16 pages.
Oral Proceedings, dated Mar. 7, 2018, received in European Office Action No. 13798465.4, which corresponds with U.S. Appl. No. 14/608,965, 5 pages.
Notice of Allowance, dated Jun. 1, 2018, received in U.S. Appl. No. 14/536,267, 5 pages.
Notice of Acceptance, dated Feb. 27, 2018, received in Australian Patent Application No. 2016204411, which correponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Jun. 13, 2018, received in Chinese Patent Application No. 201810332044.2, which corresponds with U.S. Appl. No. 14/536,267, 2 pages.
Office Action, dated Jan. 25, 2018, received in European Patent Application No. 13724106.3, which corresponds with U.S. Appl. No. 14/536,267, 5 pages.
Intention to Grant, dated Jun. 27, 2018, received in European Patent Application No. 13724106.3, which corresponds with U.S. Appl. No. 14/536,267, 5 pages.
Patent, dated Dec. 1, 2017, received in Korean Patent Application No. 20167029533, which corresponds with U.S. Appl. No. 14/536,267, 2 pages.
Notice of Allowance, dated Dec. 1, 2017, received in U.S. Appl. No. 14/536,291, 19 pages.
Notice of Allowance, dated Mar. 20, 2018, received in U.S. Appl. No. 14/536,291, 5 pages.
Office Action, dated Jun. 29, 2018, received in Japanese Patent Application No. 2017-0803027, which corresponds with U.S. Appl. No. 14/536,291, 5 pages.
Notice of Allowance, dated Apr. 20, 2018, received in U.S. Appl. No. 14/608,985, 5 pages.
Patent, dated Dec. 8, 2017, received in Chinese Patent Application No. 201380068399.0, which corresponds with U.S. Appl. No. 14/608,985, 4 pages.
Patent, dated Dec. 19, 2017, received in Korean Patent Application No. 20157019984, which corresponds with U.S. Appl. No. 14/608,985, 3 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Notice of Allowance, dated May 18, 2018, received in U.S. Appl. No. 14/866,159, 8 pages.
Office Action, dated Jun. 5, 2018, received in Chinese Patent Application NO. 201610137839.9, which corresponds with U.S. Appl. No. 14/866,159, 11 pages.
Office Action, dated Jan. 10, 2018, received in Danish Patent Application No. 201500574, which corresponds with U.S. Appl. No. 14/866,159, 2 pages.
Notice of Allowance, dated Mar. 21, 2018, received in Danish Patent Application No. 201500574, which corresponds with U.S. Appl. No. 14/866,159, 2 pages.
Patent, dated May 22, 2018, received in Danish Patent Application No. 201500574, which corresponds with U.S. Appl. No. 14/866,159, 2 pages.
Notice of Allowance, dated May 24, 2018, received in U.S. Appl. No. 14/868,078, 6 pages.
Certificate of Grant, dated Jan. 3, 2018, received in Australian Patent Application No. 2016229421, which corresponds with U.S. Appl. No. 14/868,078, 1 page.
Office Action, dated Apr. 25, 2018, received in European Patent Application No. 16708916.8, which corresponds with U.S. Appl. No. 14/868,078, 6 pages.
Office Action, dated Nov. 24, 2017, received in European Patent Application No. 16727900.9, which corresponds with U.S. Appl. No. 14/866,511, 5 pages.
Office Action, dated May 24, 2018, received in European Patent Application No. 16727900.9, which corresponds with U.S. Appl. No. 14/866,511, 7 pages.
Office Action, dated Jan. 29, 2018, received in Danish Patent Application No. 201500592, which corresponds with U.S. Appl. No. 14/869,899, 2 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Office Action, dated May 1, 2018, received in Danish Patent Application No. 201670594, which corresponds with U.S. Appl. No. 14/869,899, 2 pages.
Office Action, dated Jan. 29, 2018, received in U.S. Appl. No. 14/866,992, 44 pages.
Office Action, dated Mar. 26, 2018, received in Australian Patent Application No. 2016304890, which corresponds with U.S. Appl. No. 14/866,992, 3 pages.
Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 pages.
Office Action, dated Mar. 13, 2018, received in U.S. Appl. No. 15/009,688, 10 pages.
Notice of Allowance, dated Jun. 29, 2018, received in U.S. Appl. No. 14/856,517, 11 pages.

(56) References Cited

OTHER PUBLICATIONS

Notice of Allowance, dated Jan. 31, 2018, received in U.S. Appl. No. 14/856,519, 9 pages.
Notice of Allowance, dated May 2, 2018, received in U.S. Appl. No. 14/856,519, 10 pages.
Final Office Action, dated Nov. 16, 2017, received in U.S. Appl. No. 14/856,520, 41 pages.
Notice of Allowance, dated Feb. 9, 2018, received in U.S. Appl. No. 14/856,522, 9 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Jun. 25, 2018, received in Japanese Patent Application No. 2017-029201, which corresponds with U.S. Appl. No. 14/857,636, 4 pages.
Office Action, dated Dec. 1, 2017, received in U.S. Appl. No. 14/857,663, 15 pages.
Notice of Allowance, dated Feb. 12, 2018, received in U.S. Appl. No. 14/857,730, 13 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Notice of Allowance, dated Mar. 16, 2018, received in Danish Patent Application No. 201500579, which corresponds with U.S. Appl. No. 14/866,361, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated Jan. 22. 2018, received in U.S. Appl. No. 14/866,987, 22 pages.
Office Action, dated May 7, 2018, received in European Patent Application No. 16189421.7, which corresponds with U.S. Appl. No. 14/866,987, 5 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Nov. 29, 2017, received in U.S. Appl. No. 14/866,989, 31 pages.
Final Office Action, dated Jul. 3, 2018, received in U.S. Appl. No. 14/866,989, 17 pages.
Office Action, dated Feb. 26, 2018, received in Australian Patent Application No. 2017201079, which corresponds with U.S. Appl. No. 14/866,989, 6 pages.
Patent, dated Mar. 9, 2018, received in Japanese Patent Application No. 2016233450, which corresponds with U.S. Appl. No. 14/866,989, 4 pages.
Notice of Allowance, dated Feb. 5, 2018, received in Japanese Patent Application No. 2016-233450, which corresponds with U.S. Appl. No. 14/866,989, 5 pages.

Office Action, dated Jan. 29, 2018, received in Danish Patent Application No. 201500595, which corresponds with U.S. Appl. No. 14/871,236, 2 pages.
Notice of Allowance, dated Apr. 26, 2018, received in Danish Patent Application No. 201500595, which corresponds with U.S. Appl. No. 14/871,236, 2 pages.
Patent, dated Jun. 18, 2018, received in Danish Patent Application No. 201500595, which corresponds with U.S. Appl. No. 14/871,236, 3 pages.
Final Office Action, dated Mar. 9, 2018, received in U.S. Appl. No. 14/870,754, 19 pages.
Notice of Allowance, dated Jul. 2, 2018, received in U.S. Appl. No. 14/870,754, 9 pages.
Final Office Action, dated Apr. 20, 2018, received in U.S. Appl. No. 14/870,882, 7 pages.
Notice of Allowance, dated Jul. 12, 2018, received in U.S. Appl. No. 14/870,882, 5 pages.
Patent, dated Jan. 29, 2018, received in Danish Patent Application No. 201500596, which corresponds with U.S. Appl. No. 14/870,882 4 pages.
Final Office Action, dated Feb. 16, 2018, received in U.S. Appl. No. 14/870,988, 18 pages.
Notice of Allowance, dated Jun. 11, 2018, received in U.S. Appl. No. 14/871,227, 11 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227 8 pages.
Final Office Action, dated Mar. 15, 2018, received in U.S. Appl. No. 14/871,336, 23 pages.
Patent, dated Oct. 30, 2017, Danish Patent Application No. 201500601, which corresponds with U.S. Appl. No. 14/871,336, 5 pages.
Office Action, dated Apr. 2, 2018, received in Japanese Patent Application No. 2018-020324, which corresponds with U.S. Appl. No. 14/874,336, 4 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Office Action, dated Apr. 24, 2018, received in U.S. Appl. No. 14/867,892, 63 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,261, 26 pages.
Office Action, dated Jan. 23, 2018, received in U.S. Appl. No. 14/869,855, 24 pages.
Notice of Allowance, dated May 31, 2018, received in U.S. Appl. No. 14/869,855, 10 pages.
Office Action, dated Jan. 18, 2018, received in U.S. Appl. No. 14/869,873, 25 pages.
Final Office Action, dated May 23, 2018, received in U.S. Appl. No. 14/869,873, 18 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Notice of Allowance, dated Mar. 30, 2018, received in U.S. Appl. No. 14/867,990, 5 pages.
Office Action, dated Feb. 19, 2018, received in Danish Patent Application No. 201500581, which corresponds with U.S. Appl. No. 14/867,990, 4 pages.
Office Action, dated Apr. 19, 2018, received in U.S. Appl. No. 14/869,703, 19 pages.
Office Action, dated Dec. 12, 2017, received in U.S. Appl. No. 15/009,668, 32 pages.

(56) References Cited

OTHER PUBLICATIONS

Final Office Action, dated Jul. 3, 2018, received in U.S. Appl. No. 15/009,668, 19 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Notice of Allowance, dated Jun. 28, 2018, received in Korean Patent Application No. 2017-7014536, which corresponds with U.S. Appl. No. 15/081,771, 4 pages.
Office Action, dated May 4, 2018, received in Australian Patent Application No. 2018202855, which corresponds with U.S. Appl. No. 15/136,782, 3 pages.
Office Action, dated Jan. 8, 2018, received in Danish Patent Application No. 201770190, which corresponds with U.S. Appl. No. 15/138,782, 2 pages.
Notice of Allowance, dated Mar. 19, 2018, received in Danish Patent Application No. 201770190, which corresponds with U.S. Appl. No. 15/136,782, 2 pages.
Patent, dated May 22, 2018, received in Danish Patent Application 201770190, which corresponds with U.S. Appl. No. 15/136,782, 2 pages.
Office Action, dated Jun. 1, 2018, received in Japanese Patent Application No. 2018062161, which corresponds with U.S. Appl. No. 15/136,782, 5 pages.
Office Action, dated Feb. 22, 2018, received in Danish Patent Application No, 201670587, which corresponds with U.S. Appl. No. 15/231,745, 4 pages.
Office Action, dated Jan. 10, 2018, received in Danish Patent Application No. 201670590, which corresponds with U.S. Appl. No. 15/231,745, 2 pages.
Patent, dated May 28, 2018, received in Danish Patent Application No. 201670590, which corresponds with U.S. Appl. No. 15/231,745, 2 pages.
Office Action, dated Apr. 11, 2018, received in Danish Patent Application No. 201670591, which corresponds with U.S. Appl. No. 15/231,745, 3 pages.
Office Action, dated Jan. 30, 2018, received in Danish Patent Application No. 201670592, which corresponds with U.S. Appl. No. 15/231,745, 2 pages.
Notice of Allowance, dated Mar. 27, 2018, received in Danish Patent Application No. 201670592, which corresponds with U.S. Appl. 15/231,745, 2 pages.
Patent, dated May 28, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,691 29 pages.
Final Office Action, dated May 10, 2018, received in U.S. Appl. No. 15/655,749, 19 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.

International Preliminary Report on Patentability, dated Sep. 12, 2017, received in International Patent Application No. PCT/US2016/021400, which corresponds with U.S. Appl. No. 14/869,899, 39 pages.
International Preliminary Report on Patentability, dated Feb. 13, 2018, received in International Patent Application No. PCT/US2016/046407, which corresponds with U.S. Appl. No. 15/009,688, 20 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated May 30, 2018, received in International Patent Application No. 18155939.4, which corresponds with U.S. Appl. No. 15/272,327, 8 pages.
Extended European Search Report, dated Mar. 2, 2018, received in European Patent Application No. 17206374.5, which corresponds with U.S. Appl. No. 15/272,343, 11 pages.
Notice of Allowance, dated Sep. 5, 2018, received in U.S. Appl. No. 14/535,671 5 pages.
Notice of Allowance, dated Aug. 15, 2018, received in U.S. Appl. No. 14/536,235, 5 pages.
Notice of Allowance, dated Aug. 9, 2018, received in U.S. Appl. No. 14/536,646, 5 pages.
Final Office Action, dated Aug. 7, 2018, received in U.S. Appl. No. 14/536,648, 14 pages.
Final Office Action, dated Aug. 28, 2018, received in U.S. Appl. No. 14/866,992, 52 pages.
Final Office Action, dated Sep. 19, 2018, received in U.S. Appl. No. 15/009,661, 28 pages.
Notice of Allowance, dated Aug. 3, 2018, received in U.S. Appl. No. 15/009,676, 6 pages.
Notice of Allowance, dated Aug. 16, 2018, received in U.S. Appl. No. 14/857,636, 5 pages.
Notice of Allowance, dated Aug. 16, 2018, received in U.S. Appl. No. 14/857,663, 5 pages.
Notice of Allowance, dated Aug. 27, 2018, received in U.S. Appl. No. 14/870,988, 11 pages.
Notice of Allowance, dated Jul. 30, 2018, received in U.S. Appl. No. 14/869,873, 8 pages.
Office Action, dated Sep. 7, 2018, received in U.S. Appl. No. 14/869,997, 23 pages.
Notice of Allowance, dated Aug. 15, 2018, received in U.S. Appl. No. 15/482,618, 7 pages.
Anonymous, "Android—What Should Status Bar Toggle Button Behavior Be?", https://ux.stackechange.com/questions/34814, Jan. 15, 2015, 2 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
YouTube, "How to Use 3D Touch Multitasking on iPhone", https://www.youtube.com/watch?v=kDq05uRdrCg, Sep. 29, 2015, 1 page.
Patent, dated Aug. 17, 2018, received in Chinese Patent Application No. 201380035982.1, which corresponds with U.S. Appl. No. 14/536,426, 4 pages.
Notice of Allowance, dated Aug. 8, 2018, received in Chinese Patent Application No. 201510566550.4, which corresponds with U.S. Appl. No. 14/536,426, 3 pages.
Intention to Grant, dated Aug. 14, 2018, received in European Patent Application No. 15183980.0, which corresponds with U.S. Appl. No. 14/536,426, 5 pages.
Notice of Acceptance, dated Jul. 19, 2018, received in Australian Patent Application No. 2016262773, which corresponds with U.S. Appl. No. 14/536,141, 3 pages.
Notice of Allowance, dated Aug. 31, 2018, received in Chinese Patent Application No. 201380035893.7, which corresponds with U.S. Appl. No. 14/536,141, 6 pages.

(56) References Cited

OTHER PUBLICATIONS

Office Action, dated Aug. 13, 2018, received in Japanese Patent Application No. 2017-141953, which corresponds with U.S. Appl. No. 14/536,141, 6 pages.
Office action, dated Aug. 1, 2018, received in Chinese Patent Application No. 201380074060.1, which corresponds with U.S. Appl. No. 14/608,965, 5 pages.
Notice of Acceptance, dated Jul. 19, 2018, received in Australian Patent Application No. 2016216658, which corresponds with U.S. Appl. No. 14/536,291, 3 pages.
Certificate of Grant, dated Jun. 29, 2018, received in Hong Kong Patent Application No. 15112851.6, which corresponds with U.S. Appl. No. 14/608,985, 2 pages.
Notice of Acceptance, dated Jul. 19, 2018, received in Australian Patent Application No. 2016247194, which corresponds with U.S. Appl. No. 14/536,648, 3 pages.
Office Action, dated Aug. 24, 2018, received in Japanese Patent Application No. 2017-113598, which corresponds with U.S. Appl. No. 14/609,042, 6 pages.
Office Action, dated Sep. 11, 2018, received in Chinese Patent Application No. 201610159295.6, which corresponds with U.S. Appl. No. 14/864,737, 6 pages.
Office Action, dated Aug. 20, 2018, received in Chinese Patent Application No. 01610130348.1, which corresponds with U.S. Appl. No. 14/868,078, 6 pages.
Notice of Acceptance, dated Aug. 23, 2018, received in Australian Patent Application No. 2018204611, which corresponds with U.S. Appl. No. 14/869,899, 3 pages.
Office Action, dated Aug. 31, 2018, received in Australian Patent Application No. 2016276030, which corresponds with U.S. Appl. No. 14/864,601, 3 pages.
Notice of Allowance, dated Jul. 30, 2018, received in Japanese Patent Application No. 2018-506989, which corresponds with U.S. Appl. No. 15/272,327, 4 pages.
Extended European Search Report, dated Jul. 30, 2018, received in European Patent Application No. 18180503.7, which corresponds with U.S. Appl. No. 14/536,426, 7 pages.
Extended European Search Report, dated Aug. 17, 2018, received in European Patent Application No. 18175195.9, which corresponds with U.S. Appl. No. 14/869,899, 13 pages.
Extended European Search Report, dated Aug. 2, 2018, received in European Patent Application No. 18168941.5, which corresponds with U.S. Appl. No. 14/871,236, 11 pages.
Extended European Search Report, dated Aug. 24, 2018, received in European Patent Application No. 18171453.6, which corresponds with U.S. Appl. No. 15/136,782, 9 pages.
Anonymous, "Event Handling Guide for iOS", https://github.com/lonfee88/iOSDevelopeLibrary/raw/master/EventHandlingiPhoneOS.pdf, Apr. 15, 2015, 3 pages.
Anonymous, "Event Handling Guide for iOS—GitHub", https://github.com/lonfee88/iOSDevelopeLibrary/blob/master/EventHandlingiPhoneOS.pdf, Apr. 15, 2015, 3 pages.
Binbill, "Android 5.0 Lollipop", https://www.bilibili.com/video/av1636064?from=search&seid=3128140235778895126, Oct. 19, 2014, 3 pages.
McGarry, "Everything You Can Do With Force Touch on Apple Watch", Macworld, www.macworld.com, May 6, 2015, 4 pages.
Nickinson, "How to use Do Not Disturb on the HTC One M8", Android Central (Year: 2014) Apr. 7, 2014, 9 pages.
Office Action. dated Oct. 9, 2018, received in Chinese Patent Application No, 201380068493.6, which corresponds with U.S. Appl. No. 14/608,895, 3 pages.
Office Action, dated Oct. 5, 2018, received in Korean Patent Application No. 20187028236, which corresponds with U.S. Appl. No. 14/608,895, 6 pages.
Certificate of Grant, dated Sep. 13, 2018, received in Australian Patent Application No. 2016216580, which corresponds with U.S. Appl. No. 14/536,426, 1 pages.

Office Action, dated Oct. 8, 2018, received in Chinese Patent Application No. 201380068295.X, which corresponds with U.S. Appl. No. 14/608,942, 3 pages.
Decision to Grant, dated Sep. 13, 2018, received in European Patent Application No. 13798464.7, which corresponds with U.S. Appl. No. 14/608,942, 2 pages.
Office Action, dated Oct. 24, 2018, received in European Patent Application No. 13724104.8, which corresponds with U.S. Appl. No. 14/536,203, 5 pages.
Office Action, dated Oct. 19, 2018, received in Japanese Patent Application No, 2018-022394, which corresponds with U.S. Appl. No. 14/536,203, 4 pages.
Decision to Grant, dated Sep. 6, 2018, received in European Office Action No, 13798465.4, which corresponds with U.S. Appl. No. 14/608,965, 2 pages.
Decision to Grant, dated Oct. 18, 2018, received in European Patent Application No. 13724106.3, which corresponds with U.S. Appl. No. 14/536,267, 3 pages.
Office Action, dated Oct. 25, 2018, received in European Patent Application No, 17184437.6, which corresponds with U.S. Appl. No. 14/868,078, 6 pages.
Office Action, dated Oct. 9, 2018, received in Danish Patent Application No. 201670594, which corresponds with U.S. Appl. No. 14/869,899, 2 pages.
Office Action, dated Sep. 21, 2018, received in Japanese Patent Application No, 2018-100827, which corresponds with U.S. Appl. No. 14/869,899, 4 pages.
Office Action, dated Oct. 5, 2018, received in Korean Patent Application No. 2018-7017213, which corresponds with U.S. Appl. No. 14/869,899, 3 pages.
Office Action, dated Oct. 12, 2018, received in European Patent Application No. 16758008.3, which corresponds with U.S. Appl. No. 14/866,992, 11 pages.
Office Action, dated Oct. 19, 2018, received in Chinese Patent Application No. 201610189298.4, which corresponds with U.S. Appl. No. 14/866,361, 6 pages.
Office Action, dated Oct. 12, 2018, received in Japanese Patent Application No. 2017-141962, which corresponds with U.S. Appl. No. 14/866,361, 6 pages.
Office Action, dated Sep. 14, 2018, received in Korean Patent Application No. 2018-7013039, which corresponds with U.S. Appl. No. 14/866,361, 2 pages.
Office Action, dated Sep. 19, 2018, received in Chinese Patent Application No. 201610342314.9, which corresponds with U.S. Appl. No. 14/866,989, 6 pages.
Office Action, dated Oct. 11, 2018, received in Australian Patent Application No. 2017245442, which corresponds with U.S. Appl. No. 14/871,227, 4 pages.
Intent to Grant, dated Sep. 17, 2018, received in European Patent No. 16711743.1, which corresponds with U.S. Appl. No. 14/871,227, 5 pages.
Notice of Allowance, dated Oct. 1, 2018, received in Korean Patent Application No. 2016-7019816, which corresponds with U.S. Appl. No. 14/871,227, 6 pages.
Notice of Allowance, dated Oct. 12, 2018, received in Japanese Patent Application No. 2018-020324, which corresponds with U.S. Appl. No. 14/871,336, 5 pages.
Notice of Allowance, dated Oct. 12, 2018, received in Japanese Patent Application No. 2017-086460, which corresponds with U.S. Appl. No. 15/081,771, 5 pages.
Patent, dated Sep. 28, 2018, received in Korean Patent Application No. 2017-7014536, which corresponds with U.S. Appl. No. 15/081,771, 3 pages.
Notice of Acceptance, dated Sep. 10, 2018, received in Australian Patent Application No. 2018202855, which corresponds with U.S. Appl. No. 15/136,782, 3 pages.
Office Action, dated Sep. 14, 2018, received in European Patent Application No. 15155939.4, which corresponds with U.S. Appl. No. 15/272,327, 5 pages.
Patent, dated Aug. 31, 2018, received in Japanese Patent Application No. 2018-506989, which corresponds with U.S. Appl. No. 15/272,327, 3 pages.

(56) References Cited

OTHER PUBLICATIONS

Extended European Search Report, dated Oct. 30, 2018, received in European Patent Application No. 18183789.9, which corresponds with U.S. Appl. No. 14/536,267, 11 pages.
Dachis, "All the Awesome Things You Can Do With a Long Press on Your iPhone, iPad, or iPad Touch", www.lifehacker.com, Jan. 25, 2012, 4 pages.
Office Action, dated Nov. 2, 2018, received in U.S. Appl. No. 14/536,644, 24 pages.
Office Action, dated Oct. 11, 2018, received in U.S. Appl. No. 14/609,006, 12 pages.
Notice of Allowance, dated Oct. 9, 2018, received in U.S. Appl. No. 14/864,529, 11 pages.
Final Office Action, dated Oct. 11, 2018, received in U.S. Appl. No. 14/866,987, pages.
Final Office Action, dated Oct. 17, 2018, received in U.S. Appl. No. 14/867,892, 48 pages.
Final Office Action, dated Oct. 4. 2018, received in U.S. Appl. No. 14/869,361, 28 pages.
Final Office Action, dated Oct. 26, 2018, received in U.S. Appl. No. 14/869,703, 19 pages.
Notice of Allowance, dated Oct. 4, 2018, received in U.S. Appl. No. 15/272,327, 46 pages.
Office Action, dated Oct. 26, 2018, received in U.S. Appl. No. 15/272,341, 22 pages.
Notice of Allowance, dated Sep. 20, 2018, received in U.S. Appl. No. 15/272,343, 44 pages.
Office Action, dated Oct. 15, 2018, received in U.S. Appl. No. 16/272,345, 31 pages.
Notice of Allowance, dated Oct. 12, 2018, received in U.S. Appl. No. 15/499,693, 8 pages.

* cited by examiner

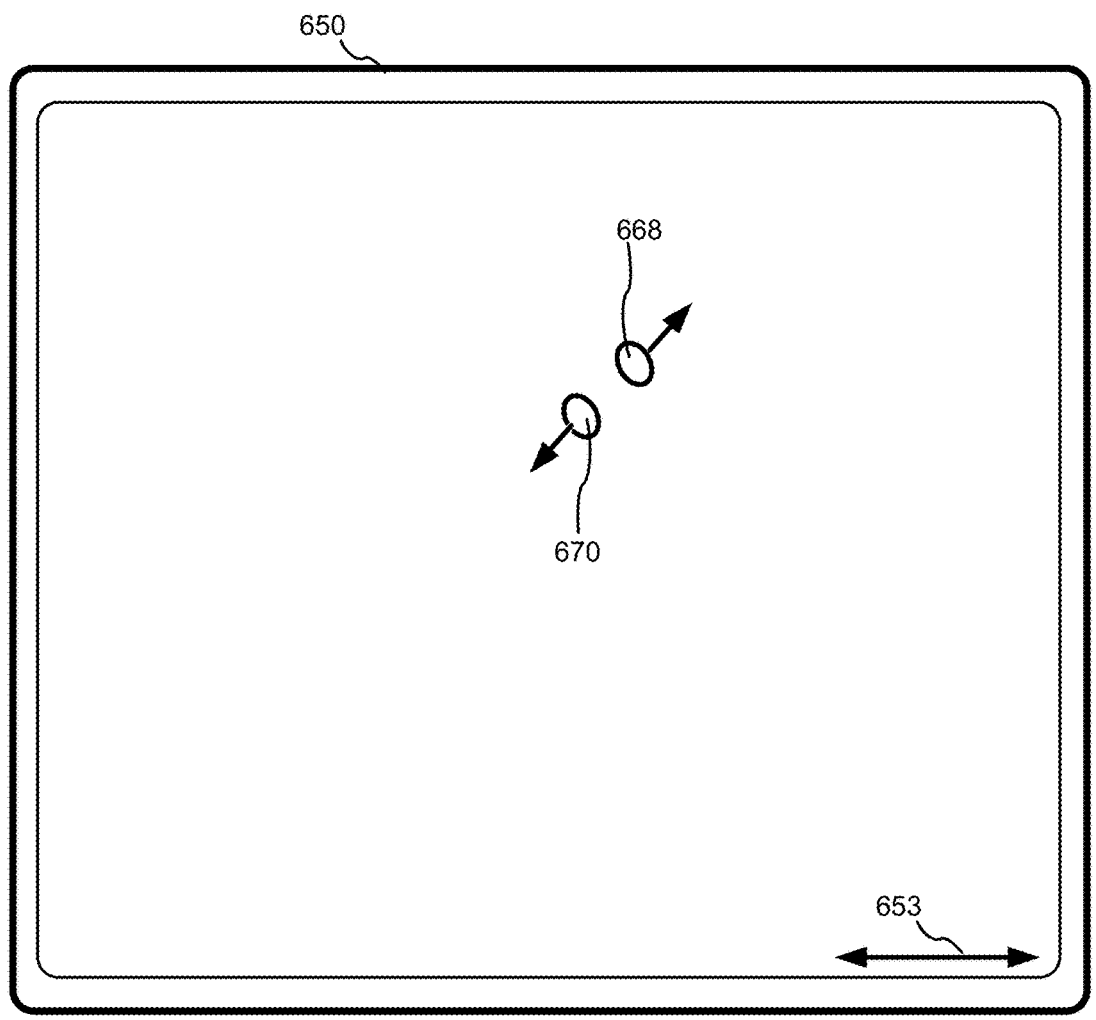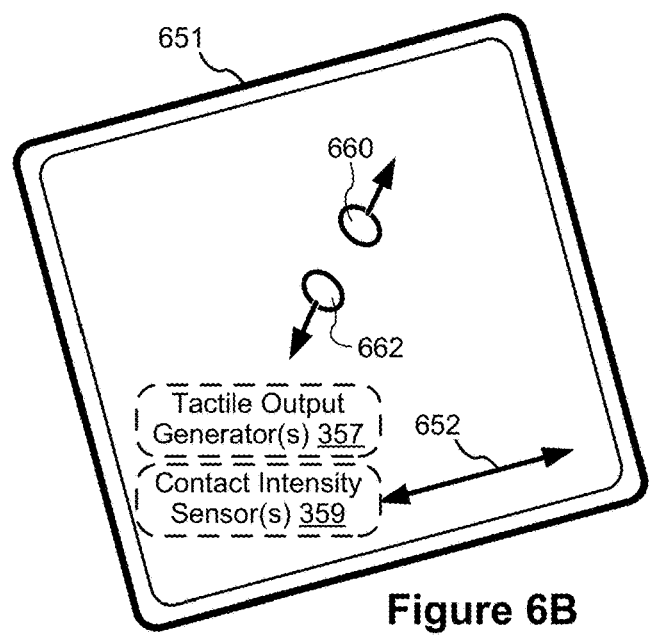
Figure 6B

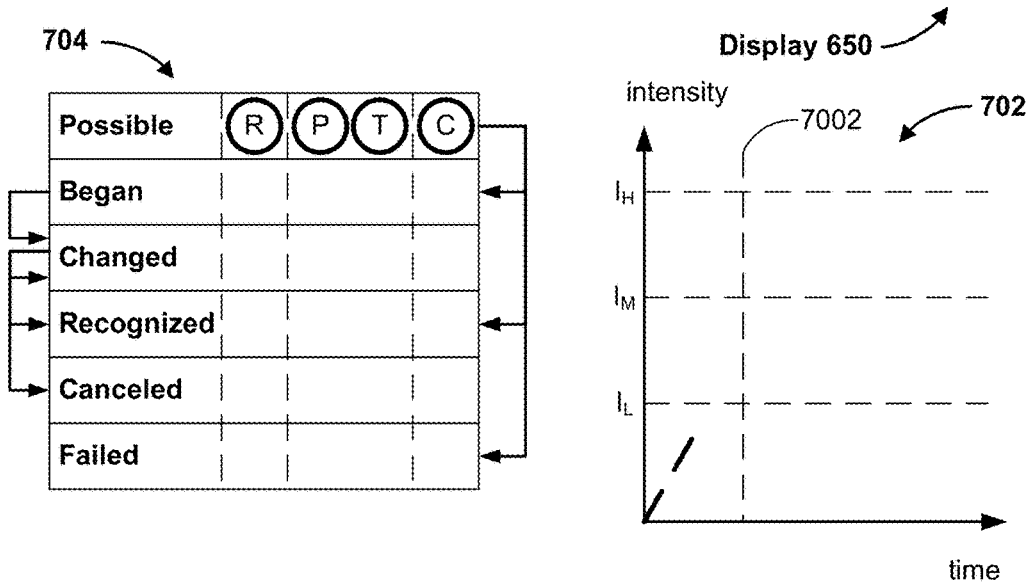
Figure 7A

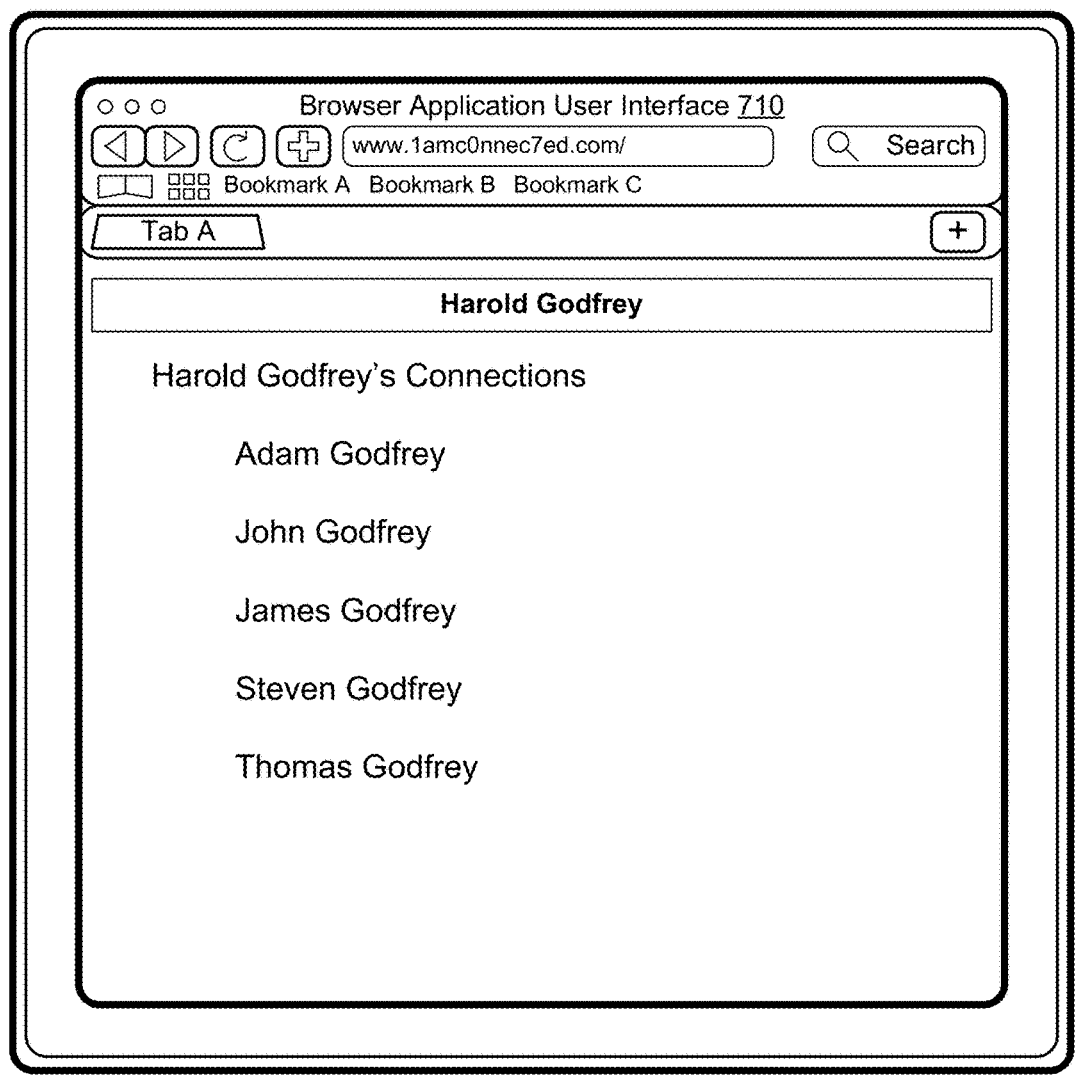
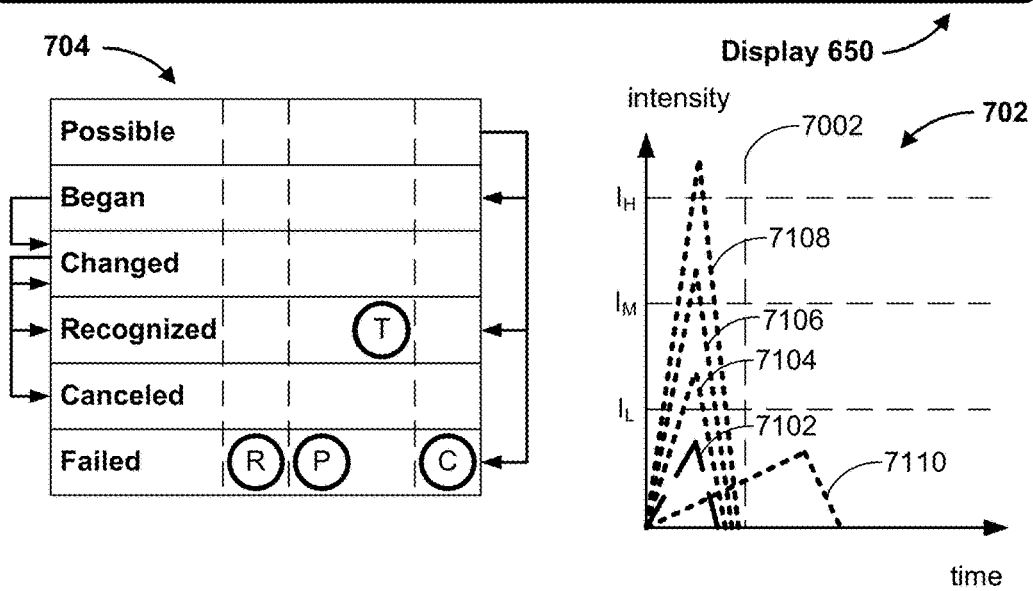
Figure 7B

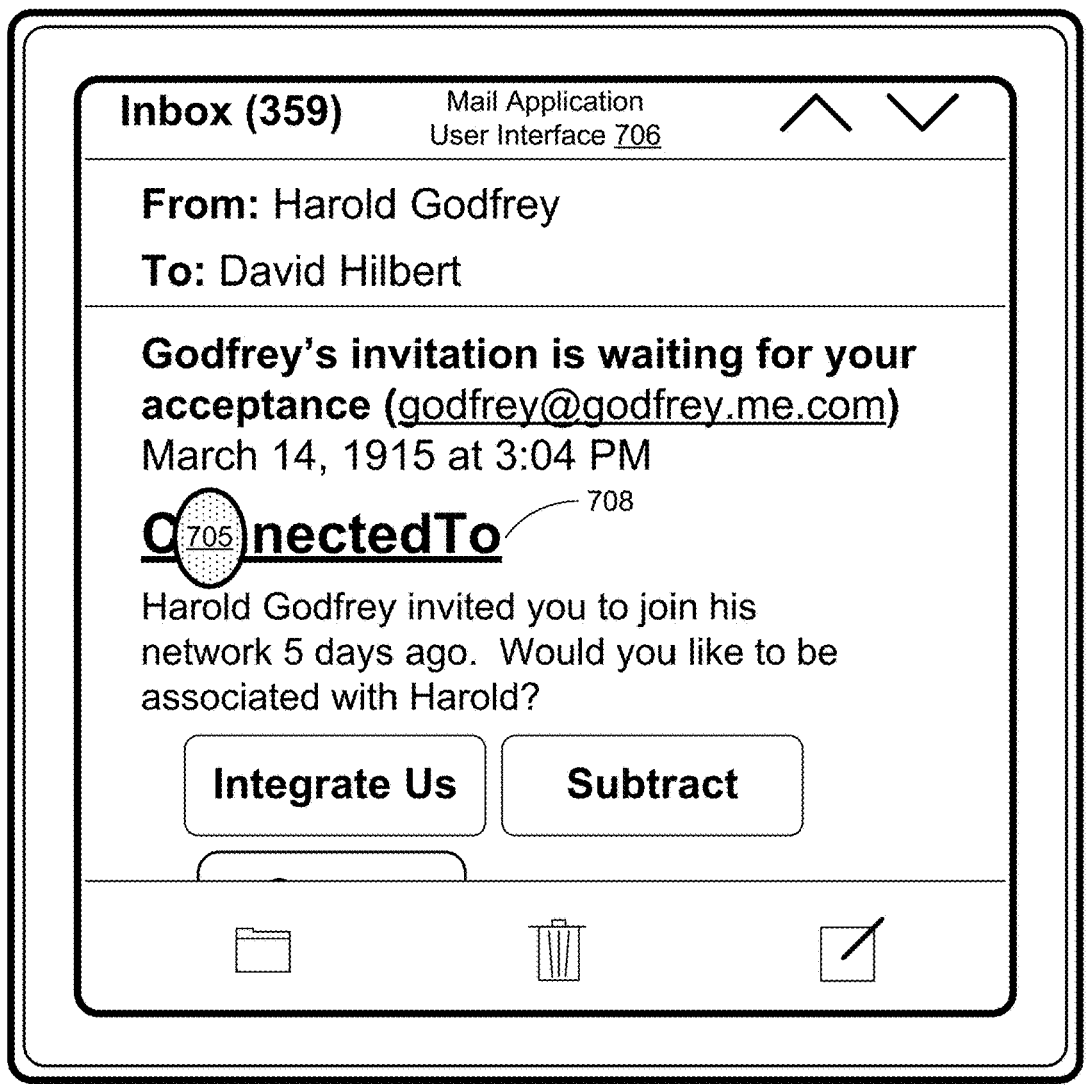
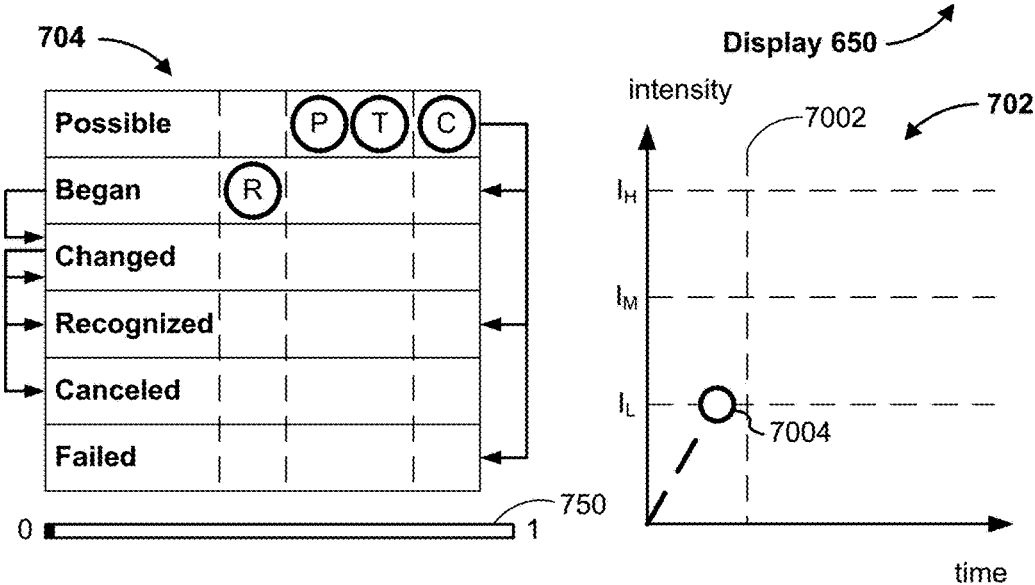
Figure 7C

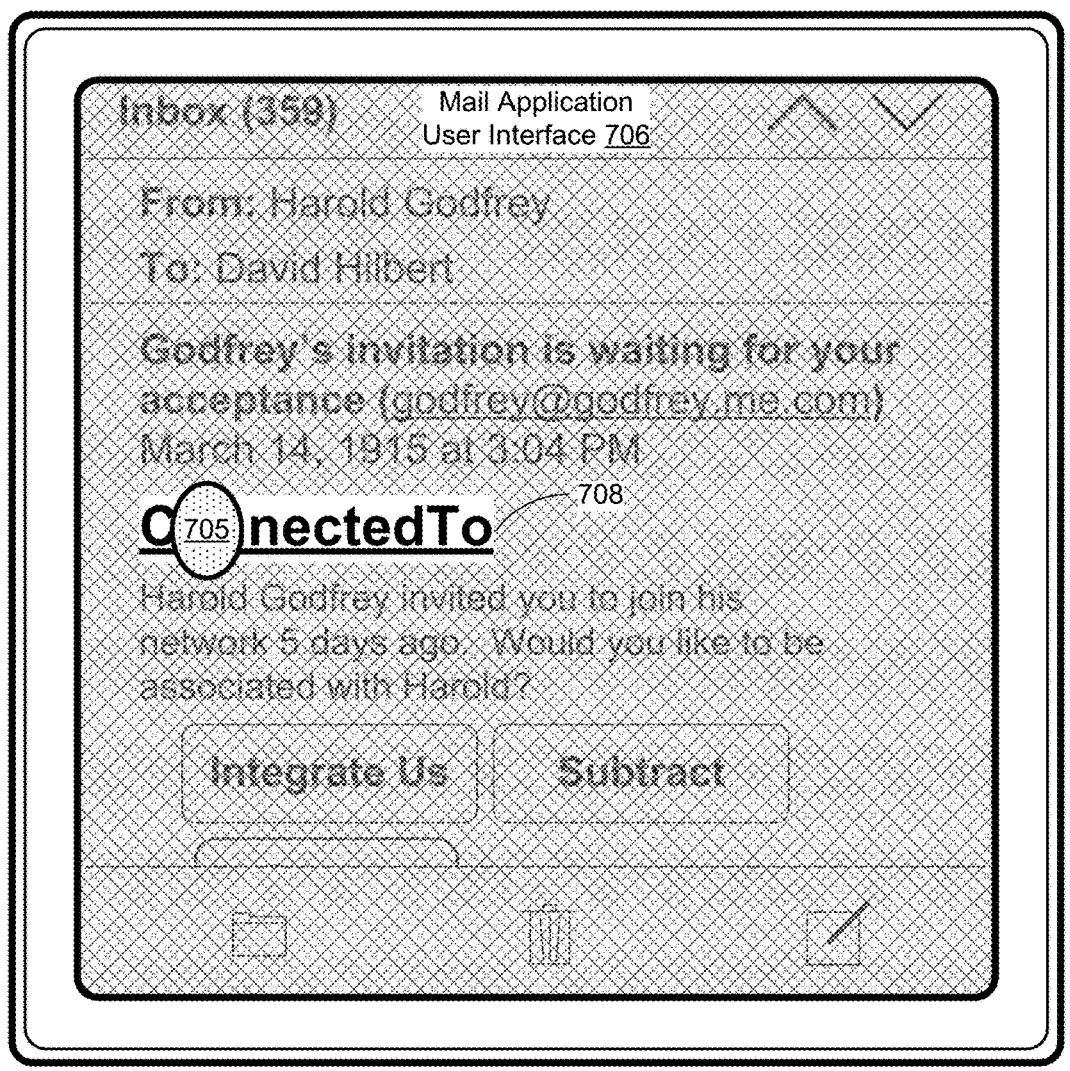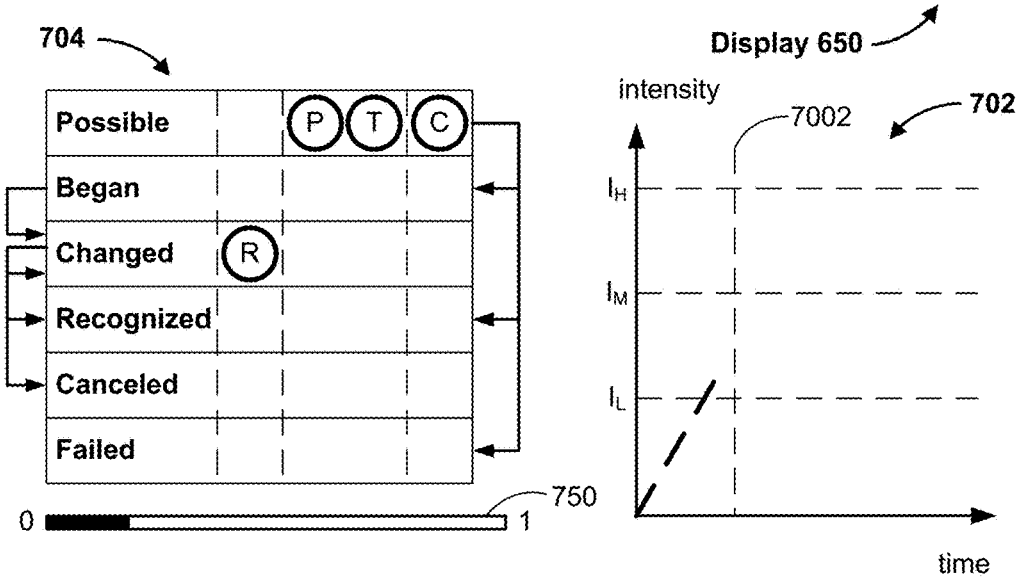
Figure 7D

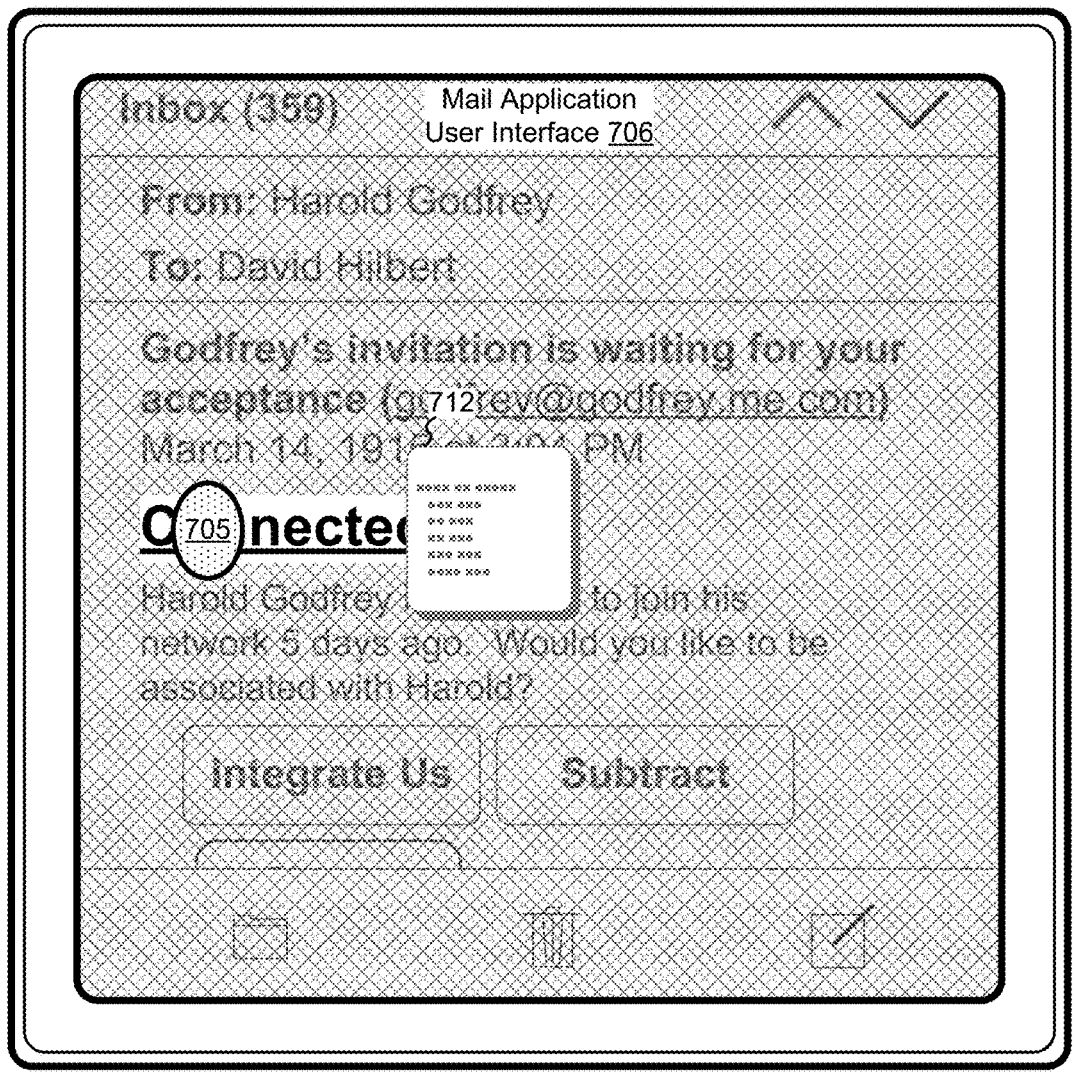
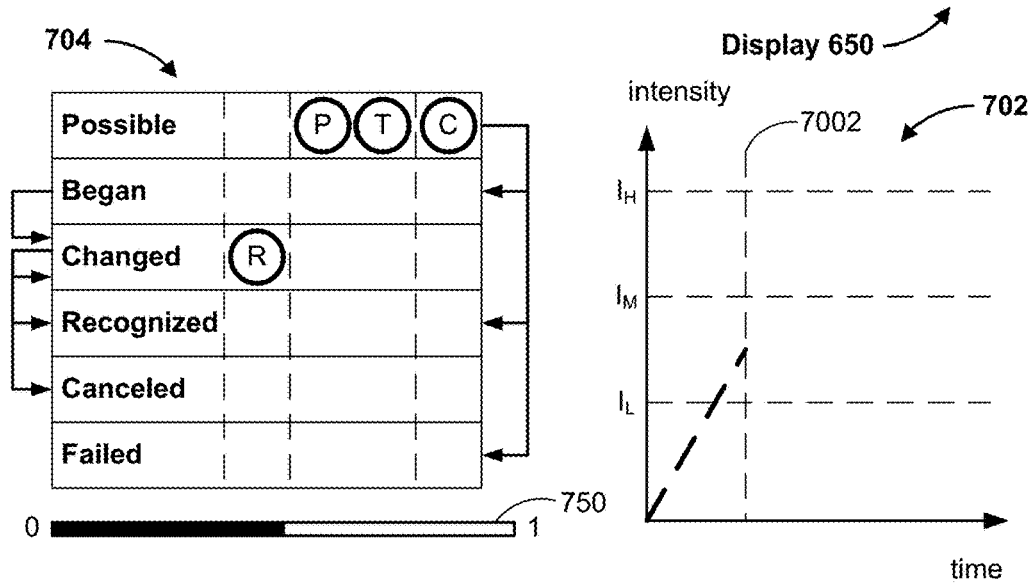
Figure 7E

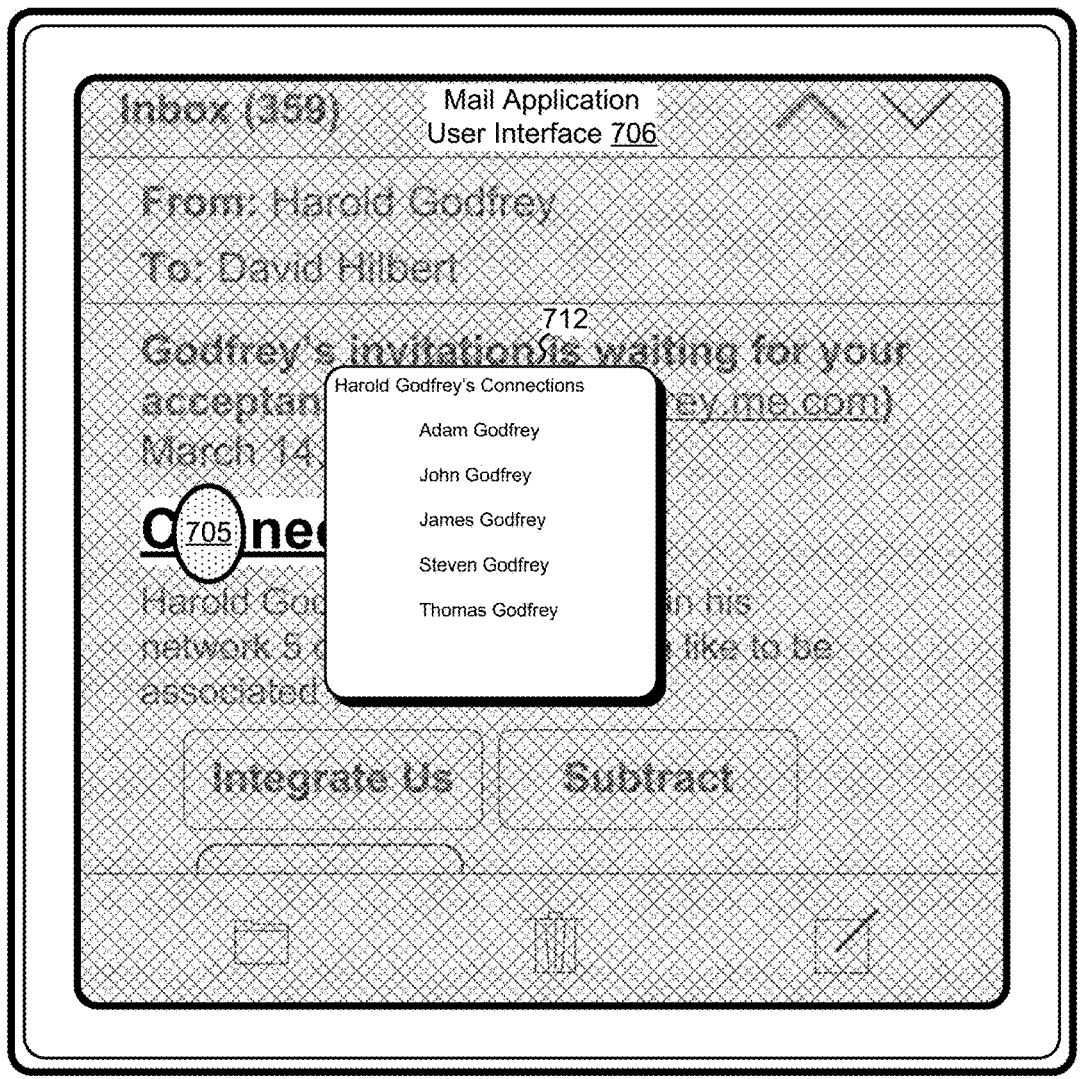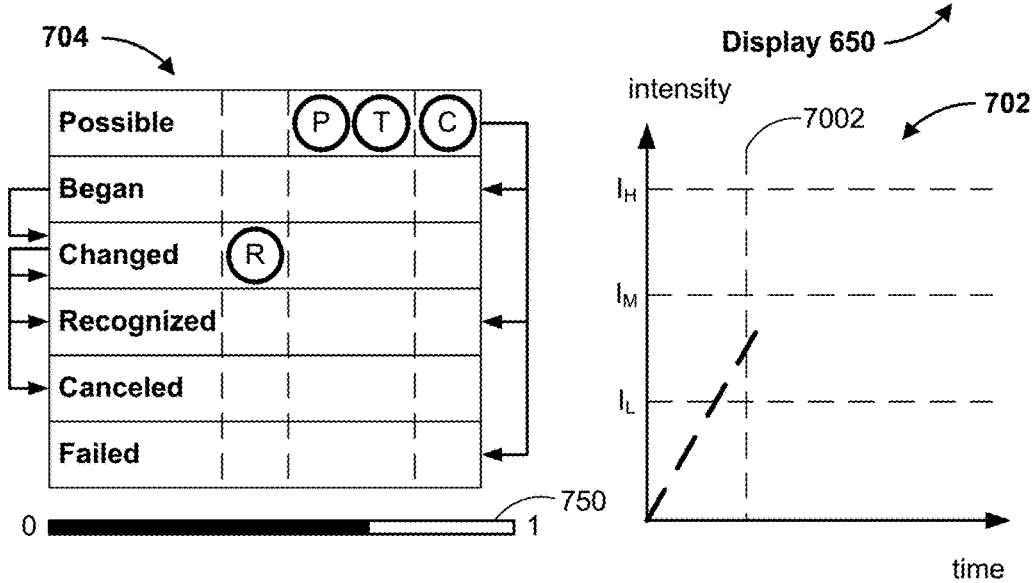
Figure 7F

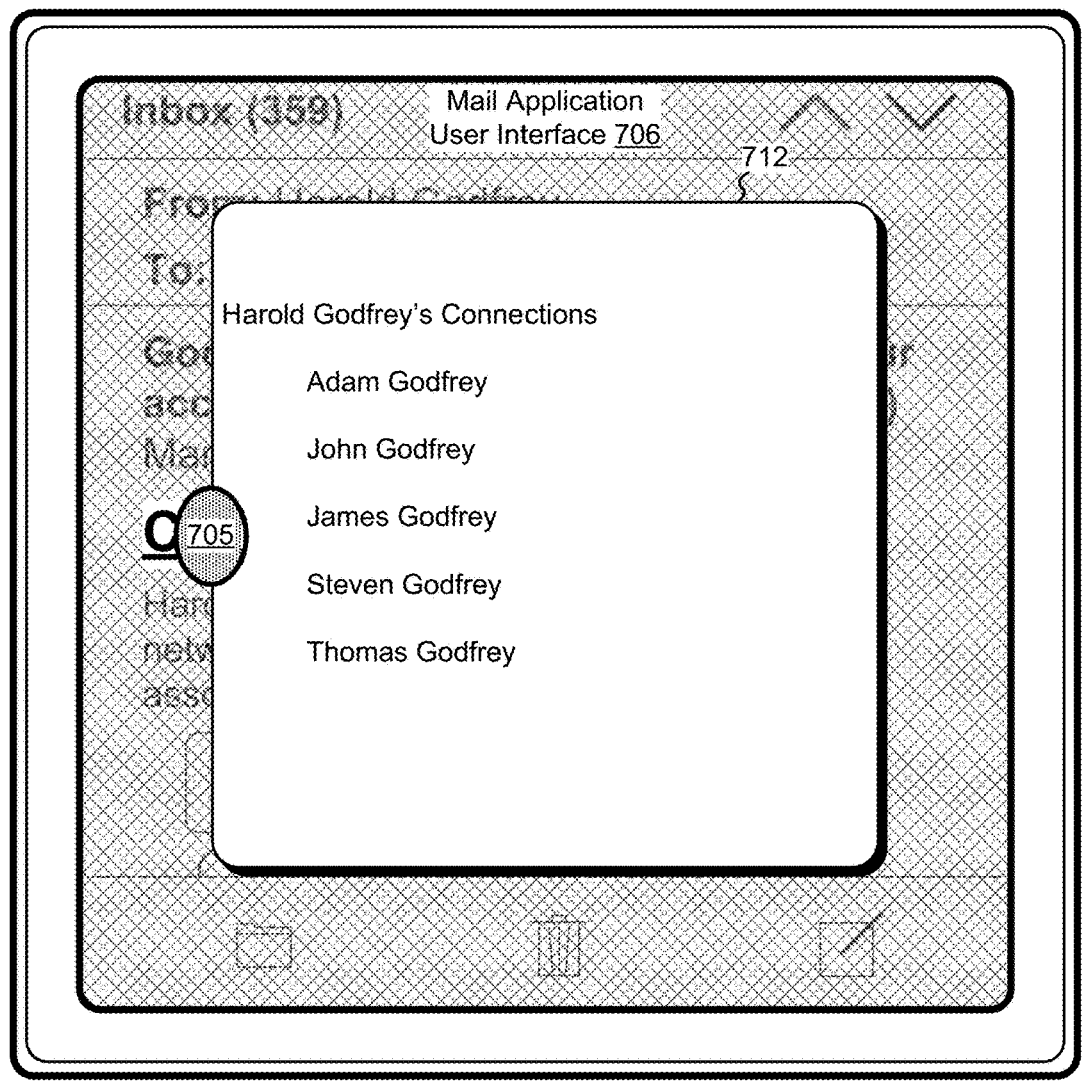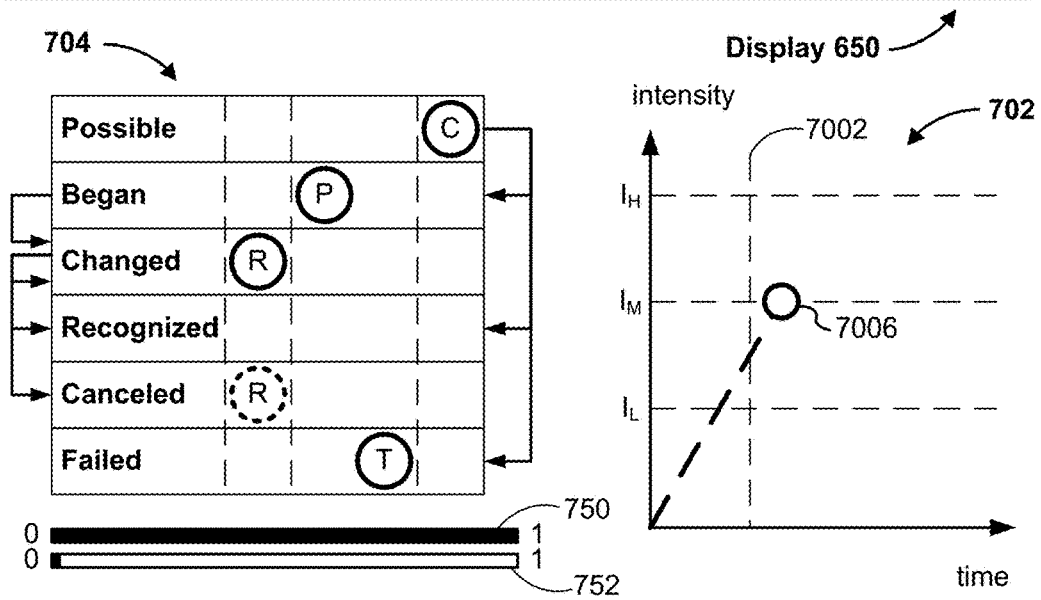
Figure 7G

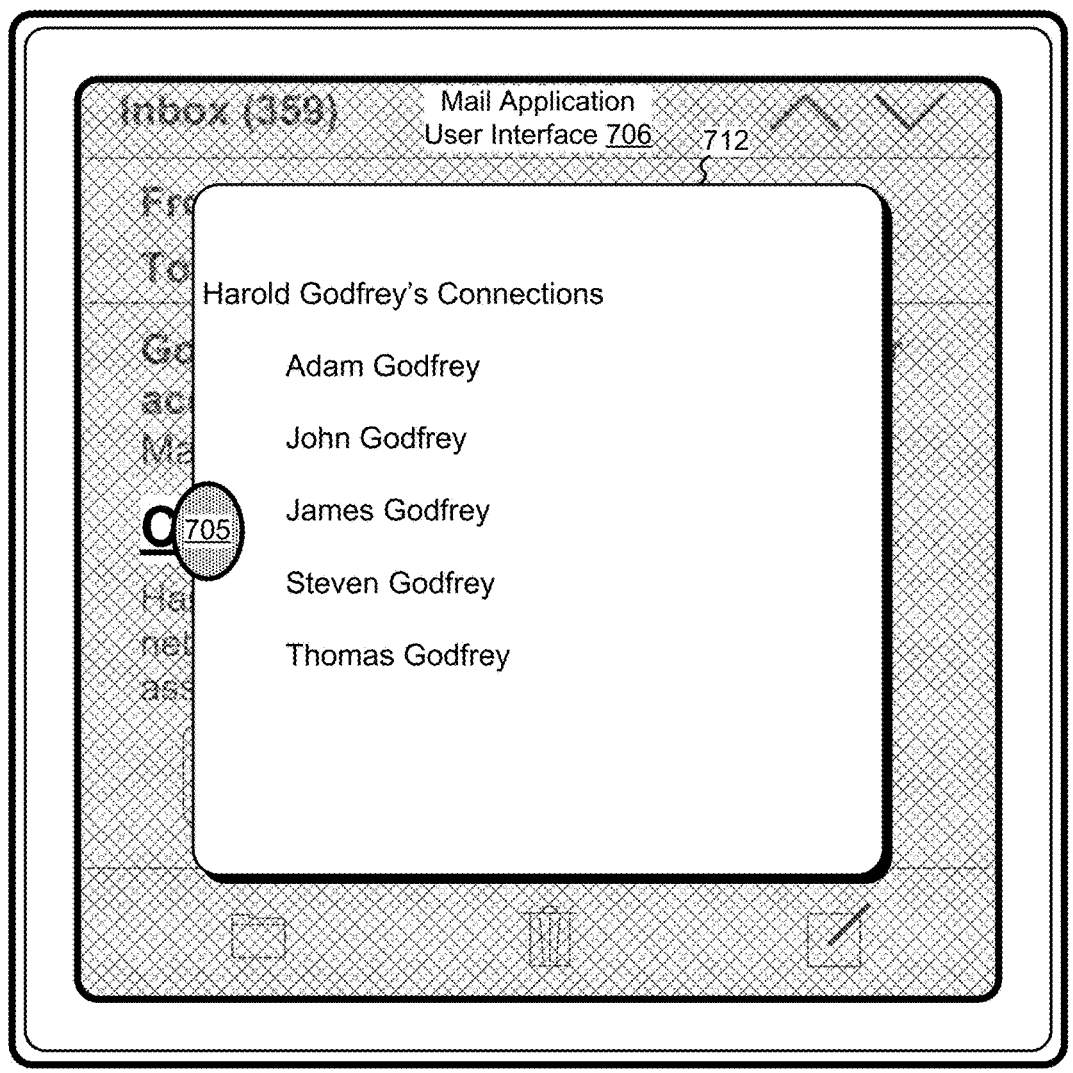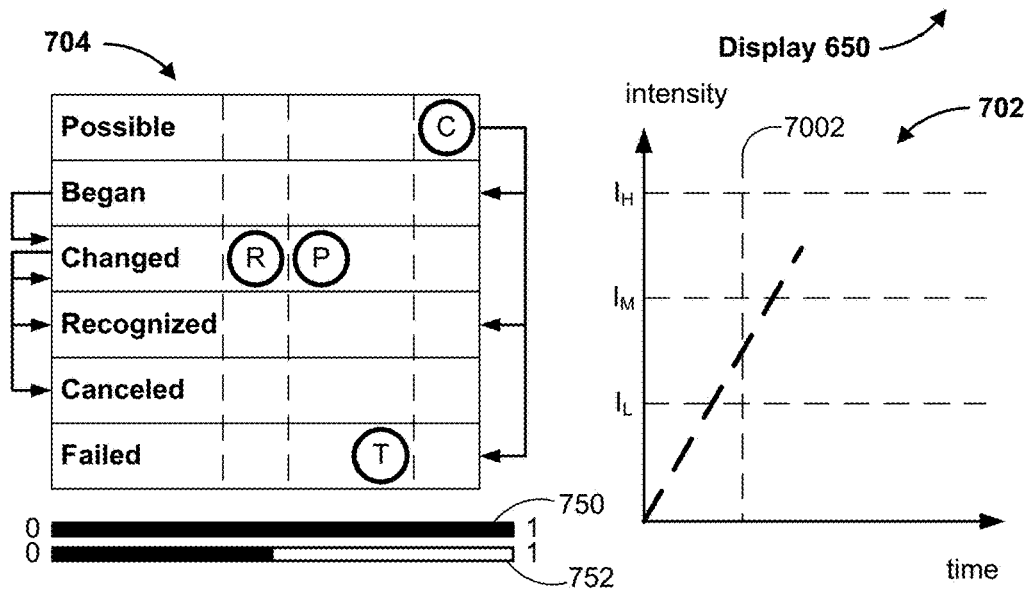
Figure 7H

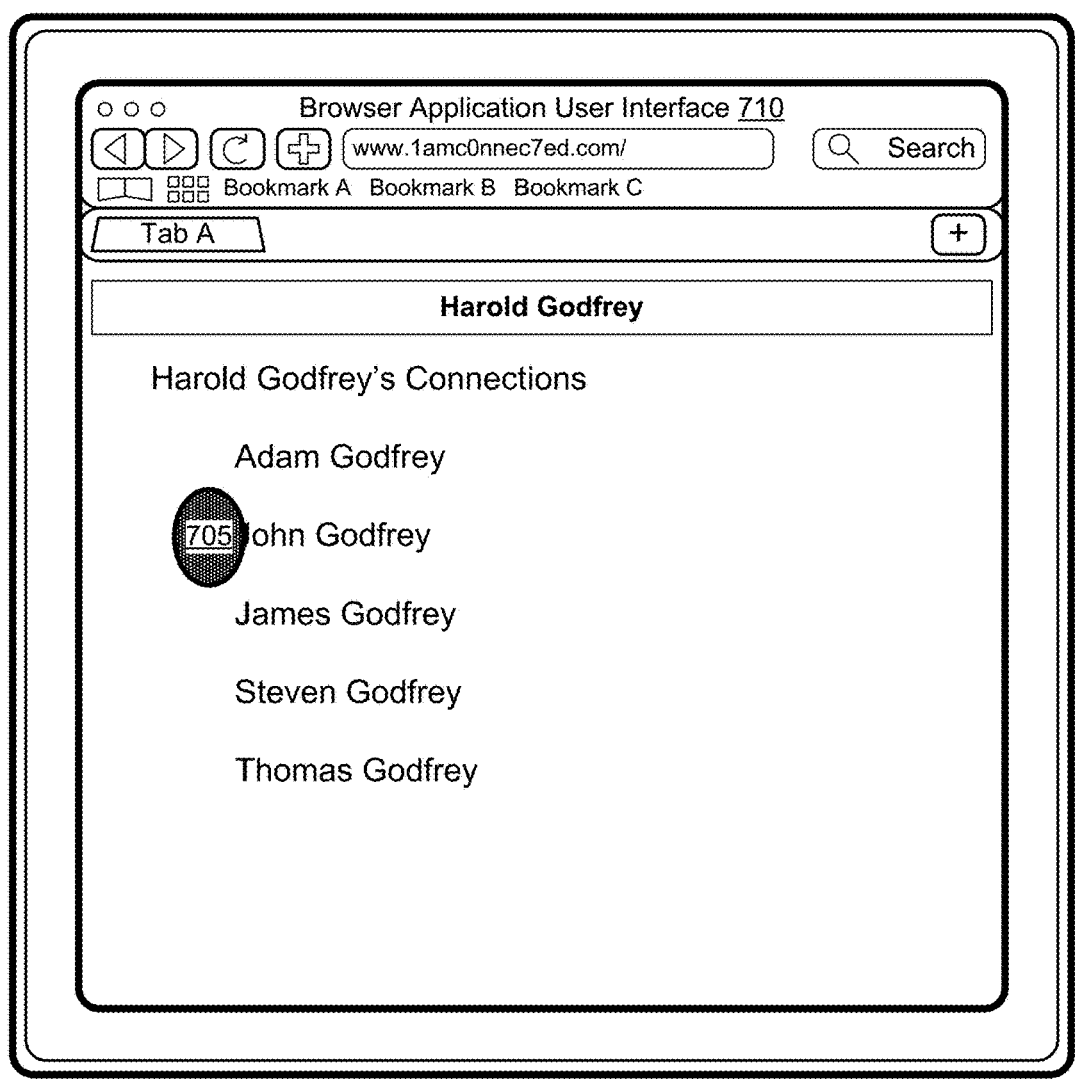
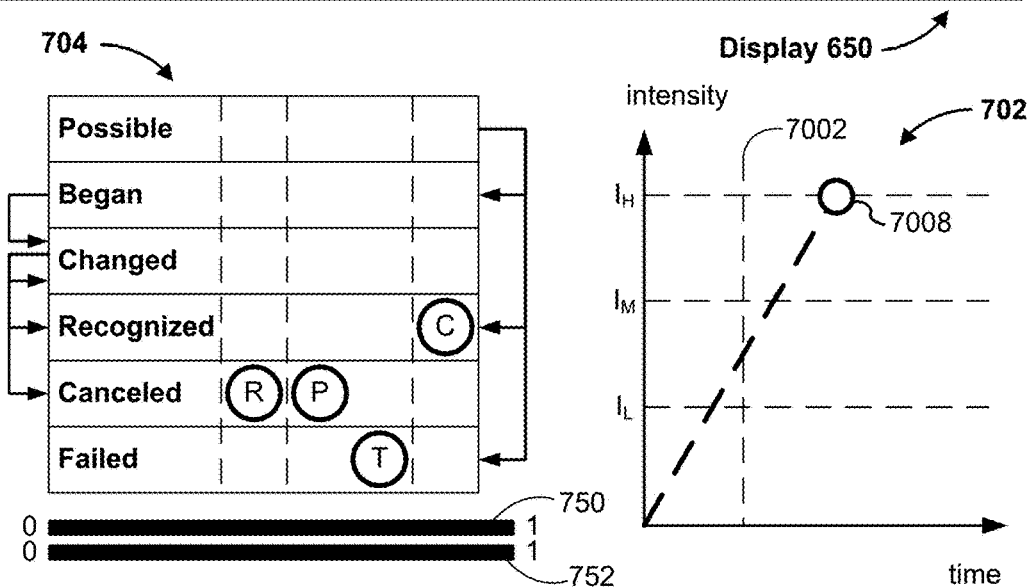
Figure 7I

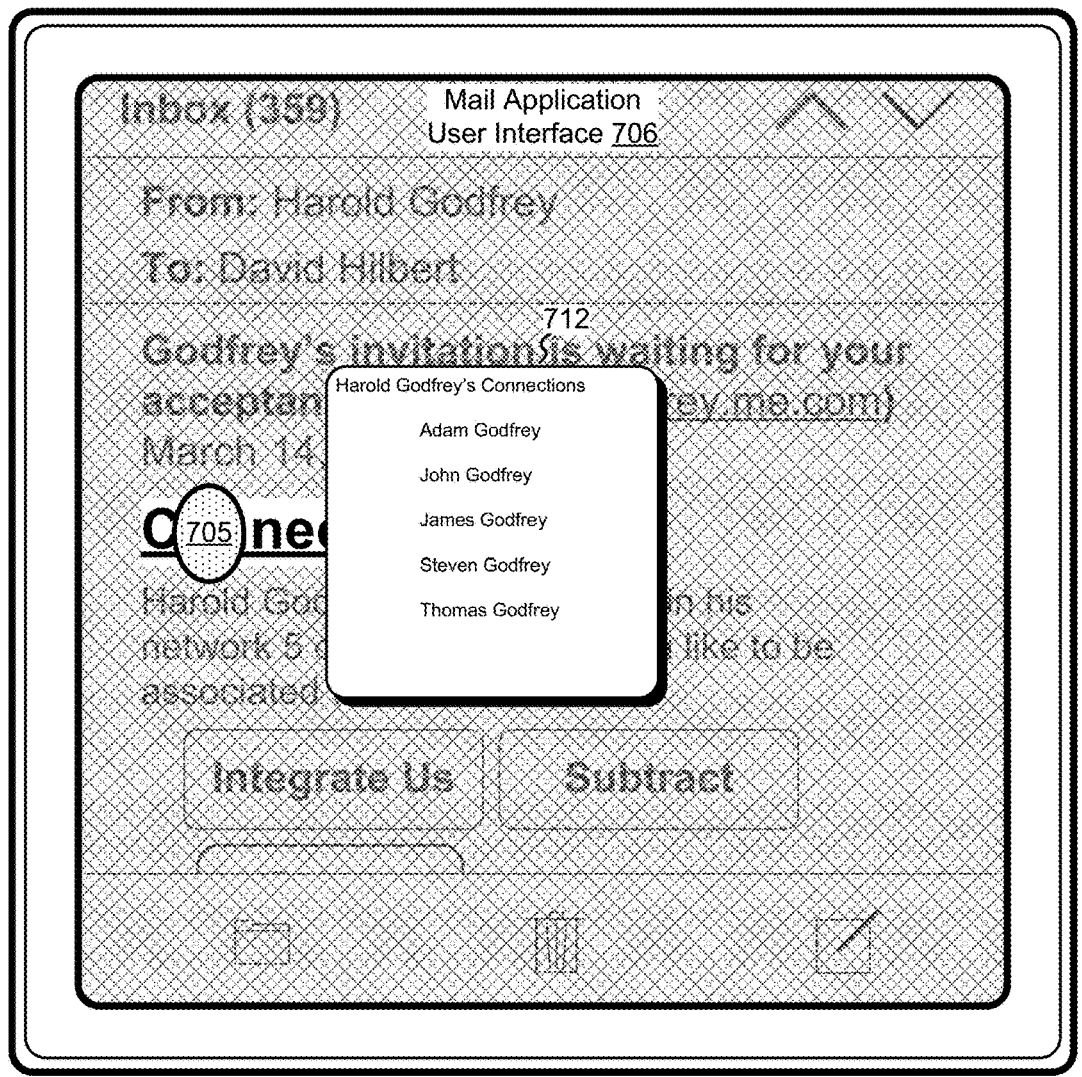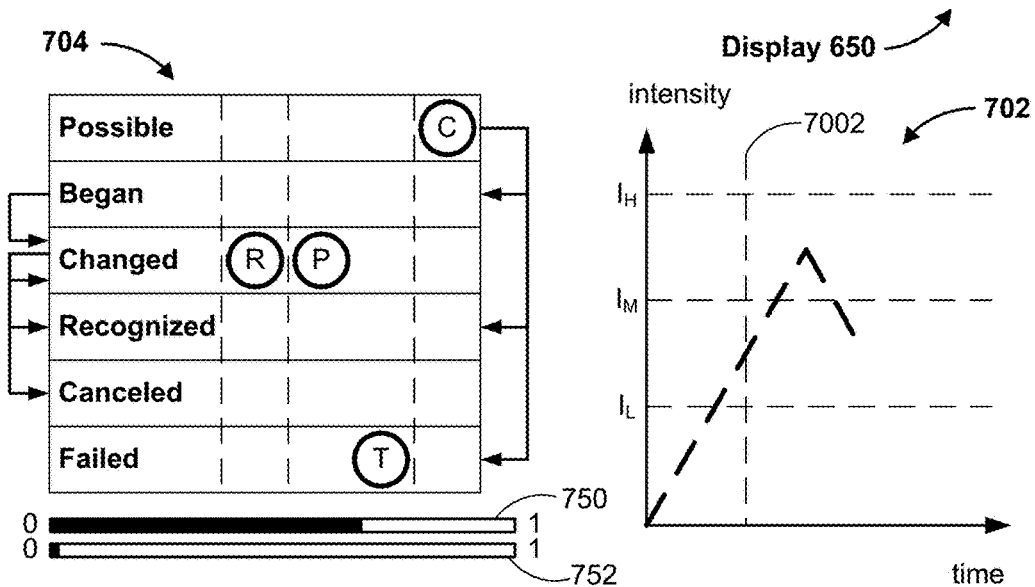
Figure 7J

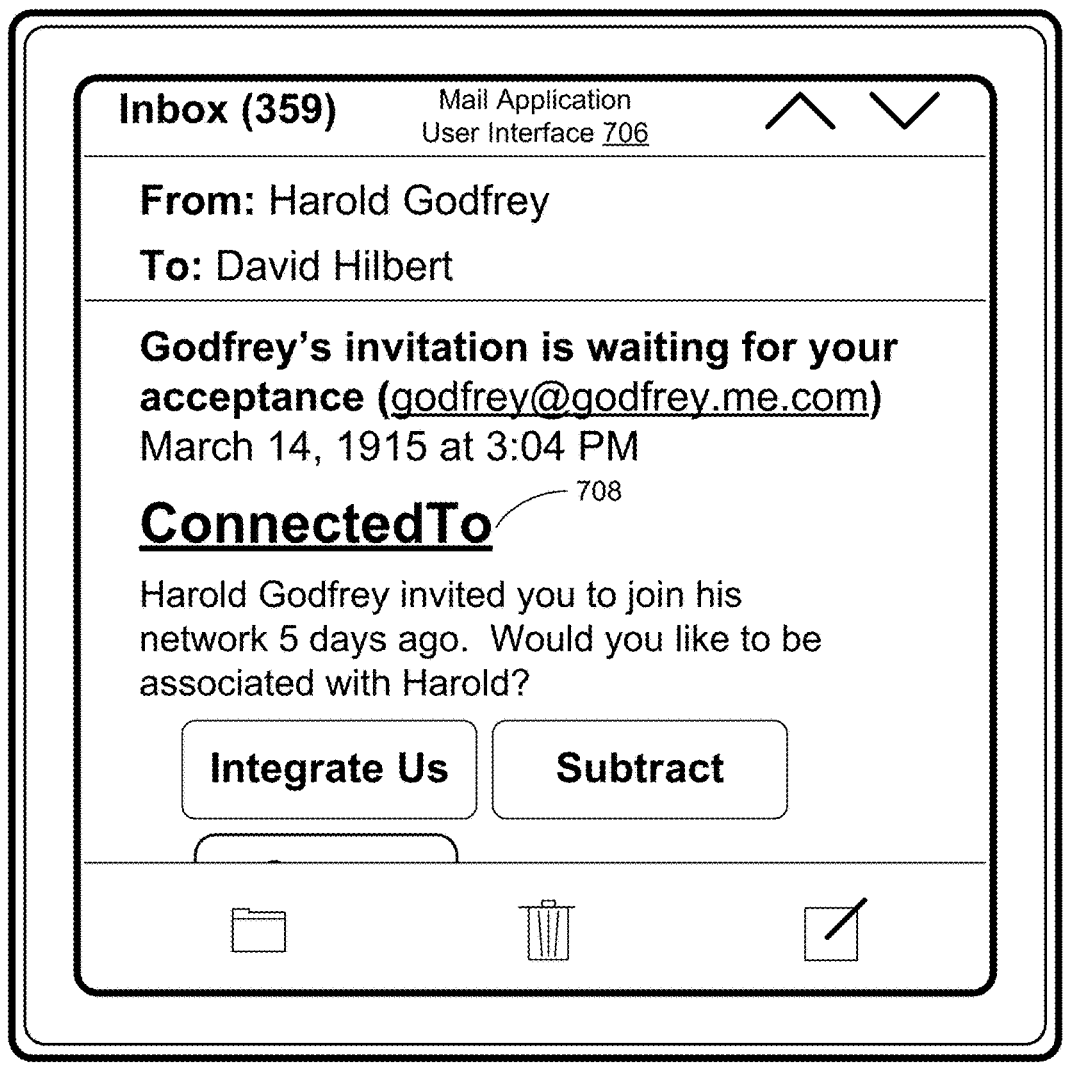
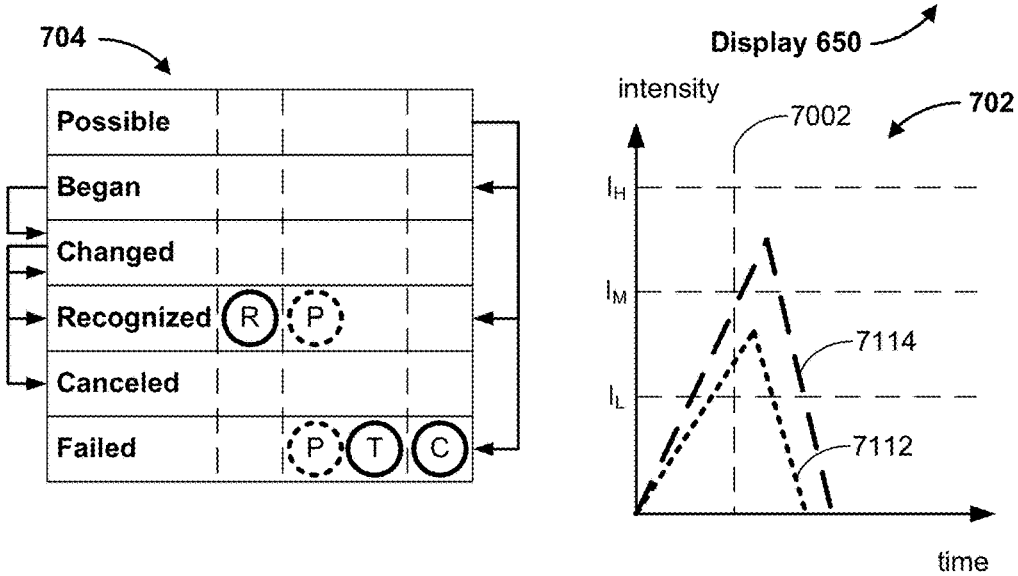
Figure 7K

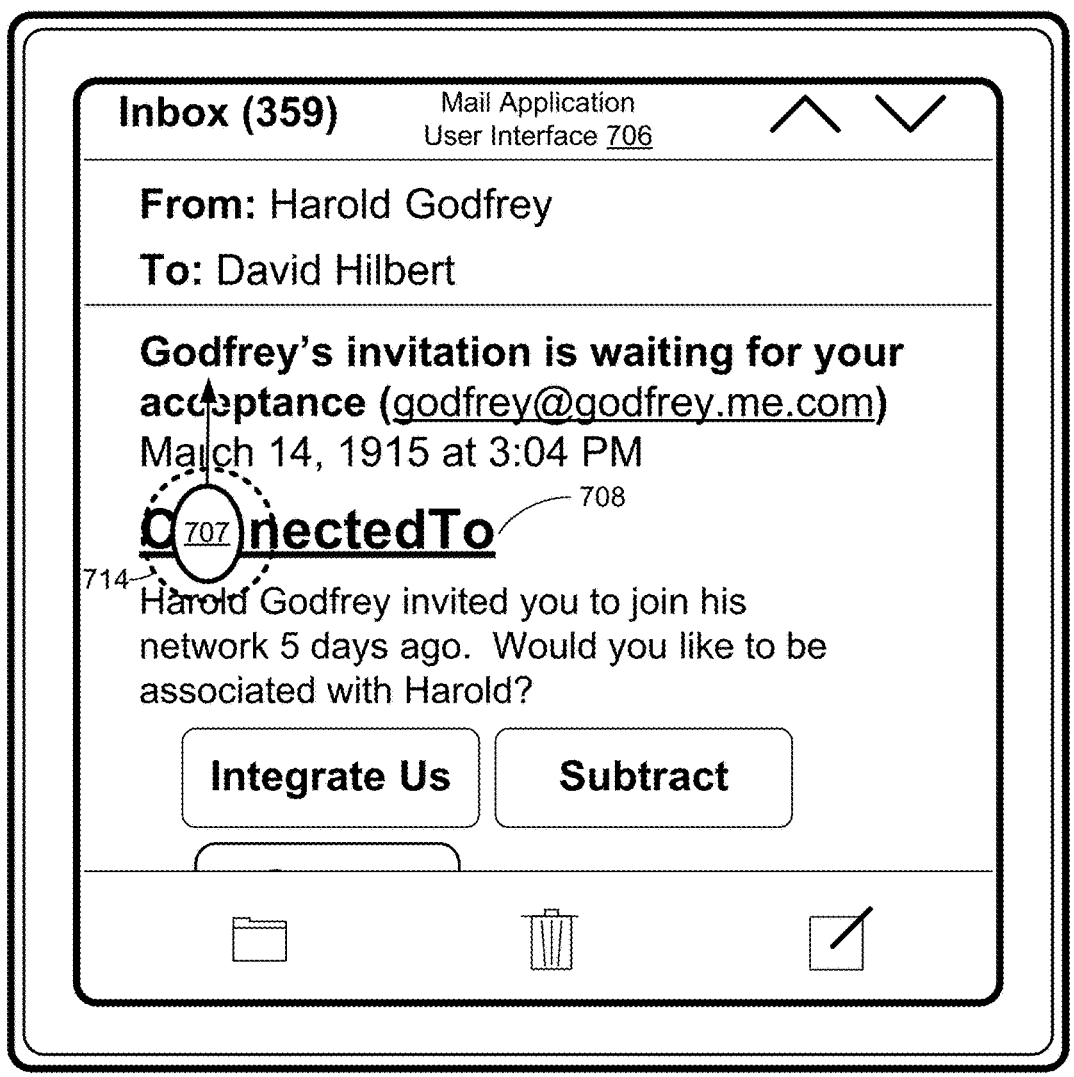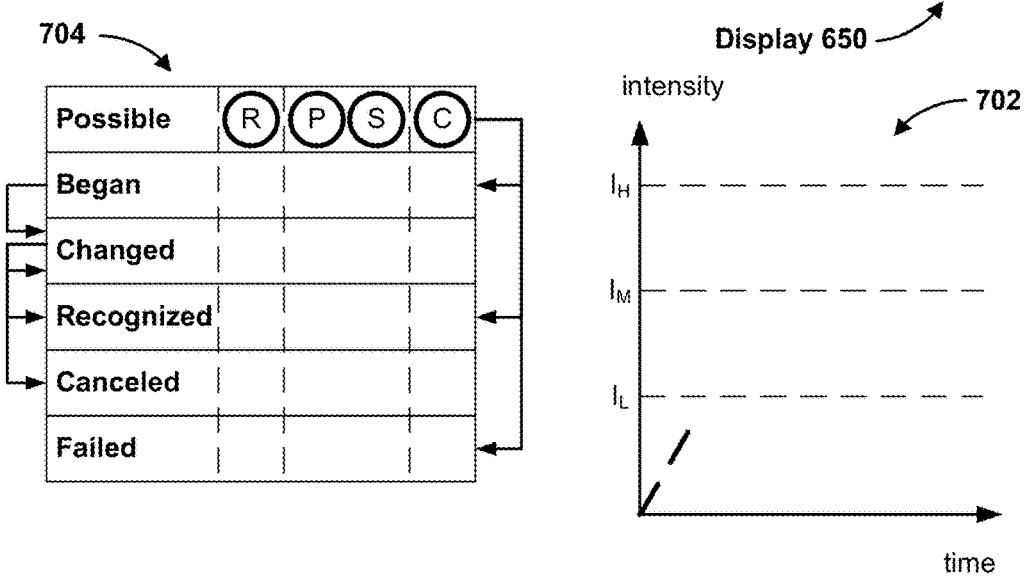
Figure 7L

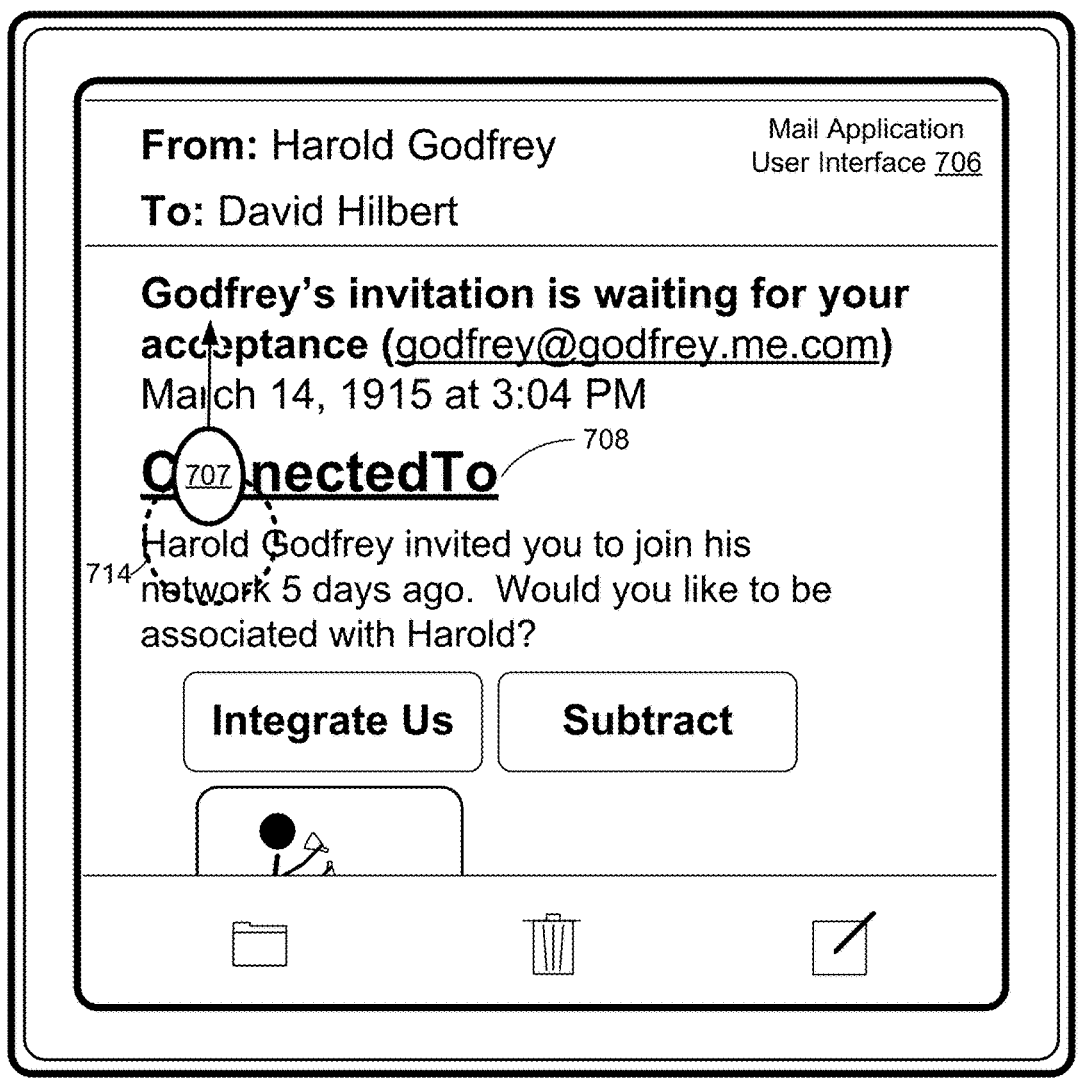
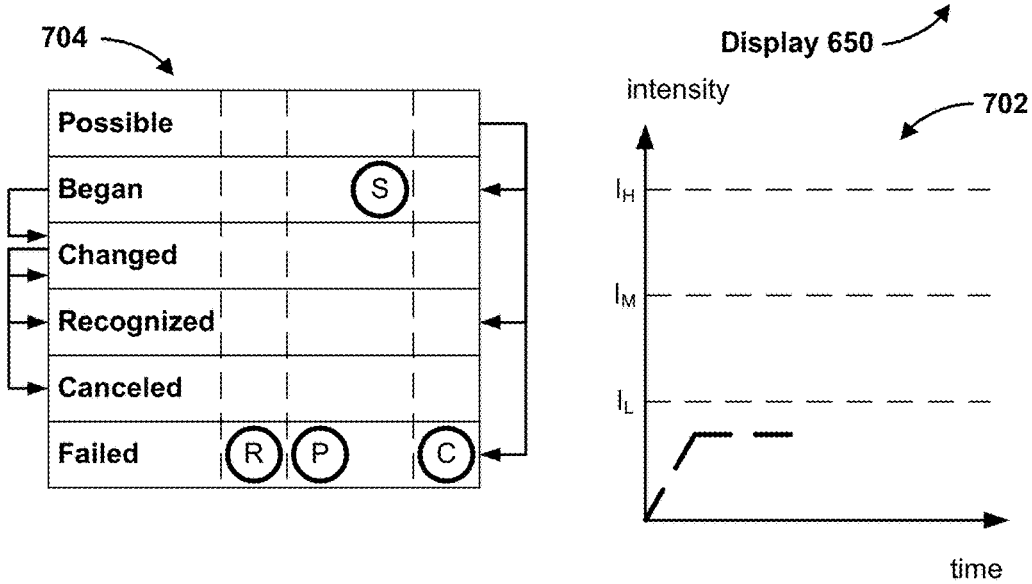
Figure 7M

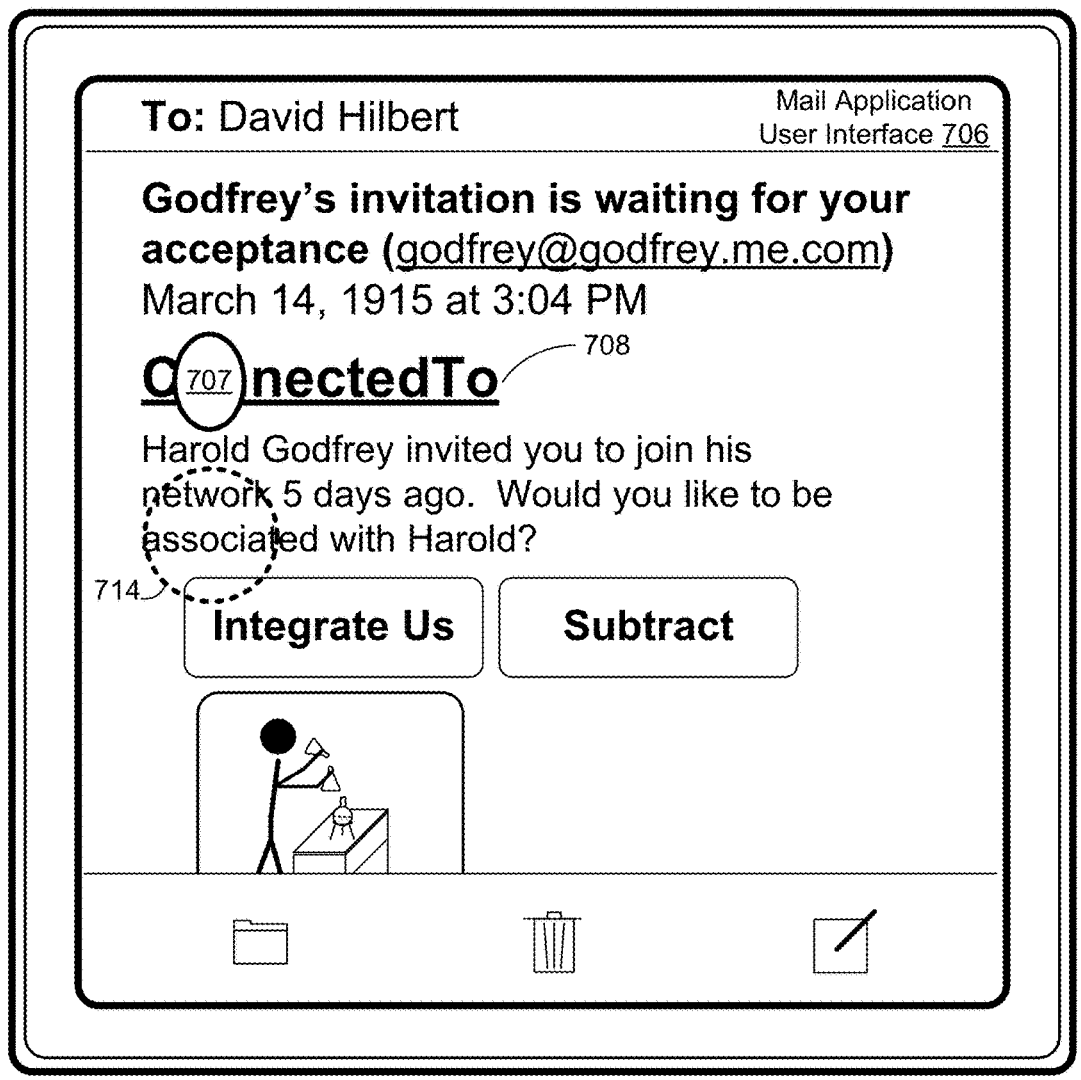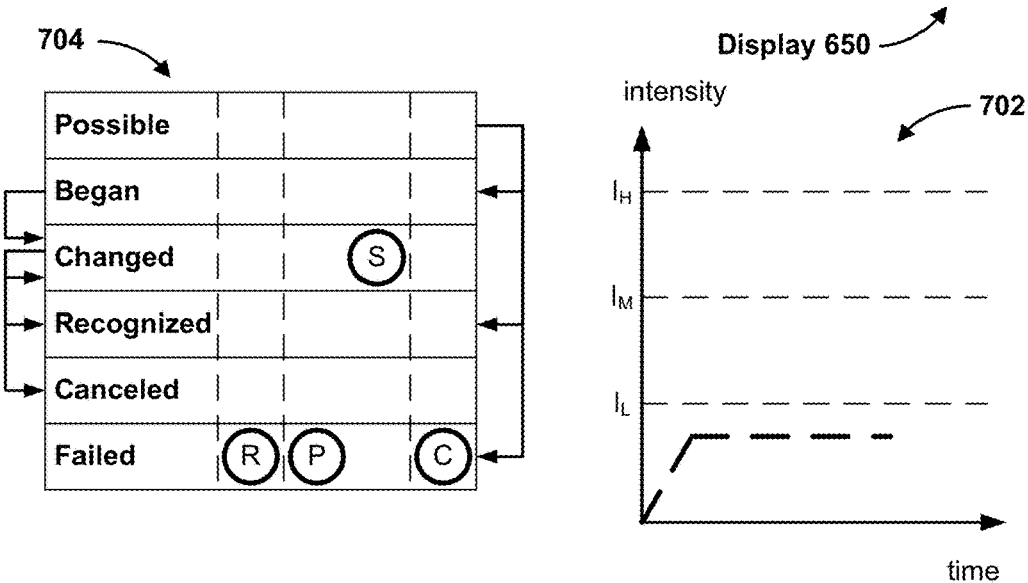
Figure 7N

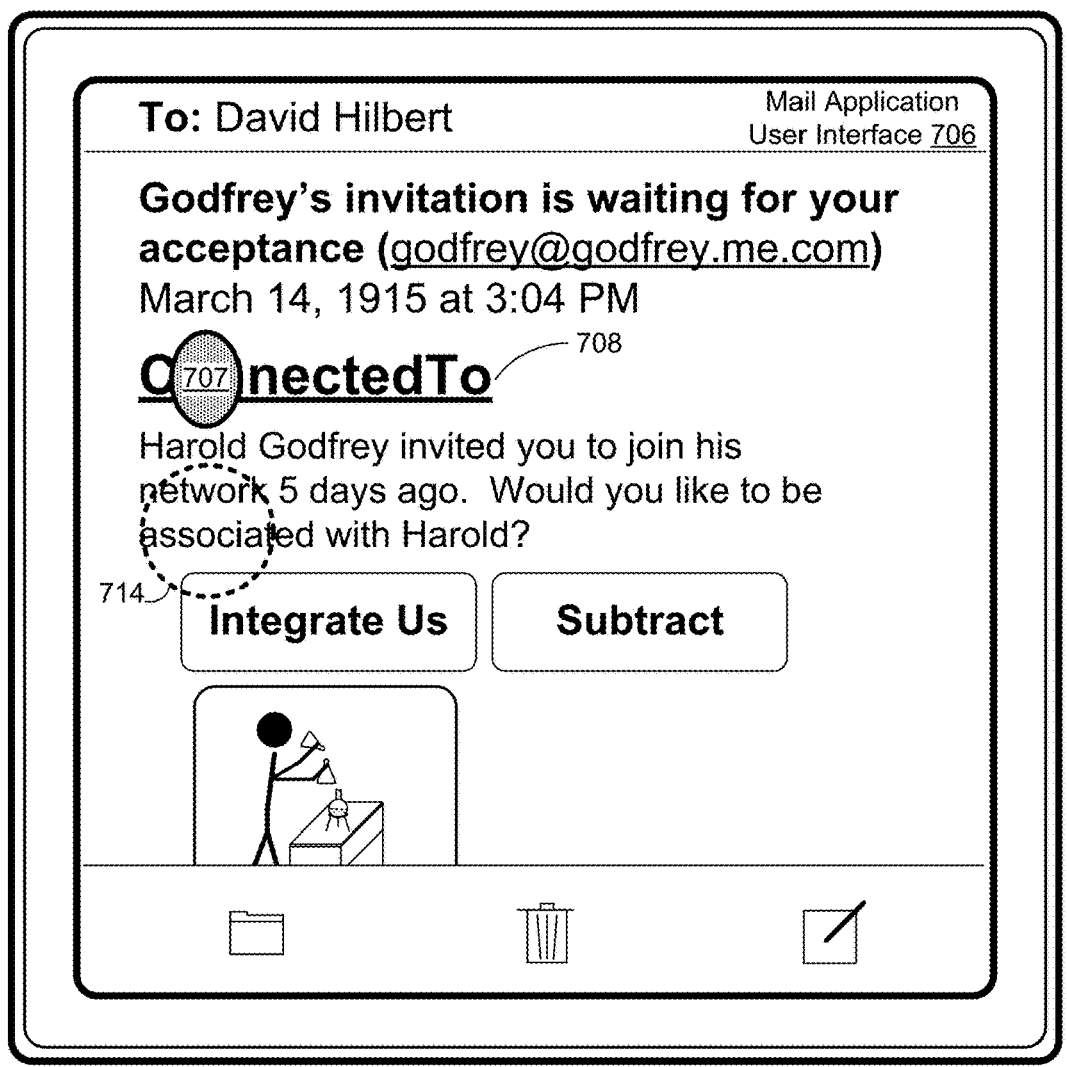
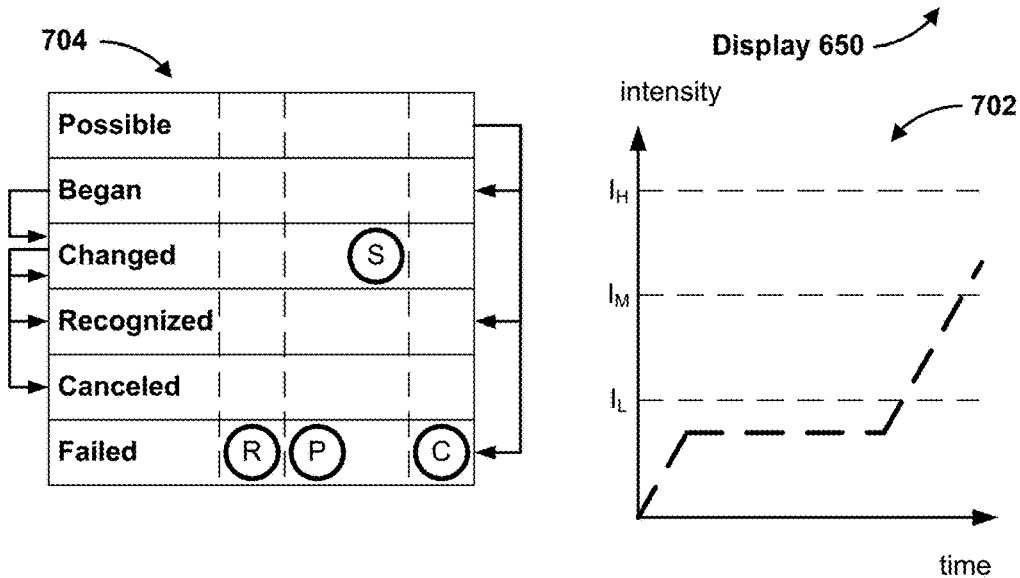
Figure 7O

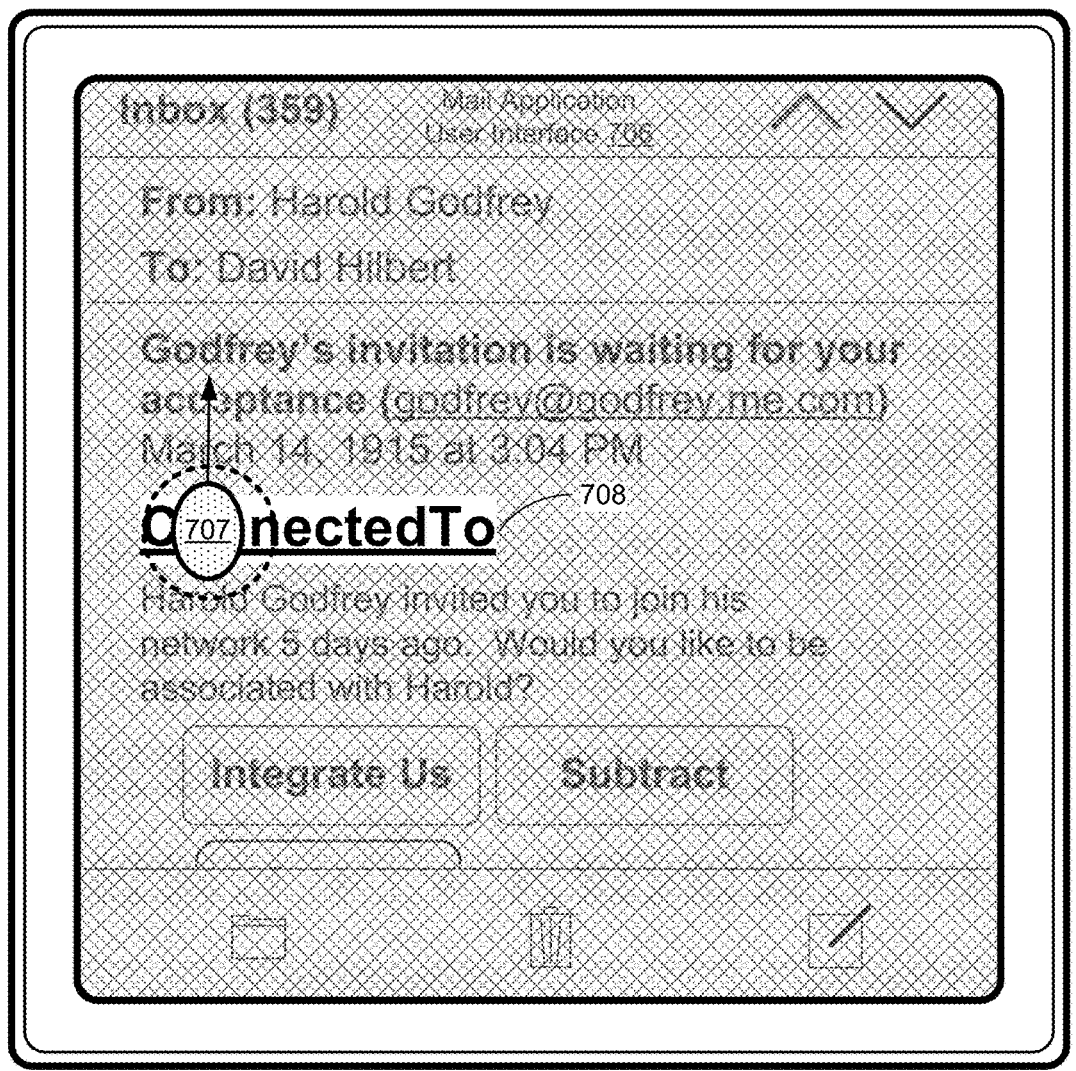
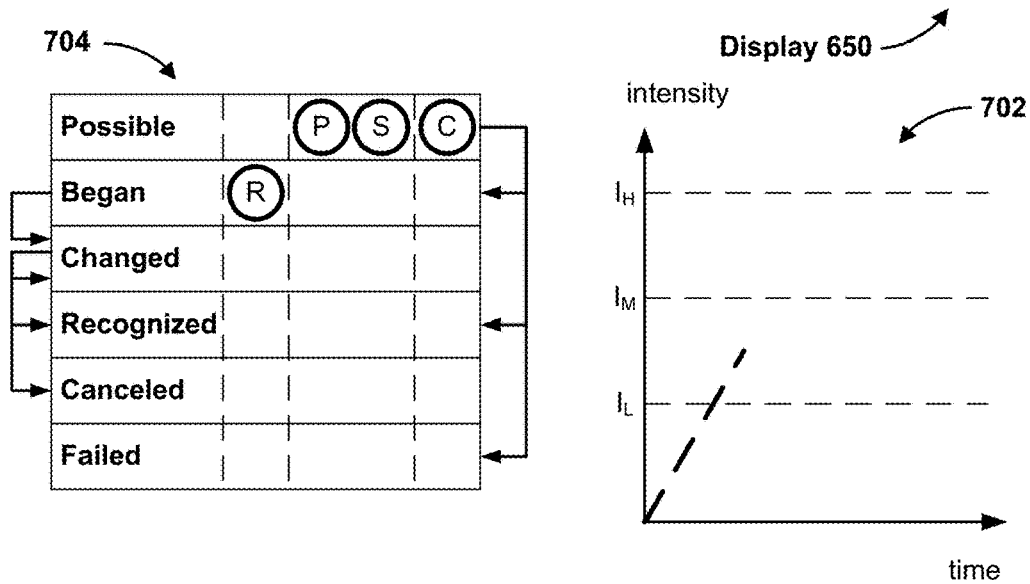
Figure 7P

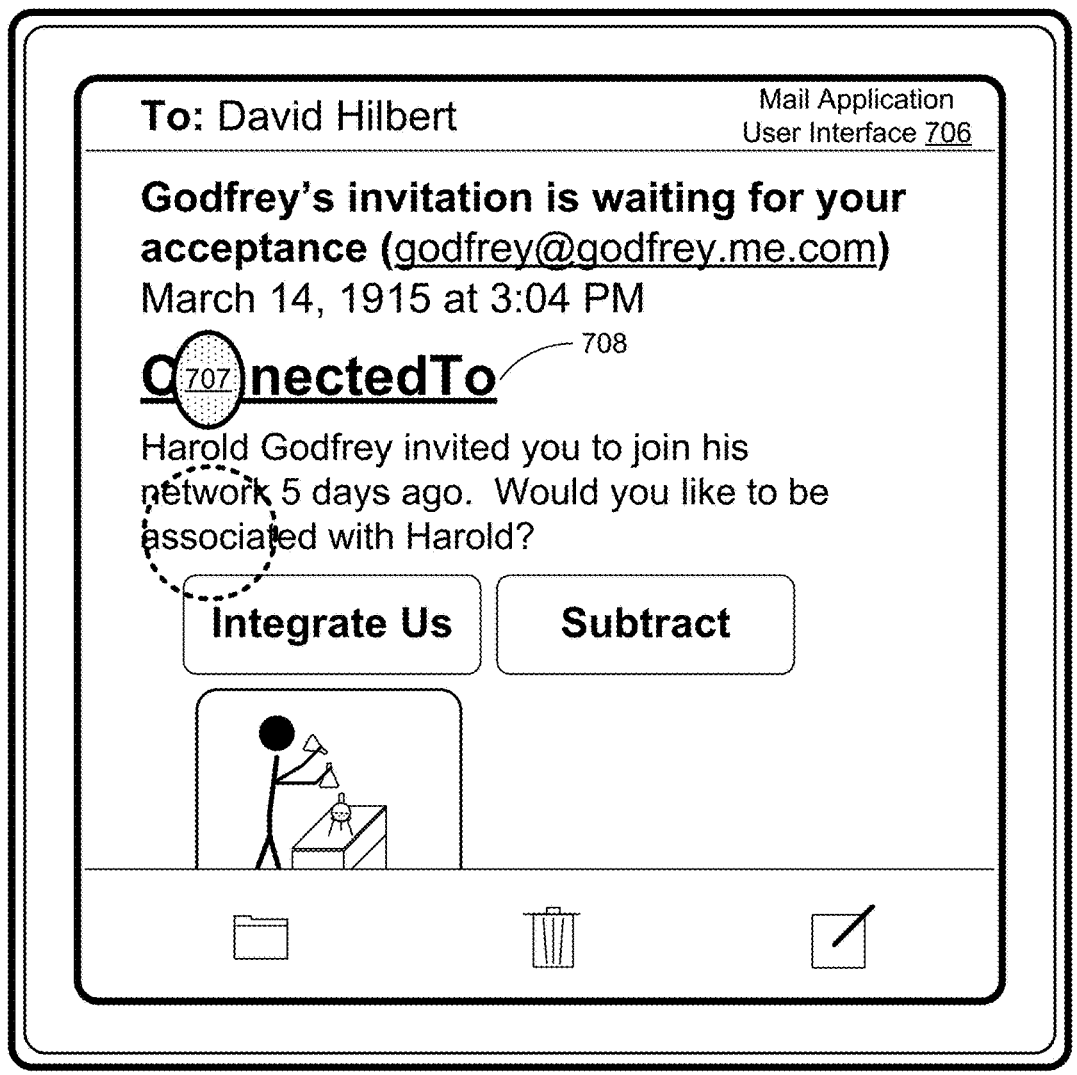
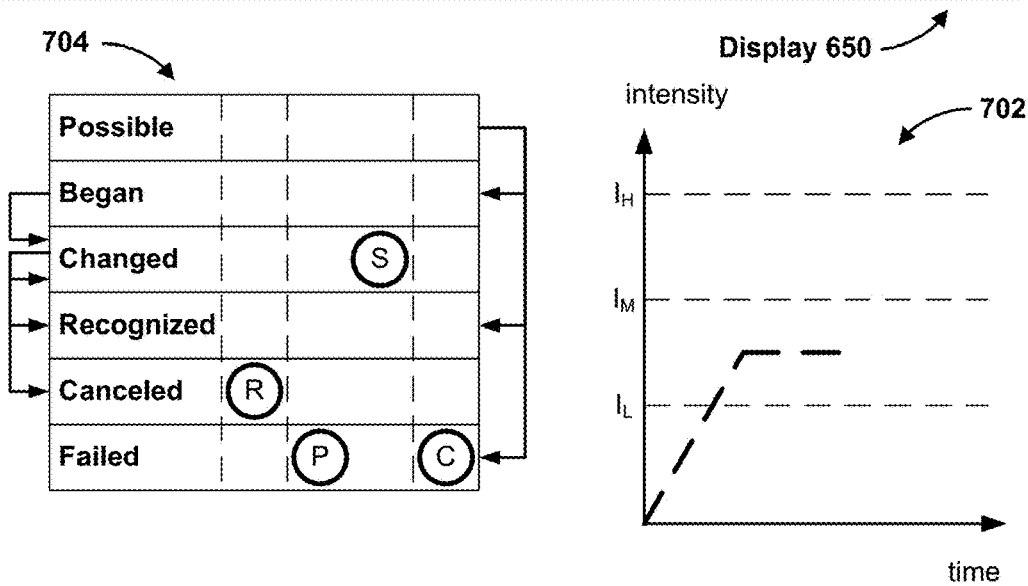
Figure 7Q

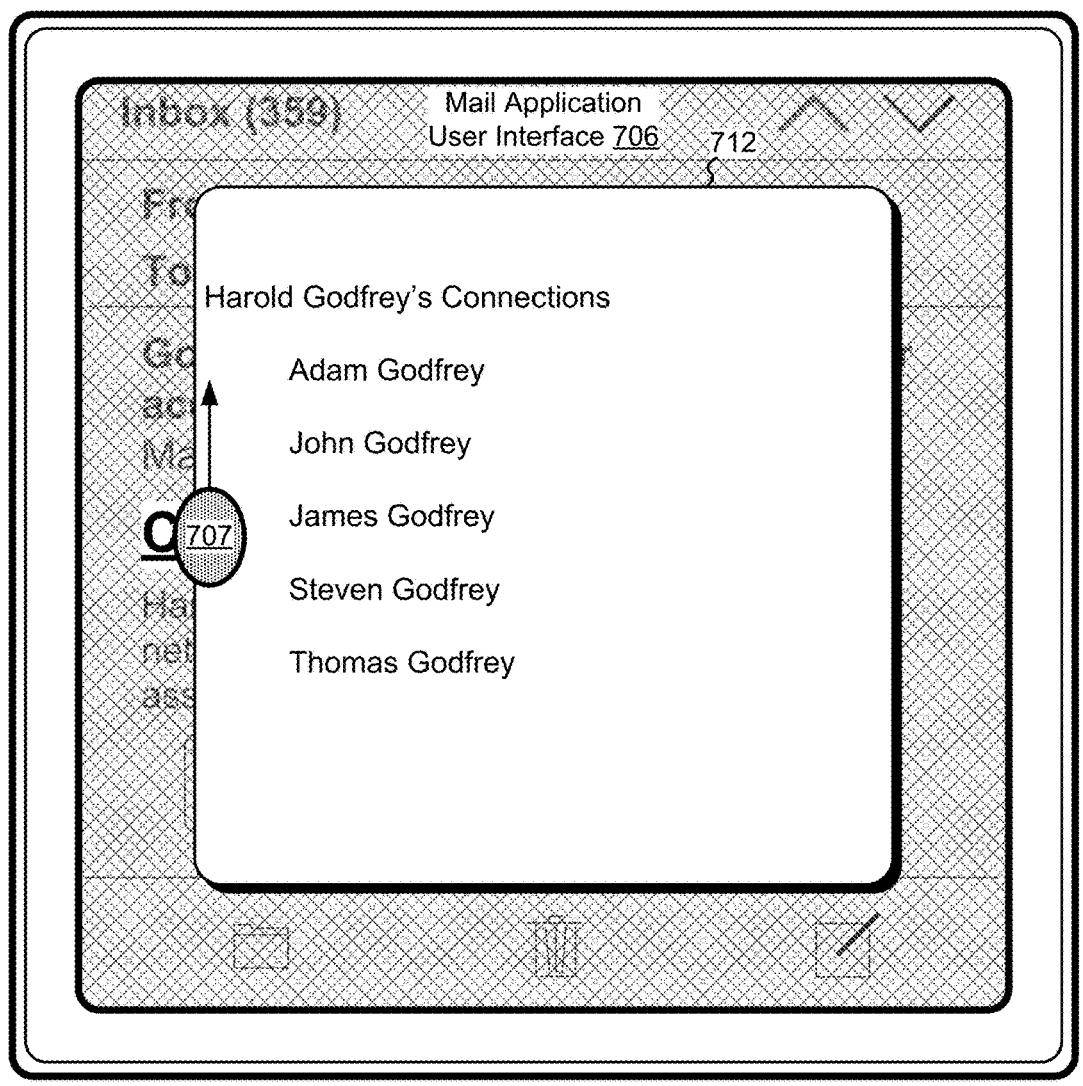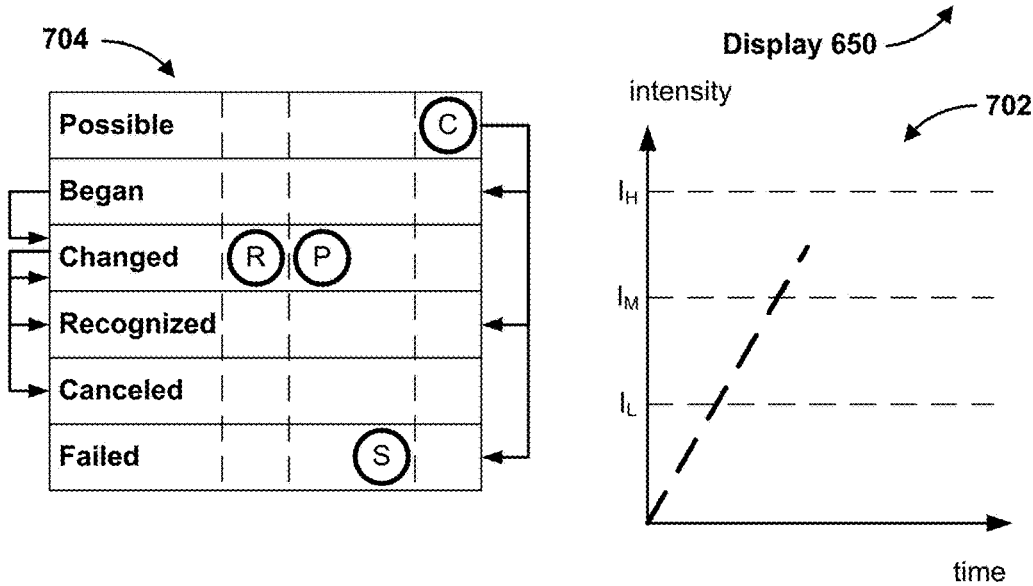
Figure 7R

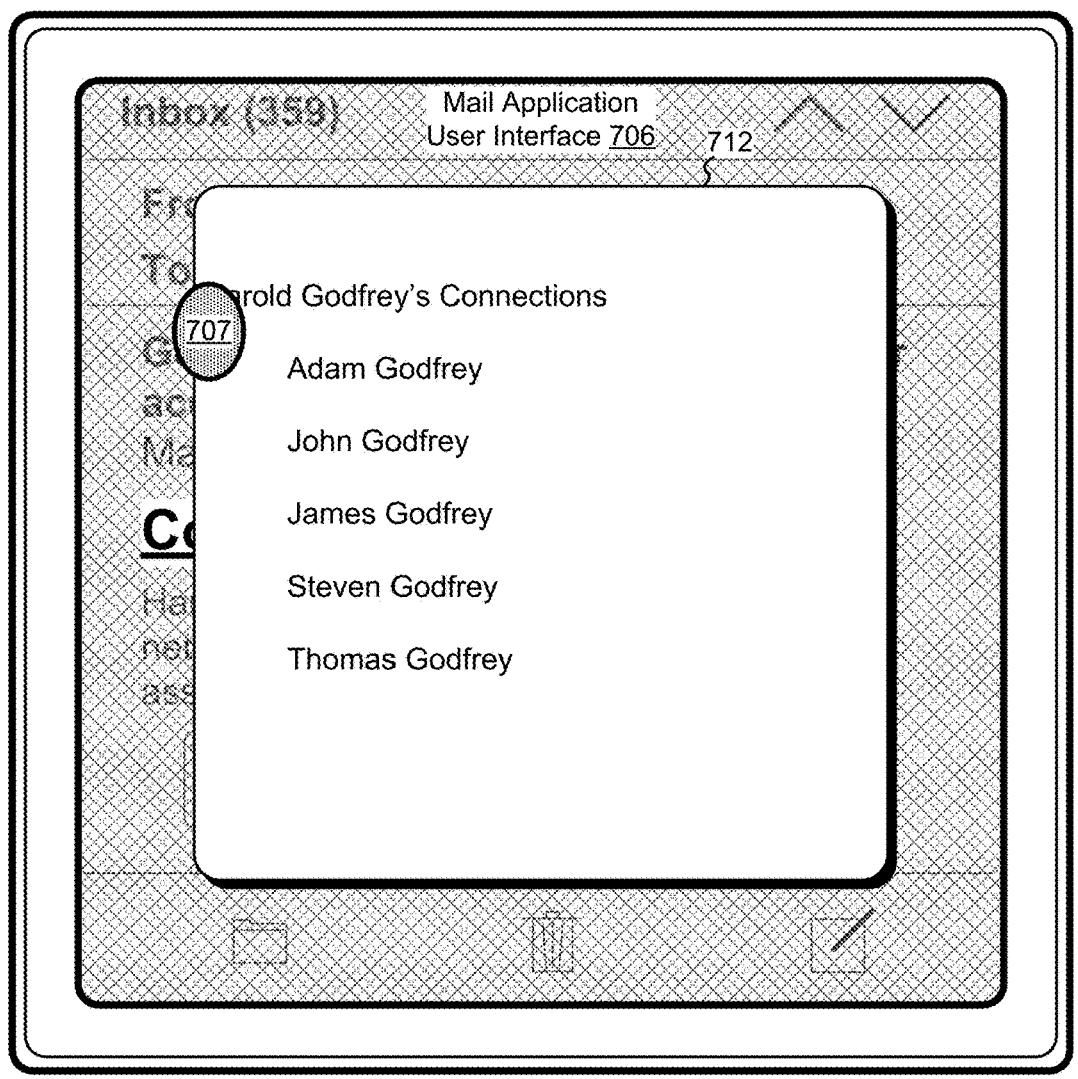
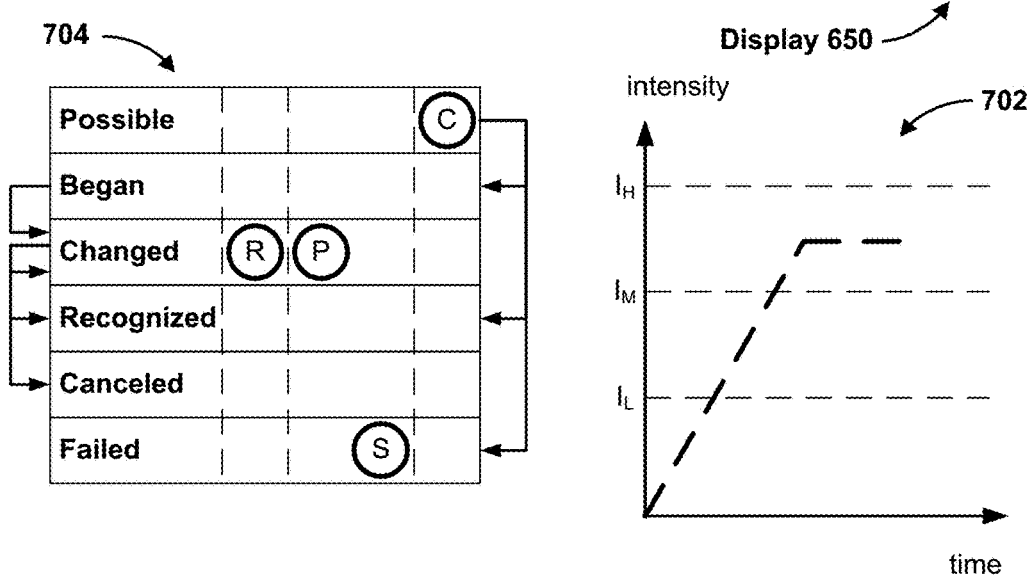
Figure 7S

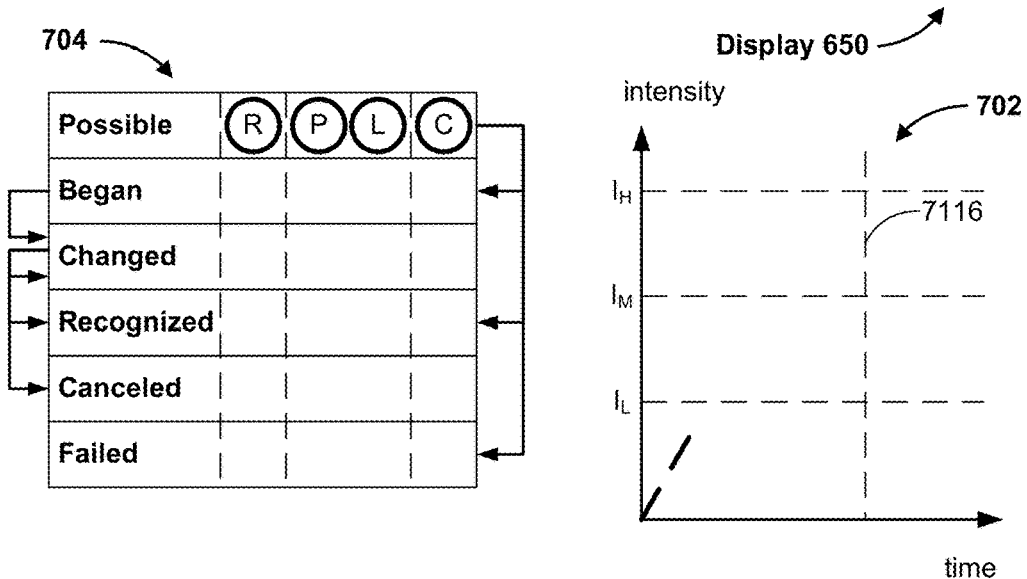
Figure 7T

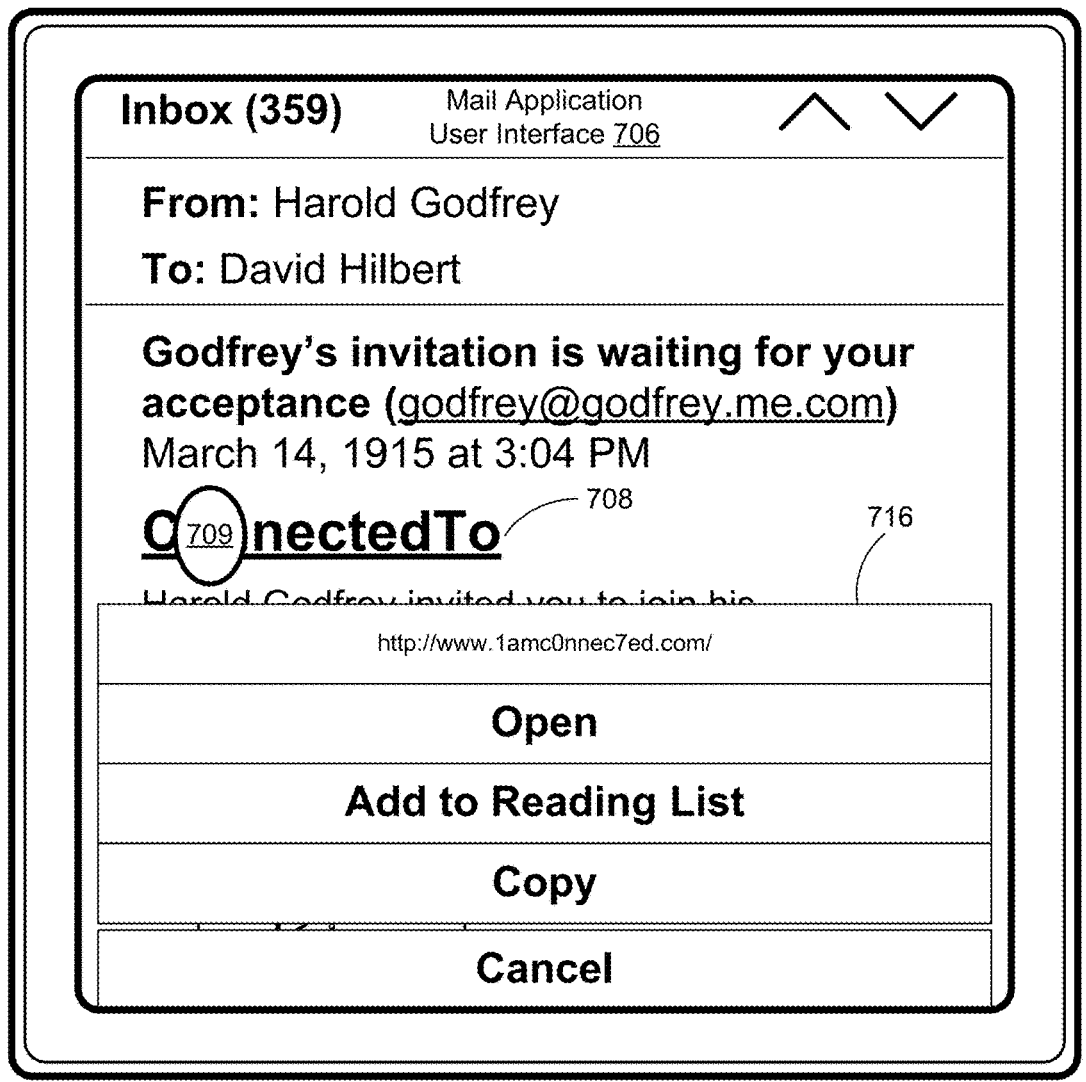
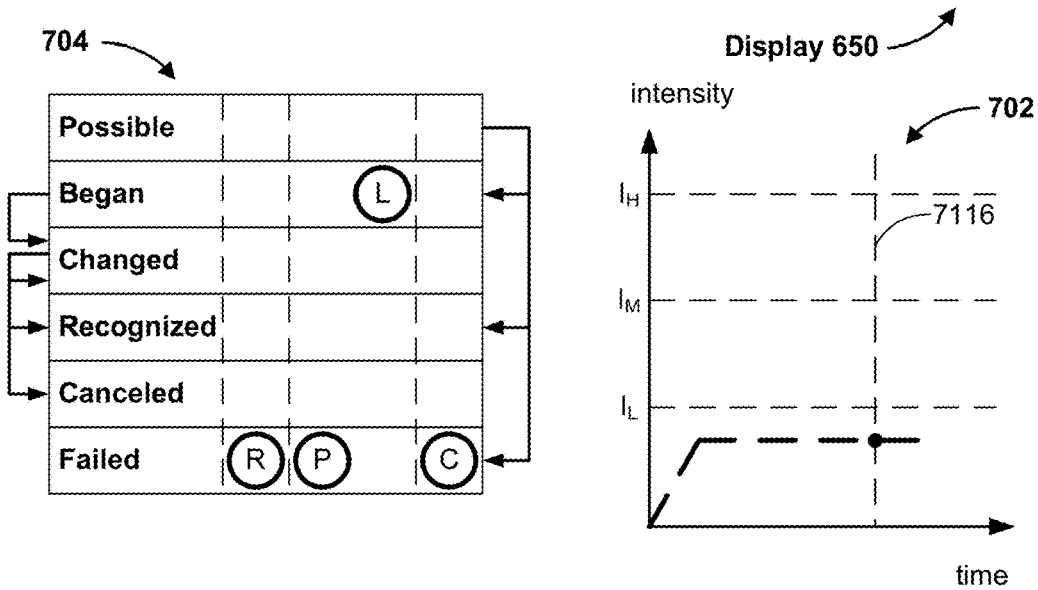
Figure 7U

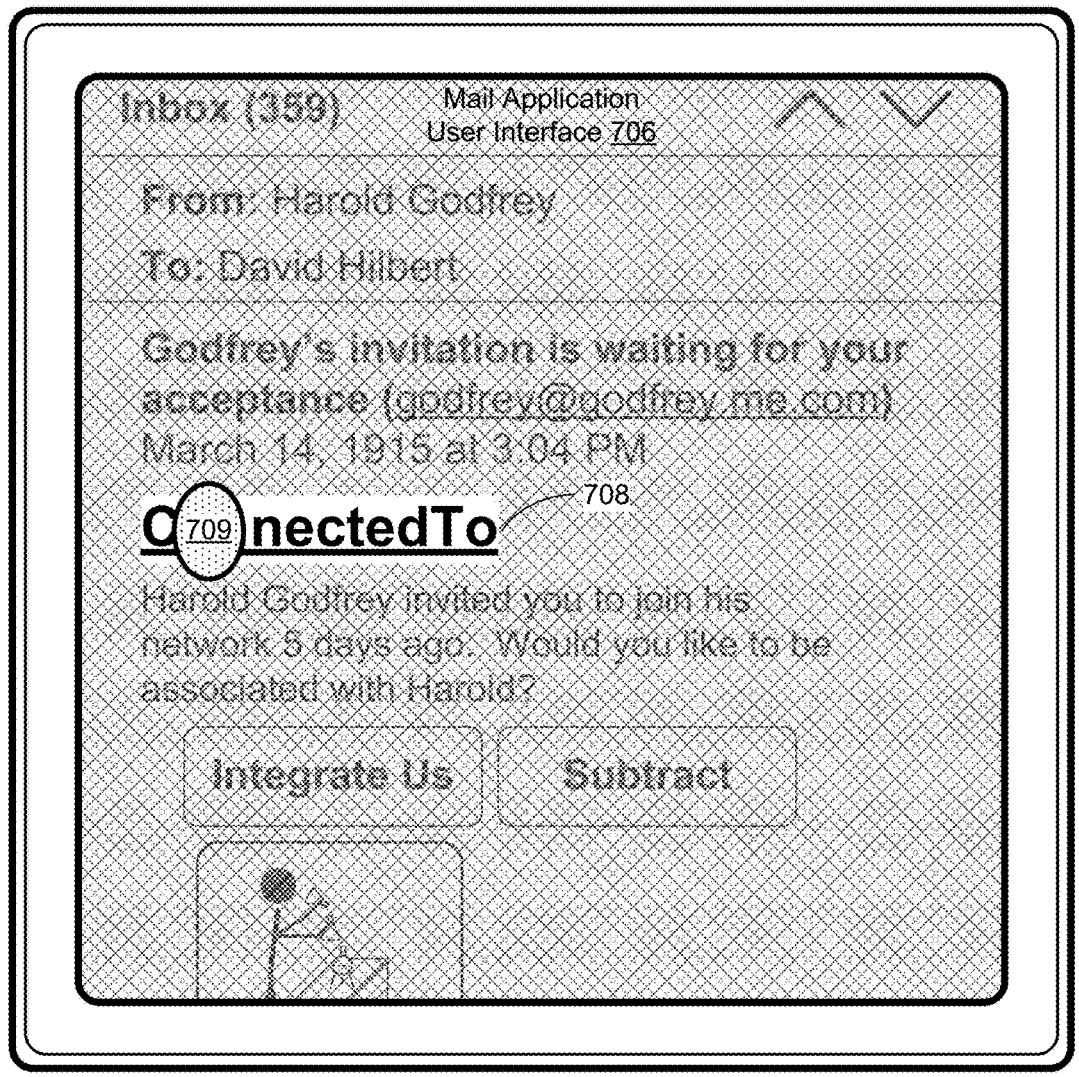
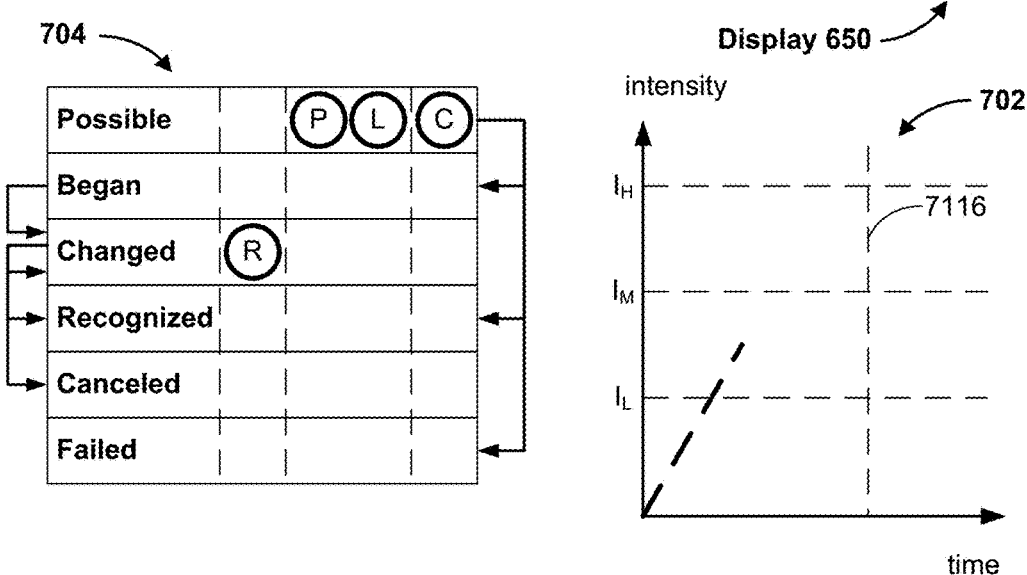
Figure 7V

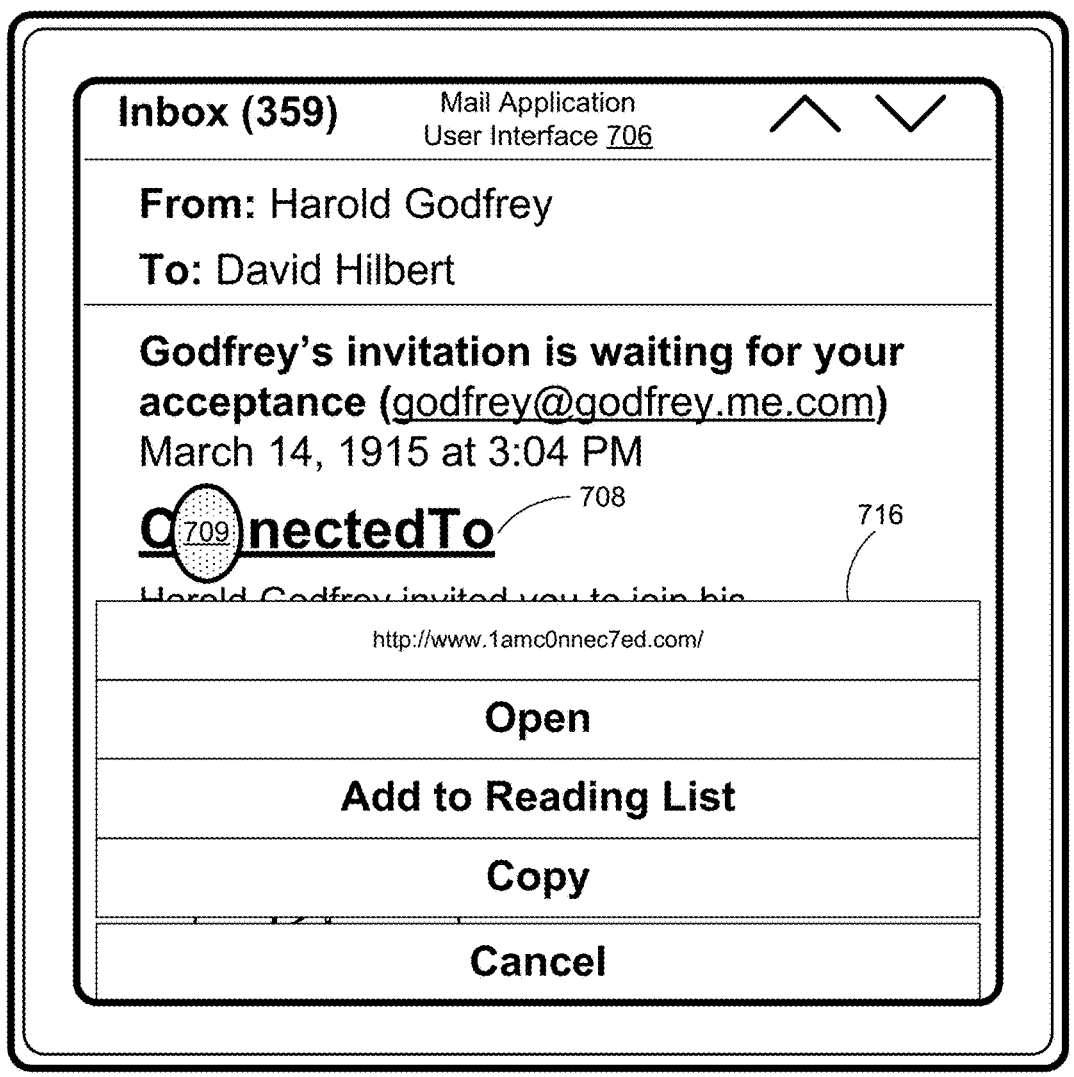
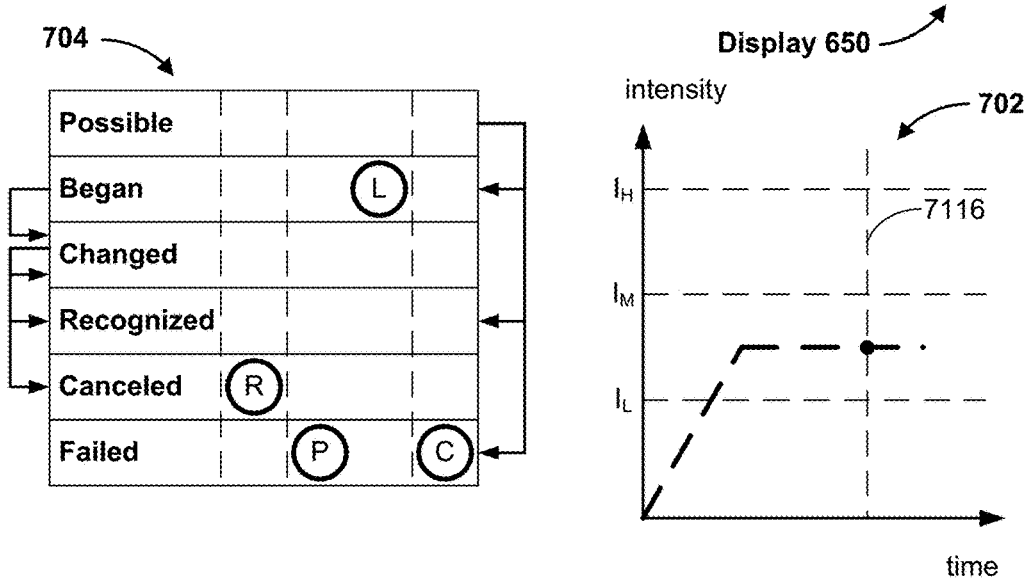
Figure 7W

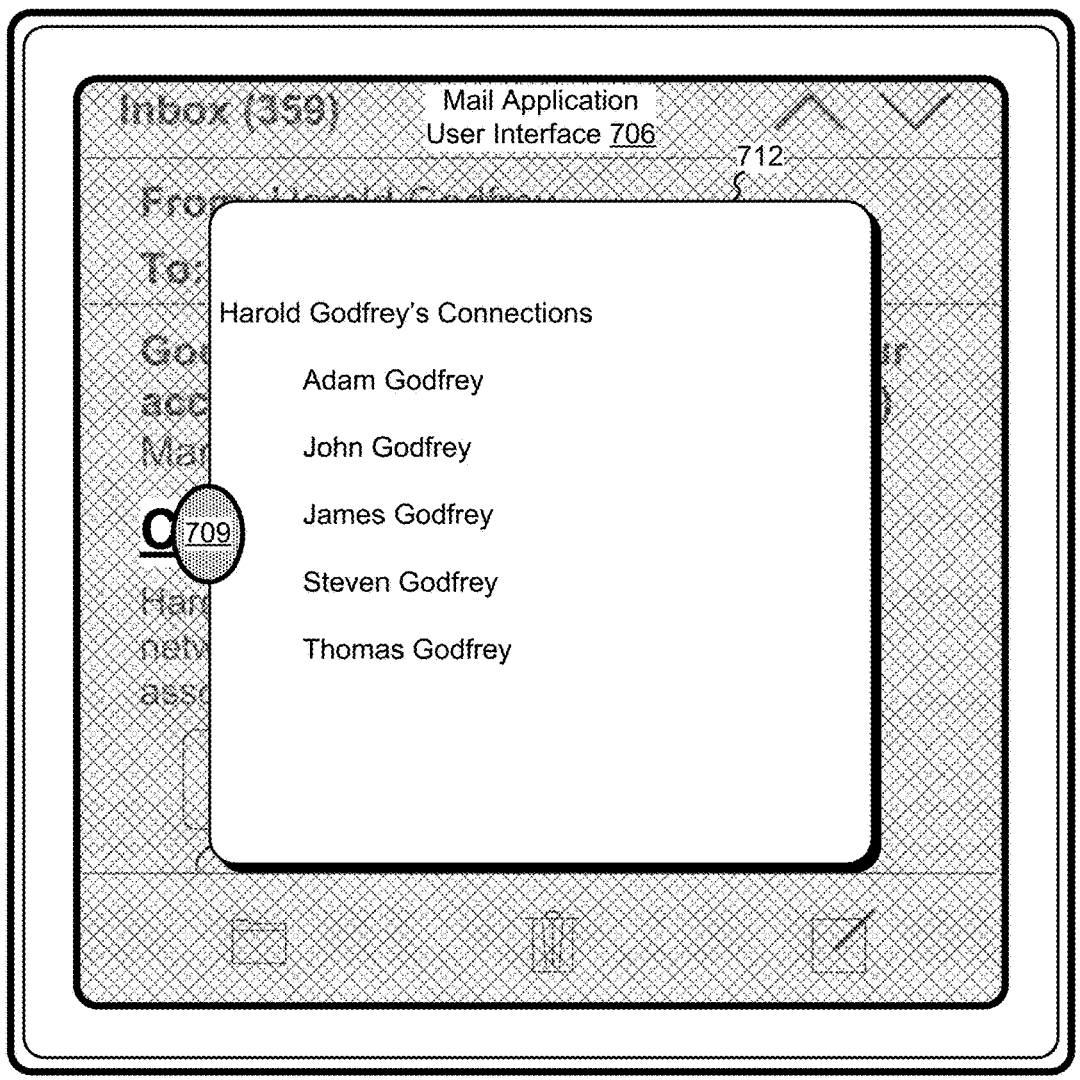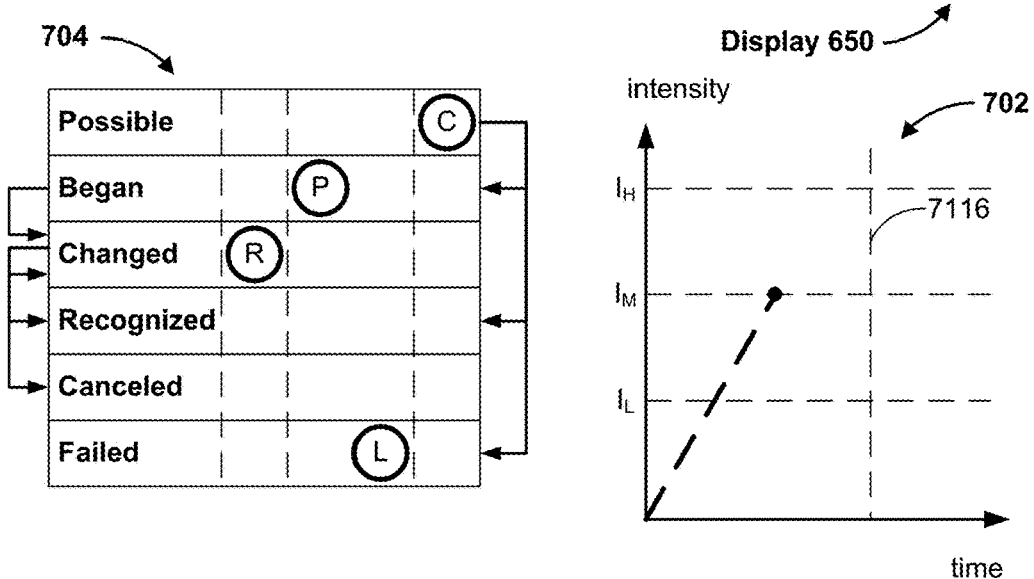
Figure 7X

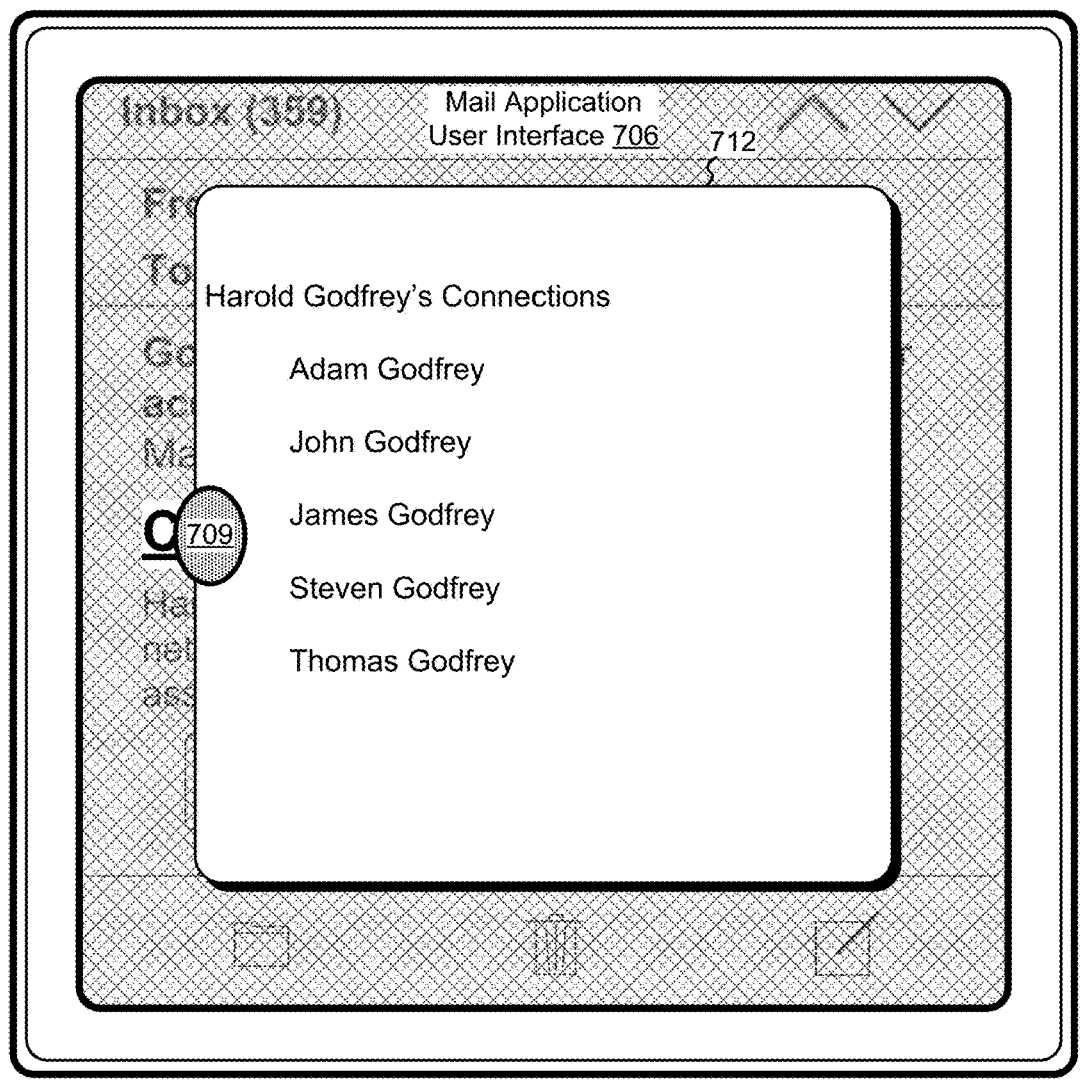
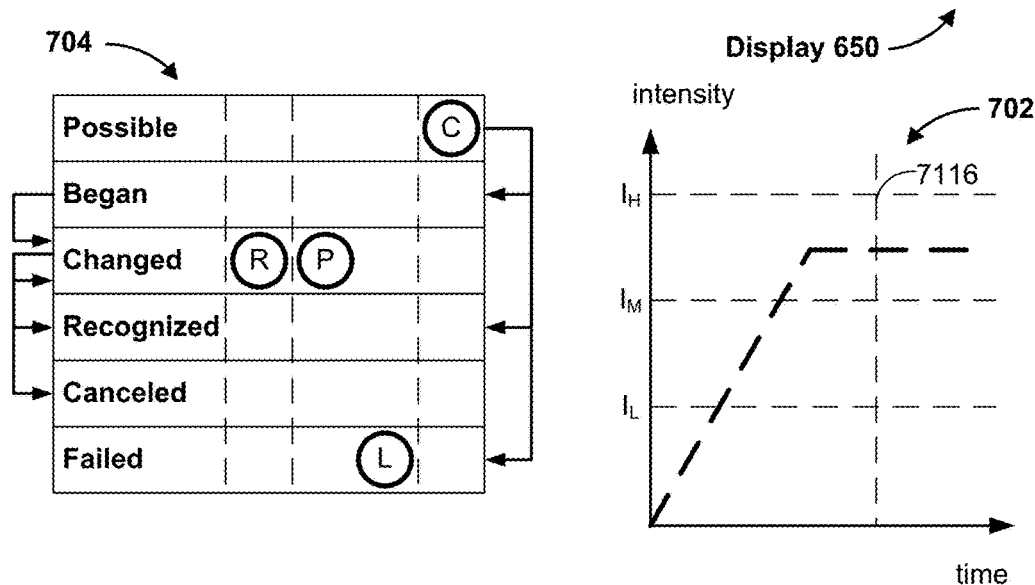
Figure 7Y

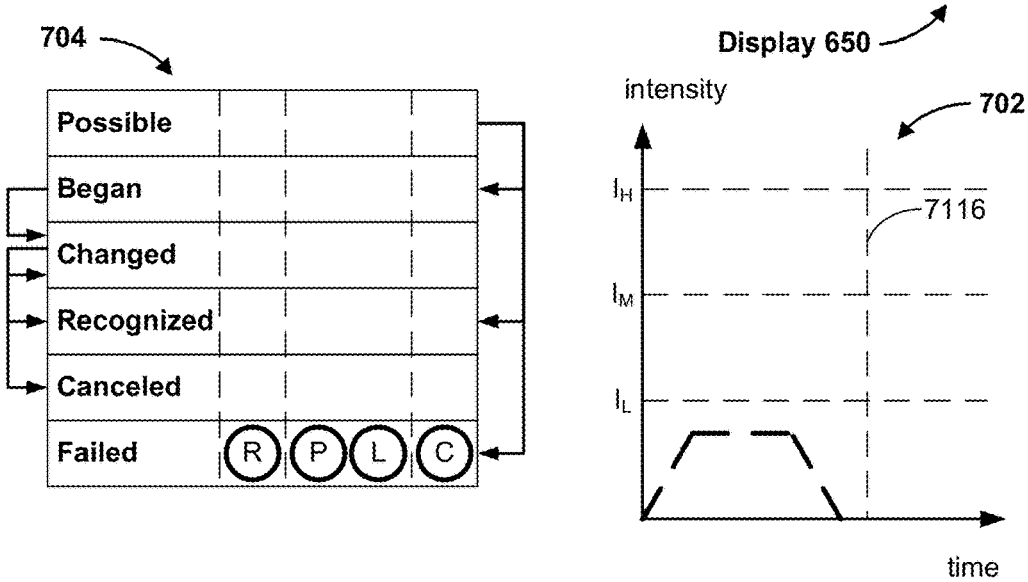
Figure 7Z

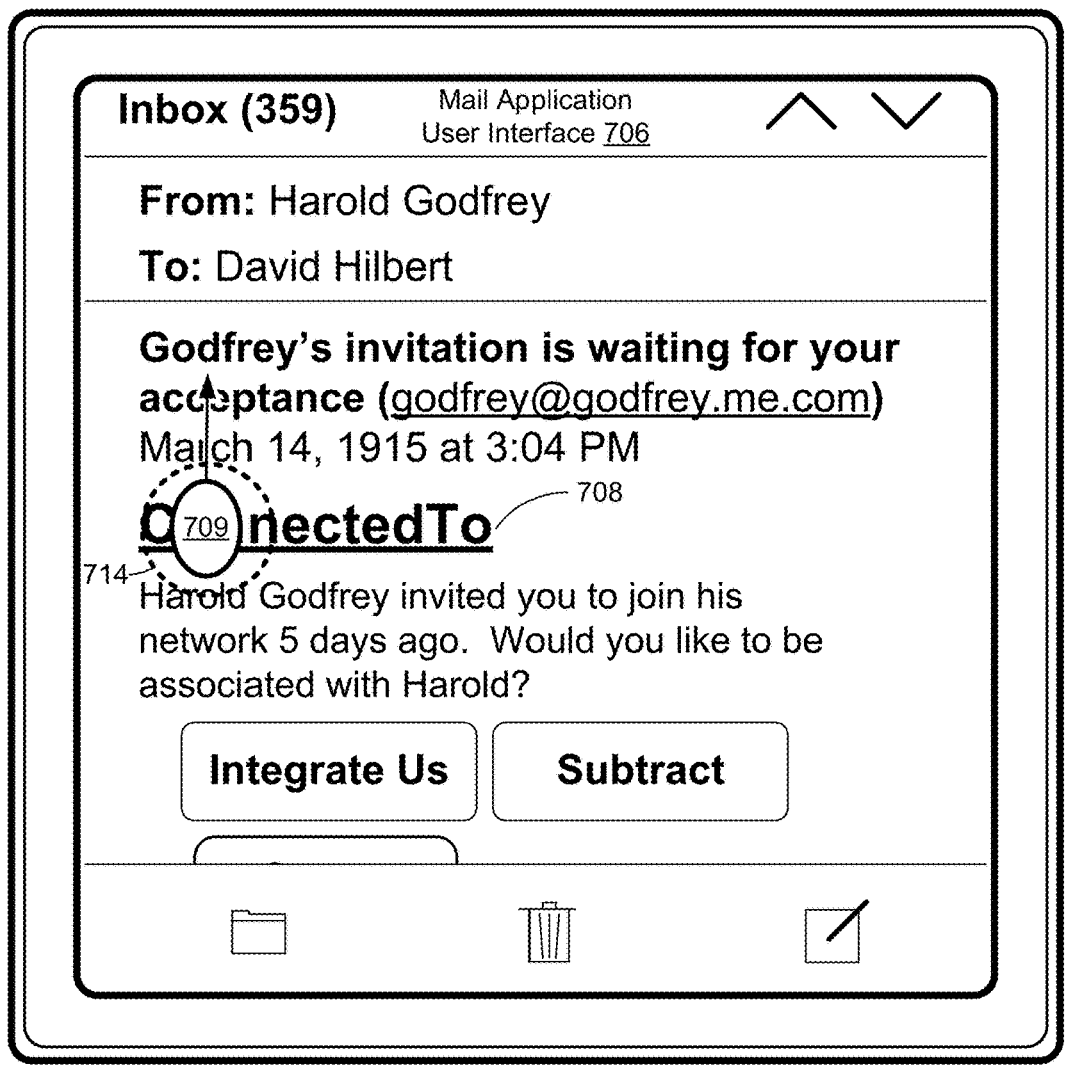
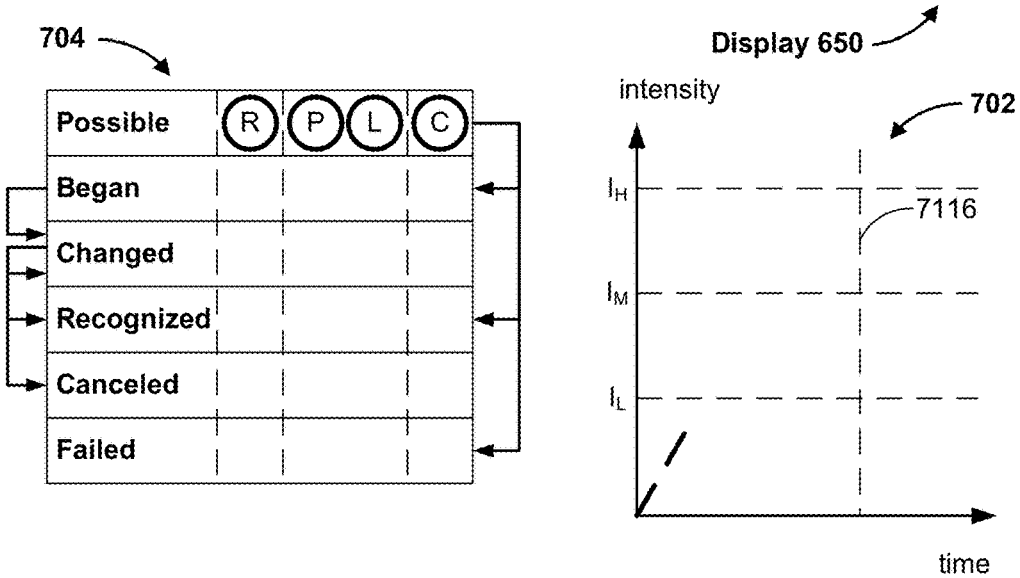
Figure 7AA

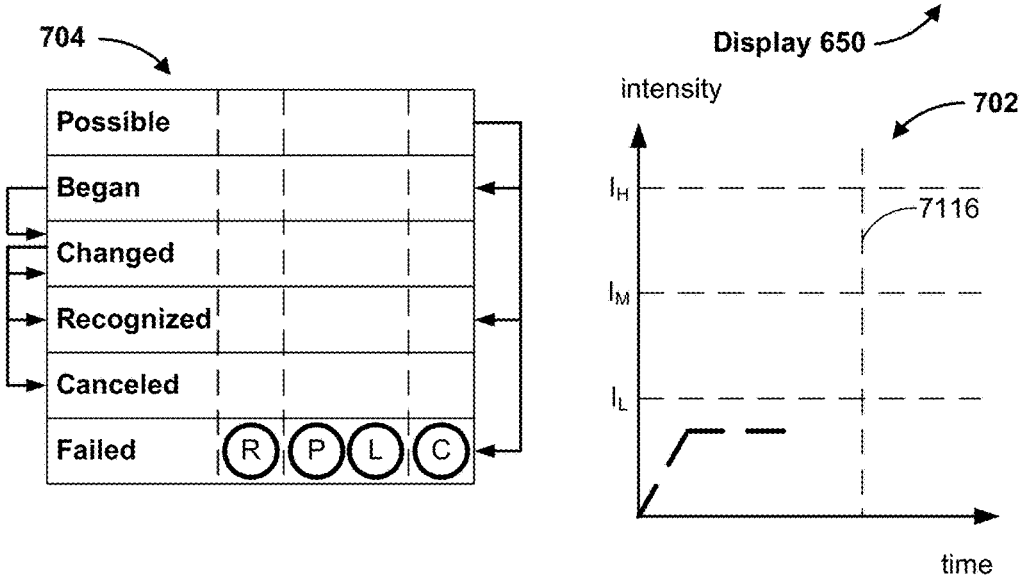
Figure 7BB

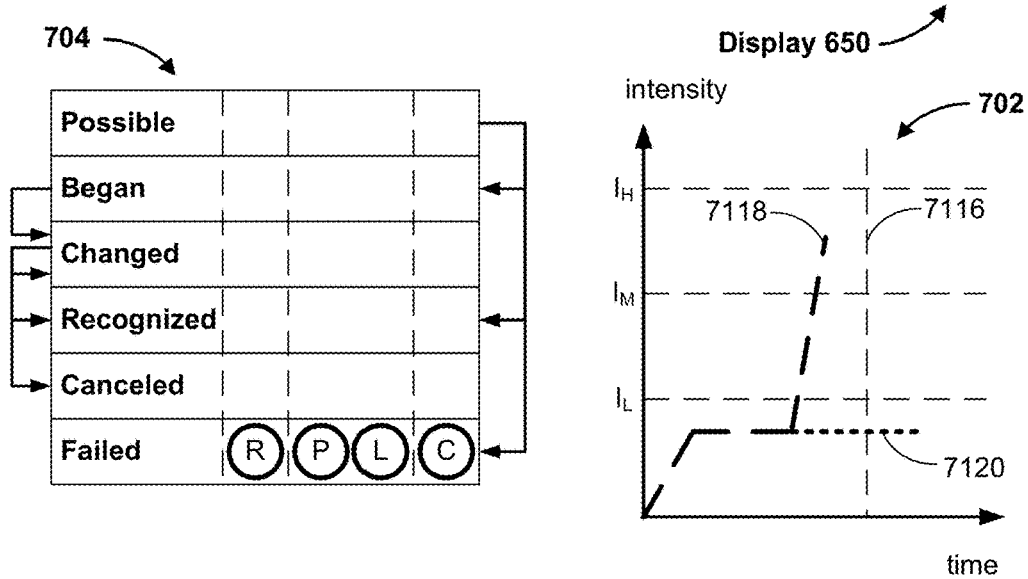
Figure 7CC

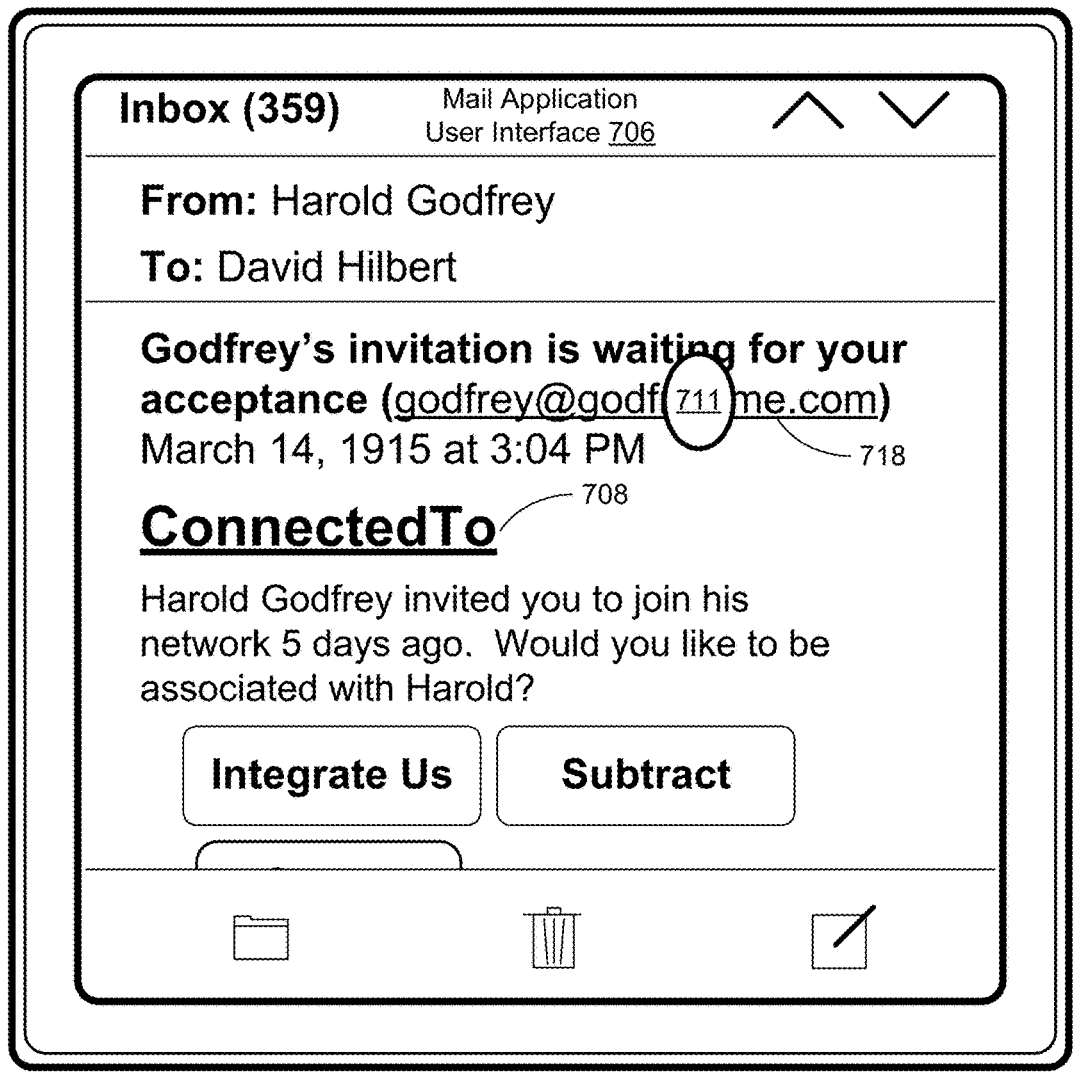
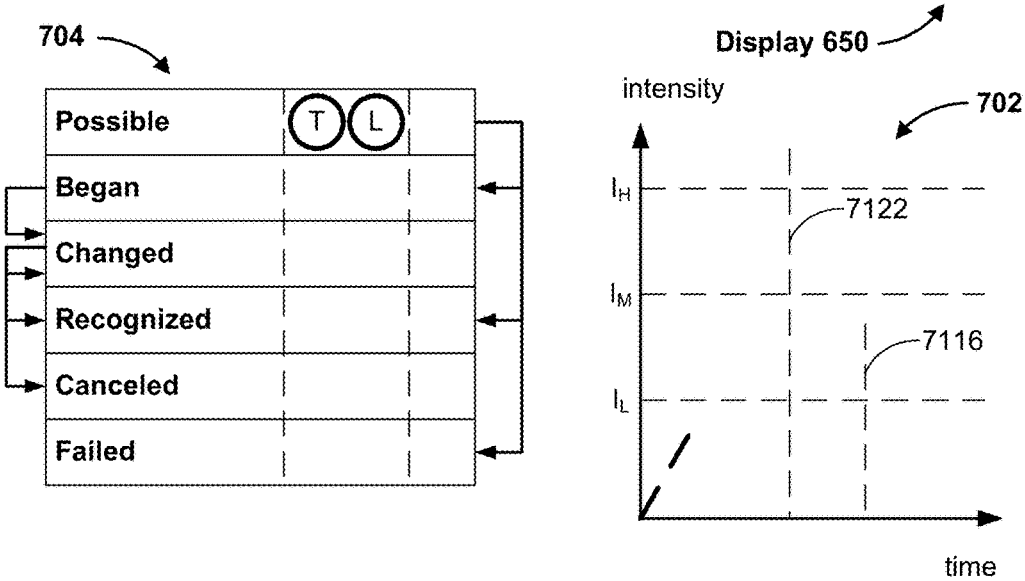
Figure 7DD

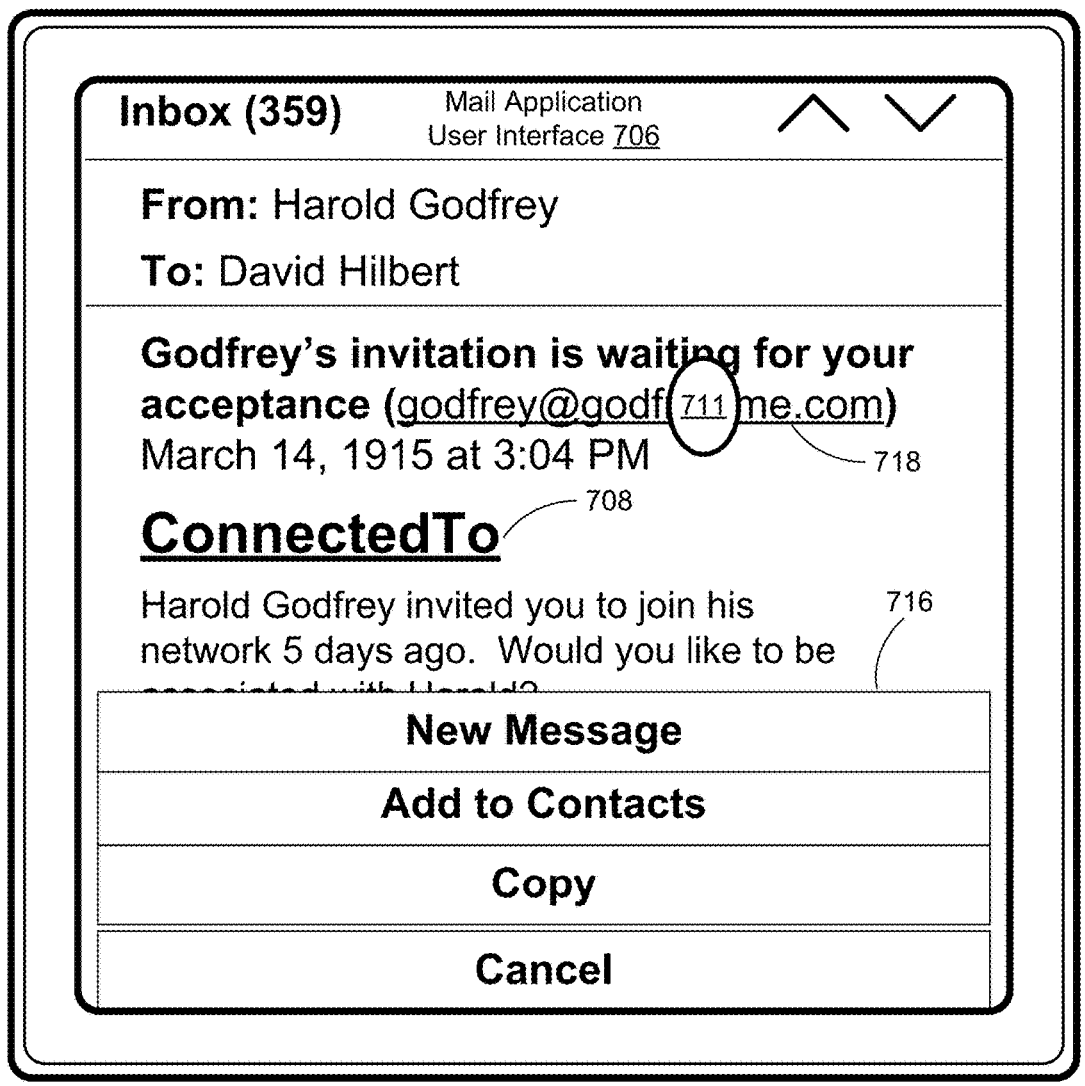
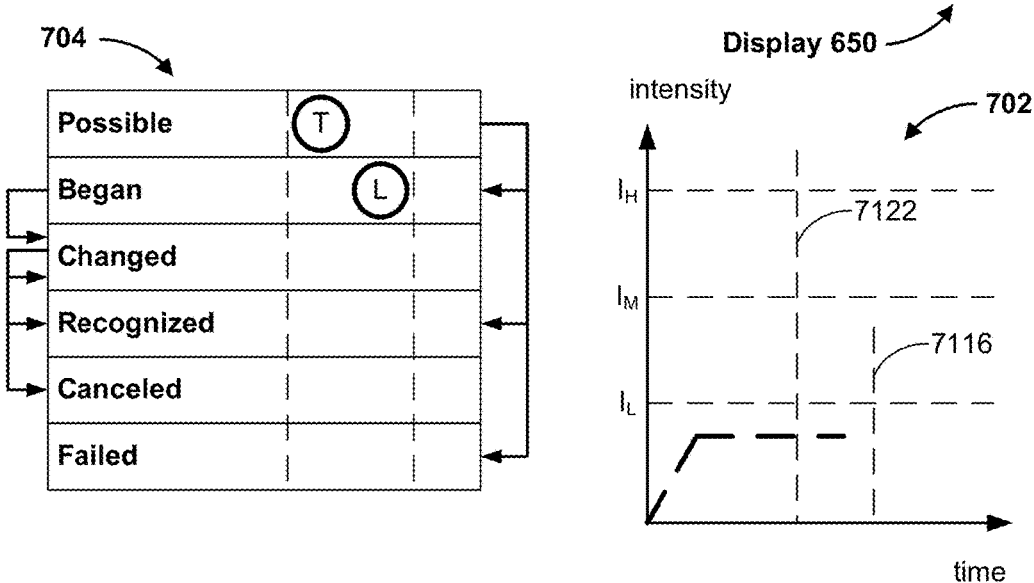
Figure 7EE

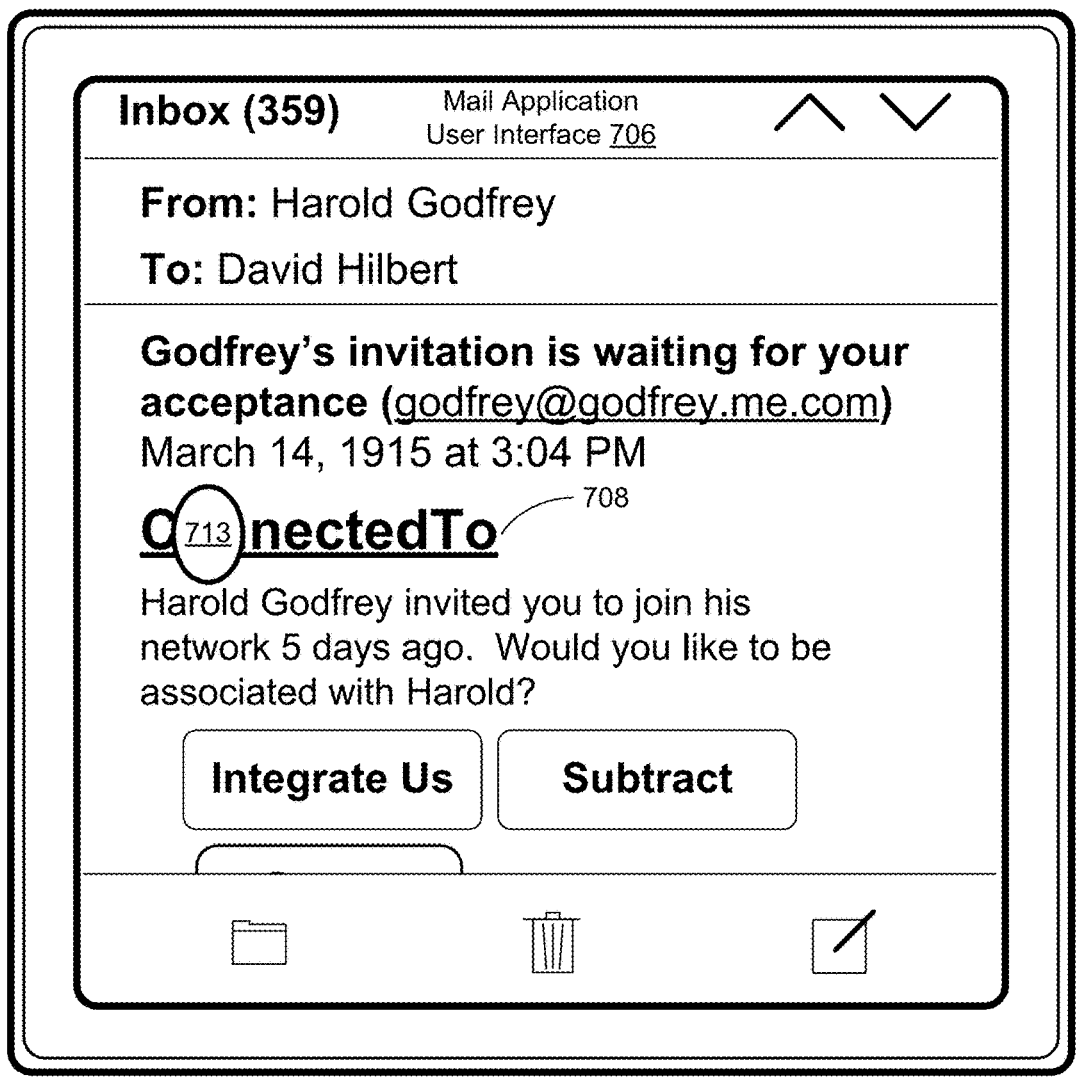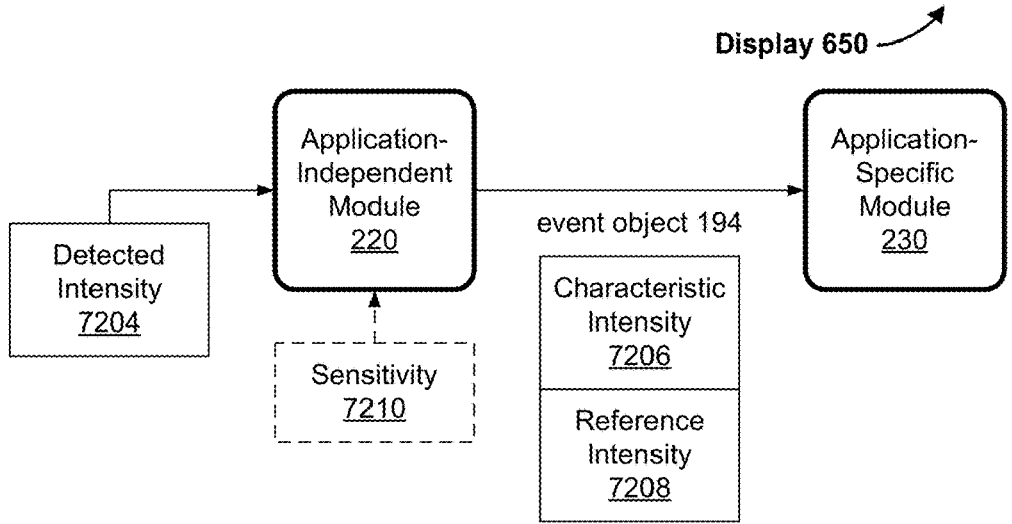
Figure 7FF

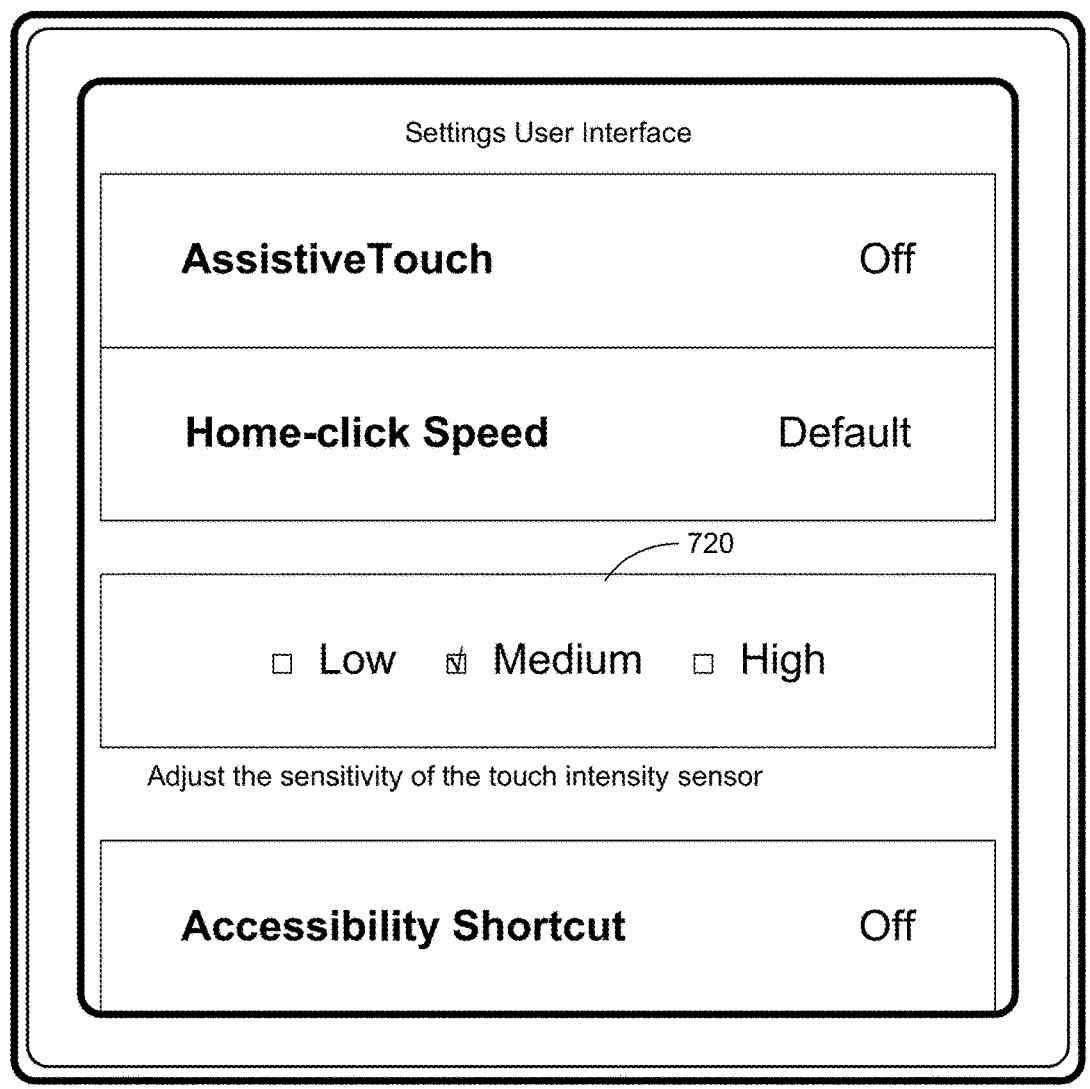
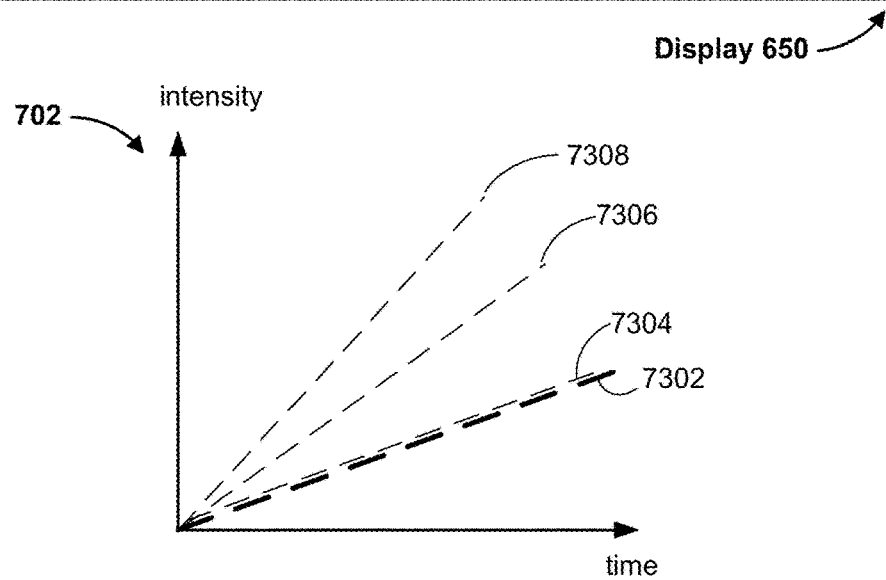
Figure 7GG

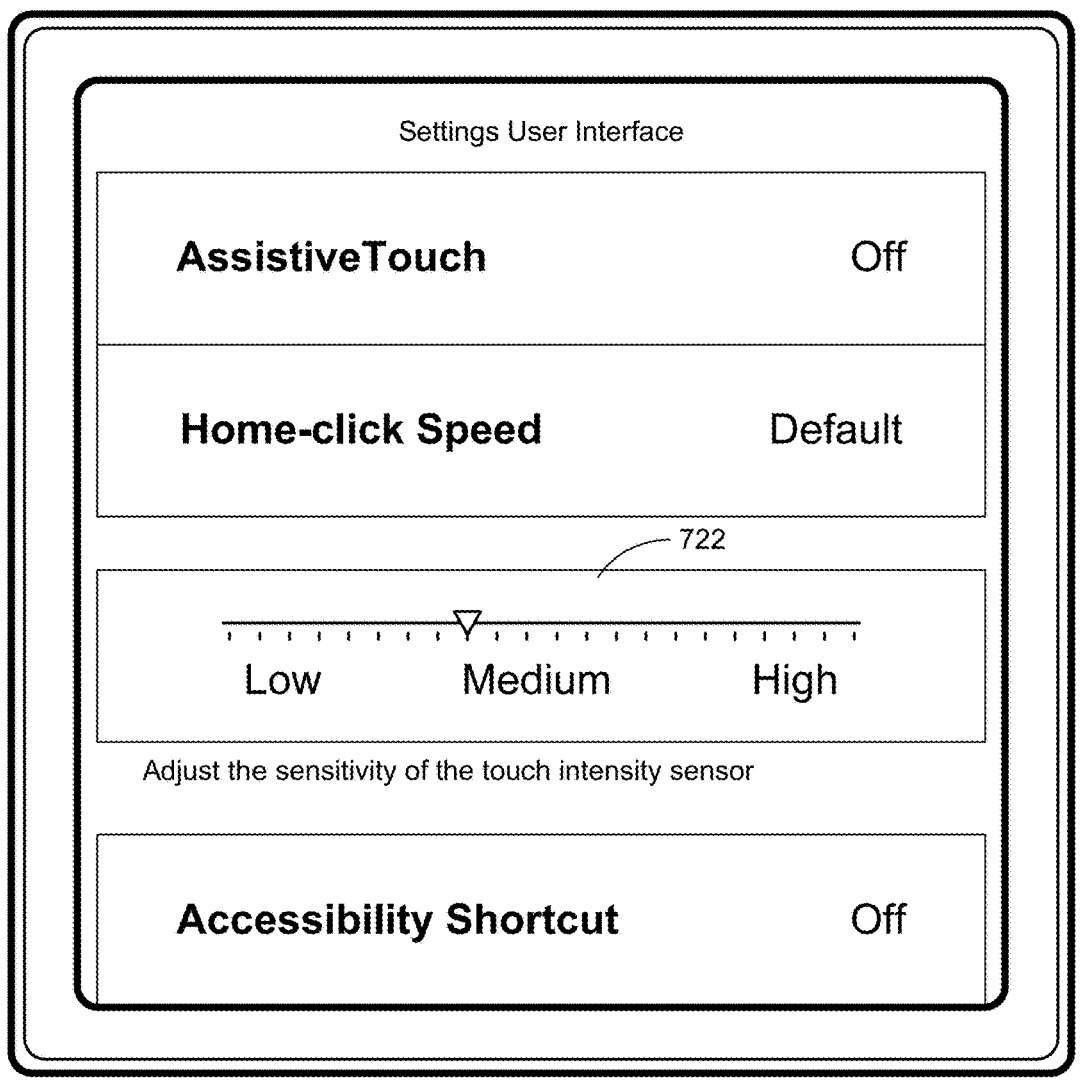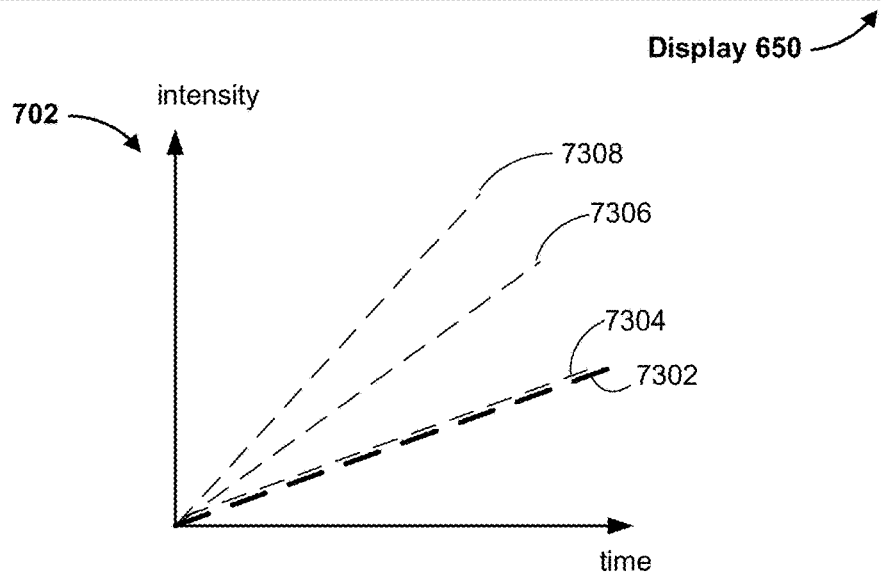
Figure 7HH

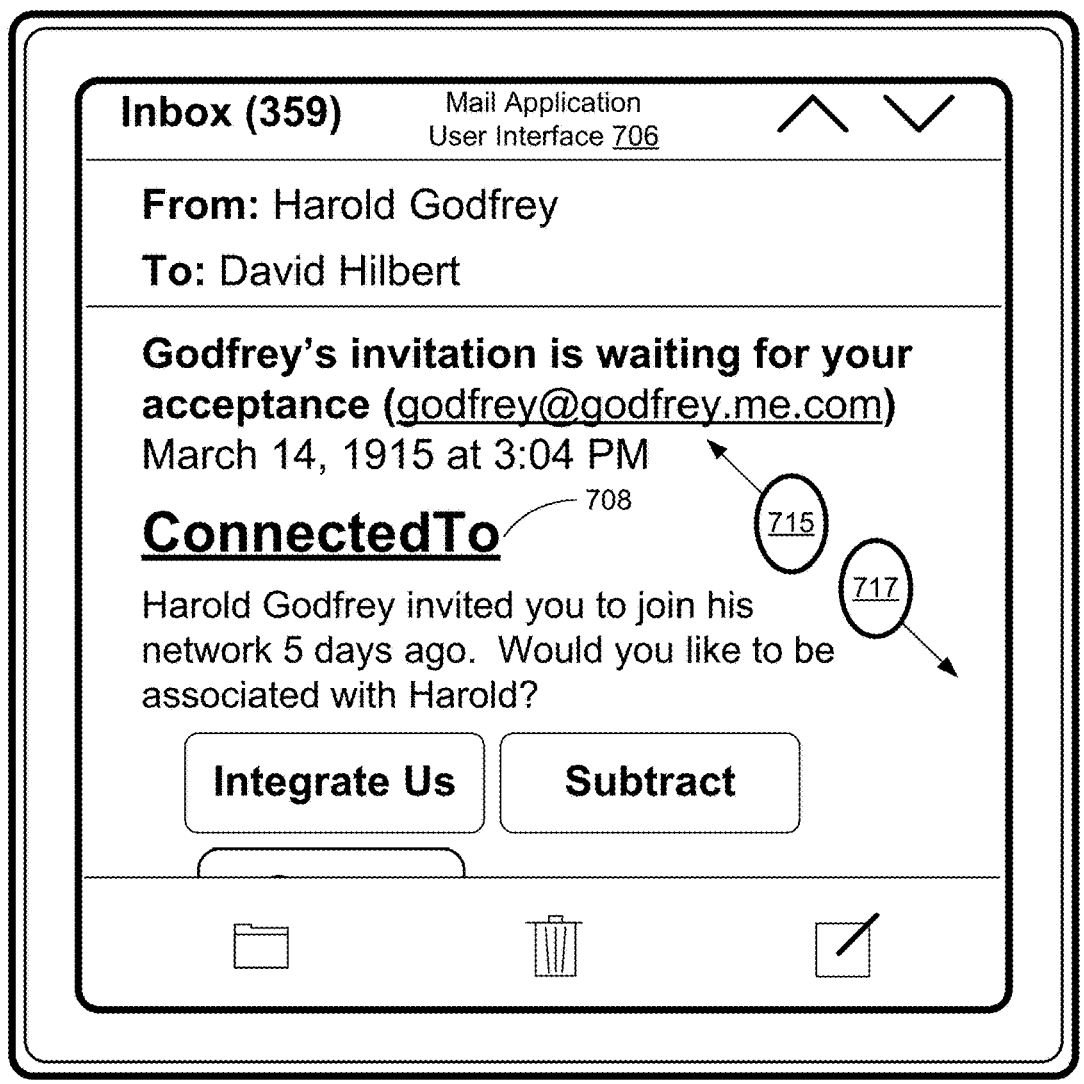
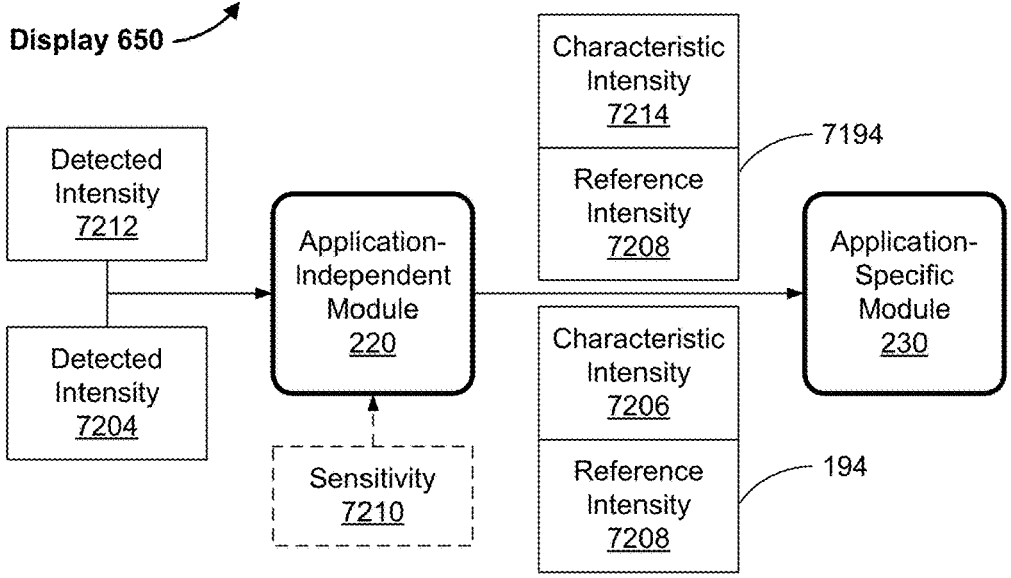
Figure 7II

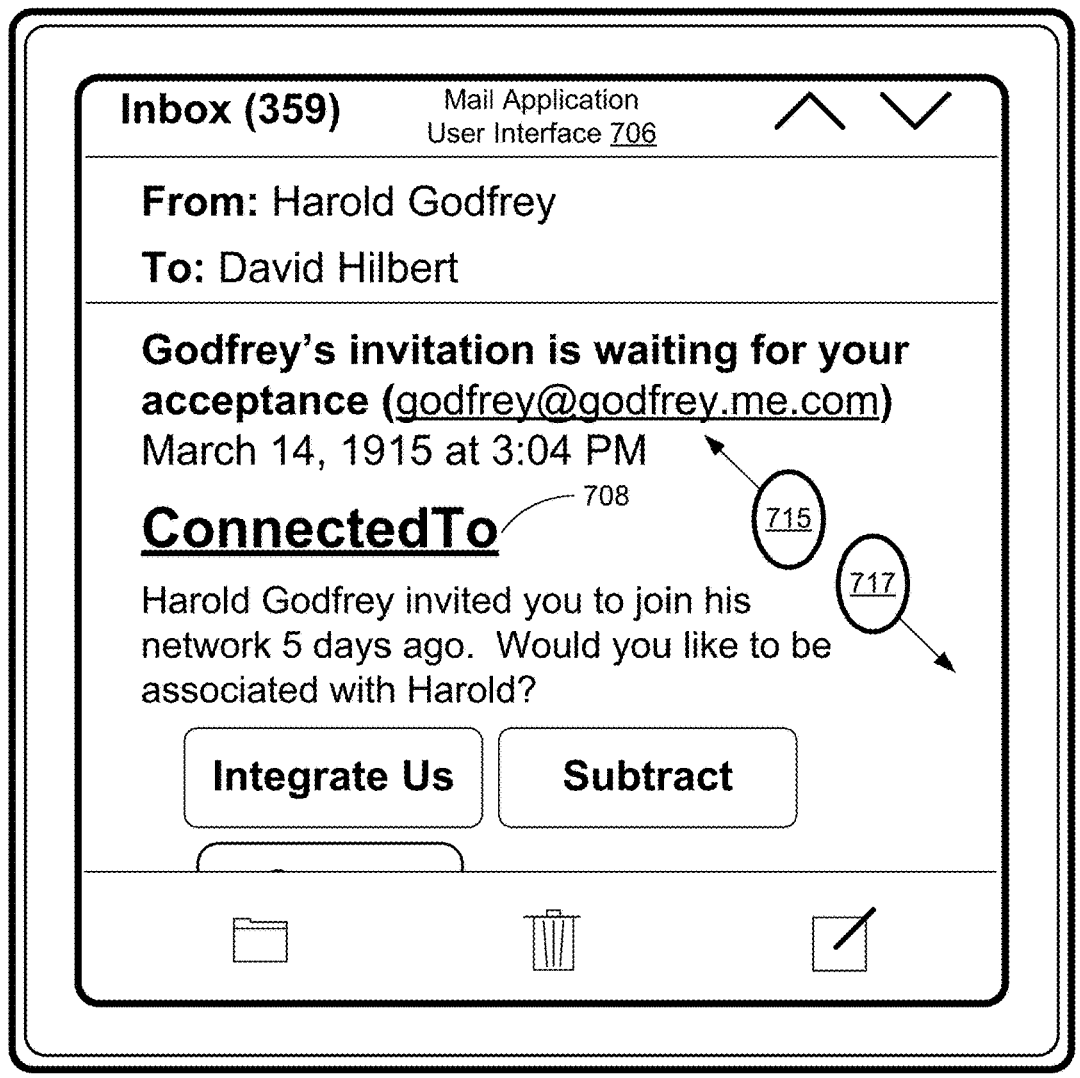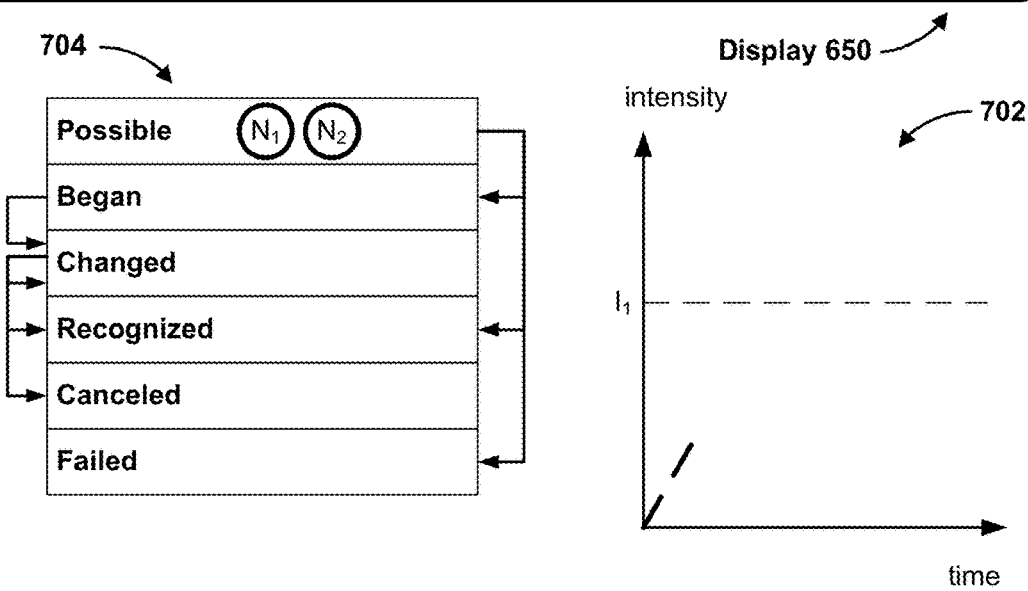
Figure 7JJ

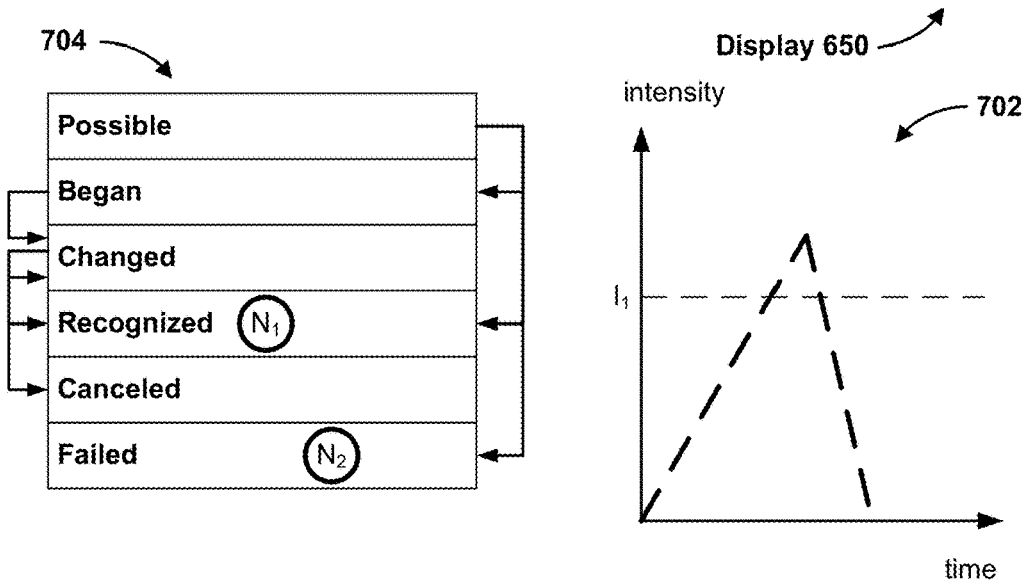
Figure 7KK

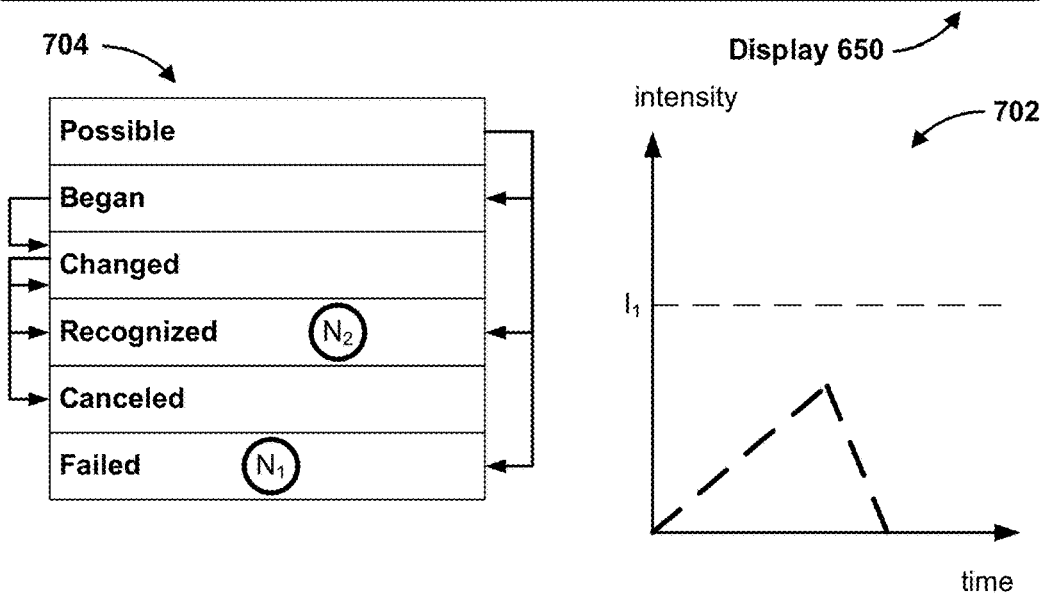
Figure 7LL

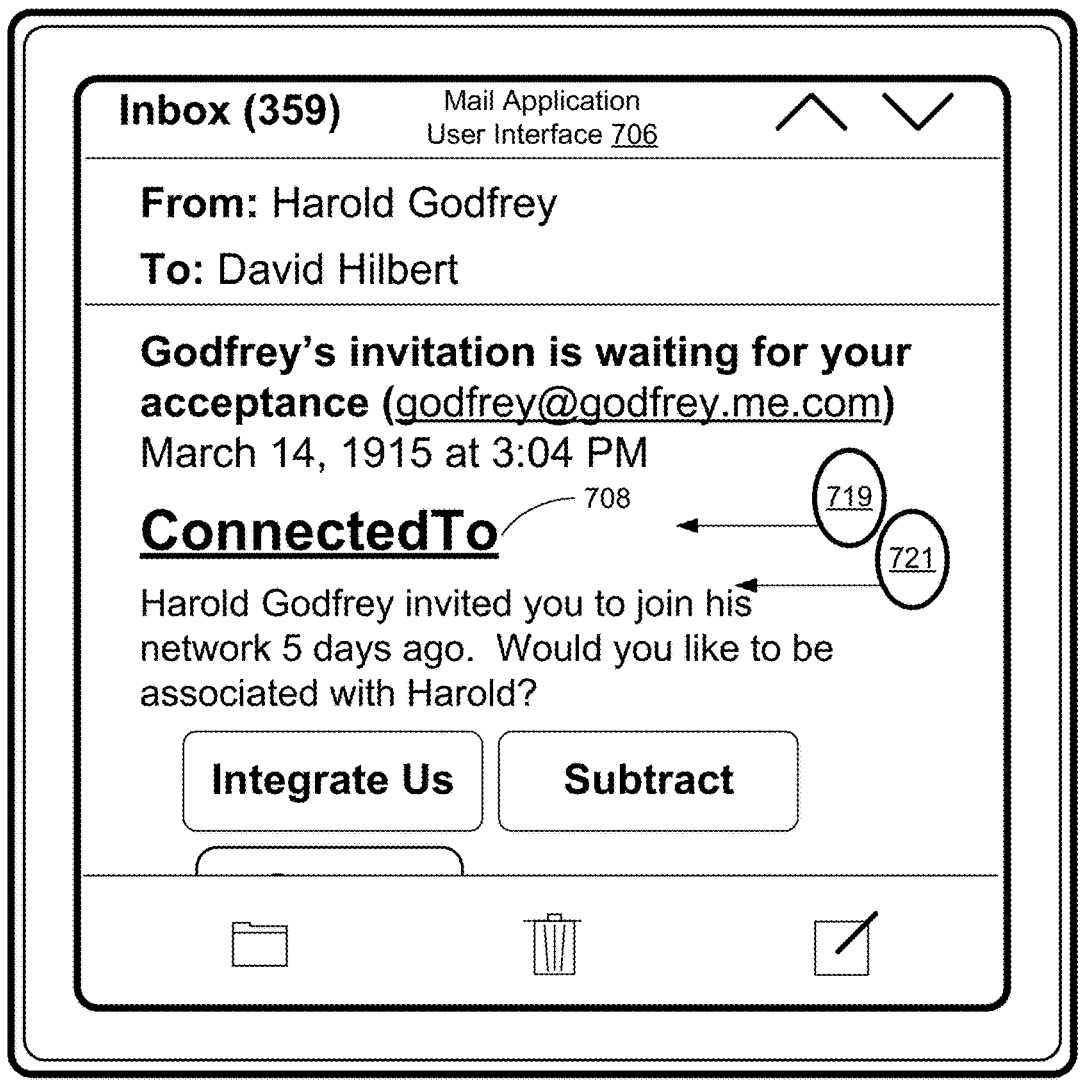
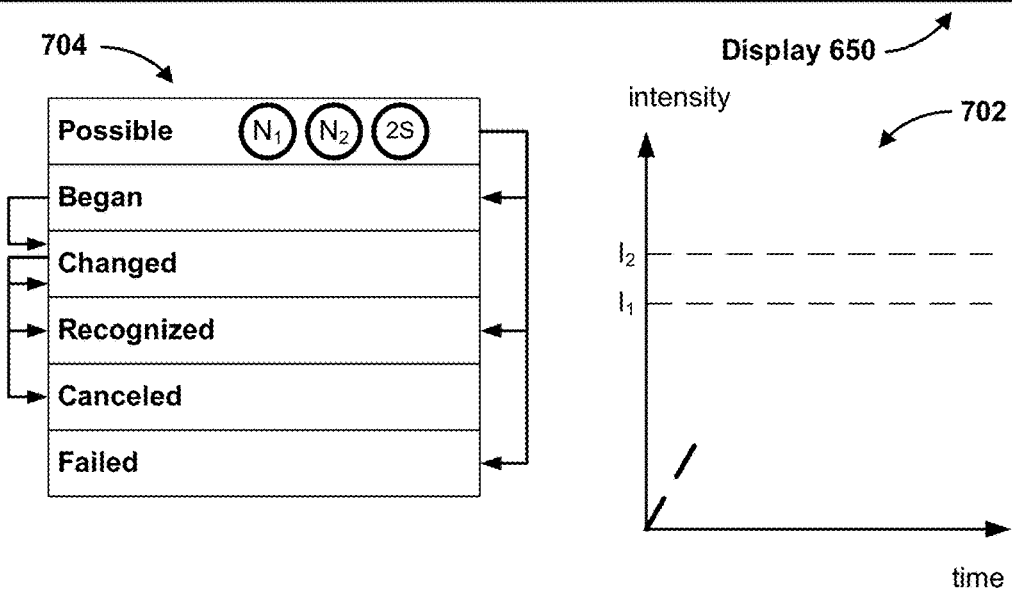
Figure 7MM

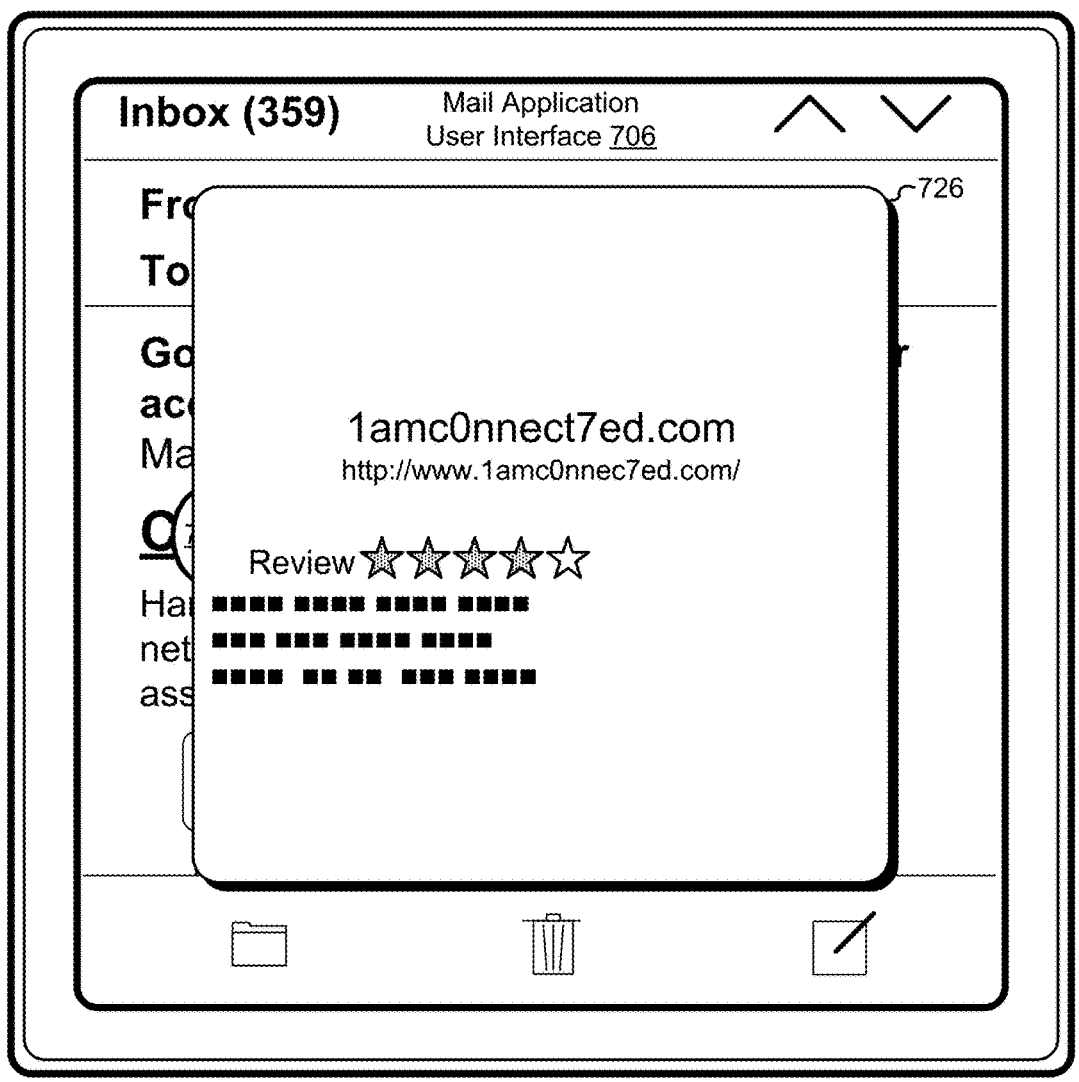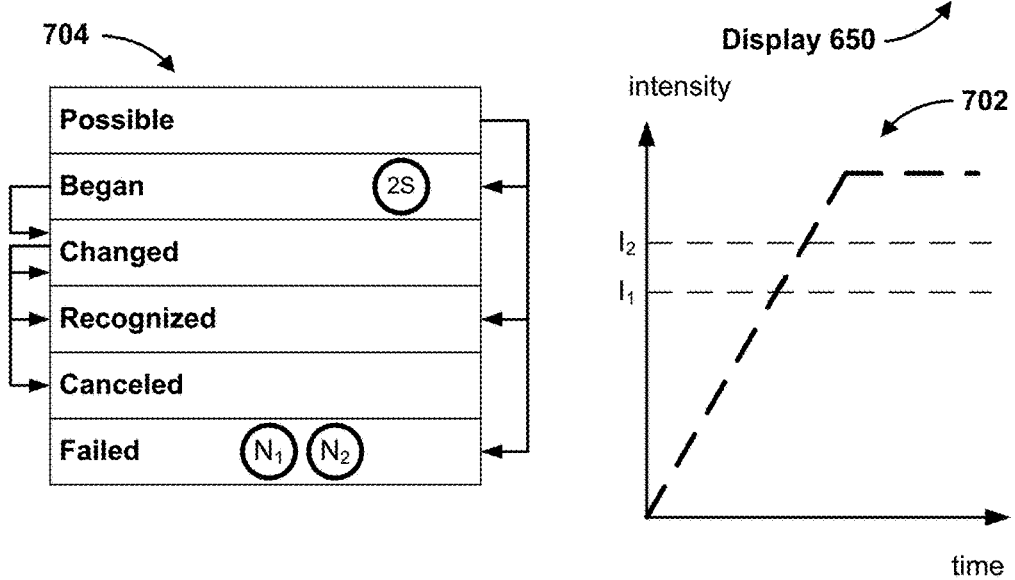
Figure 7NN

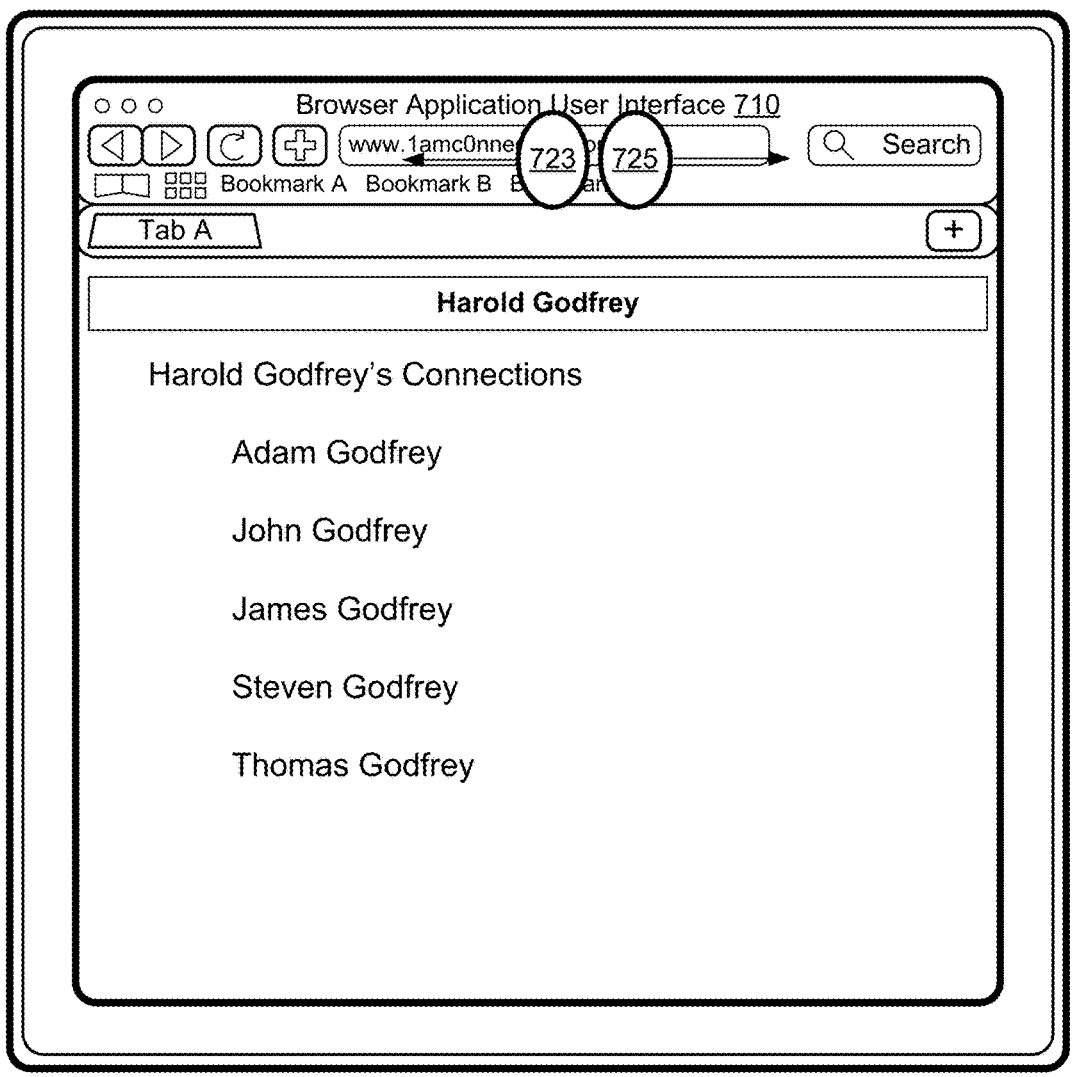
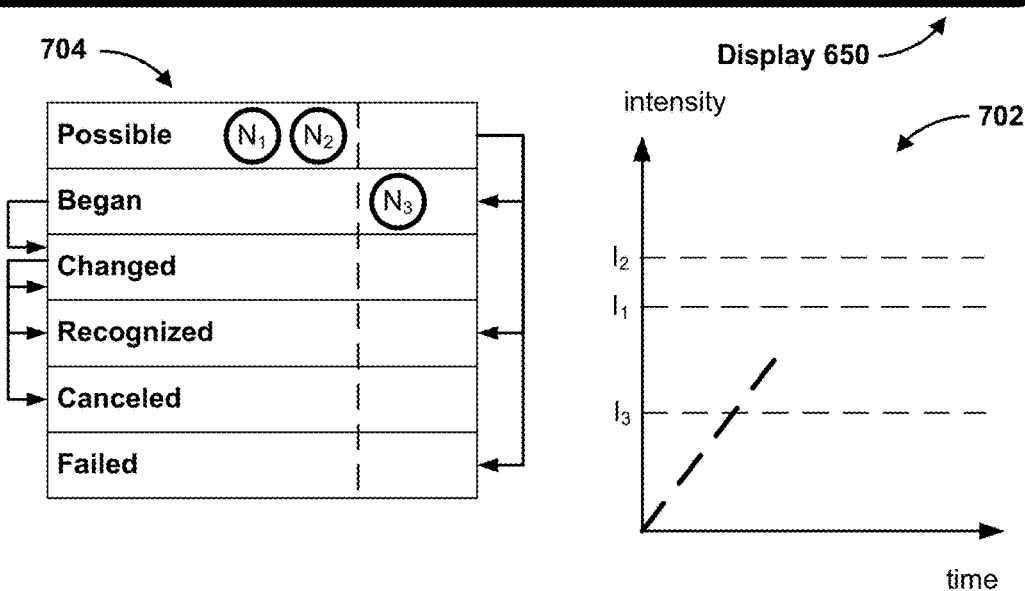
Figure 7OO

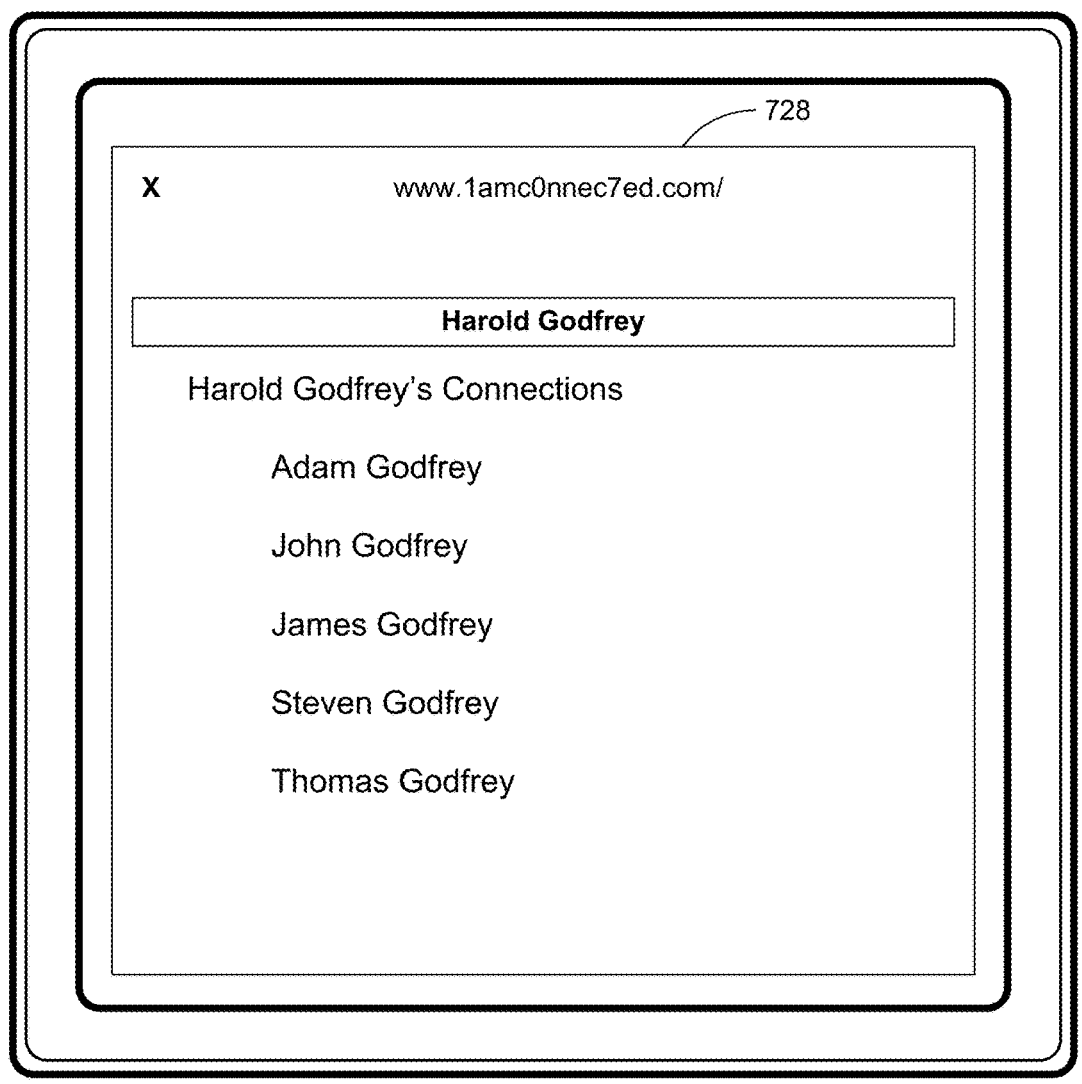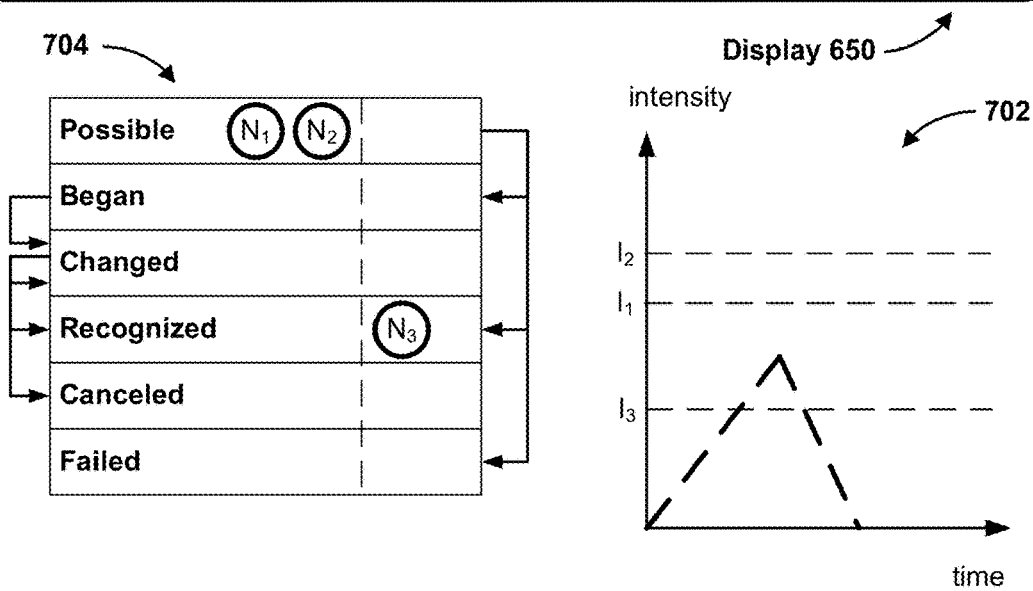
Figure 7PP

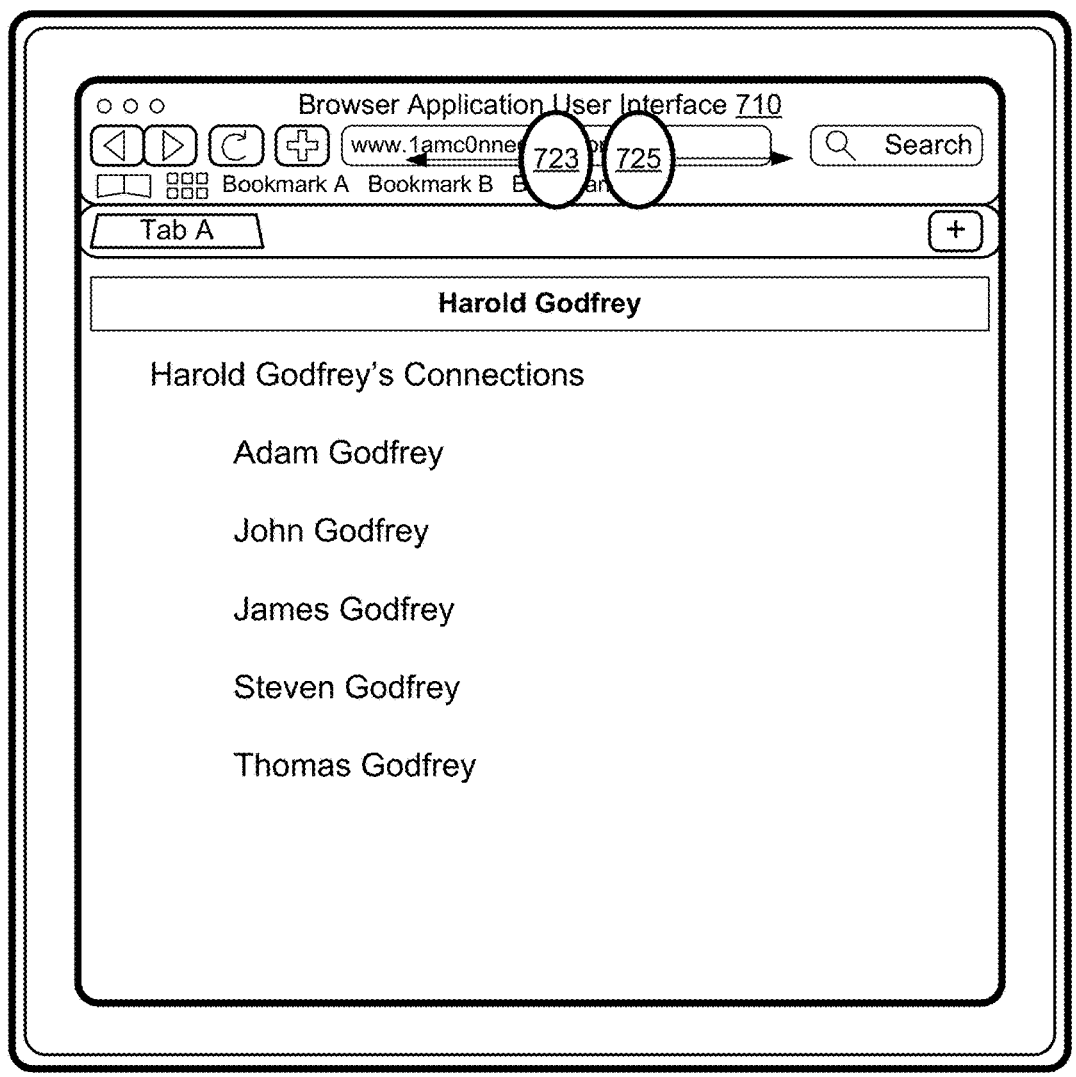
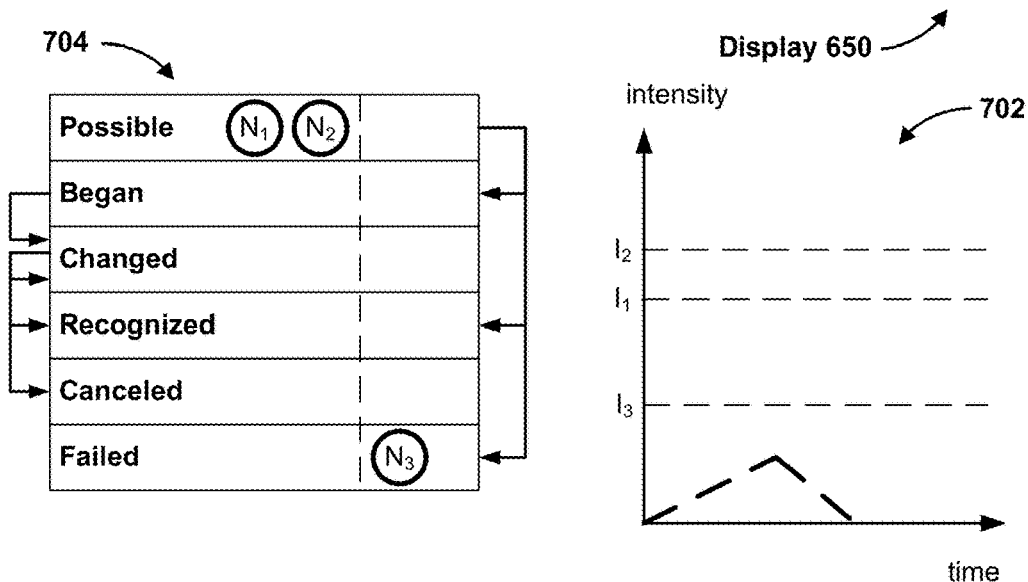
Figure 7QQ

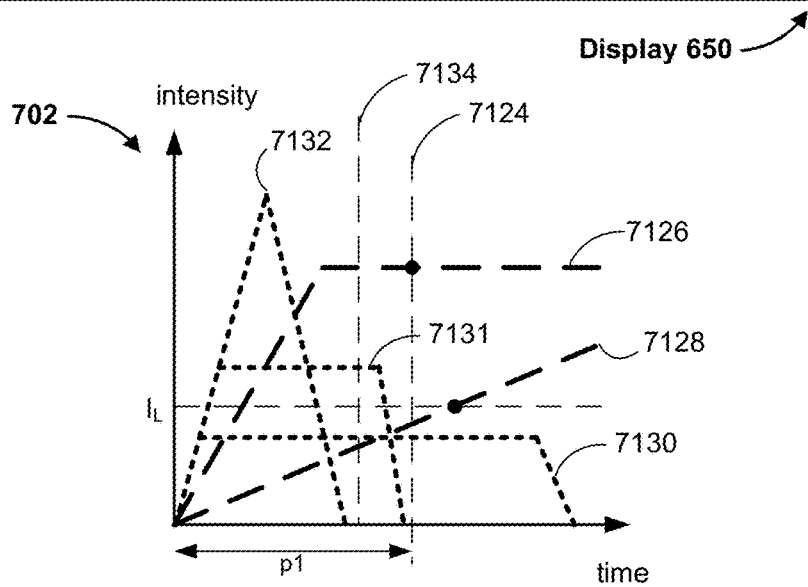
Figure 7RR

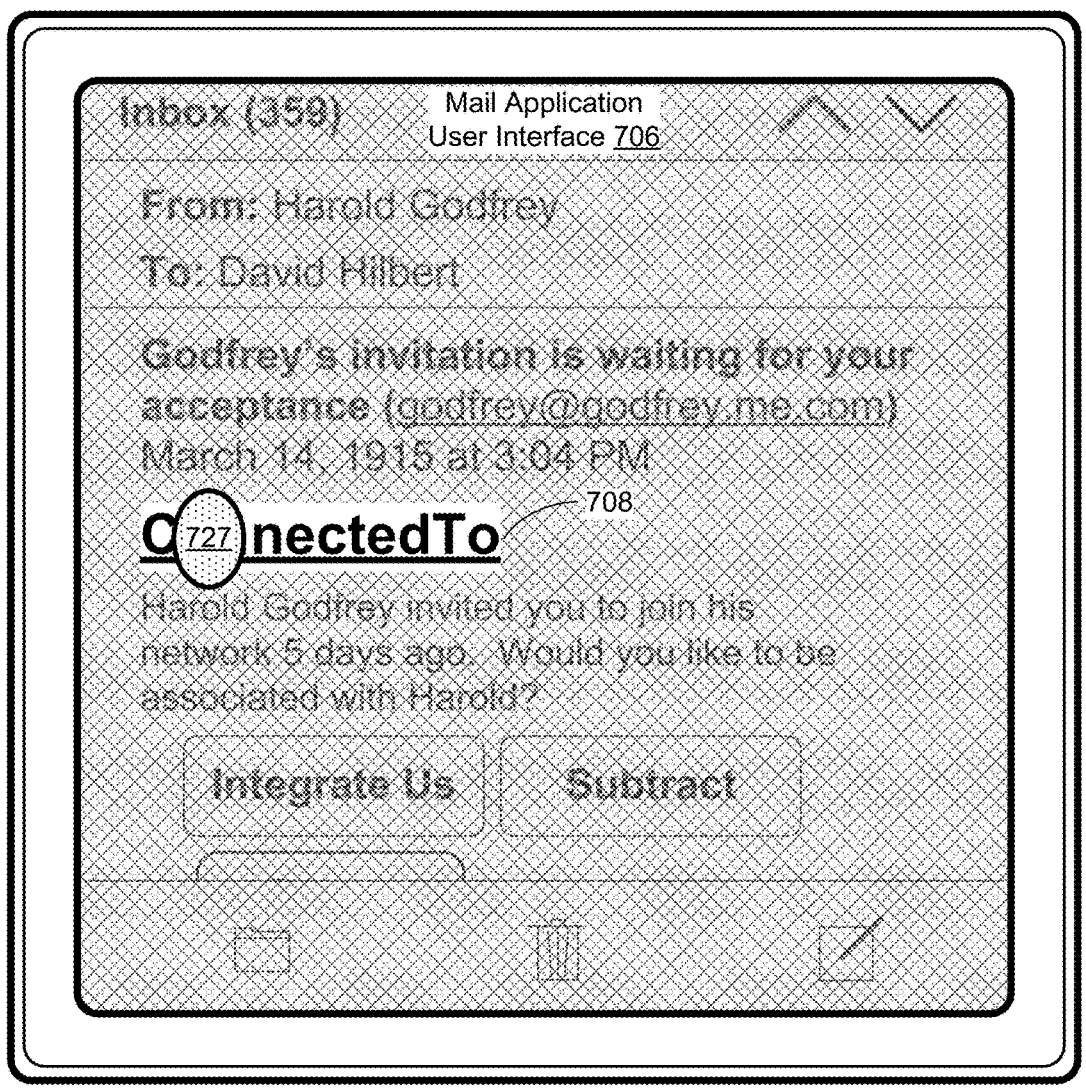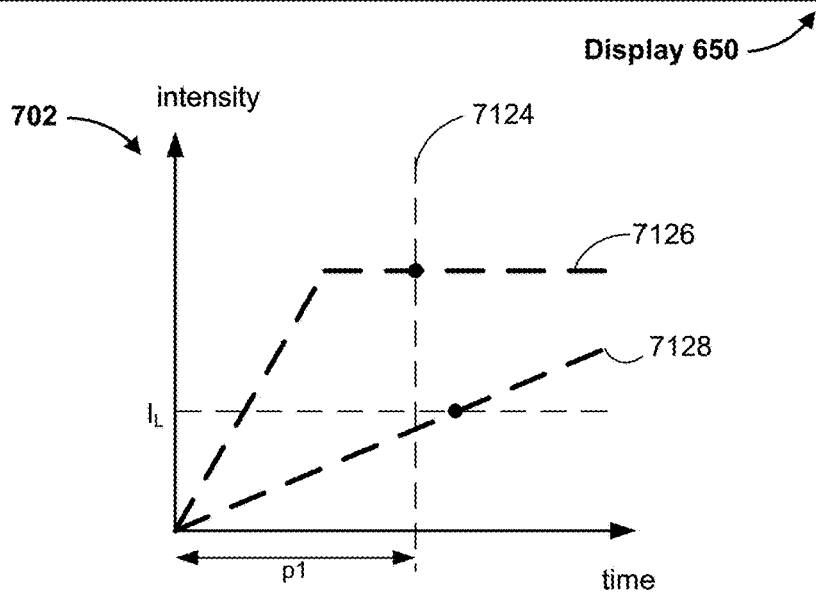
Figure 7SS

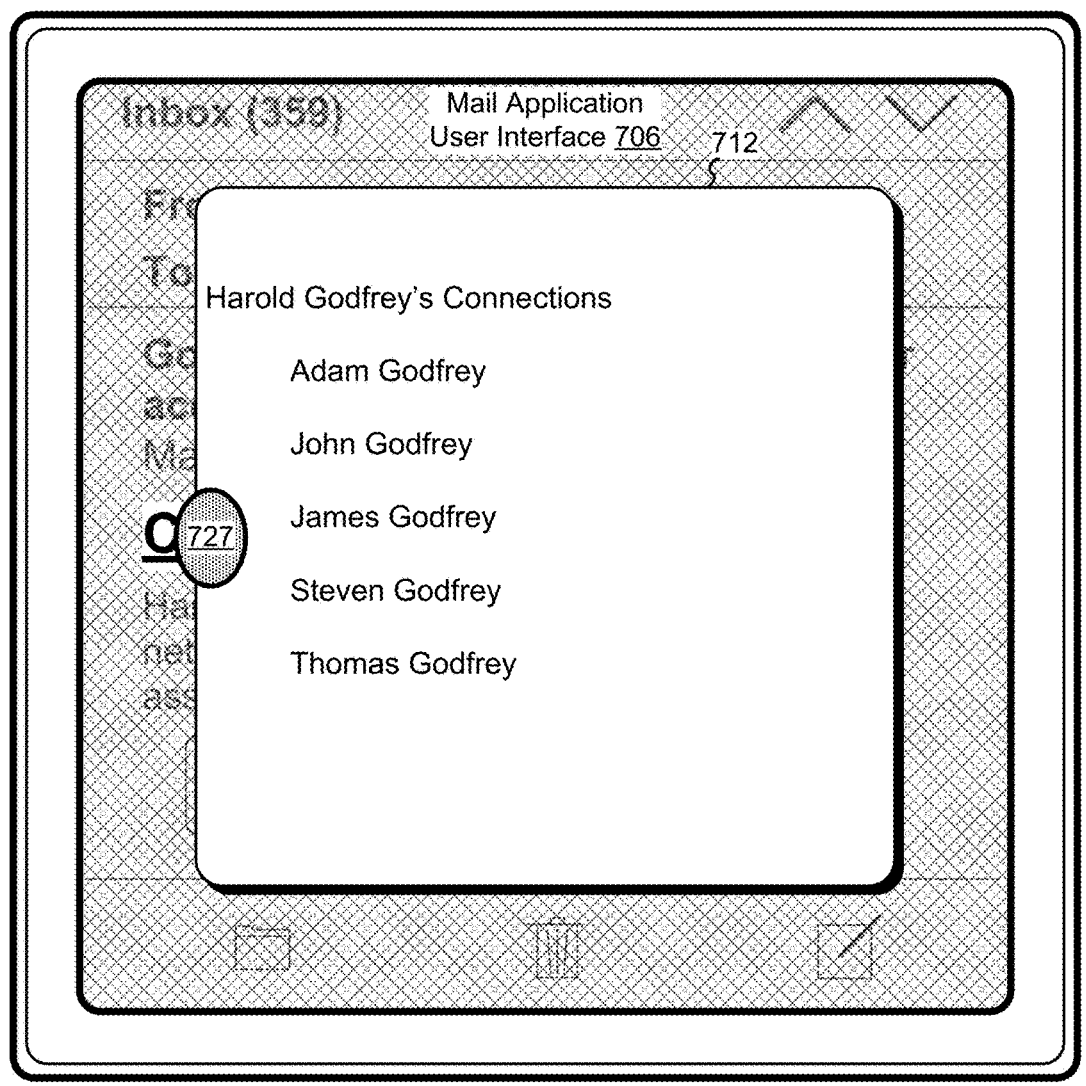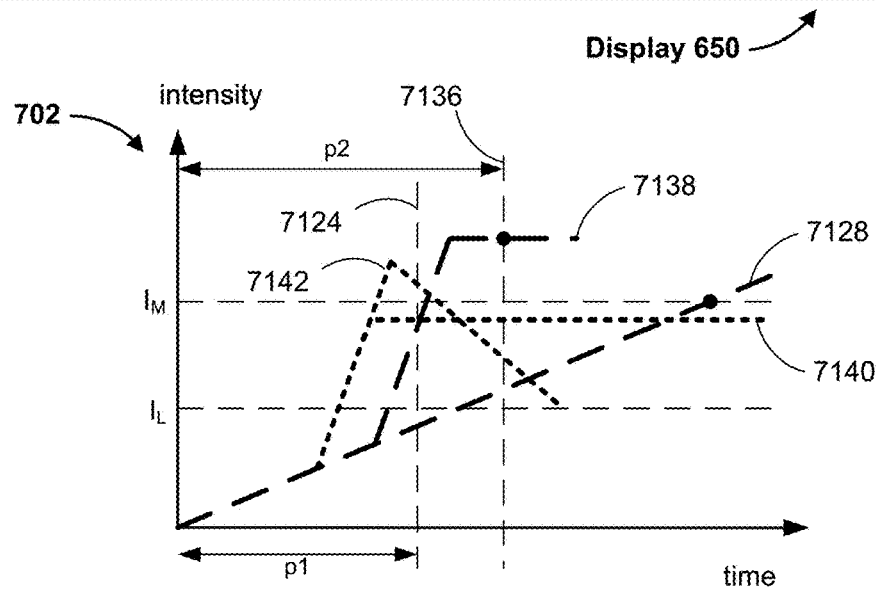
Figure 7TT

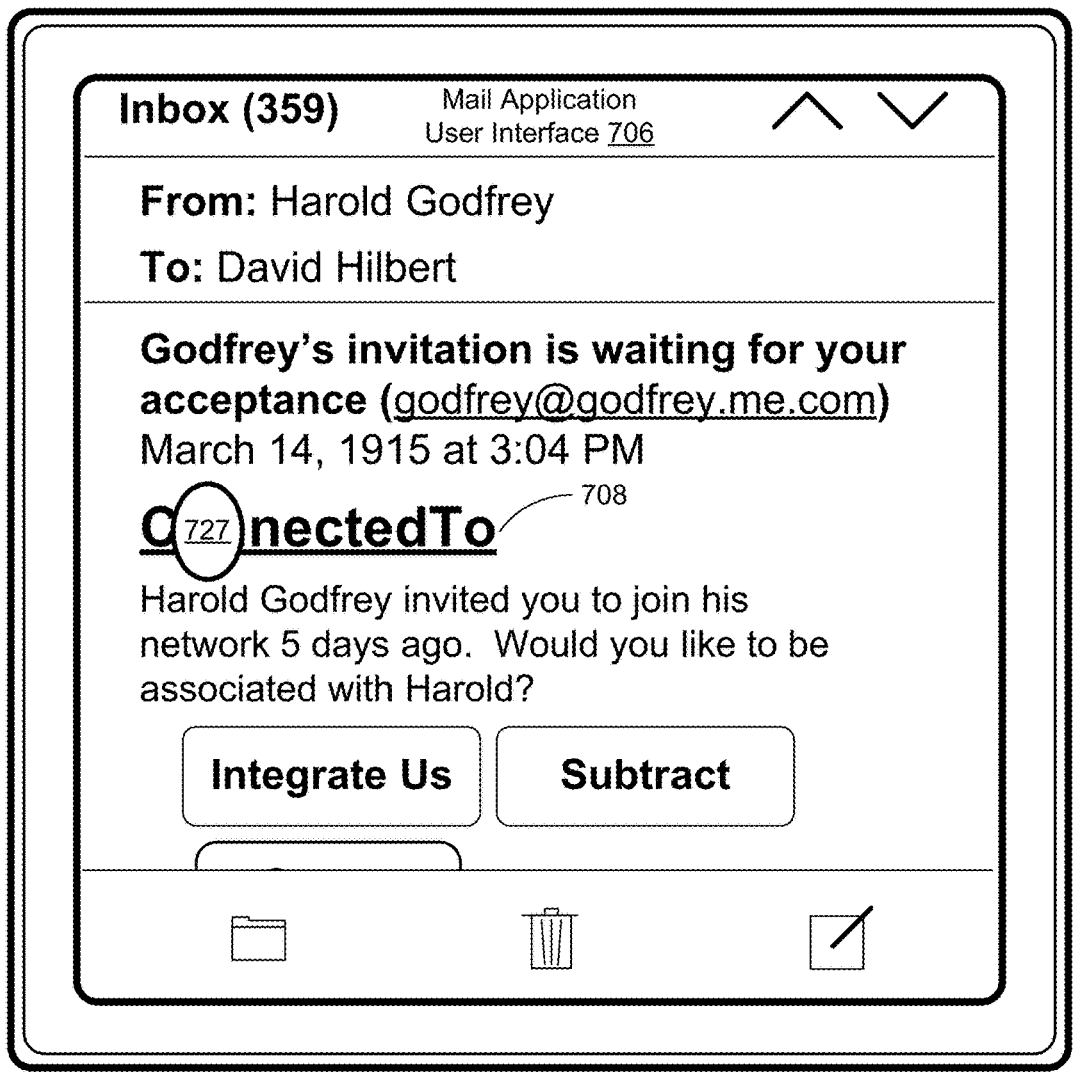
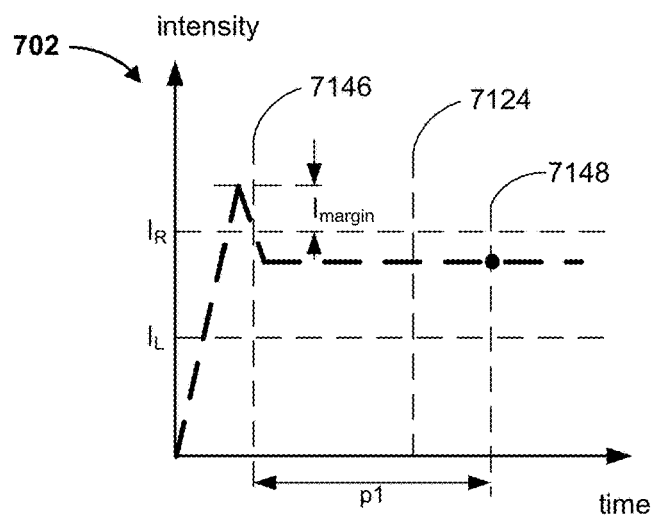
Figure 7UU

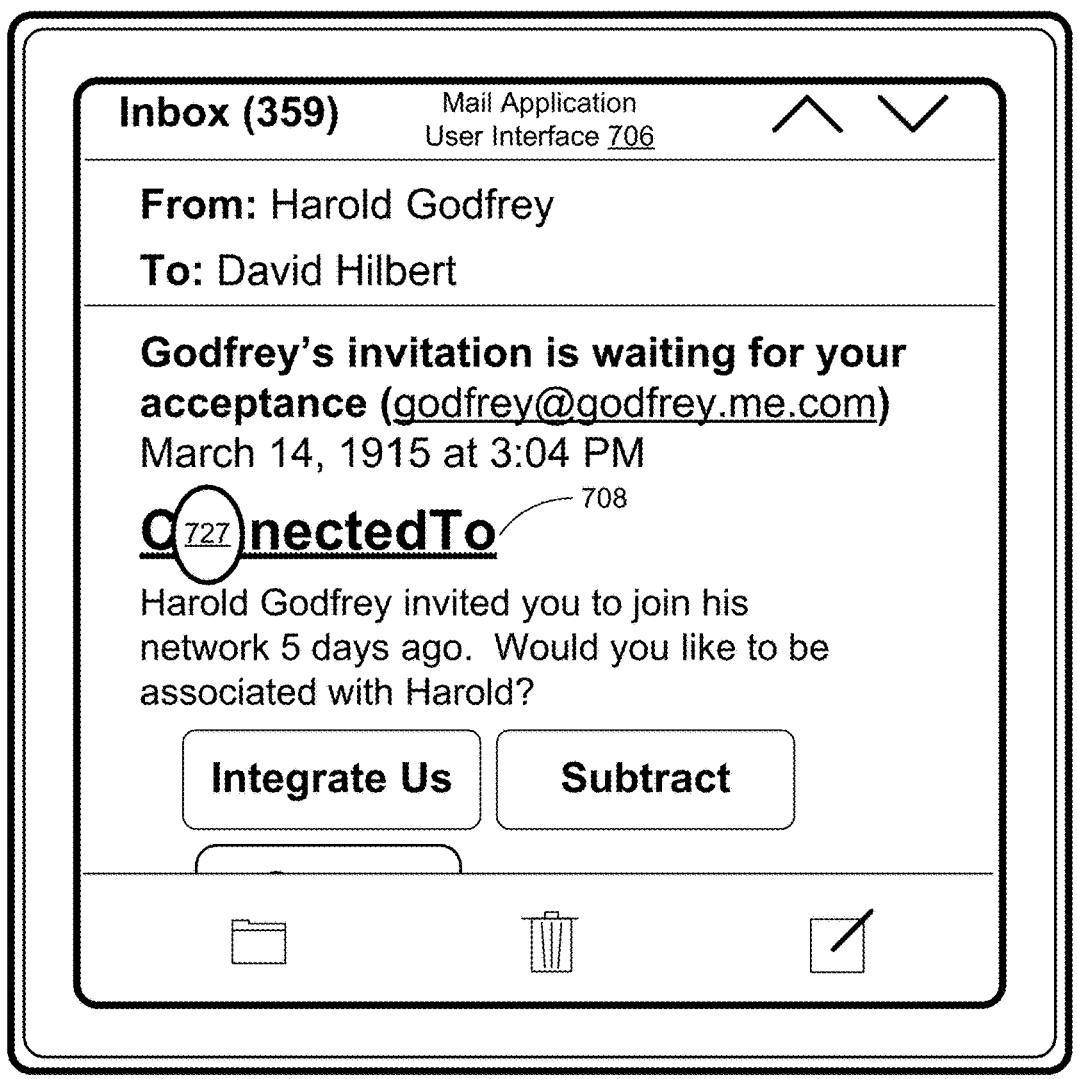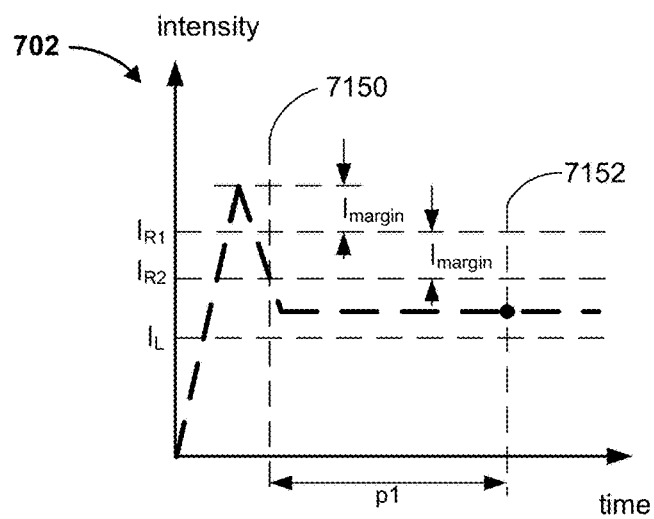
Figure 7VV

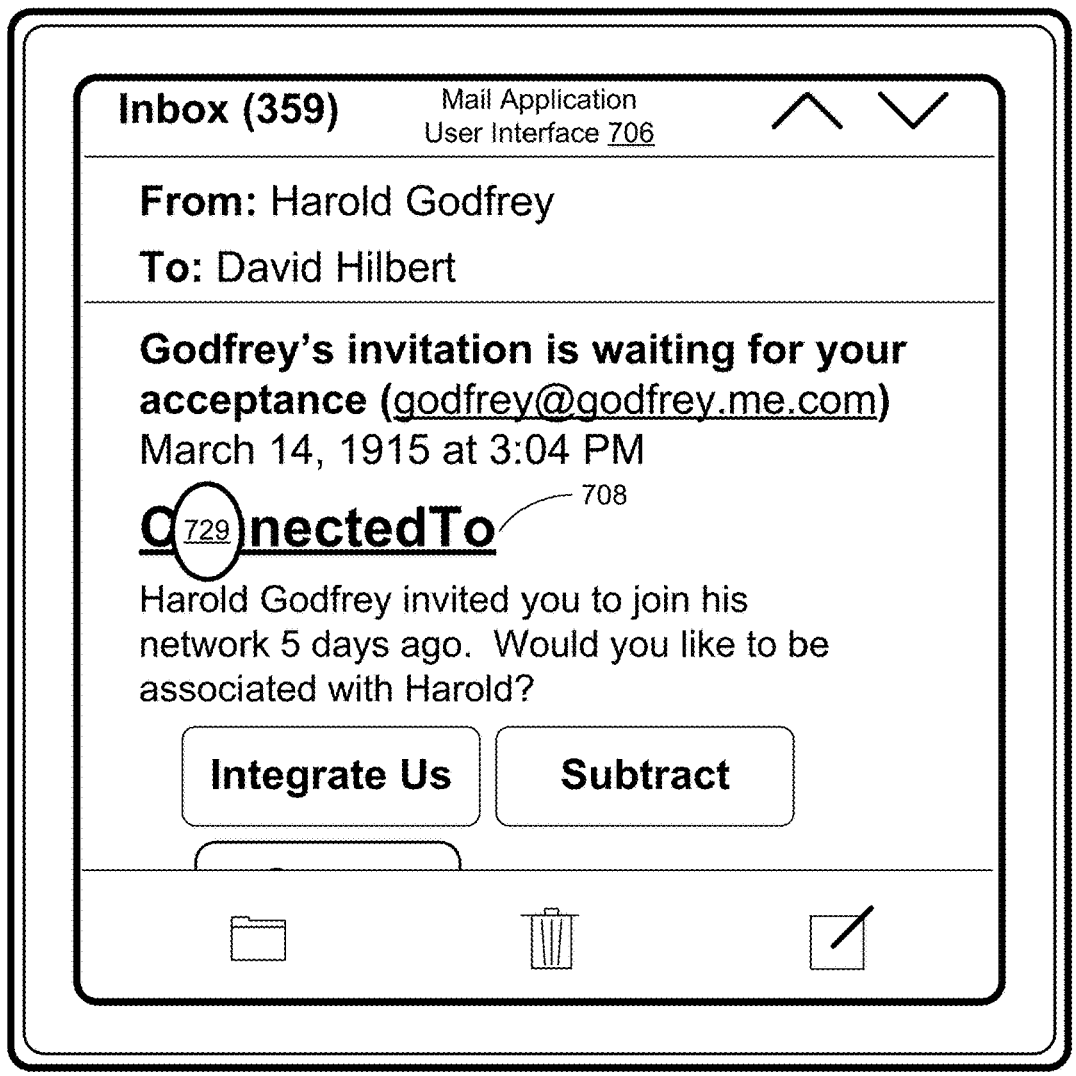
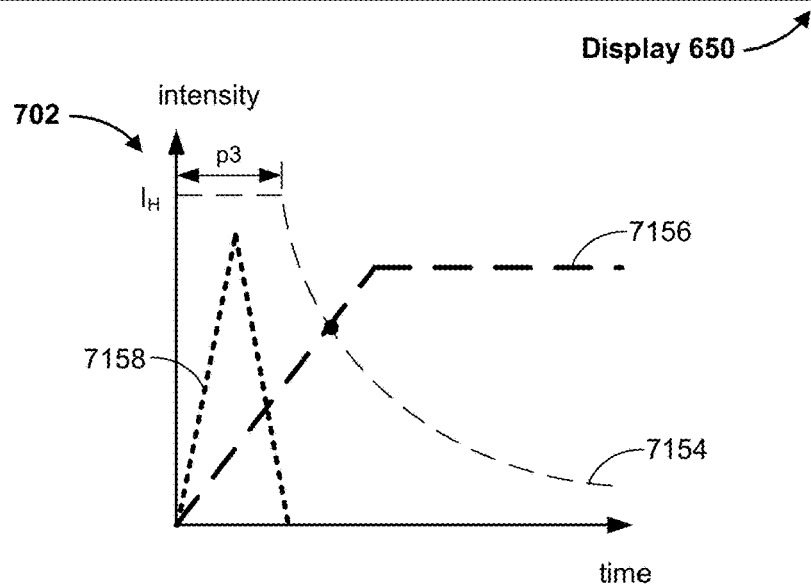
Figure 7WW

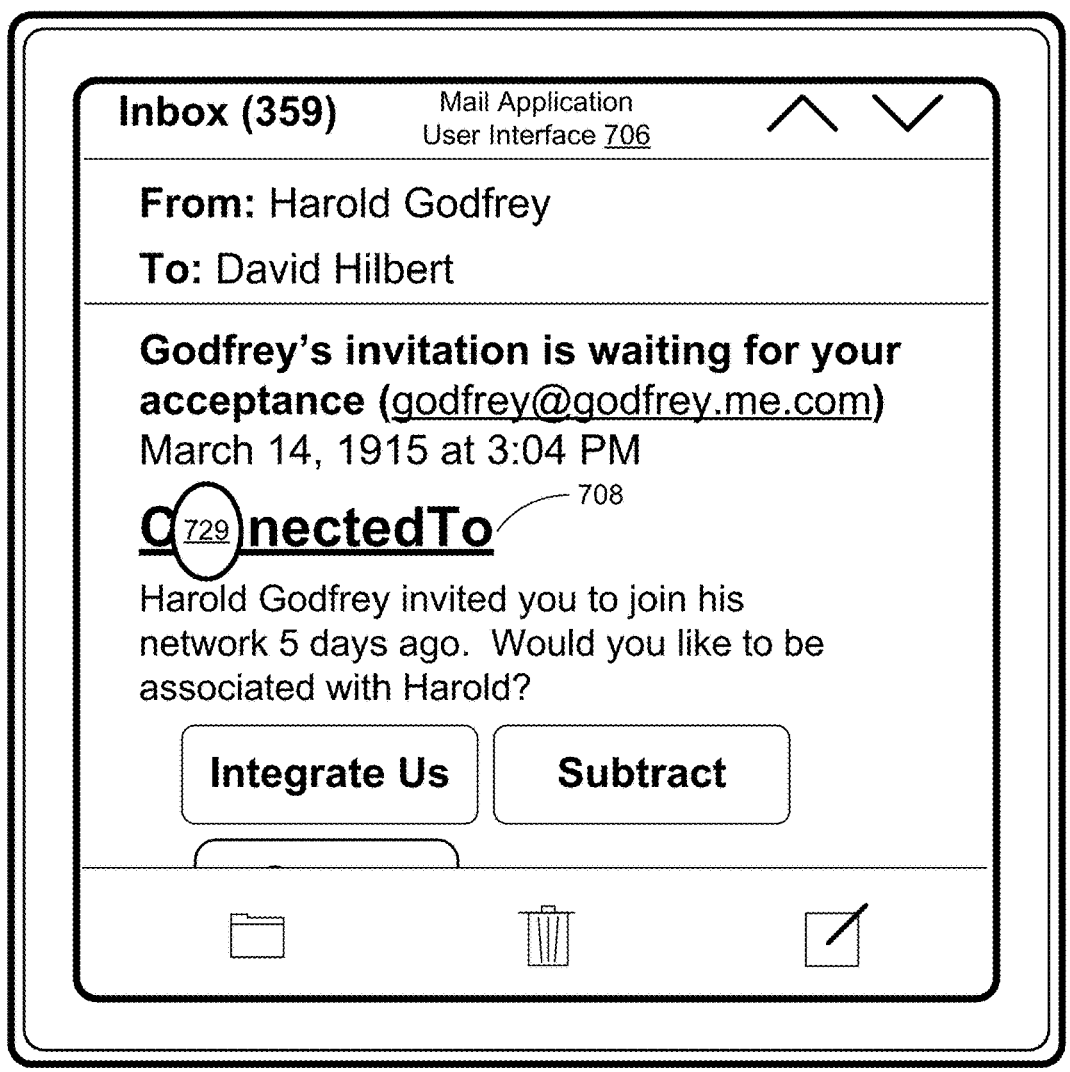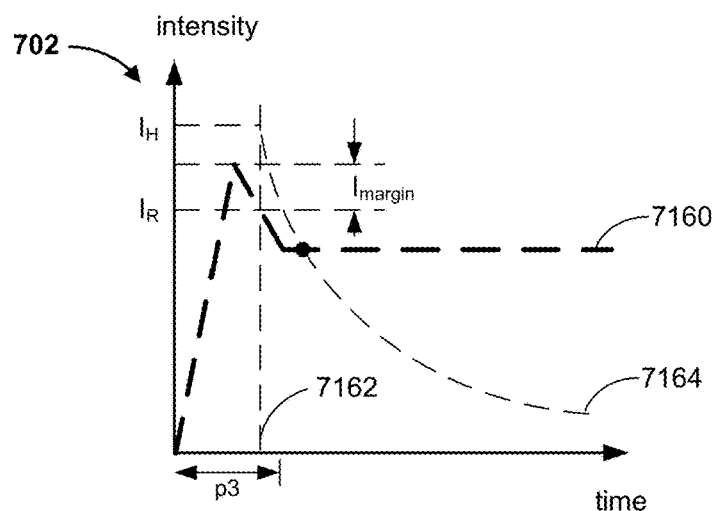
Figure 7XX

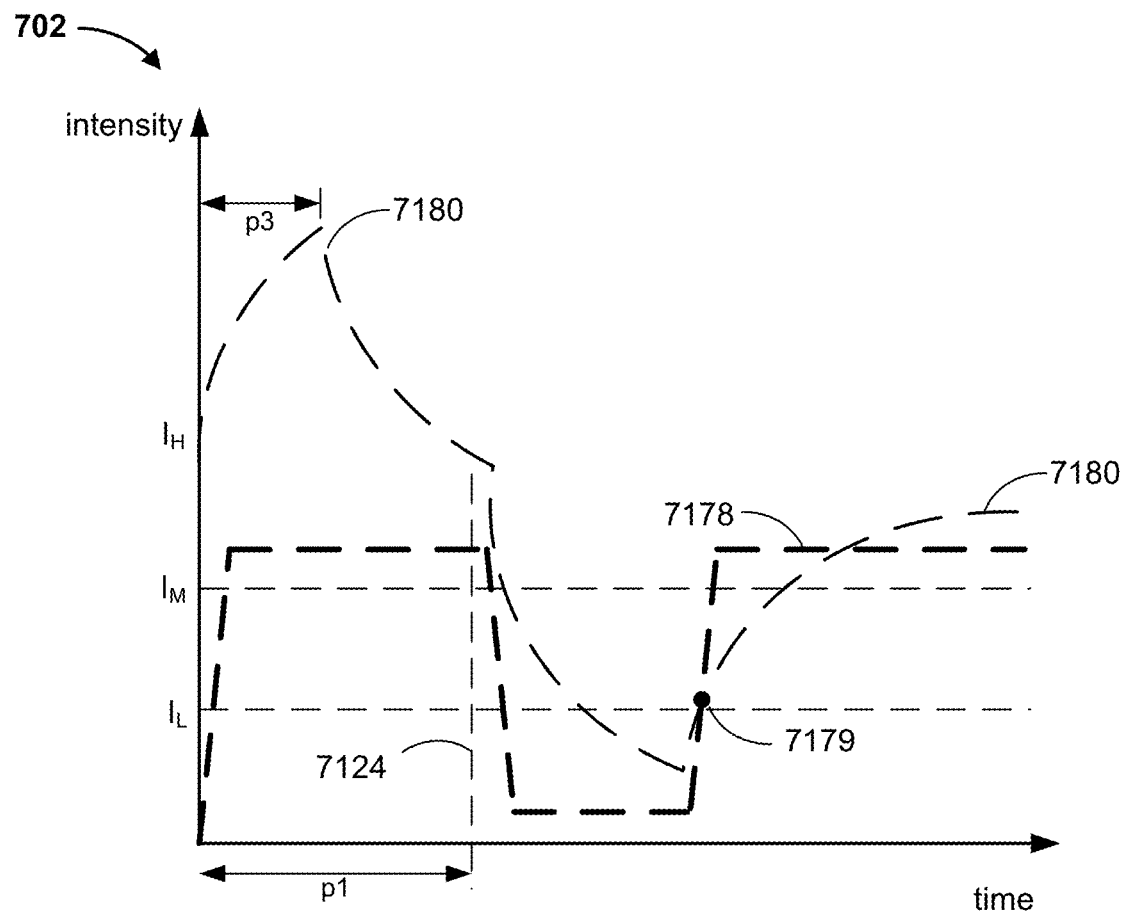
Figure 7AAA

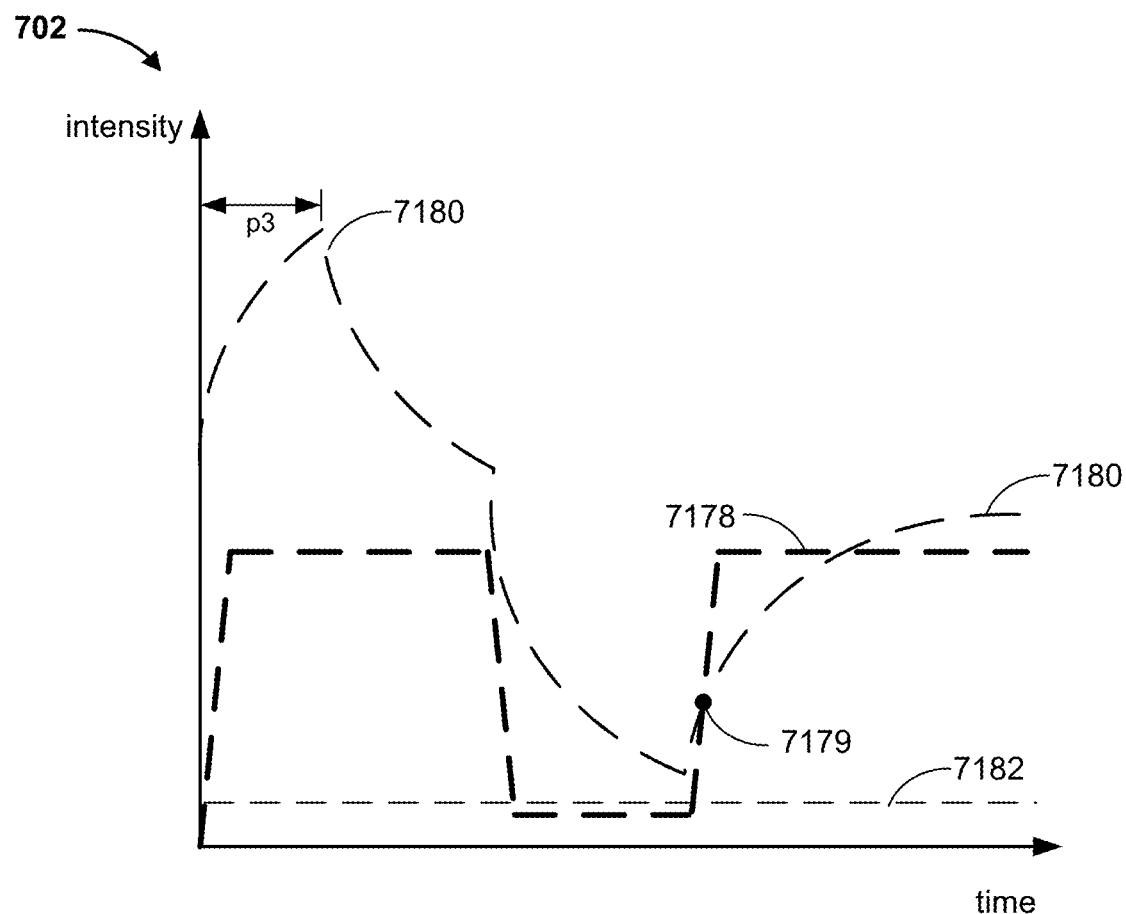
Figure 7BBB

810 In accordance with a determination that the input satisfies intensity input criteria including that the input satisfies a first intensity threshold during a first predefined time period, perform a first operation

820 Performing the first operation includes displaying a preview area

822 The first intensity threshold is satisfied in response to multiple contacts in the input satisfying the first intensity threshold 824 The first intensity threshold is satisfied in response to a combination of the intensity applied by a plurality of contacts in the input satisfying the first intensity threshold 826 The first intensity threshold is adjustable 828 Update the first gesture recognizer to be activated in response to the intensity of the input satisfying a third intensity threshold that is distinct from the first intensity threshold 812 In accordance with a determination that the input satisfies long press criteria including that the input remains below the first intensity threshold during the first predefined time period, perform a second operation that is distinct from the first operation 830 Performing the second operation includes displaying a menu view

Figure 8B

808 In response to detecting the input while displaying the first user interface

| 840 The intensity input criteria include that the input does not move across the touch-sensitive surface by more than a predefined distance |

| 842 The long press criteria include that the contact in the input does not move across the touch-sensitive surface by more than the predefined distance |

850 Detecting the input on the touch-sensitive surface includes detecting a first portion of the input and a second portion of the input that is subsequent to the first portion of the input 852 In response to detecting the first portion of the input on the touch-sensitive surface, identify a first set of gesture recognizers that correspond to at least the first portion of the input as candidate gesture recognizers, the first set of gesture recognizers including a first gesture recognizer and a second gesture recognizer 854 In response to detecting the second portion of the input on the touch-sensitive surface:
in accordance with the determination that the input satisfies the intensity input criteria, perform the first operation including processing the input with the first gesture recognizer; and,
in accordance with the determination that the input satisfies the long press criteria, perform the second operation including processing the input with the second gesture recognizer

Figure 8C

910 In accordance with a determination that the input satisfies intensity input criteria including that the input satisfies a first intensity threshold during a first predefined time period, perform a first operation (A)

920 Performing the first operation includes displaying a preview area

922 The intensity input criteria include that the input does not move across the touch-sensitive surface by at least the predefined distance 924 The first intensity threshold is adjustable

926 Update the first gesture recognizer to be activated in response to the intensity of the input satisfying a third intensity threshold that is distinct from the first intensity threshold 912 In accordance with a determination that the input satisfies pan criteria including that the input remains below the first intensity threshold during the first predefined time period, perform a second operation that is distinct from the first operation (B)

930 Performing the second operation includes scrolling at least a portion of the first user interface

Figure 9B

1010 In accordance with a determination that the input satisfies intensity input criteria including that the input satisfies a first intensity threshold during a first predefined time period, perform a first operation

1020 Performing the first operation includes displaying a preview area

1022 Performing the second operation includes replacing display of the first user interface with a third user interface of a software application that corresponds to a location of the input on the touch-sensitive surface 1024 The first intensity threshold is adjustable 1026 Update the first gesture recognizer to be activated in response to the intensity of the input satisfying a third intensity threshold that is distinct from the first intensity threshold 1028 In response to detecting the input while displaying the first user interface:
in accordance with a determination that the input remains on the touch-sensitive surface for the first predefined time period followed by the input subsequently ceasing to be detected on the touch-sensitive surface and the input does not satisfy the intensity input criteria, perform the second operation; and,
in accordance with a determination that the input remains on the touch-sensitive surface for the first predefined time period followed by the input subsequently ceasing to be detected on the touch-sensitive surface and the input satisfies the intensity input criteria, forgo performance of the second operation

1060 The first gesture recognizer is an intensity-based gesture recognizer and the second gesture recognizer is a tap gesture recognizer

---

1062 The input includes a third portion of the input that is subsequent to the second portion of the input, and the method includes processing the third portion of the input with the first gesture recognizer

---

1064 The first set of gesture recognizers includes a third gesture recognizer

---

1066 In response to determining that the input satisfies a second intensity threshold, process the input with the first gesture recognizer, including replacing display of the first user interface with a second user interface

---

1068 The first set of gesture recognizers includes a fourth gesture recognizer

1070 In response to determining that the input satisfies a second intensity threshold, process the input with the fourth gesture recognizer

---

1072 In response to detecting the first portion of the input, perform a third operation

1074 Performing the third operation includes visually distinguishing at least a portion of the first user interface from other portions of the first user interface

1076 Subsequent to performing the third operation, in accordance with the determination that the input satisfies the intensity input criteria, perform the first operation

1078 Subsequent to performing the third operation, in accordance with the determination that the input satisfies the tap criteria, perform the second operation

1080 Performing the third operation is initiated during the first predefined time period

```
┌─────────────────────────────────────────────────────────────────────────┐
│  1130  Display a first user interface of a first software application,   │
│  the first user interface including a plurality of user interface        │
│  objects, a first user interface object of the plurality of user         │
│  interface objects being associated with an application-                 │
│  independent set of predefined instructions for preview operations       │
└─────────────────────────────────────────────────────────────────────────┘
                                    │
                                    ▼
┌─────────────────────────────────────────────────────────────────────────┐
│  1132  Detect a first portion of an input by a contact while a focus    │
│  selector is over the first user interface object, in the plurality of  │
│  user interface objects, on the display                                  │
└─────────────────────────────────────────────────────────────────────────┘
                                    │
                                    ▼
```

1134 In response to detecting the first portion of the input and in accordance with a determination that the first portion of the input satisfies reveal criteria including that the input satisfies a first intensity threshold, execute the application-independent set of predefined instructions for preview operations, including providing preview content to the application-independent set of predefined instructions, wherein the preview operations performed by executing the application-independent set of predefined instructions include:

visually distinguishing the first user interface object in the first user interface; and, subsequent to initiation of the visual distinction of the first user interface object in the first user interface:

receiving a second portion of the input that is subsequent to the first portion of the input; and, in accordance with a determination that the second portion of the input satisfies preview criteria including that the input satisfies a second intensity threshold displaying a preview area overlaid on the first user interface, wherein the preview area includes the preview content

---

1136 Subsequent to initiation of the preview operations, the preview operations are performed independent of the first software application

---

1138 The preview operations include updating the preview area in accordance with intensity of the contact

---

1140 The preview operations include, in response to detecting the second portion of the input, in accordance with a determination that the second portion of the input meets preview-area-disappearance criteria, ceasing to display the preview area and maintaining display of the first user interface (A)

Figure 11B

1134 In response to detecting the first portion of the input and in accordance with a determination that the first portion of the input satisfies reveal criteria including that the input satisfies a first intensity threshold, execute the application-independent set of predefined instructions for preview operations, including providing preview content to the application-independent set of predefined instructions, wherein the preview operations performed by executing the application-independent set of predefined instructions include:

visually distinguishing the first user interface object in the first user interface; and, subsequent to initiation of the visual distinction of the first user interface object in the first user interface:

receiving a second portion of the input that is subsequent to the first portion of the input; and, in accordance with a determination that the second portion of the input satisfies preview criteria including that the input satisfies a second intensity threshold displaying a preview area overlaid on the first user interface, wherein the preview area includes the preview content (A)

---

1142 The preview operations include:

after detecting the second portion of the input, detecting a third portion of the input by the contact; and, in response to detecting the third portion of the input by the contact, in accordance with a determination that the third portion of the input satisfies user-interface-replacement criteria, replacing display of the first user interface with a second user interface that is distinct from the first user interface

---

1144 The preview operations include:

sending from the application-independent set of predefined instructions information indicating operation for the first user interface object for generating a second user interface; and receiving at the application-independent set of predefined instructions the second user interface, wherein the preview content includes at least a portion of the second user interface.

---

1146 The preview operations include:
at the first software application:

receiving the information indicating operation for the first user interface object;

generating the second user interface; and sending the second user interface to the application-independent set of predefined instructions

1152 Display a first user interface of a first software application, the first user interface including a plurality of user interface objects, a first user interface object of the plurality of user interface objects being associated with an application-independent set of predefined instructions for preview operations 1154 Detect a first portion of an input by a contact while a focus selector is over the first user interface object, in the plurality of user interface objects, on the display 1156 In response to detecting the first portion of the input and in accordance with a determination that the first portion of the input meets preview criteria, execute the application-independent set of predefined instructions for preview operations, wherein the preview operations performed by executing the application-independent set of predefined instructions include:
  displaying a preview area overlaid on the first user interface;
  after detecting the first portion of the input, detecting a second portion of the input; and,
  in response to detecting the second portion of the input by the contact, in accordance with a determination that the second portion of the input meets user-interface-replacement criteria, replacing display of the first user interface with a second user interface that is distinct from the first user interface

| 1158 Subsequent to initiation of the preview operations, the preview operations are performed independent of the first software application |

| 1160 Inputs on the touch-sensitive surface detected subsequent to replacing the display of the first user interface with the second user interface are processed with the first software application |

Figure 11D

1220 Display, on the display, a sensitivity control for selecting a respective intensity sensitivity setting between a plurality of intensity sensitivity settings.
    While displaying the sensitivity control, receive a user input corresponding to selection of the respective intensity sensitivity setting of the plurality of intensity sensitivity settings.
    In response to receiving the user input corresponding to selection of the respective intensity sensitivity setting, adjust characteristic intensity values for a plurality of subsequent inputs by a respective sensitivity value that corresponds to the respective intensity sensitivity setting selected by the user.

Figure 12B

1308 The value of the first progress indicator is a normalized value that indicates a status of the input between a first initial state and a first terminal state (A)

1310 The first initial state and the first terminal state are specified by the software application 1312 Progress between different states is determined by one or more heuristics based on a combination of intensity-based criteria and non-intensity-based criteria 1314 The states are selected from a set of state values provided by an operating system of the device and transitions between these states are used throughout the operating system to trigger operating-system driven user interactions 1316 While detecting the input:
 in response to detecting changes to intensity of the input over the first terminal state:
  provide from the application-independent set of instructions to the software application a value of a second progress indicator that represents the changes to the input, wherein the value of the second progress indicator is a normalized value that indicates a status of the input between a second initial state and a second terminal state; and
  update the first user interface in accordance with the set of instructions in the software application that is different from the application-independent set of instructions and the value of the second progress indicator 1318 Updating the first user interface in accordance with the set of instructions in the software application and the value of the second progress indicator includes replacing the first user interface with a second user interface

1402 Display, on a display, a user interface of a first third-party application that runs within an operating system. Capabilities of the device are exposed to the first third-party application through an operating system framework of the operating system. The operating system framework defines a plurality of gesture classes that can be recognized by the device. A first gesture class is associated with first gesture recognition criteria for recognizing input detected on the touch-sensitive surface as a first gesture when the first gesture recognition criteria are met. The first third-party application has associated a first portion of the user interface with the first gesture from the first gesture class for a first operation. The first third-party application has specified first intensity criteria for the first gesture associated with the first portion of the user interface for the first operation.

> 1404 The first intensity criteria include an intensity threshold
>
> > 1406 The intensity threshold is selected from a set of predefined thresholds
> >
> > 1408 The intensity threshold is selected from a range of values detectable by the device

1410 While displaying the user interface of the first third-party application on the display, detect an input on the touch-sensitive surface at a location that corresponds to the first portion of the user interface of the first third-party application In response to detecting the input:

1412 In accordance with a determination that the input meets the first gesture recognition criteria and that the input meets the first intensity criteria specified by the first third-party application, perform the first operation associated with the first portion of the user interface of the first third-party application

1414 In accordance with a determination that the input meets the first gesture recognition criteria but does not meet the first intensity criteria specified by the first third-party application, forgo performance of the first operation associated with the first portion of the user interface of the first third-party application (A) (B)

Figure 14A

```
┌─────────────────────────────────────────────────────────────────────────┐
│ 1416 The first third-party application has associated the first portion of the user │
│ interface with the first gesture from the first gesture class for a second operation. │
│ The first third-party application has not specified the first intensity criteria for the first │
│     gesture associated with the first portion of the user interface for the second │
│     operation. In response to detecting the input: in accordance with a determination │
│     that the input meets the first gesture recognition criteria but does not meet the first │
│     intensity criteria specified by the first third-party application, perform the second │
│ operation associated with the first portion of the user interface of the first third-party │
│     application; and, in accordance with a determination that the input meets the first │
│     gesture recognition criteria and that the input meets the first intensity criteria │
│     specified by the first third-party application, forgo performance of the second │
│ operation associated with the first portion of the user interface of the first third-party │
│                                    application.                                        │
└─────────────────────────────────────────────────────────────────────────┘
```

```
┌─────────────────────────────────────────────────────────────────────────┐
│ 1418 A second gesture class is associated with second gesture recognition criteria │
│     for recognizing input detected on the touch-sensitive surface as a second gesture │
│         when the second gesture recognition criteria are met. The first third-party │
│         application has associated the first portion of the user interface with the second │
│         gesture from the second gesture class for a third operation. The first third-party │
│ application has specified second intensity criteria for the second gesture associated │
│     with the first portion of the user interface for the third operation. In response to │
│     detecting the input: in accordance with a determination that the input meets the │
│     second gesture recognition criteria and that the input meets the second intensity │
│     criteria specified by the first third-party application, perform the third operation │
│         associated with the first portion of the user interface of the first third-party │
│         application; and, in accordance with a determination that the input meets the │
│     second gesture recognition criteria but does not meet the second intensity criteria │
│     specified by the first third-party application, forgo performance of the third operation │
│         associated with the first portion of the user interface of the first third-party │
│                                    application.                                        │
└─────────────────────────────────────────────────────────────────────────┘
```

Figure 14B

1420 Display, on the display, a user interface of a second third-party application that runs within the operating system and is different from the first third-party application. The second third-party application has associated a second portion of the user interface of the second third-party application with the first gesture from the first gesture class for a first operation. The second third-party application has specified third intensity criteria for the first gesture associated with the second portion of the user interface for the first operation. The third intensity criteria are different from the first intensity criteria. While displaying the user interface of the second third-party application on the display, detect an input on the touch-sensitive surface at a location that corresponds to the second portion of the user interface of the second third-party application. In response to detecting the input a location that corresponds to the second portion of the user interface of the second third-party application: in accordance with a determination that the input at the location that corresponds to the second portion of the user interface of the second third-party application meets the first gesture recognition criteria and that the input meets the third intensity criteria specified by the second third-party application, perform the first operation associated with the second portion of the user interface of the second third-party application; and, in accordance with a determination that the input at the location that corresponds to the portion of the user interface of the second third-party application meets the first gesture recognition criteria but does not meet the third intensity criteria specified by the second third-party application, forgo performance of the first operation associated with the second portion of the user interface of the second third-party application.

Figure 14C

In response to detecting the input while displaying the first user interface and while detecting the input:

(A)

1616 In accordance with a determination that the input satisfies first timing criteria and first intensity input criteria, perform a second operation. The first timing criteria require that the input remain on the touch-sensitive surface while a first time period elapses. The first intensity input criteria require that the input satisfy a first intensity threshold at an end of or subsequent to the first time period.

1618 The first intensity threshold component follows a decay curve that decreases after a predefined time interval from a moment the input satisfies the first timing criteria and the first intensity input criteria 1620 The input is a continuous gesture that includes a first increase in intensity and a second increase in intensity that is subsequent to the first increase in intensity and a decrease in intensity between the first increase in intensity and the second increase in intensity. The input remains in contact with the touch-sensitive surface between the first increase in intensity and the second increase in intensity. In response to detecting the first increase in intensity of the input, perform the second operation; and, in response to detecting the second increase in intensity of the input, perform the first operation.

Figure 16B

DEVICES AND METHODS FOR PROCESSING TOUCH INPUTS BASED ON THEIR INTENSITIES

RELATED APPLICATIONS

This application is a continuation application of U.S. patent application Ser. No. 14/866,992, filed Sep. 27, 2015, entitled "Devices and Methods for Processing Touch Inputs Based on Their Intensities," which claims priority to U.S. Provisional Application Ser. No. 62/215,621, filed Sep. 8, 2015, entitled "Devices and Methods for Processing Touch Inputs Based on Their Intensities;" U.S. Provisional Application Ser. No. 62/213,589, filed Sep. 2, 2015, entitled "Devices and Methods for Processing Touch Inputs Based on Their Intensities;" and U.S. Provisional Application Ser. No. 62/203,387, filed Aug. 10, 2015, entitled "Devices, Methods, and Graphical User Interfaces for Manipulating User Interface Objects with Visual and/or Haptic Feedback," all of which are incorporated by reference herein in their entireties.

This application relates to U.S. Provisional Application Ser. No. 62/141,818, filed Apr. 1, 2015, entitled "Devices, Methods, and Graphical User Interfaces for Interacting with a Control Object while Dragging Another Object," which is incorporated by reference herein in its entirety.

TECHNICAL FIELD

This relates generally to electronic devices with touch-sensitive surfaces, including but not limited to electronic devices with sensors to detect intensity of contacts on touch-sensitive surfaces.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for processing these manipulations are cumbersome and inefficient. In addition, existing methods take longer than necessary, thereby wasting energy. This latter consideration is particularly important in battery-operated devices.

SUMMARY

Accordingly, the present disclosure provides electronic devices with faster, more efficient methods for processing touch inputs. Such methods and interfaces optionally complement or replace conventional methods for processing touch inputs. Such methods and interfaces provide a more efficient human-machine interface by allowing customized processing of touch inputs. Further, such methods reduce the processing power consumed to process touch inputs, conserve power, reduce unnecessary/extraneous/repetitive inputs, and potentially reduce memory usage. For battery-operated devices, such methods and interfaces conserve battery power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes displaying a first user interface, and detecting an input on the touch-sensitive surface while displaying the first user interface. The method further includes, in response to detecting the input while displaying the first user interface, in accordance with a determination that the input satisfies intensity input criteria including that the input satisfies a first intensity threshold during a first predefined time period, performing a first operation; and in accordance with a determination that the input satisfies long press criteria including that the input remains below the first intensity threshold during the first predefined time period, performing a second operation that is distinct from the first operation.

In accordance with some embodiments, a method is performed at an electronic device with a display, a touch-sensitive surface, and one or more sensors to detect intensity of contacts with the touch-sensitive surface. The method includes displaying a first user interface, and detecting an input on the touch-sensitive surface while displaying the first user interface. The method further includes, in response to detecting the input while displaying the first user interface, in accordance with a determination that the input satisfies intensity input criteria including that the input satisfies a first intensity threshold, performing a first operation; and in accordance with a determination that the input satisfies pan criteria including that the input has moved across the touch-sensitive surface by at least a predefined distance, performing a second operation that is distinct from the first operation.

In accordance with some embodiments, a method is performed at an electronic device with a display, a touch-sensitive surface, and one or more sensors to detect intensity of contacts with the touch-sensitive surface. The method includes displaying a first user interface, and detecting an input on the touch-sensitive surface while displaying the first user interface. The method further includes, in response to detecting the input while displaying the first user interface, in accordance with a determination that the input satisfies intensity input criteria including that the input satisfies a first intensity threshold and the input remains on the touch-sensitive surface for a first predefined time period, performing a first operation; and in accordance with a determination that the input satisfies tap criteria including that the input ceases to remain on the touch-sensitive surface during the first predefined time period, performing a second operation that is distinct from the first operation.

In accordance with some embodiments, a method is performed at an electronic device with a display, a touch-sensitive surface, and one or more sensors to detect intensity of contacts with the touch-sensitive surface. The method includes: displaying a first user interface of a first software application, the first user interface including a plurality of user interface objects, a first user interface object of the plurality of user interface objects being associated with an application-independent set of predefined instructions for preview operations; detecting a first portion of an input by a contact while a focus selector is over the first user interface object, in the plurality of user interface objects, on the display; and in response to detecting the first portion of the input and in accordance with a determination that the first portion of the input satisfies reveal criteria including that the input satisfies a first intensity threshold, executing the application-independent set of predefined instructions for preview operations, including providing preview content to the application-independent set of predefined instructions. The preview operations performed by executing the application-independent set of predefined instructions include: visually distinguishing the first user interface object in the first user interface; and, subsequent to initiation of the visual distinction of the first user interface object in the first user interface: receiving a second portion of the input that is subsequent to the first portion of the input; and, in accordance with a determination that the second portion of the input satisfies preview criteria including that the input satisfies a second intensity threshold, displaying a preview area overlaid on the first user interface. The preview area includes the preview content.

In accordance with some embodiments, a method is performed at an electronic device with a display, a touch-sensitive surface, and one or more sensors to detect intensity of contacts with the touch-sensitive surface. The method includes: displaying a first user interface of a first software application, the first user interface including a plurality of user interface objects, a first user interface object of the plurality of user interface objects being associated with an application-independent set of predefined instructions for preview operations; detecting a first portion of an input by a contact while a focus selector is over the first user interface object, in the plurality of user interface objects, on the display; and in response to detecting the first portion of the input and in accordance with a determination that the first portion of the input meets preview criteria, executing the application-independent set of predefined instructions for preview operations. The preview operations performed by executing the application-independent set of predefined instructions include: displaying a preview area overlaid on the first user interface; after detecting the first portion of the input, detecting a second portion of the input; and, in response to detecting the second portion of the input by the contact, in accordance with a determination that the second portion of the input meets user-interface-replacement criteria, replacing display of the first user interface with a second user interface that is distinct from the first user interface.

In accordance with some embodiments, a method is performed at an electronic device with a display, a touch-sensitive surface, and one or more sensors to detect intensity of contacts with the touch-sensitive surface. The method includes: displaying, on the display, a user interface of a software application; while displaying the user interface of the software application on the display, detecting an input on the touch-sensitive surface at a location that corresponds to the user interface of the software application; and, in response to detecting the input, sending from an application-independent set of instructions to the software application intensity information that corresponds to the input. The intensity information includes: a reference intensity assigned to the one or more sensors; and a characteristic intensity that corresponds to a detected intensity of the input.

In accordance with some embodiments, a method is performed at an electronic device with a display, a touch-sensitive surface, and one or more sensors to detect intensity of contacts with the touch-sensitive surface. The method includes: displaying, on the display, a first user interface of a software application; while displaying the first user interface of the software application, detecting an input on the touch-sensitive surface; and, while detecting the input: in response to detecting changes to intensity of the input, providing from an application-independent set of instructions to the software application a value of a first progress indicator that represents the changes to the intensity of the input; and updating the first user interface in accordance with a set of instructions in the software application that is different from the application-independent set of instructions and the value of the first progress indicator.

In accordance with some embodiments, a method is performed at an electronic device with a display, a touch-sensitive surface, and one or more sensors to detect intensity of contacts with the touch-sensitive surface. The method includes displaying, on the display, a user interface of a first third-party application that runs within an operating system. Capabilities of the device are exposed to the first third-party application through an operating system framework of the operating system. The operating system framework defines a plurality of gesture classes that can be recognized by the device. A first gesture class is associated with first gesture recognition criteria for recognizing input detected on the touch-sensitive surface as a first gesture when the first gesture recognition criteria are met. The first third-party application has associated a first portion of the user interface with the first gesture from the first gesture class for a first operation. The first third-party application has specified first intensity criteria for the first gesture associated with the first portion of the user interface for the first operation. The method also includes, while displaying the user interface of the first third-party application on the display, detecting an input on the touch-sensitive surface at a location that corresponds to the first portion of the user interface of the first third-party application. The method further includes, in response to detecting the input: in accordance with a determination that the input meets the first gesture recognition criteria and that the input meets the first intensity criteria specified by the first third-party application, performing the first operation associated with the first portion of the user interface of the first third-party application; and, in accordance with a determination that the input meets the first gesture recognition criteria but does not meet the first intensity criteria specified by the first third-party application, forgoing performance of the first operation associated with the first portion of the user interface of the first third-party application.

In accordance with some embodiments, a method is performed at an electronic device with a display, a touch-sensitive surface, and one or more sensors to detect intensity of contacts with the touch-sensitive surface. The method includes displaying, on the display, a user interface. The method also includes: while displaying the user interface, detecting an input on the touch-sensitive surface; and, in response to detecting the input while displaying the first user interface, and while detecting the input, in accordance with a determination that the input satisfies first timing criteria and first intensity input criteria, performing a first operation. The first timing criteria require that the input remain on the touch-sensitive surface while a first time period elapses. The first intensity input criteria require that the input satisfy a first intensity threshold at an end of or subsequent to the first time period.

In accordance with some embodiments, a method is performed at an electronic device with a display, a touch-sensitive surface, and one or more sensors to detect intensity of contacts with the touch-sensitive surface. The method includes displaying, on the display, a user interface. The method also includes: while displaying the user interface, detecting an input on the touch-sensitive surface; and, in response to detecting the input while displaying the first user interface, and while detecting the input, in accordance with a determination that the input satisfies an activation intensity threshold, performing a first operation. The activation intensity threshold includes a first intensity threshold component that decreases from a first intensity value over time.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to distinguish between a long press gesture and a deep press input and to perform distinct operations in response to the long press gesture and the deep press input. More specifically, the processing unit is configured to enable display of a first user interface, and detect an input on the touch-sensitive surface unit while enabling display of the first user interface, and in response to detecting the input while enabling display of the first user interface, perform a first operation in accordance with a determination that the input satisfies intensity input criteria including that the input satisfies a first intensity threshold during a first predefined time period, and perform a second operation in accordance with a determination that the input satisfies long press criteria including that the input remains below the first intensity threshold during the first predefined time period.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to distinguish between a pan gesture and a deep press input and to perform distinct operations in response to the pan gesture and the deep press input. More specifically, the processing unit is configured to enable display of a first user interface, to detect an input on the touch-sensitive surface unit while enabling display of the first user interface, and in response to detecting the input while enabling display of the first user interface, perform a first operation in accordance with a determination that the input satisfies intensity input criteria including that the input satisfies a first intensity threshold, and perform a second operation in accordance with a determination that the input satisfies pan criteria including that the input has moved across the touch-sensitive surface by at least a predefined distance.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to distinguish between a tap gesture input and a deep press input and to perform distinct operations in response to the tap gesture and the deep press input. In such embodiments, the processing unit is configured to enable display of a first user interface, and is further configured to detect an input on the touch-sensitive surface unit while enabling display of the first user interface, and in response to detecting the input while enabling display of the first user interface, perform a first operation in accordance with a determination that the input satisfies intensity input criteria including that the input satisfies a first intensity threshold and the input remains on the touch-sensitive surface for a first predefined time period, and perform a second operation in accordance with a determination that the input satisfies long press criteria including that the input ceases to remain on the touch-sensitive surface during the first predefined time period.

In accordance with some embodiments, an electronic device includes a display unit configured to display one or more user interfaces, a touch-sensitive surface unit to receive user inputs, one or more sensor units to detect intensity of contacts with the touch-sensitive surface unit; and a processing unit coupled with the display unit, the touch-sensitive surface unit, and the one or more sensor units. The processing unit is configured to: enable display of a first user interface of a first software application, the first user interface including a plurality of user interface objects, a first user interface object of the plurality of user interface objects being associated with an application-independent set of predefined instructions for preview operations; detect a first portion of an input by a contact while a focus selector is over the first user interface object, in the plurality of user interface objects, on the display unit; and in response to detecting the first portion of the input and in accordance with a determination that the first portion of the input satisfies reveal criteria including that the input satisfies a first intensity threshold, execute the application-independent set of predefined instructions for preview operations, including providing preview content to the application-independent set of predefined instructions. The preview operations performed by executing the application-independent set of predefined instructions include: visually distinguishing the first user interface object in the first user interface; and, subsequent to initiation of the visual distinction of the first user interface object in the first user interface: receiving a second portion of the input that is subsequent to the first portion of the input; and, in accordance with a determination that the second portion of the input satisfies preview criteria including that the input satisfies a second intensity threshold, enabling display of a preview area overlaid on the first user interface. The preview area includes the preview content.

In accordance with some embodiments, an electronic device includes a display unit configured to display one or more user interfaces, a touch-sensitive surface unit to receive user inputs, one or more sensor units to detect intensity of contacts with the touch-sensitive surface unit; and a processing unit coupled with the display unit, the touch-sensitive surface unit, and the one or more sensor units. The processing unit is configured to: enable display of a first user interface of a first software application, the first user interface including a plurality of user interface objects, a first user interface object of the plurality of user interface objects being associated with an application-independent set of predefined instructions for preview operations; detect a first portion of an input by a contact while a focus selector is over the first user interface object, in the plurality of user interface objects, on the display unit; and in response to detecting the first portion of the input and in accordance with a determination that the first portion of the input meets preview criteria, execute the application-independent set of predefined instructions for preview operations. The preview operations performed by executing the application-independent set of predefined instructions include: enabling display of a preview area overlaid on the first user interface; after detecting the first portion of the input, detecting a second portion of the input; and, in response to detecting the second portion of the input by the contact, in accordance with a determination that the second portion of the input meets user-interface-replacement criteria, replacing display of the first user interface with a second user interface that is distinct from the first user interface.

In accordance with some embodiments, an electronic device includes a display unit configured to display a user interface, a touch-sensitive surface unit configured to receive user inputs, one or more sensor units configured to detect intensity of contacts with the touch-sensitive surface unit; and a processing unit coupled with the display unit, the touch-sensitive surface unit, and the one or more sensor units. The processing unit is configured to: enable display, on the display unit, of a user interface of a software application; while enabling display of the user interface of the software application on the display unit, detect an input on the touch-sensitive surface unit at a location that corresponds to the user interface of the software application; and, in response to detecting the input, send from an application-independent set of instructions to the software application intensity information that corresponds to the input. The intensity information includes: a reference intensity assigned to the one or more sensors; and a characteristic intensity that corresponds to a detected intensity of the input.

In accordance with some embodiments, an electronic device includes a display unit configured to display a user interface, a touch-sensitive surface unit configured to receive user inputs, one or more sensor units configured to detect intensity of contacts with the touch-sensitive surface unit; and a processing unit coupled with the display unit, the touch-sensitive surface unit, and the one or more sensor units. The processing unit is configured to: enable display, on the display unit, of a first user interface of a software application; while enabling display of the first user interface of the software application, detect an input on the touch-sensitive surface unit; and, while detecting the input: in response to detecting changes to intensity of the input, provide from an application-independent set of instructions to the software application a value of a first progress indicator that represents the changes to the intensity of the input; and update the first user interface in accordance with a set of instructions in the software application that is different from the application-independent set of instructions and the value of the first progress indicator.

In accordance with some embodiments, a display unit configured to display user interfaces; a touch-sensitive surface unit configured to receive contacts; one or more sensor units configured to detect intensity of contacts on the touch-sensitive surface unit; and a processing unit coupled with the display unit, the touch-sensitive surface unit, and the one or more sensor units. The processing unit is configured to enable display, on the display unit, of a user interface of a first third-party application that runs within an operating system. Capabilities of the device are exposed to the first third-party application through an operating system framework of the operating system. The operating system framework defines a plurality of gesture classes that can be recognized by the device. A first gesture class is associated with first gesture recognition criteria for recognizing input detected on the touch-sensitive surface as a first gesture when the first gesture recognition criteria are met. The first third-party application has associated a first portion of the user interface with the first gesture from the first gesture class for a first operation. The first third-party application has specified first intensity criteria for the first gesture associated with the first portion of the user interface for the first operation. The processing unit is also configured to: while enabling display of the user interface of the first third-party application on the display unit, detect an input on the touch-sensitive surface at a location that corresponds to the first portion of the user interface of the first third-party application; and, in response to detecting the input: in accordance with a determination that the input meets the first gesture recognition criteria and that the input meets the first intensity criteria specified by the first third-party application, perform the first operation associated with the first portion of the user interface of the first third-party application; and, in accordance with a determination that the input meets the first gesture recognition criteria but does not meet the first intensity criteria specified by the first third-party application, forgo performance of the first operation associated with the first portion of the user interface of the first third-party application.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display, on the display unit, a user interface; while enabling display of the user interface, detect an input on the touch-sensitive surface unit; and, in response to detecting the input while enabling display of the first user interface, and while detecting the input, in accordance with a determination that the input satisfies first timing criteria and first intensity input criteria, perform a first operation. The first timing criteria require that the input remain on the touch-sensitive surface unit while a first time period elapses. The first intensity input criteria require that the input satisfy a first intensity threshold at an end of or subsequent to the first time period.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display, on the display unit, of a user interface; while enabling display of the user interface, detect an input on the touch-sensitive surface unit; and, in response to detecting the input while enabling display of the first user interface, and while detecting the input: in accordance with a determination that the input satisfies an activation intensity threshold, perform a first operation. The activation intensity threshold includes a first intensity threshold component that decreases from a first intensity value over time.

In accordance with some embodiments, an electronic device includes a display, a touch-sensitive surface, one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In some embodiments, the electronic device includes one or more sensors to detect signals from a stylus associated with the electronic device. In accordance with some embodiments, a computer readable storage medium (e.g., a non-transitory computer readable storage medium, or alternatively, a transitory computer readable storage medium) has stored therein instructions which when executed by an electronic device with a display, a touch-sensitive surface, and one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and one or more sensors to detect intensity of contacts with the touch-sensitive surface, includes means for performing or causing performance of the operations of any of the methods described herein.

Thus, electronic devices with displays, touch-sensitive surfaces and one or more sensors to detect intensity of contacts with the touch-sensitive surface are provided with faster, more efficient methods and interfaces for processing of touch inputs, thereby increasing the effectiveness and efficiency of such devices, and user satisfaction with such devices. Furthermore, such methods and interfaces reduce processing power, reduce memory usage, reduce battery usage, and/or reduce unnecessary or extraneous or repetitive inputs. Furthermore, such methods and interfaces may complement or replace conventional methods for processing of touch inputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 6B illustrates an exemplary user interface for a multifunction device with a touch-sensitive surface that is separate from the display in accordance with some embodiments.

FIGS. 8A-8E are flow diagrams illustrating a method of disambiguating a long press input and a deep press input in accordance with some embodiments.

FIGS. 9A-9D are flow diagrams illustrating a method of disambiguating a pan gesture input and a deep press input in accordance with some embodiments.

FIGS. 10A-10D are flow diagrams illustrating a method of disambiguating a tap gesture input and a deep press input in accordance with some embodiments.

FIGS. 11B-11D are flow diagrams illustrating methods of processing touch inputs using application-independent set of predefined instructions in accordance with some embodiments.

FIGS. 12A-12B are flow diagrams illustrating a method of processing a touch input using a predefined data structure in accordance with some embodiments.

FIGS. 13A-13B are flow diagrams illustrating a method of processing a touch input using a force gesture progress indicator in accordance with some embodiments.

FIGS. 14A-14C are flow diagrams illustrating a method of processing touch inputs based on intensity criteria specified by third-party applications in accordance with some embodiments.

FIGS. 16A-16B are flow diagrams illustrating a method of processing touch inputs based on dynamic thresholds in accordance with some embodiments.

DESCRIPTION OF EMBODIMENTS

Many electronic devices store applications to allow certain manipulations of displayed user interface objects in response to touch inputs. However, conventional methods and user interfaces are inefficient. The disclosed embodiments address these limitations and disadvantages.

Figure 2:
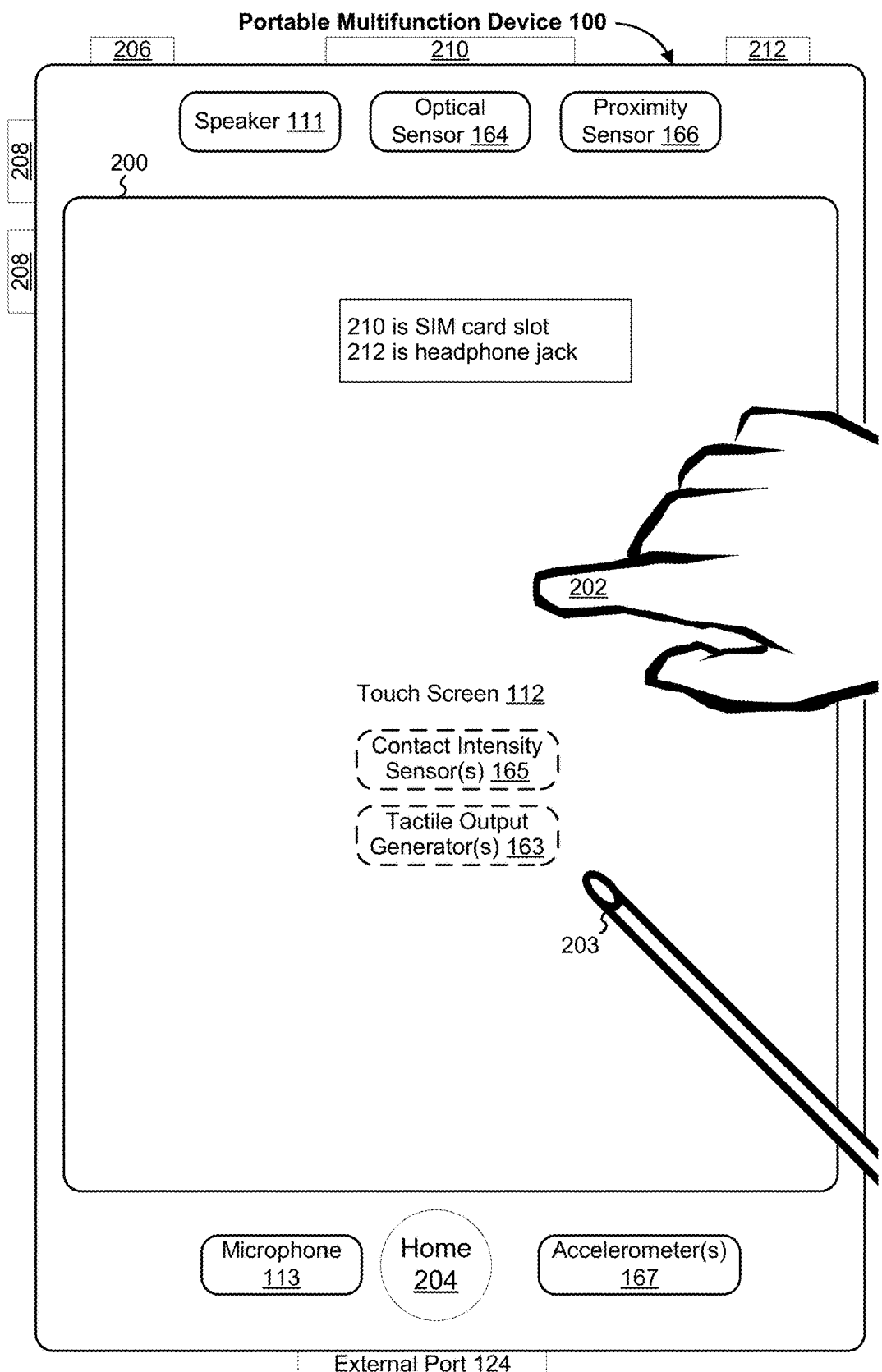
FIG. 2 illustrates a portable multifunction device having a touch screen in accordance with some embodiments.
Figure 3:
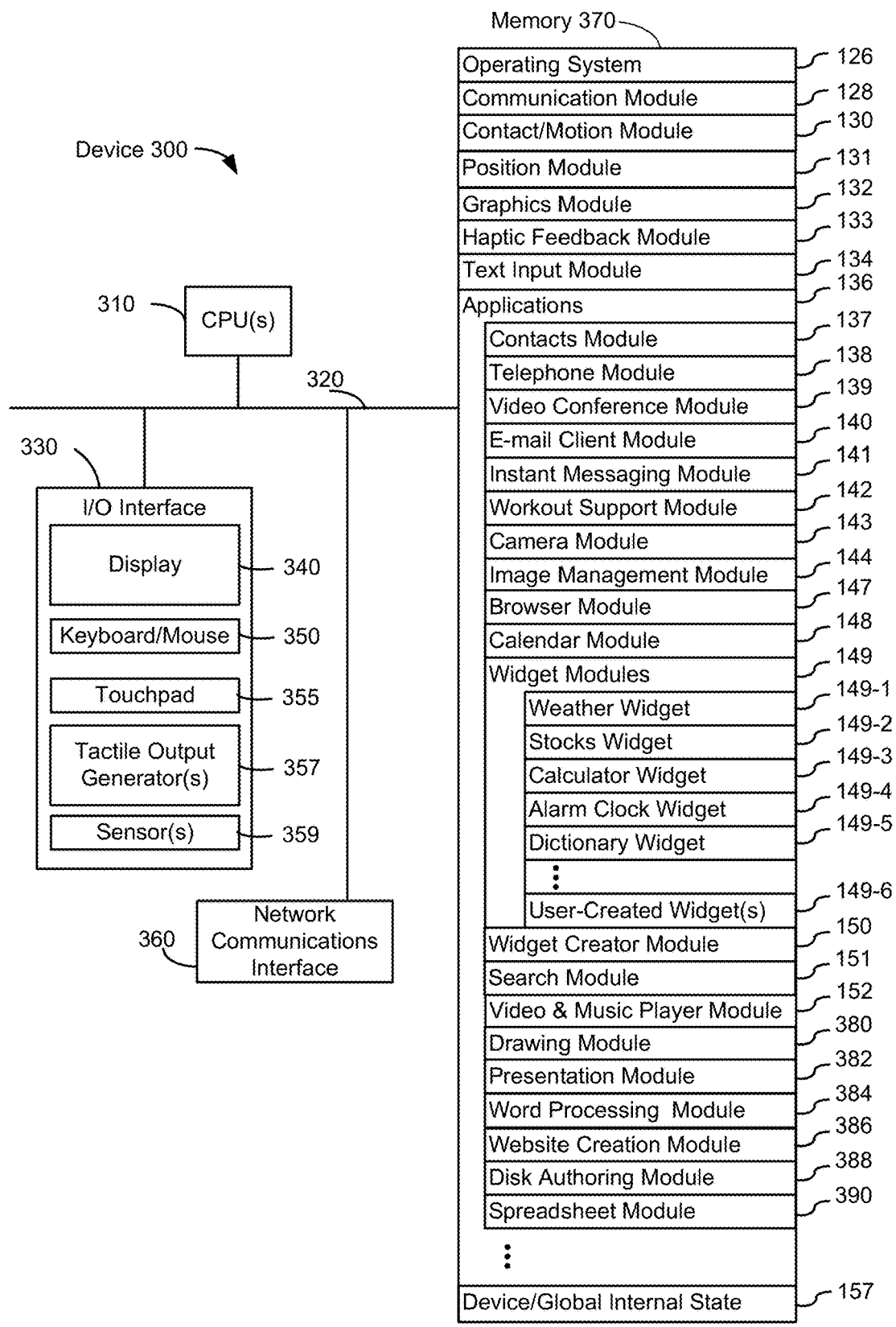
FIG. 3 is a block diagram of an exemplary multifunction device with a display and a touch-sensitive surface in accordance with some embodiments.
Figure 4:
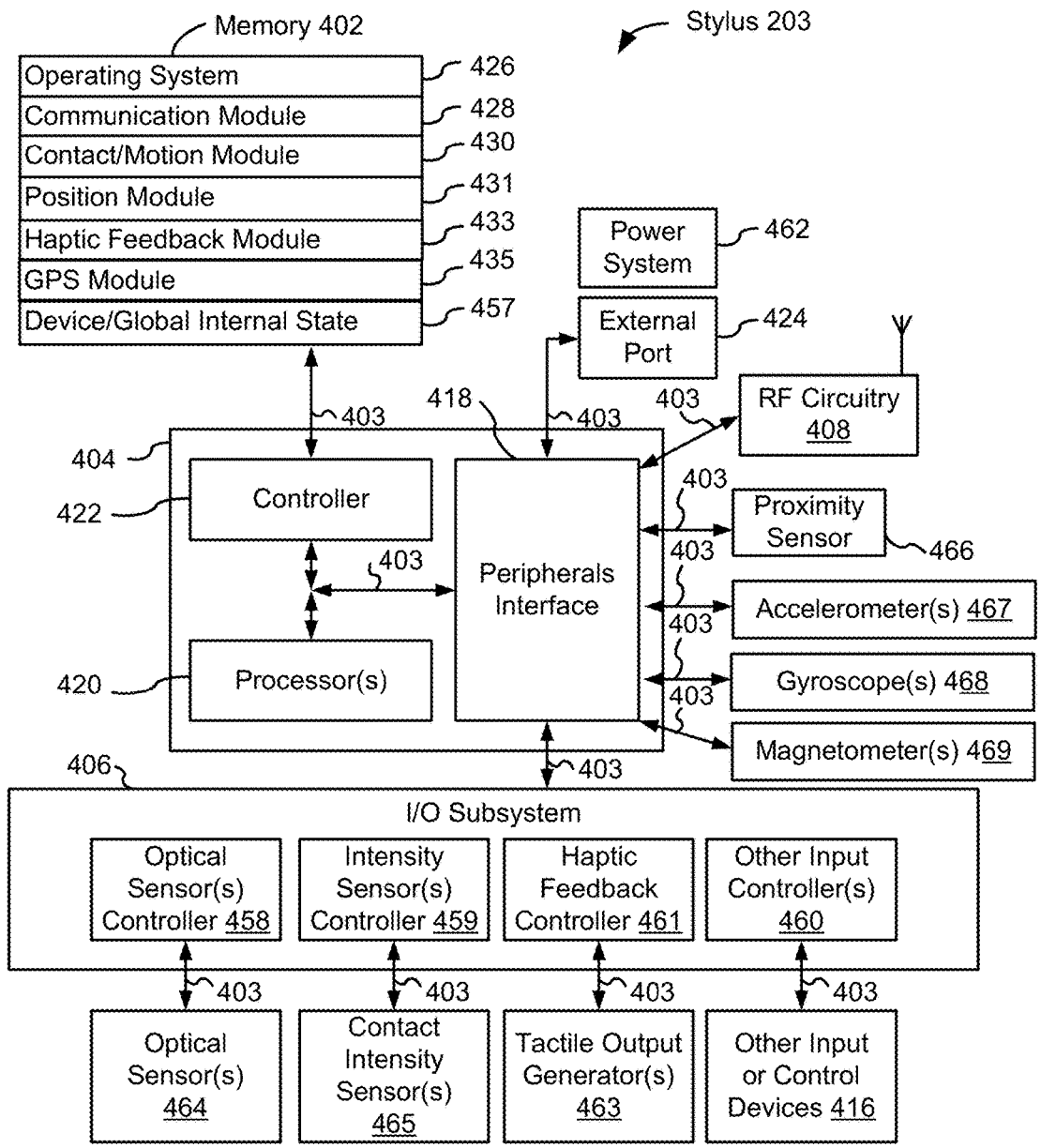
FIG. 4 is a block diagram of an exemplary electronic stylus in accordance with some embodiments.
Figure 5A:
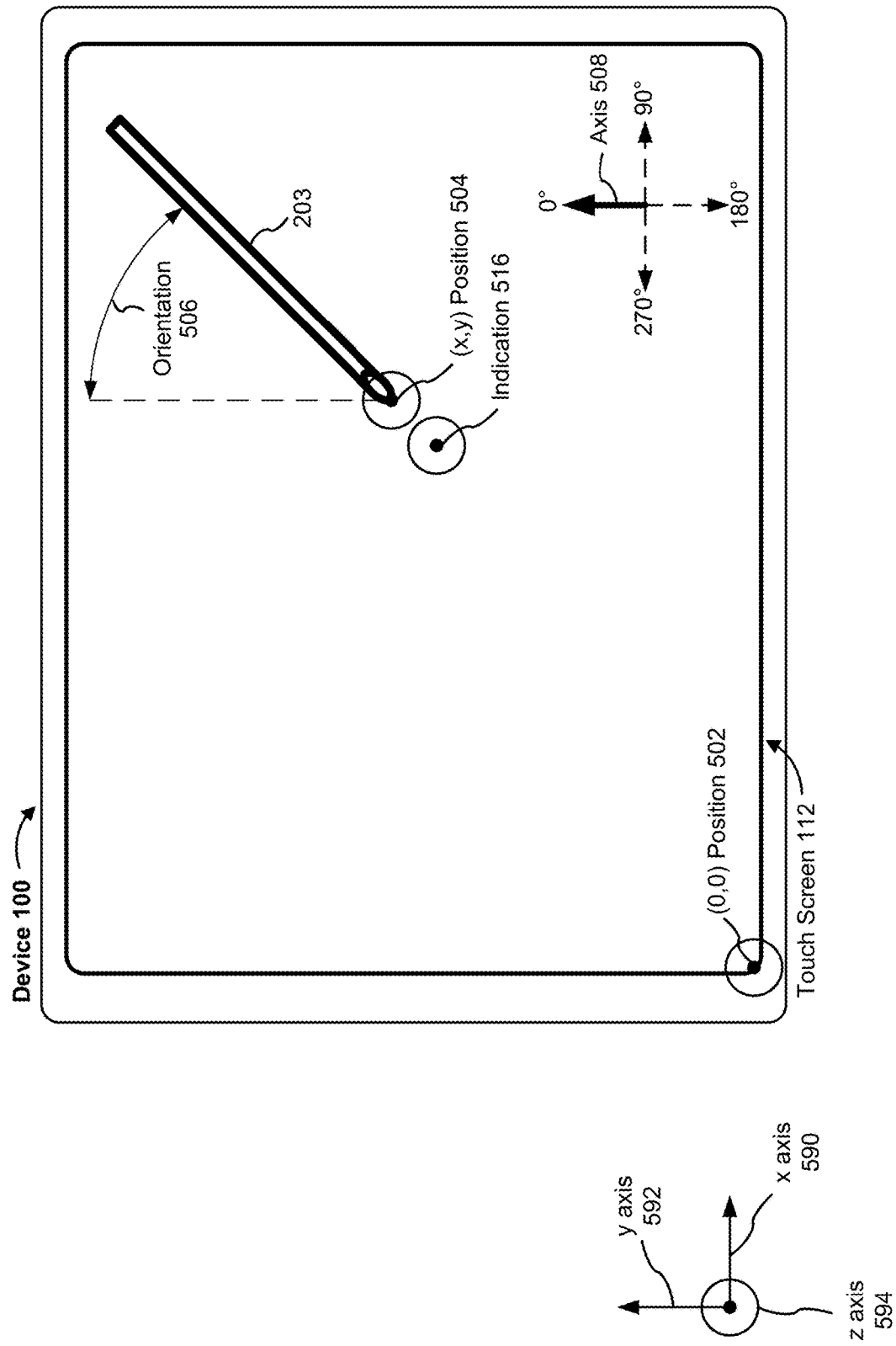
FIGS. 5A-5B illustrate a positional state of a stylus relative to a touch-sensitive surface in accordance with some embodiments.
Figure 5B:
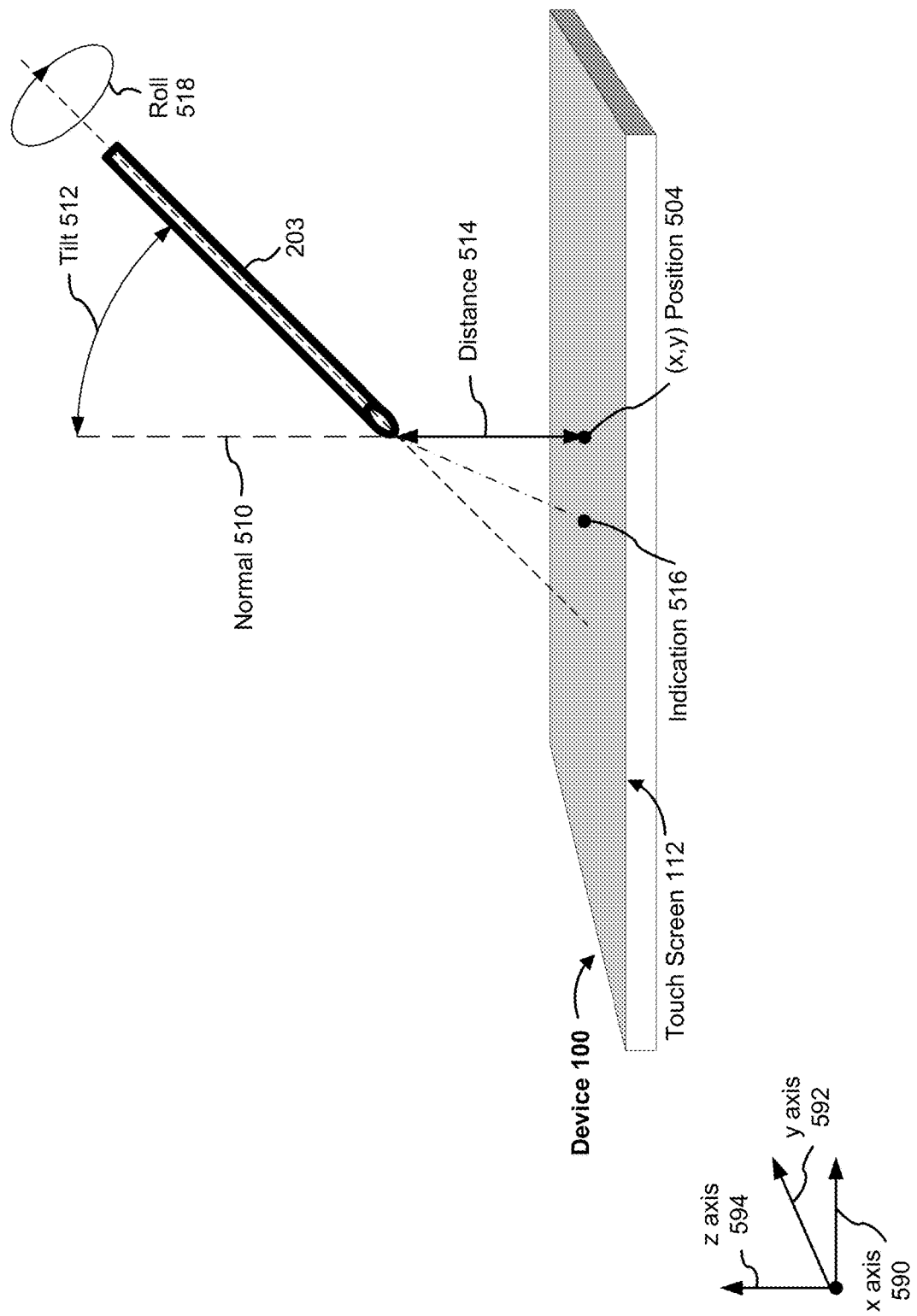
Figure 12A:
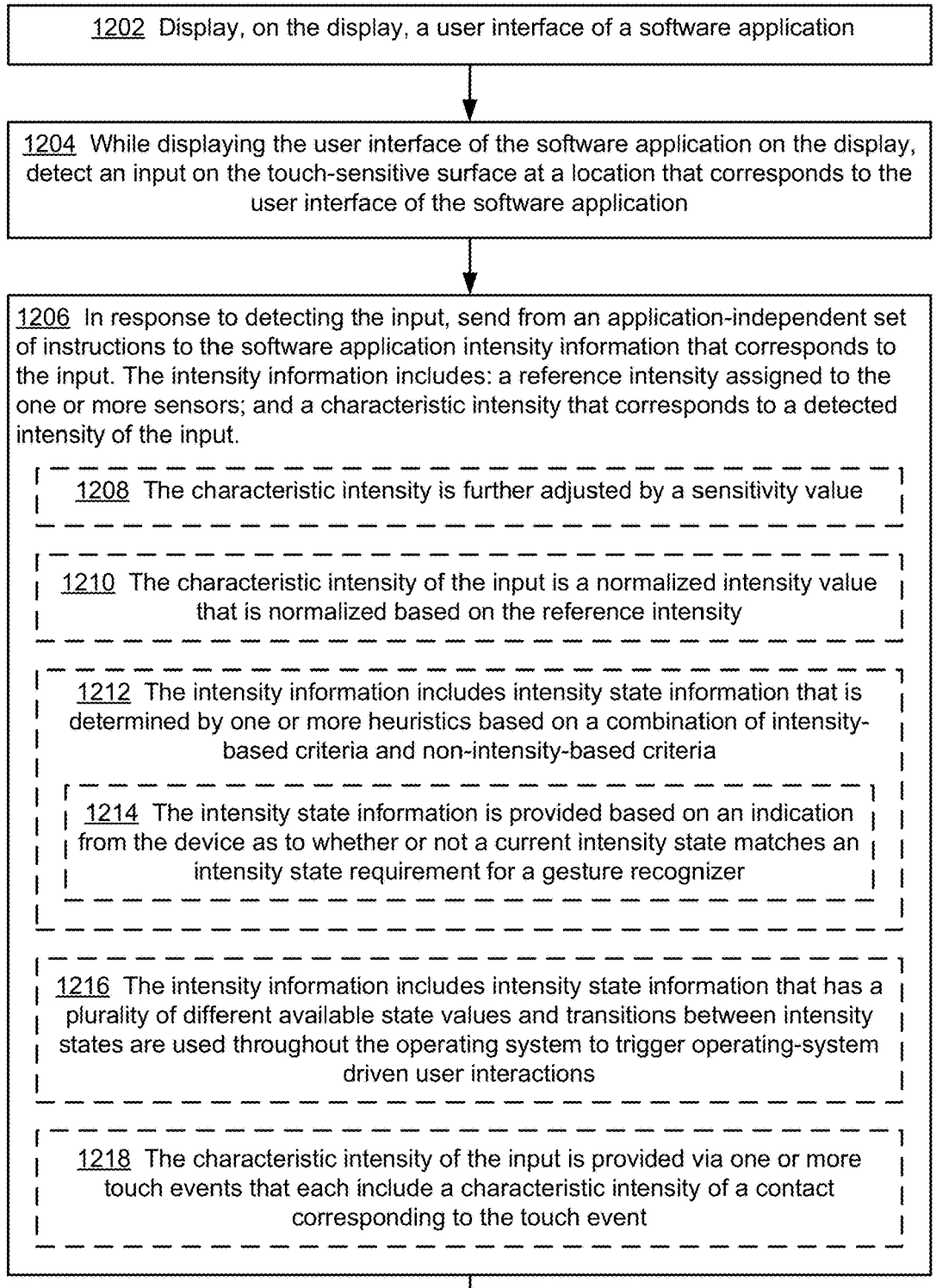
Figure 13A:
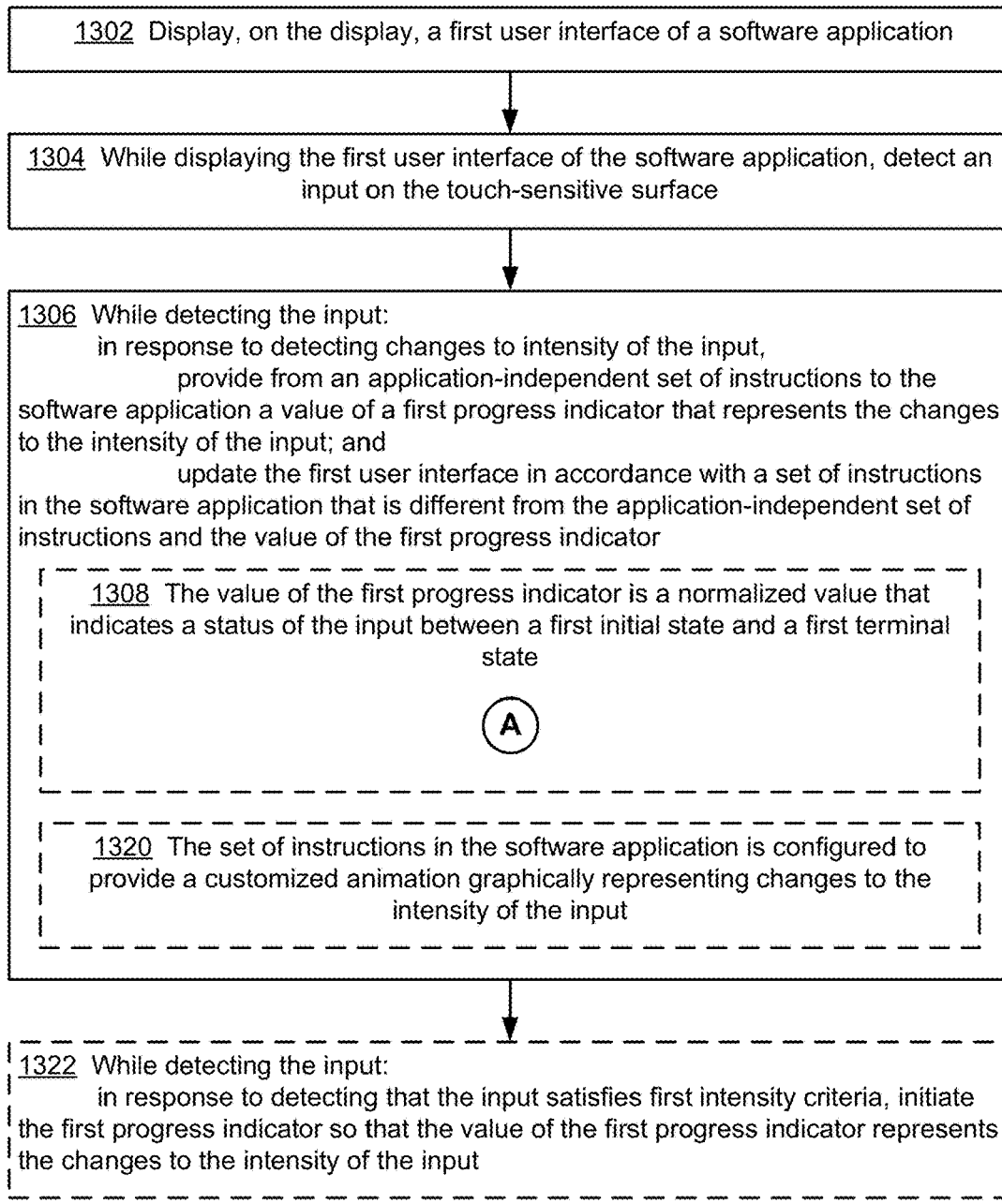
Figure 15A:
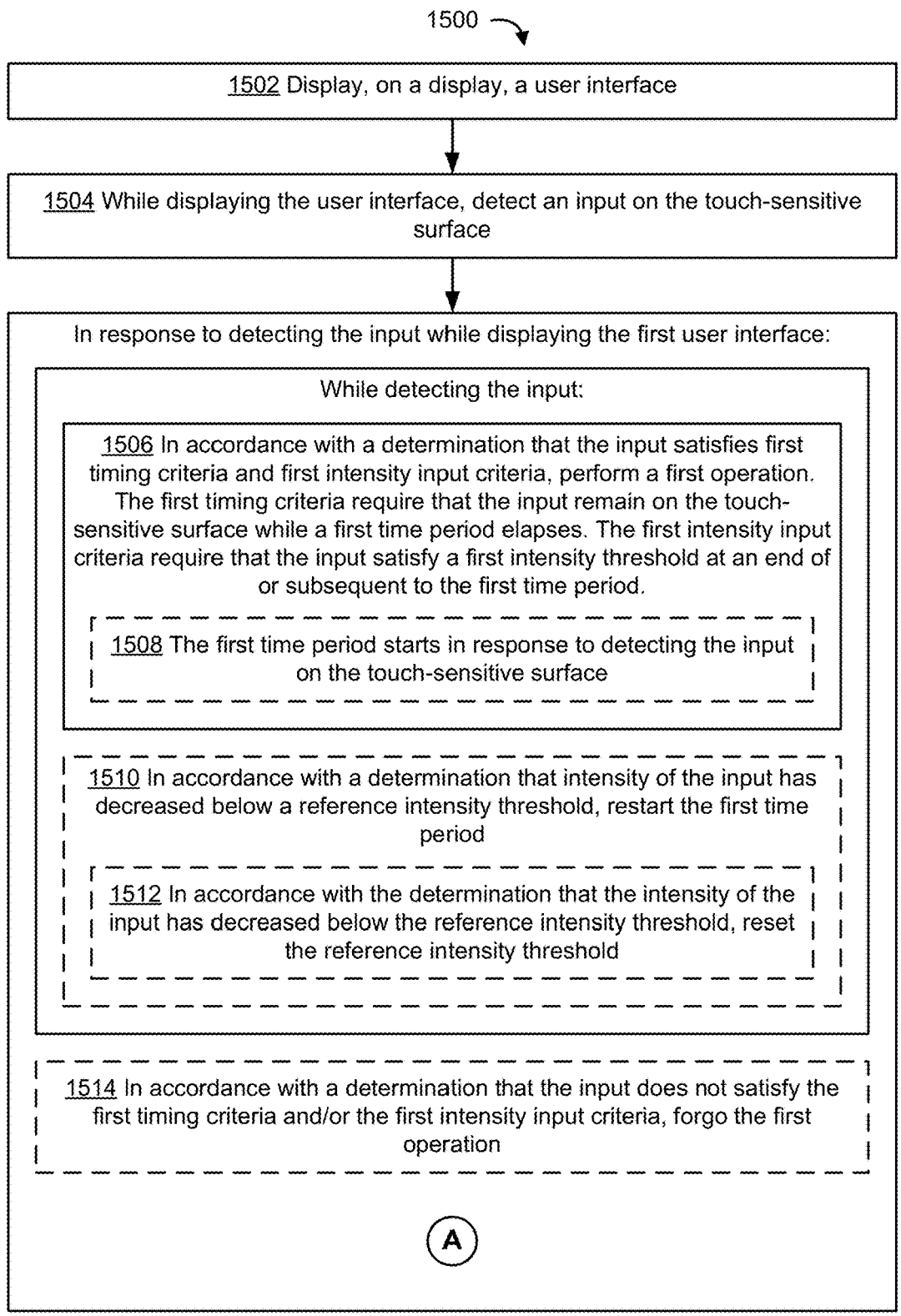
FIGS. 15A-15B are flow diagrams illustrating a method of processing touch inputs based on dynamic thresholds in accordance with some embodiments.
Figure 15B:
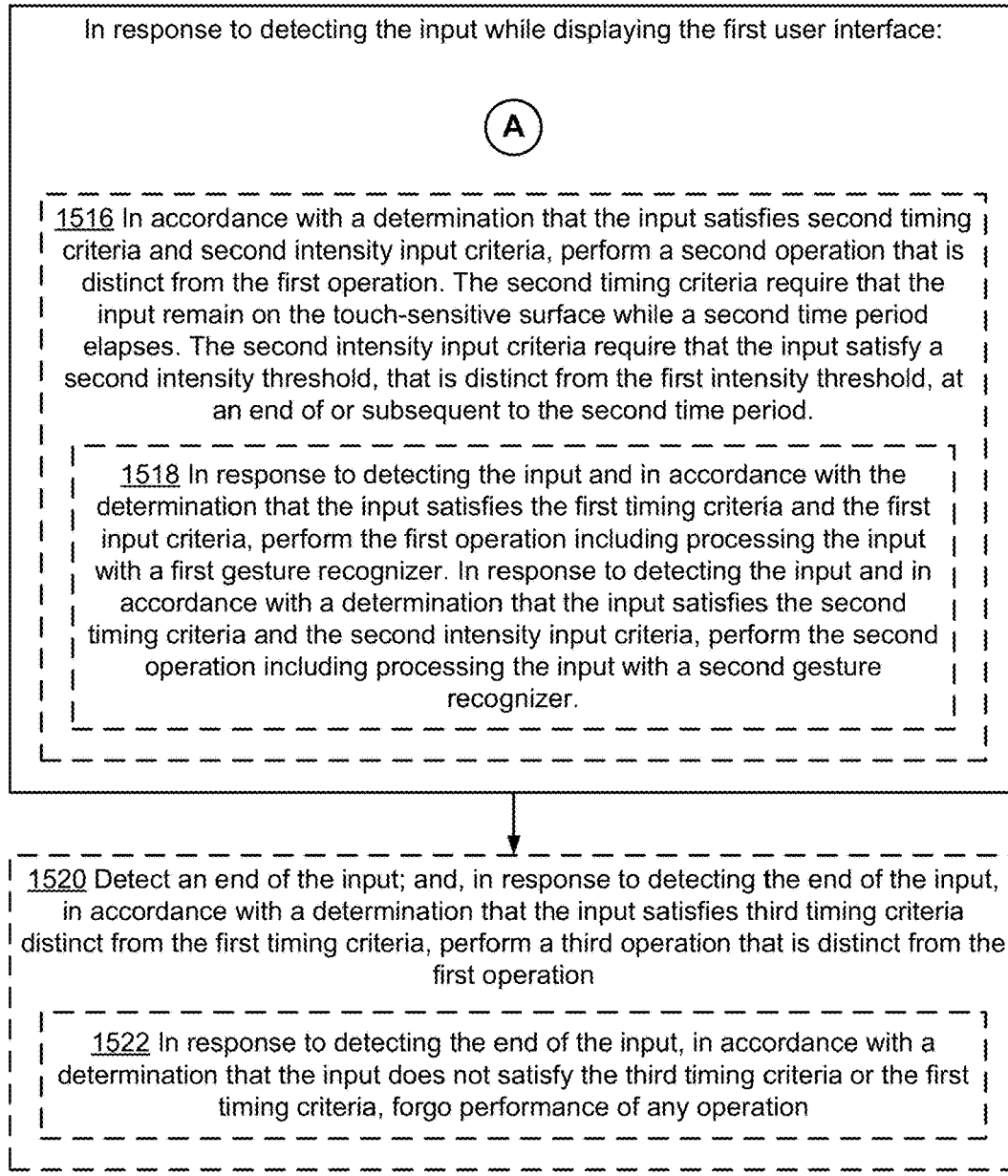
Figure 16A:
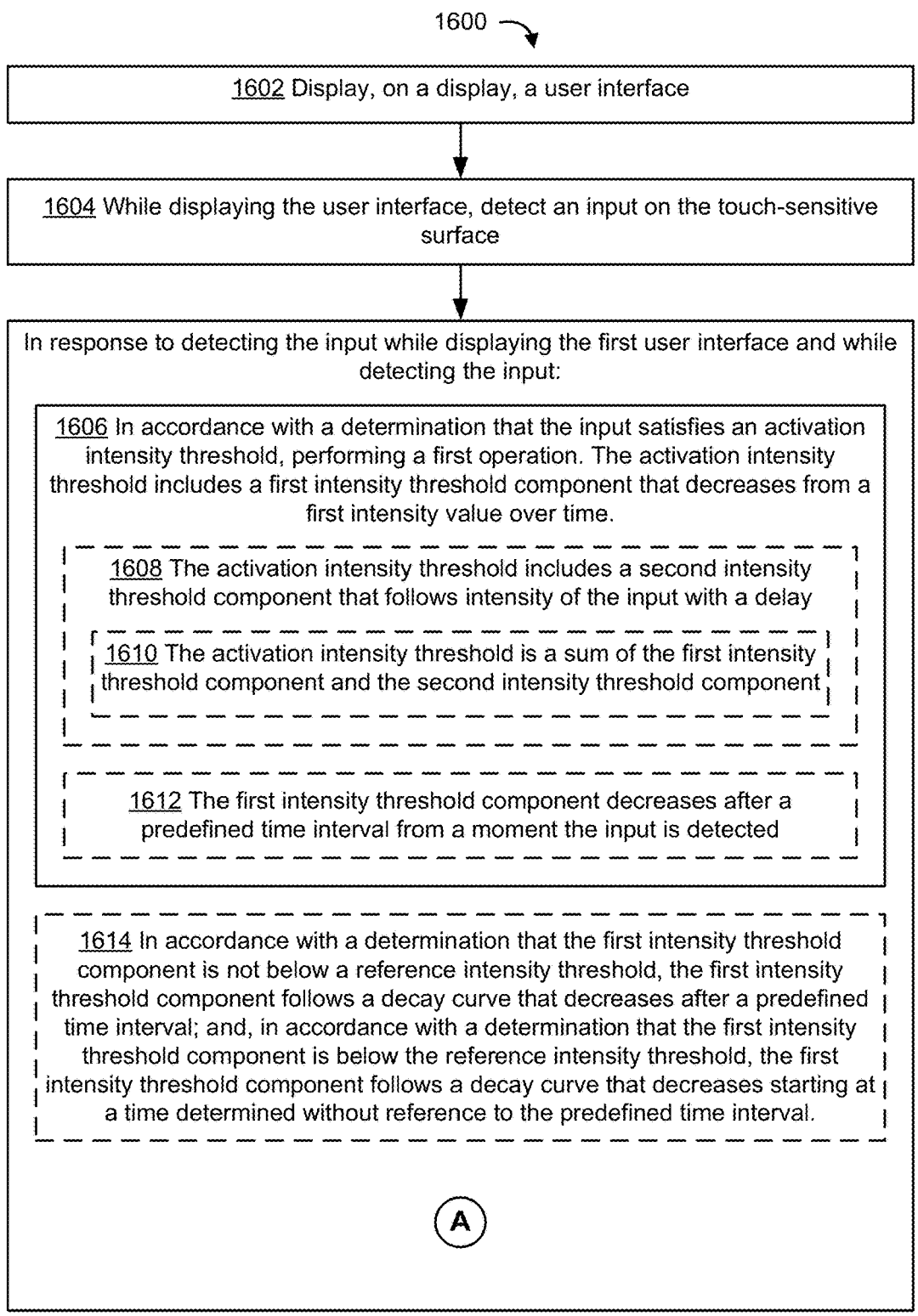

Below, FIGS. 1A-1B, 2, and 3 provide a description of exemplary devices. FIG. 4 provides a description of an exemplary electronic stylus. FIGS. 5A-5B illustrate a positional state of a stylus relative to a touch-sensitive surface. FIGS. 6A-6B and 7A-7BBB illustrate exemplary user interfaces for processing touch inputs with instructions in a web page. FIGS. 8A-8E are flow diagrams illustrating a method of disambiguating a long press input and a deep press input. FIGS. 9A-9D are flow diagrams illustrating a method of disambiguating a pan gesture input and a deep press input. FIGS. 10A-10D are flow diagrams illustrating a method of disambiguating a tap gesture input and a deep press input. FIGS. 11A-11D are flow diagrams illustrating methods of processing touch inputs using application-independent set of predefined instructions. FIGS. 12A-12B are flow diagrams illustrating a method of processing a touch input using a predefined data structure. FIGS. 13A-13B are flow diagrams illustrating a method of processing a touch input using a force gesture progress indicator. FIGS. 14A-14C are flow diagrams illustrating a method of processing touch inputs based on intensity criteria specified by third-party applications. FIGS. 15A-15B are flow diagrams illustrating a method of processing touch inputs based on dynamic thresholds. FIGS. 16A-16B are flow diagrams illustrating a method of processing touch inputs based on dynamic thresholds. The user interfaces in FIGS. 7A-7BBB are used to illustrate the processes in FIGS. 8A-8E, 9A-9D, 10A-10D, 11A-11D, 12A-12B, 13A-13B, 14A-14C, 15A-15B and FIGS. 16A-16B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
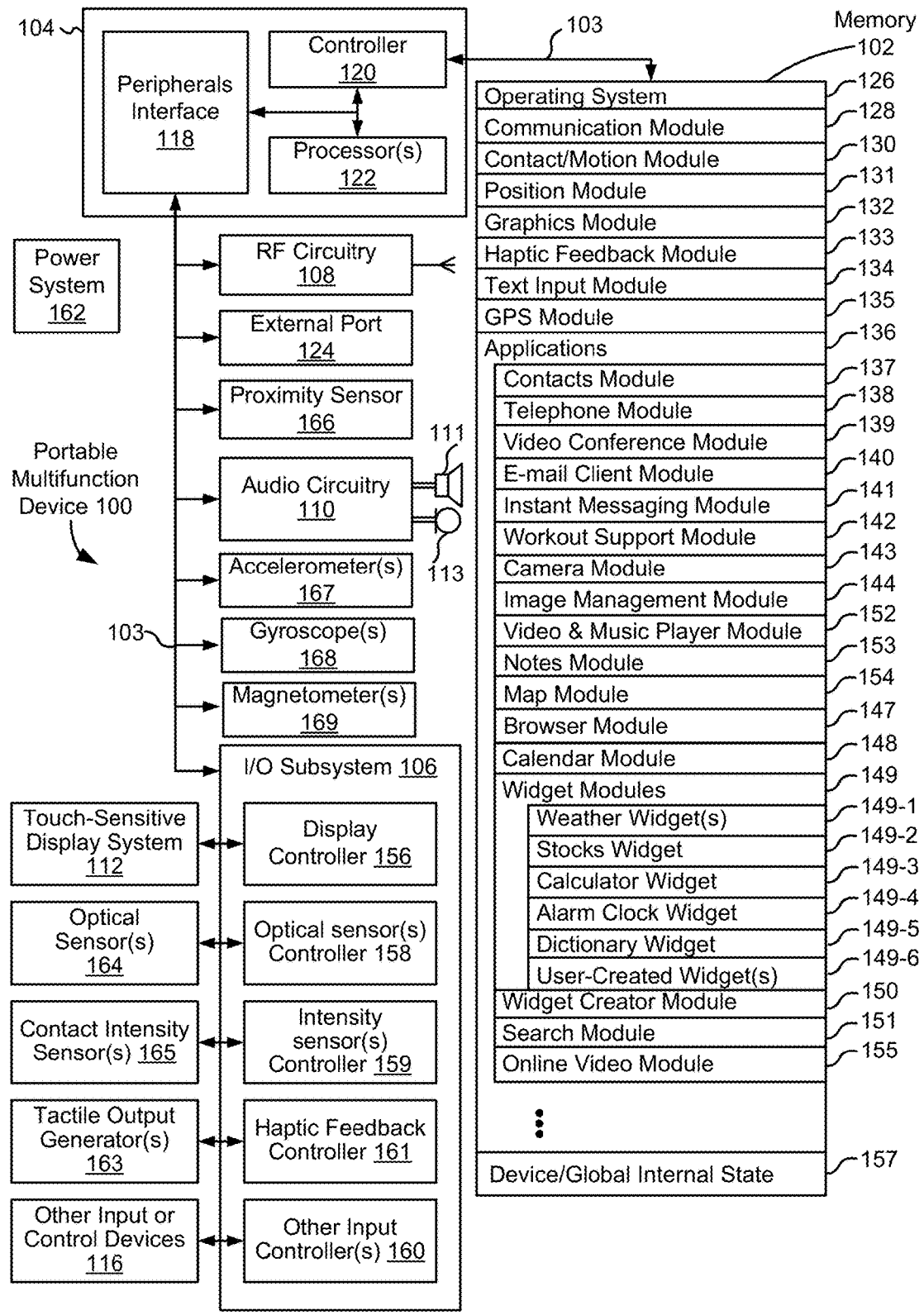
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more non-transitory computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
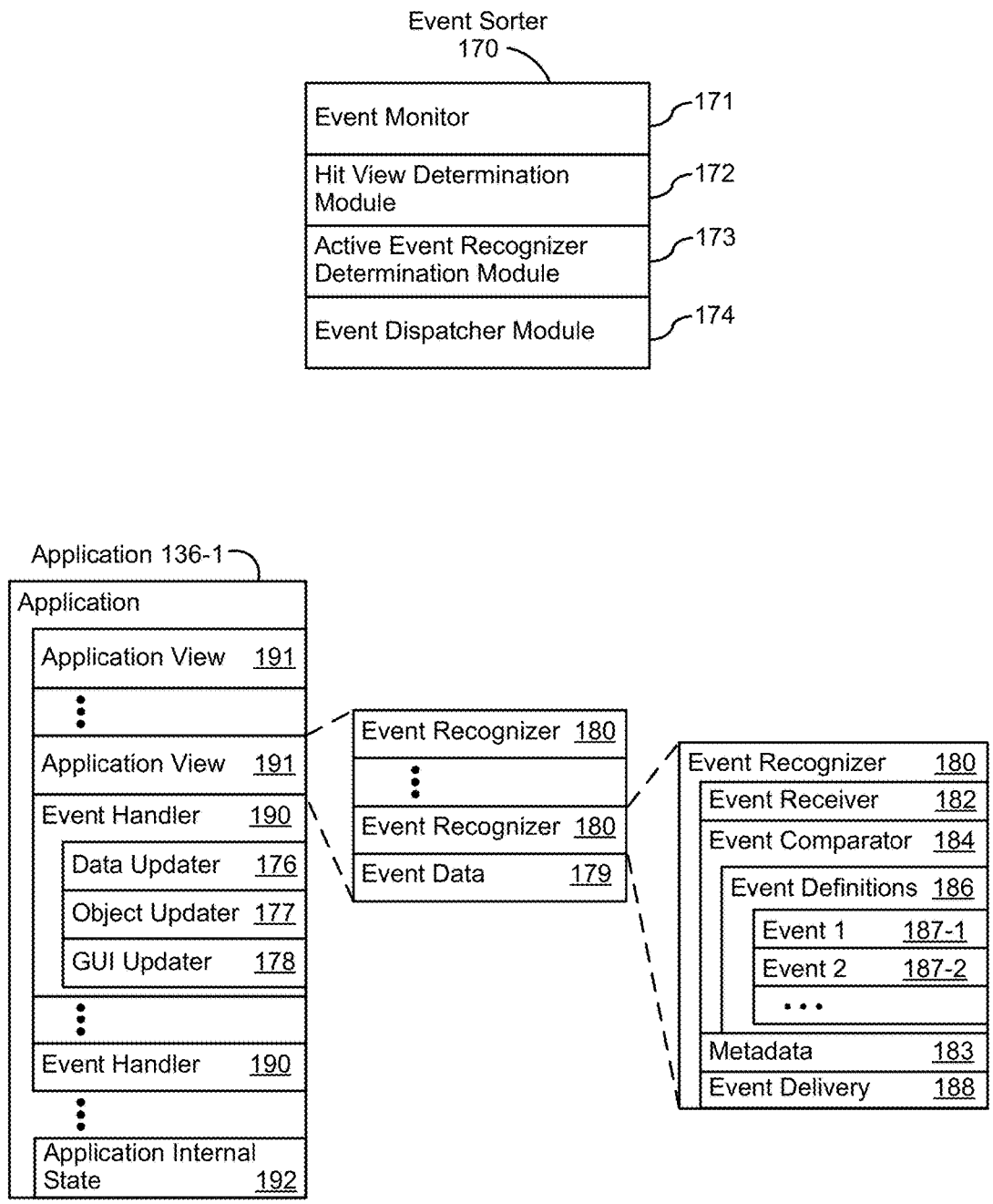
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

As used herein, a force event refers to a device-generated signal or device-generated data (e.g., a signal or a data object generated or updated by device 100) to indicate status or a change in status of a touch input, such as beginning (e.g., satisfying a minimum force intensity threshold), changing intensity (e.g., increasing or decreasing intensity of the touch input), or changing intensity status (e.g., hard press to exceed an intensity threshold or release the touch input so that the intensity falls below the intensity threshold) of the touch input. Although force events are associated with physical touches (e.g., touches with a finger and/or a stylus) on the touch-sensitive surface, the force events, as described herein, are distinct from the physical touches.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
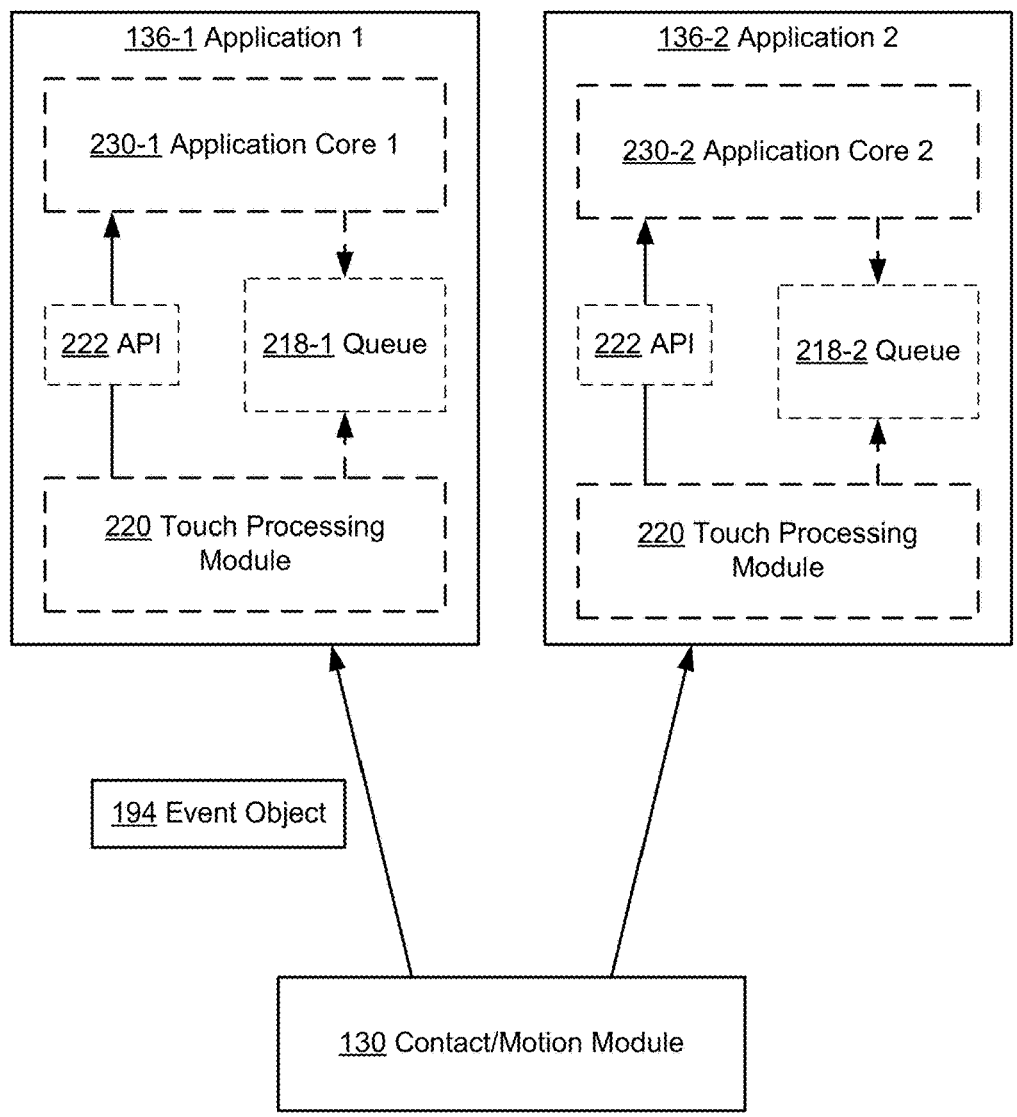
FIG. 1C is a block diagram illustrating transfer of an event object in accordance with some embodiments.

FIG. 1C is a block diagram illustrating transfer of event object 194 in accordance with some embodiments.

As described above with respect to FIG. 1A, contact/motion module 130 determines status and/or a change in the status of a touch input. In some embodiments, the device generates signal or data (e.g., in the form of a data object) to transfer the determined status and/or the determined change in the status of a touch input to one or more software components. In some embodiments, the data object is called an event object (e.g., event object 194). An event object includes data that represents the status of a corresponding touch input. In some embodiments, event object 194 is a mouse event object (because the touch input is equivalent to an input by a mouse). For example, in such embodiments, a touch input moving across a touch-sensitive surface corresponds to a mouse movement (e.g., a mouse moved event). In some other embodiments, event object 194 is a touch event object that is distinct from a mouse event object. In some embodiments, the touch event object includes data that represents touch-specific properties of a corresponding touch input (e.g., a number of concurrent touches, an orientation of a finger contact or a stylus, etc.). In some embodiments, event object 194 is a force event object that is distinct from a mouse event object (or a touch event object). In some embodiments, the force event object includes data that represents force event specific properties of a corresponding touch input (e.g., an intensity applied by the touch input, a stage/phase of the touch input, etc.). In some embodiments, the event object includes any combination of such properties (e.g., mouse event specific properties, touch event specific properties, and force event specific properties).

In some embodiments, contact/motion module 130 generates (or updates) an event object and sends an event object to one or more applications (e.g., application 136-1, such as e-mail client module 140 in FIG. 1A, and/or application 136-2, such as browser module 147). Alternatively, contact/information module 130 sends information regarding contacts (e.g., raw coordinates of contacts) to one or more applications (e.g., application 1 (136-1) and/or application 2 (136-2)), and an application that receives the information generates (or updates) one or more event objects. In some embodiments, an application includes touch-processing module 220 that generates (or updates) one or more event objects and sends the one or more event objects to a portion of the application other than touch-processing module 220. In some embodiments, touch-processing module 220 is application-independent (e.g., the same touch-processing module is included in each of multiple distinct applications, such as e-mail client application, browser application, etc.). As used herein, that touch-processing module 220 is application-independent means that touch-processing module 220 is not designed specifically for a particular software application. That touch-processing module 220 is application-independent does not mean that touch-processing module 220 is located separate from its associated application. Although touch-processing module 220, in some embodiments, is distinct and separate from its associated application, as shown in FIG. 1C, touch-processing module 220 is included in its associated application in some embodiments. In some embodiments, the application also includes an application core that is specific to the application.

In FIG. 1C, each of application 1 (136-1, such as a e-mail client application) and application 2 (136-2, such as a browser application) includes touch processing module 220. In addition, application 1 (136-1) includes application core 1 (230-1) that is specific to application 1 (136-1) and/or application 2 (136-2) includes application core 2 (230-2) that is specific to application 2 (136-2). For example, application core 1 (230-1) includes instructions for performing operations specific to application 1 (136-1) (e.g., retrieving e-mails from one or more e-mail servers) and application core 2 (230-2) includes instructions for performing operations specific to application 2 (136-2) (e.g., bookmarking a web page).

In some embodiments, event object 194 is sent directly to the destination (e.g., a software component, such as application core 1 (230-1)). Optionally, event object 194 is sent through application programming interface 222. In some embodiments, event object 194 is sent by posting event object 194 (e.g., in queue 218-1) for retrieval by application core 1 (230-1).

In some embodiments, event object 194 includes force information. In some embodiments, a mouse event object includes force information (e.g., raw or normalized force applied by the touch input). In some embodiments, a touch event object includes force information. In some embodiments, a force event object includes force information.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
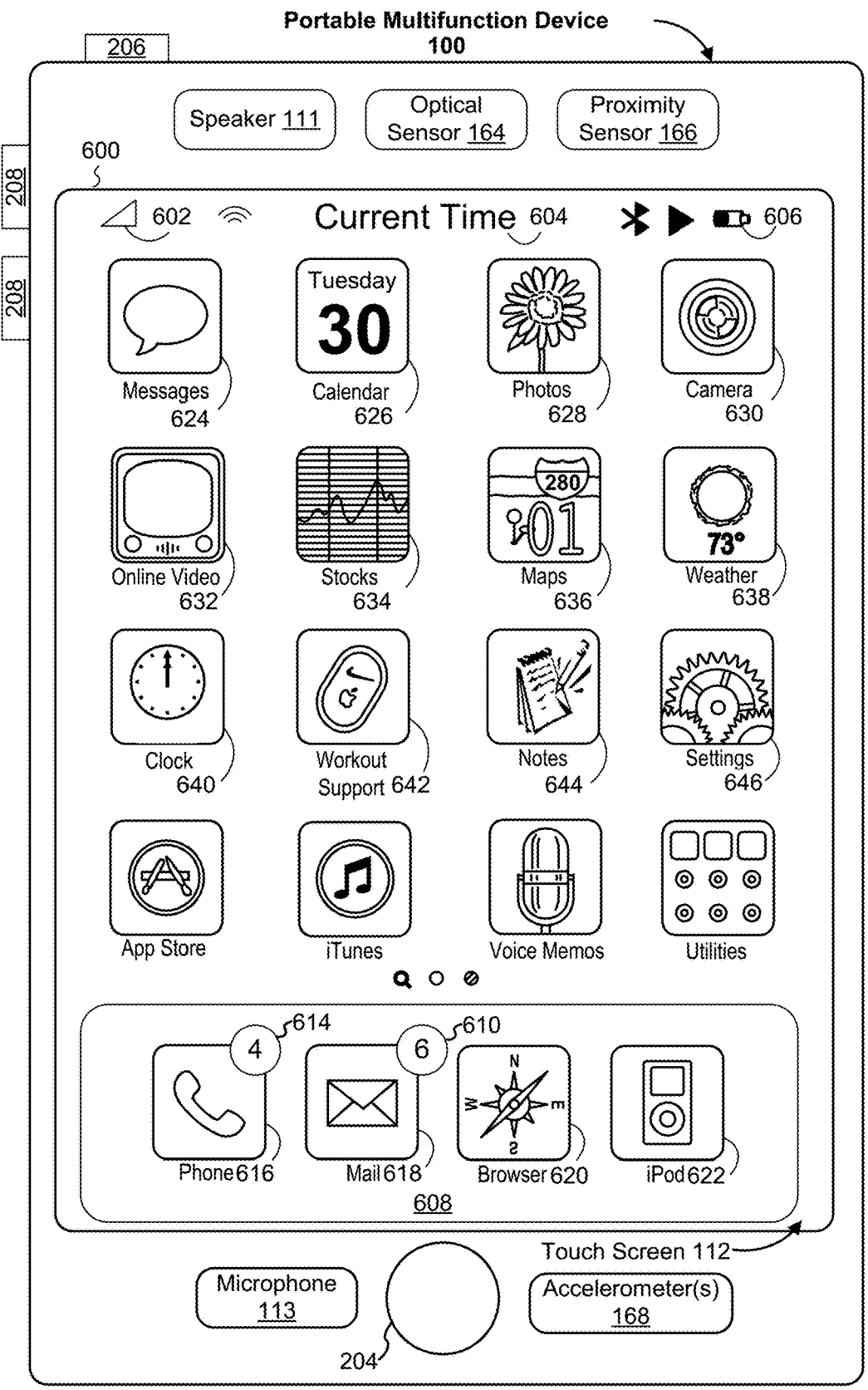
FIG. 6A illustrates an exemplary user interface for a menu of applications on a portable multifunction device in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
a Bluetooth indicator;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod (trademark of Apple Inc.) module 152, labeled "iPod;" and
Icons for other applications, such as:
  Icon 624 for IM module 141, labeled "Messages;"
  Icon 626 for calendar module 148, labeled "Calendar;"
  Icon 628 for image management module 144, labeled "Photos;"
  Icon 630 for camera module 143, labeled "Camera;"
  Icon 632 for online video module 155, labeled "Online Video;"
  Icon 634 for stocks widget 149-2, labeled "Stocks;"
  Icon 636 for map module 154, labeled "Maps;"
  Icon 638 for weather widget 149-1, labeled "Weather;"
  Icon 640 for alarm clock widget 169-6, labeled "Clock;"
  Icon 642 for workout support module 142, labeled "Workout Support"
  Icon 644 for notes module 153, labeled "Notes;" and
  Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 6B illustrates an exemplary user interface on a device (e.g., device 300, FIG. 3) with a touch-sensitive surface 651 (e.g., a tablet or touchpad 355, FIG. 3) that is separate from display 650. Device 300 also, optionally, includes one or more contact intensity sensors (e.g., one or more of sensors 359) for detecting intensity of contacts on touch-sensitive surface 651 and/or one or more tactile output generators 359 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from display 650. Many of the examples that follow will be given with reference to a device that detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a stylus input).

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 651 in FIG. 6B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 6A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7BBB) described below optionally include various intensity diagrams that show the current intensity of the contact on the touch-sensitive surface relative to one or more intensity thresholds (e.g., a first intensity threshold $I_L$, a second intensity threshold $I_M$, a third intensity threshold $I_H$, and/or one or more other intensity thresholds). This intensity diagram is typically not part of the displayed user interface, but is provided to aid in the interpretation of the figures. In some embodiments, the first intensity threshold corresponds to an intensity at which the device will perform operations typically associated with clicking a button of a physical mouse or a trackpad. In some embodiments, the second and third intensity thresholds correspond to intensities at which the device will perform operations that are different from operations typically associated with clicking a button of a physical mouse or a trackpad. In some embodiments, when a contact is detected with a characteristic intensity below the first intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some inputs, the intensity of a contact exceeding a first intensity threshold during the input triggers a first response. In some embodiments, the response of the device to inputs detected by the device depends on criteria that include both the contact intensity during the input and time-based criteria. For example, for some inputs, the intensity of a contact exceeding a second intensity threshold during the input, greater than the first intensity threshold (e.g., for a light press), triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental triggering of the second response. As another example, for some inputs, there is a reduced-sensitivity time period that occurs after the time at which the first intensity threshold is met. During the reduced-sensitivity time period, the second intensity threshold is increased. This temporary increase in the second intensity threshold also helps to avoid accidental triggering of the second response. For other inputs, the second response does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the intensity threshold $I_L$ to an intensity between the intensity threshold $I_L$ and the intensity threshold $I_M$ is sometimes referred to as a "light press" input. An increase of characteristic intensity of the contact from an intensity below the intensity threshold $I_M$ to an intensity above the intensity threshold $I_M$ is sometimes referred to as a "deep press" input. In some embodiments, an increase of characteristic intensity of the contact from an intensity below the intensity threshold $I_H$ to an intensity above the intensity threshold $I_H$ is also called a "deep press" input. An increase of characteristic intensity of the contact from an intensity below a contact-detection intensity threshold to an intensity between the contact-detection intensity threshold and the intensity threshold $I_L$ is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a low intensity threshold being met and a high intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

FIGS. 7A-7BBB illustrate exemplary user interfaces for processing touch inputs with instructions in a web page in accordance with some embodiments. The user interfaces in these figures are used to illustrate the processes described below, including the processes in FIGS. 8A-8C and FIG. 9. Although some of the examples which follow will be given with reference to inputs on a touch-sensitive surface 651 that is separate from display 650, in some embodiments, the device detects inputs on a touch-screen display (where the touch-sensitive surface and the display are combined), as shown in FIG. 6A.

FIG. 7A illustrates that user interface 706 on display 650 includes a user interface of a mail application (e.g., e-mail client module 140, FIG. 1A).

FIG. 7A also illustrates state machines 704 for gesture recognizers. State machines 704 for gesture recognizers as well as event handling operations (including handling of gesture events) are described in detail in Appendix A, which is incorporated by reference herein in its entirety. In this example, state machines 704 for four gesture recognizers are shown, each represented in FIG. 7A by a single letter: a reveal gesture recognizer (R), a preview gesture recognizer (P), a tap gesture recognizer (T) and a commit gesture recognizer (C). As shown in FIG. 7A, distinct intensity thresholds, are associated with three of these gesture recognizers: a first intensity threshold $I_L$ is associated with the reveal gesture recognizer, a second intensity threshold $I_M$ is associated with the preview gesture recognizer, and a third intensity threshold $I_H$ is associated with the commit gesture recognizer. In this example, the third intensity threshold $I_H$ is greater than (i.e., higher than) the second intensity threshold $I_M$, and the second intensity threshold $I_M$ is greater than (i.e., higher than) the first intensity threshold $I_L$.

FIG. 7A shows the position of a focus selector 705 positioned over a user interface object 708 or feature in user interface 706. The position of the focus selector 705 corresponds to the position of a corresponding user input on a touch-sensitive surface (e.g., touch sensitive surface 651 or a touch-sensitive surface of a touch-screen display 650, FIG. 6B).

As shown in user input intensity graph 702, the intensity (also called contact intensity) of the user input is initially below the first intensity threshold $I_L$.

FIG. 7B shows a new user interface 710 that results when the user input corresponding to focus selector 705 is a tap gesture. Intensity profiles 7102, 7104, 7106 and 7108 all correspond to tap gestures than end prior to completion of a first predefined time period, represented by the time period ending at time 7002. All four of these intensity profiles correspond to tap gestures, even when the peak intensity of the gesture is greater than one or more of the three intensity thresholds, because the user input does not remain on the touch sensitive surface for a first predefined time period.

In some embodiments, intensity profile 7110 also corresponds to a tap gesture, even though the user input remains on the touch sensitive surface for the first predefined time period, because the user input never exceeds the first intensity threshold $I_L$. However, in some other embodiments, a user input having intensity profile 7110 is construed as a non-event that does not cause performance of any operation.

FIG. 7B also shows that the state machine for the tap gesture recognizer (T) transitions from the Possible state, as shown in FIG. 7A, to the Recognized state. Furthermore, FIG. 7B shows that the state machines for the reveal gesture recognizer (R), preview gesture recognizer (P), and commit gesture recognizer (C) have all transitioned from the Possible state to the Failed state. This is because, for every one of intensity profiles 7102, 7104, 7106, 7108 and 7110, the input has failed to satisfy either an intensity input criteria or a duration criteria required for gesture recognition by those gesture recognizers. Alternatively, or in addition, each of the gesture recognizers that transition to the Failed state do so because recognition of a tap gesture by the tap gesture recognizer (T) causes all the other gesture recognizers to transition to the Failed state.

FIG. 7C shows a transition of user interface 706 from the state of that user interface in FIG. 7A. In particular, in accordance with a determination that the intensity of the user input satisfies intensity input criteria for the reveal gesture recognizer (R), the reveal gesture recognizer transitions to the Began state. In some embodiments, the intensity of the user input satisfies intensity input criteria for the reveal gesture recognizer (R) when the intensity of the user input reaches the first intensity threshold $I_L$. In some other embodiments, the intensity of the user input satisfies intensity input criteria for the reveal gesture recognizer (R) when the intensity of the user input exceeds the first intensity threshold $I_L$.

Optionally, when the reveal gesture recognizer transitions to the Began state, focus selector 705 is displayed, or provided for display, with a different appearance than when the reveal gesture recognizer is in the Possible state.

In some embodiments, in accordance with a determination that the intensity of the user input satisfies intensity input criteria for the reveal gesture recognizer (R), an internal event 7004 is generated, indicating that the intensity of the user input satisfies intensity input criteria for the reveal gesture recognizer (R). That event is provided to the reveal gesture recognizer (R), which transitions to the Began state in response to the event. Event 7004 optionally includes a progress indicator, graphically represented in FIG. 7C by progress indicator 750, which indicates an amount of progress of the intensity of the user input between first intensity threshold $I_L$ and a second intensity threshold $I_M$. In some embodiments, the progress indicator 750 is a normalized value, for example having a value between 0 and 1, and initially have a value of 0, or a value close to zero, when the intensity of the user input equals or has reached the first intensity threshold $I_L$.

In FIG. 7D, the intensity of the user input has changed from an intensity equal or approximately equal to the first intensity threshold $I_L$, as shown in FIG. 7C, to an intensity above the first intensity threshold $I_L$ and below the second intensity threshold $I_M$. In response to this increase in intensity of the user input, the value of progress indicator 750 increases to a value indicating where in the range between the first intensity threshold $I_L$ and the second intensity threshold $I_M$ the current user input intensity falls. Furthermore, the state of the reveal gesture recognizer (R) transitions to the Changed state, and user interface 706 is blurred, or transitions to a blur state, excluding the user interface object 708, corresponding to the position of the user input, which is not blurred. In this way, the user is notified that an action or operation with respect to user interface object 708 will occur if the user continues to increase the intensity of the user input.

In FIG. 7E, the intensity of the user input has further increased from the intensity of the user input in FIG. 7D. The reveal gesture recognizer (R) remains in the Changed state. Further, a small version of a preview area 712, sometimes called the preview platter, is displayed in or over user interface 706, which remains blurred except for object 708. In some embodiments, the size of the preview area 712 corresponds to a value of progress indicator 750. In some embodiments, preview area 712 is initially displayed only when the progress indicator 750 reaches a predefined value, such as 0.4 or 0.5.

In FIG. 7F, the intensity of the user input has further increased from the intensity of the user input in FIG. 7E. The reveal gesture recognizer (R) remains in the Changed state, and user interface 706 remains blurred except for object 708. Further, the size of preview area 712, as displayed in or over user interface 706, has increased in accordance with the increased intensity of the user input, or in accordance with the increased value of progress indicator 750. In FIG. 7F, the preview area 712 has increase in size sufficiently to enable a user to read the contents of the preview area 712. In this example, preview area 712 includes a preview of information corresponding to the user interface object 708 over which the focus selector 705 is positioned. In this example, the previewed information is a list of connections associated with the person corresponding to the user interface object 708 over which the focus selector 705 is positioned.

In FIG. 7G, the intensity of the user input has further increased from the intensity of the user input in FIG. 7E to an intensity equal or approximately equal to the second intensity threshold $I_M$. Progress indicator 750 now has its maximum value, for example 1, indicating that the intensity of the user input has reached to maximum value of the range corresponding to that progress indicator. Optionally, a second progress indicator 752 is generated, indicating a status of the user input with respect to the intensity range between the second intensity threshold $I_M$ and the third intensity threshold $I_H$. In FIG. 7G, second progress indicator 752 has its minimum value, indicating that the intensity of the user input is at the low end of the intensity range between the second intensity threshold $I_M$ and the third intensity threshold $I_H$.

In accordance with the intensity of the user input reaching the second intensity threshold $I_M$, the reveal gesture recognizer (R) remains in the Changed state, or alternatively transitions to the Canceled state, the tap gesture recognizer transitions to the Failed state, the preview gesture recognizer transitions to the Began state, and preview area 712 is displayed at either its maximum size (sometimes herein called full size), or at a size close to its maximum size. Preview area 712 continues to include a preview of information corresponding to the user interface object 708 over which the focus selector 705 is positioned.

In FIG. 7H, the intensity of the user input has further increased from the intensity of the user input in FIG. 7G to an intensity above the second intensity threshold $I_M$ and below the third intensity threshold $I_H$. Progress indicator 750 remains its maximum value, for example 1, since the intensity of the user input is above the maximum value of the range corresponding to that progress indicator. Second progress indicator 752 now has an intermediate value, between the minimum and maximum values for that progress indicator 752, indicating the current status of the user input with respect to the intensity range between the second intensity threshold $I_M$ and the third intensity threshold $I_H$.

In accordance with the intensity of the user input exceeding the second intensity threshold $I_M$, the reveal gesture recognizer (R) remains in the Changed state, or alternatively transitions to the Canceled state, the tap gesture recognizer remains in the Failed state, the preview gesture recognizer transitions to the Changed state, and preview area 712 is displayed at its maximum size (sometimes herein called full size). Preview area 712 continues to include a preview of information corresponding to the user interface object 708 over which the focus selector 705 is positioned.

In FIG. 7I, the intensity of the user input has further increased from the intensity of the user input in FIG. 7H to an intensity at or above the third intensity threshold $I_H$. Progress indicator 750 remains its maximum value, for example 1, since the intensity of the user input is above the maximum value of the range corresponding to that progress indicator. Second progress indicator 752 now has its maximum value, indicating the current status of the user input with respect to the intensity range between the second intensity threshold $I_M$ and the third intensity threshold $I_H$. Optionally, upon reaching the third intensity threshold $I_H$, an event 7008 is generated indicating the intensity of the user input and optionally including one or both progress indicators 750, 752.

In accordance with the intensity of the user input reaching the third intensity threshold $I_H$, the reveal gesture recognizer (R) transitions to the Canceled state, the tap gesture recognizer remains in the Failed state, the preview gesture recognizer transitions to the Canceled state, and the commit gesture recognizer transitions to the Recognized state. Furthermore, in accordance with the intensity of the user input reaching the third intensity threshold $I_H$, preview area 712 is no longer displayed, and instead a new user interface 710 corresponding to selection of user interface object 708 is displayed. In the example shown in FIG. 7I, selection of user interface object 708 has caused connection information for person or entity corresponding to user interface object 708 be displayed, or provided for display.

In FIG. 7J, the intensity of the user input has decreased from the intensity of the user input in FIG. 7H to an intensity below the second intensity threshold $I_M$. In this example, the intensity of the user input has not reached the third intensity threshold $I_H$ and therefore the commit gesture recognizer remains in the Possible state. Furthermore, progress indicator 750 transitions to a value below its maximum value, since the intensity of the user input is now below the maximum value of the range corresponding to that progress indicator. Second progress indicator 752 now has its minimum value, indicating the current status of the user input with respect to the intensity range between the second intensity threshold $I_M$ and the third intensity threshold $I_H$. In other words, since the intensity of the user input is below the second intensity threshold $I_M$, second progress indicator 752 has its minimum value. Optionally, the change in intensity of the user input causes an event (not shown) to be generated, where the event includes information indicating the intensity of the user input and optionally including one or both progress indicators 750, 752.

In accordance with the intensity of the user input decreasing to an intensity below the second intensity threshold $I_M$, without first reaching the third intensity threshold $I_H$, the reveal gesture recognizer (R) remains in the Changed state, the tap gesture recognizer remains in the Failed state, the preview gesture recognizer remains in the Changed state, and the commit gesture recognizer remains in the Possible state. Furthermore, in accordance with the decreased intensity of the user input, the size of preview area 712 decreases from the size at which it was displayed when the intensity of the user input was higher (see FIG. 7H).

In FIG. 7K, the user input ceases, as indicated by a zero intensity of the user input, after previously reaching or exceeding the first intensity threshold $I_L$ (corresponding to intensity profile 7112) or the second intensity threshold $I_M$ (corresponding to intensity profile 7114), without exceeding the third intensity threshold $I_H$. Furthermore, the duration of the gesture exceeds the first predefined period corresponding to time 7002, indicating that the gesture does not meet tap criteria, which includes that the input ceases to remain on the touch-sensitive surface during the first predefined time period. As a result, the tap gesture recognizer transitions to the Failed state, and the commit gesture recognizer also transitions to the Failed State.

In accordance with intensity profile 7114 in FIG. 7K, the preview gesture recognizer transitions to the Recognized state during the gesture in response to the intensity of the input satisfying intensity input criteria, including that the input satisfies the second intensity threshold $I_M$, and the input remaining on the touch-sensitive surface for the first predefined time period, and subsequently transitions to the Failed state in response to the input ceasing to remain on the touch-sensitive surface.

In accordance with intensity profile 7112 in FIG. 7K, the preview gesture recognizer transitions from the Possible state to the Failed state, without first transitioning to the Recognized state, since the intensity input criteria for preview gesture recognizer are not satisfied, even temporarily, by an input with intensity profile 7112.

Optionally, the reveal gesture recognizer transitions to the Recognized state in response to an input with either intensity profile 7112 or intensity profile 7114, since the intensity of the input exceeds the first intensity threshold $I_L$ and the input remains on the touch-sensitive surface for the first predefined time period. In some embodiments, not shown in FIG. 7K, the reveal gesture recognizer transitions to the Canceled state in response to the input ceasing to remain on the touch-sensitive surface.

In FIG. 7L, the set of active gesture recognizers includes a reveal gesture recognizer (R), a preview gesture recognizer (P), a pan or scroll gesture recognizer (S) and a commit gesture recognizer (C). As shown in FIG. 7L, distinct intensity thresholds, are associated with three of these gesture recognizers: a first intensity threshold $I_L$ is associated with the reveal gesture recognizer, a second intensity threshold $I_M$ is associated with the preview gesture recognizer, and a third intensity threshold $I_H$ is associated with the commit gesture recognizer.

FIG. 7L shows the position of a focus selector 707 positioned over a user interface object 708 or feature in user interface 706. The position of the focus selector 705 corresponds to the position of a corresponding user input on a touch-sensitive surface (e.g., touch-sensitive surface 651 or a touch-sensitive surface of a touch-screen display 650, FIG. 6B). FIG. 7L also shows an input movement limit zone or input movement limit perimeter 714, shown as a dashed line circle or other shape surrounding the focus selector 707. Typically, input movement limit perimeter 714 is not actually displayed, and instead input movement limit perimeter 714 represents an input movement limit utilized by one or more of the gesture recognizers. As shown in FIG. 7L, the intensity of the user input does not satisfy any of the three intensity thresholds $I_L$, $I_M$ and $I_H$.

When the input corresponding to focus selector 707 moves from the position shown in FIG. 7L to the position shown in FIG. 7M, the input has moved across the touch-sensitive surface by at least a predefined distance, as reflected by focus selector 707 having moved at least partially past input movement limit perimeter 714. As a result, the graphical user interface 706 pans or scrolls by an amount corresponding to the distance moved by the input on the touch-sensitive surface. More generally, in response to the input moving across the touch-sensitive surface by at least the predefined distance, a second operation is performed. In some embodiments, the second operation includes scrolling at least a portion of the user interface.

Further, as shown in FIG. 7M, in response to the input moving across the touch-sensitive surface by at least the predefined distance, the reveal gesture recognizer (R), preview gesture recognizer (P), and commit gesture recognizer (C) all transition to the Failed state, and the pan gesture recognizer (S) transitions to the Began state.

In FIG. 7N, the input continues to move across the touch-sensitive surface, as represented by further movement of focus selector 707, which is not completely outside input movement limit perimeter 714. In response to this movement of the input, the pan gesture recognizer (S) transitions to the Changed state and user interface 706 is further scrolled upwards compared with its position in FIG. 7M.

It is noted that intensity of the input in FIGS. 7L, 7M and 7N remains below the first intensity threshold $I_L$. Consequences of the intensity of the input satisfying the first intensity threshold $I_L$ are addressed below in the discussion of FIGS. 7O-7S and other subsequent figures.

In FIG. 7O, after the input, as represented by focus selector 707, has already moved beyond the input movement limit perimeter 714 with an intensity that does not satisfy the first intensity threshold $I_L$, the intensity of the input increases so as to satisfy the first intensity threshold $I_L$, as shown in user input intensity graph 70. Satisfaction of the first intensity threshold $I_L$ is indicated by a changed appearance of focus selector 707. However, despite the user input now satisfying the first intensity threshold $I_L$, the reveal gesture recognizer (R), preview gesture recognizer (P), and commit gesture recognizer (C) all remain in the Failed state, and the pan gesture recognizer (S) remains in the Changed state. It is noted that, typically, once a gesture recognizer transitions to the Failed state, it cannot transition to any other state, such as the Recognized state or Began State, until the user input ceases (i.e., until the user lifts their finger or stylus or other instrument off the touch-sensitive surface).

In some circumstances, user interface 706 transitions from the state shown in FIG. 7L to the state shown in FIG. 7P, in response to the intensity of the input satisfying the first intensity threshold $I_L$, prior to the user input moving across the touch-sensitive surface by at least the predefined distance. For example, in FIG. 7P, the input has not moved or has remained at substantially the same location, since the initial contact with the touch-sensitive surface represented by FIG. 7L. In response to the input satisfying intensity input criteria including that the input satisfies the first intensity threshold, a first operation is performed. In this example, the first operation includes blurring user interface 706, or transitioning user interface 706 to a blur state, excluding the user interface object 708 corresponding to the position of the user input, which is not blurred.

Furthermore, in some embodiments, in response to the input satisfying intensity input criteria including that the input satisfies the first intensity threshold, the preview gesture recognizer (P) transitions from the Possible state to the Began state, and performance of the first operation, discussed above, occurs in response to the preview gesture recognizer (P) transitioning to the Began state.

Further, as shown in FIG. 7P, in response to the input remaining at substantially its initial location (i.e., not moving across the touch-sensitive surface by at least the predefined distance) and the input satisfying intensity input criteria including that the input satisfies the first intensity threshold, the preview gesture recognizer (P), commit gesture recognizer (C), and the pan gesture recognizer (S) all remain in the Possible state.

The input on the touch-sensitive surface represented by focus selector 707 in FIG. 7P is sometimes called a first portion of the input, and the subsequent portion of the same input shown in FIG. 7Q is sometimes called a second portion of the input. In some circumstances, discussed in more detail with respect to FIGS. 7P and 7Q and with respect to the flowchart illustrated in FIGS. 8A-8E, the first portion of the input is processed with a first gesture recognizer, for example, the reveal gesture recognizer, and the second portion of the input is processed with a second gesture recognizer, for example, the pan gesture recognizer.

In FIG. 7Q, after the preview gesture recognizer (P) transitions from the Possible state to the Began state (as discussed above with reference to FIG. 7P), the input moves by an amount sufficient to satisfy pan criteria, including that the input has moved across the touch-sensitive surface by at least the predefined distance. In response to the input moving by an amount sufficient to satisfy pan criteria, user interface 706 is scrolled by an amount corresponding to the amount of movement of the input across the touch-sensitive surface, the reveal gesture recognizer (R) transitions to the Canceled state, the preview gesture recognizer (P) and commit gesture recognizer (C) transition to the Failed state, and the pan gesture recognizer (S) transitions to the Changed state. In some embodiments, the transition of the pan gesture recognizer (S) to the Changed state is what causes, or enables, the scrolling of user interface 706, or at least a portion of user interface 706.

FIG. 7R corresponds to the FIG. 7H, but with a pan gesture recognizer (S) in place of a tap gesture recognizer (T). In FIG. 7R, the pan gesture recognizer (S) is in the Failed state due to a lack of movement of the input since its initial contact with the touch-sensitive surface and the transitioning of preview gesture recognizer (P) to the Began state (see FIG. 7G) or Changed state (see FIGS. 7H and 7R). An arrow above focus selector 707 indicates that the input has begun to move, in this example in the upward direction indicated by the arrow.

Further, it is noted that in FIG. 7R, the input satisfies intensity input criteria including that the input satisfies the second intensity threshold $I_M$, and as a result the preview gesture recognizer (P) has transitioned to the Began state (see FIG. 7G) or Changed state (see FIGS. 7H and 7R).

FIG. 7S, which shows movement of the input and its corresponding focus selector 707 from the position shown in FIG. 7R to the position shown in FIG. 7S. Despite this movement of the input, which can be assumed for purposes of this discussion to be movement across the touch-sensitive surface by more than the predefined distance, the reveal gesture recognizer (R) and the preview gesture recognizer (P) remain in the Changed state, the commit gesture recognizer (C) remains in the Possible state and the pan gesture recognizer (S) remains in the Failed state. In some embodiments, the reason that the pan gesture recognizer (S) remains in the Failed state is that once a gesture recognizer transitions to the Failed state, it cannot transition to any other state, such as the Recognized state or Began State, until the user input ceases (i.e., until the user lifts their finger or stylus or other instrument off the touch-sensitive surface).

In some embodiments, in conjunction with displaying preview area 712 (e.g., in response to displaying preview area 712), a (new) second pan gesture recognizer is initiated for preview area 712. Thus, in such embodiments, although the pan gesture recognizer (S) is in the Failed state, preview area 712 responds to a pan gesture (e.g., preview area 712 is moved across display 650 in accordance with the pan gesture, using the second pan gesture recognizer, independent of mail application user interface 706 such that mail application user interface 706 remains stationary while preview area 712 is moved across display 650, which is different from the scroll operation associated with the pan gesture recognizer (S) as shown in FIGS. 7O-7P).

FIG. 7T is similar to FIG. 7A, except that the tap gesture recognizer (T) has been replaced by a long press gesture recognizer (L), and focus selector 709 has replaced focus selector 705. The intensity of the input corresponding to focus selector 709 does not satisfy (e.g., is below) the first intensity threshold $I_L$, and the amount of time that has elapsed since the initial contact of the input with the touch-sensitive surface is less than a first predefined time period corresponding to time 7116.

FIG. 7U shows that the input has remained in contact with the touch-sensitive surface for the first predefined time period, corresponding to time 7116, and has remained at an intensity that does not satisfy (e.g., is below) the first intensity threshold $I_L$. In some embodiments, as shown in FIG. 7U, in accordance with a determination that the input satisfies long press criteria including that the input remains below the first intensity threshold during the first predefined time period, the long press gesture recognizer transitions to the Began state, and the reveal gesture recognizer (R), the preview gesture recognizer (P) and the commit gesture recognizer (C) transition to the Failed state.

Furthermore, in some embodiments, as shown in FIG. 7U, in accordance with the determination that the input satisfies long press criteria including that the input remains below the first intensity threshold during the first predefined time period, a second operation is performed. In the example shown in FIG. 7U, the second operation includes displaying a menu 716 of items related to the object 708 corresponding to a current position of the focus selector 709.

FIG. 7V shows a change in user interface 706 from the view shown in FIG. 7T, in response to an input that satisfies intensity input criteria, including that the input satisfies a first intensity threshold (e.g., $I_L$) during a first predefined time period (e.g., the time period ending at time 7116). As shown in FIG. 7V, intensity of the input has increased above the first intensity threshold $I_L$. In response, the reveal gesture recognizer (R) transitions from the Possible state, as shown in FIG. 7T, to the Began state, as shown in FIG. 7V. In some embodiments, in response to the input satisfying intensity input criteria including that the input satisfies the first intensity threshold, a first operation is performed. In this example, the first operation includes blurring user interface 706, or transitioning user interface 706 to a blur state, excluding the user interface object 708 corresponding to the position of the user input, which is not blurred.

FIG. 7W shows a change in user interface 706 from the view shown in FIG. 7V, in response to an input that satisfies intensity input criteria, including that the input remains below a second intensity threshold (e.g., $I_M$) during a first predefined time period (e.g., the time period ending at time 7116). In some embodiments, in accordance with a determination that the input satisfies long press criteria including that the input remains below the second intensity threshold during the first predefined time period, a second operation is performed. In the example shown in FIG. 7W, the second operation includes displaying a menu 716 of items related to the object 708 corresponding to a current position of the focus selector 709.

FIG. 7X shows a change in user interface 706 from the view shown in FIG. 7V, in response to an input that satisfies intensity input criteria, including that the input satisfies a second intensity threshold (e.g., $I_M$) during a first predefined time period (e.g., the time period ending at time 7116). In some embodiments, in accordance with a determination that the input satisfies intensity input criteria including that the input satisfies the second intensity threshold during the first predefined time period, a third operation is performed. In the example shown in FIG. 7X, the third operation is displaying a preview 712 of information corresponding to the user interface object 708 over which the focus selector 709 is positioned. Furthermore, in some embodiments, in accordance with a determination that the input satisfies intensity input criteria including that the input satisfies the second intensity threshold during the first predefined time period, the preview gesture recognizer (P) transitions to the Began state and the long press gesture recognizer (L) transitions to the Failed state. In some embodiments, the transition of the preview gesture recognizer (P) transitions to the Began state causes the long press gesture recognizer (L) to transition to the Failed state.

Figure 7Y:
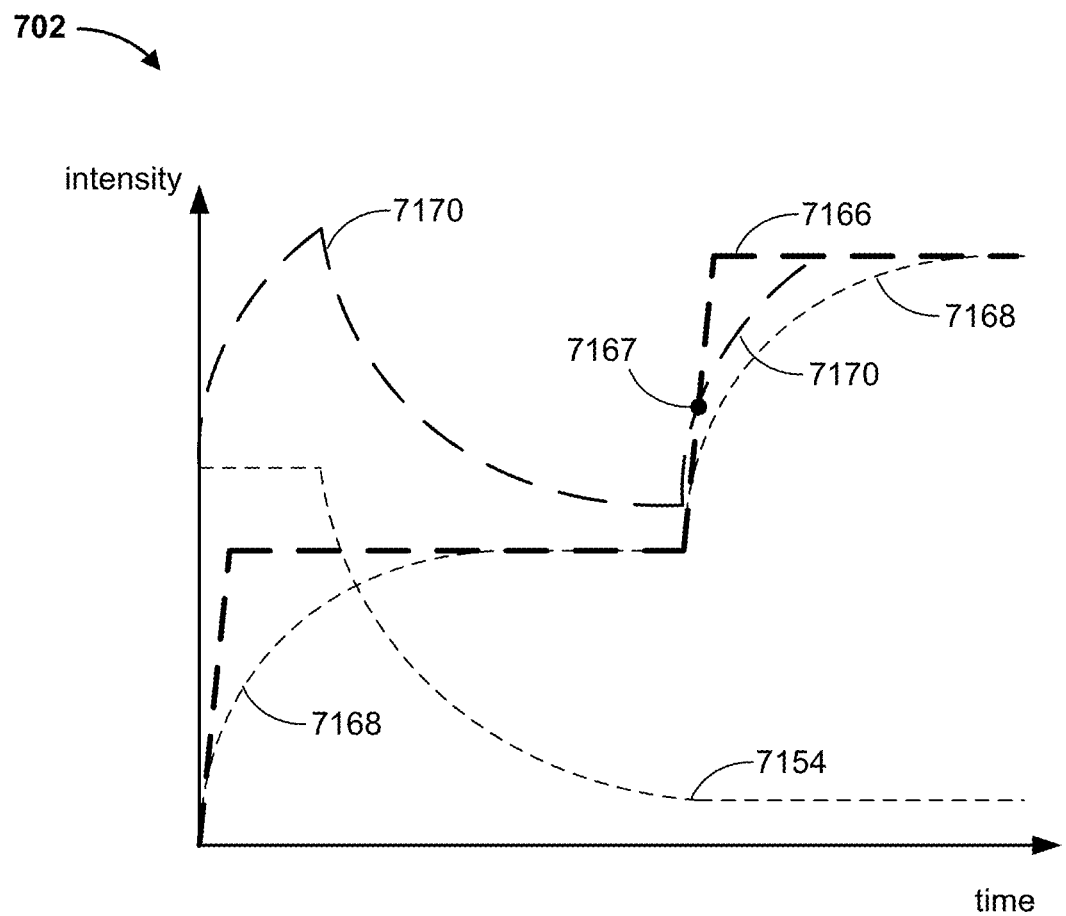
FIGS. 7A-7BBB illustrate exemplary user interfaces for processing touch inputs and associated information in accordance with some embodiments.

FIG. 7Y shows user interface 706 after the long press gesture recognizer has already transitioned to the Failed state, and the input has continued to satisfy a first (or second) intensity threshold during the first predefined time period (e.g., the time period ending at time 7116).

Despite the continuation of the input through the first predefined time period, the long press gesture recognizer (L) remains in the failed state. Further, in this example, the reveal gesture recognizer (R) remains in the Changed state, the preview gesture recognizer (P) transitions to the Changed state, and the commit gesture recognizer (C) remains in the Possible state. In some embodiments, the reason that the long press gesture recognizer (L) remains in the Failed state is that once a gesture recognizer transitions to the Failed state, it cannot transition to any other state, such as the Recognized state or Began State, until the user input ceases (i.e., until the user lifts their finger or stylus or other instrument off the touch-sensitive surface).

Figure 7Z:
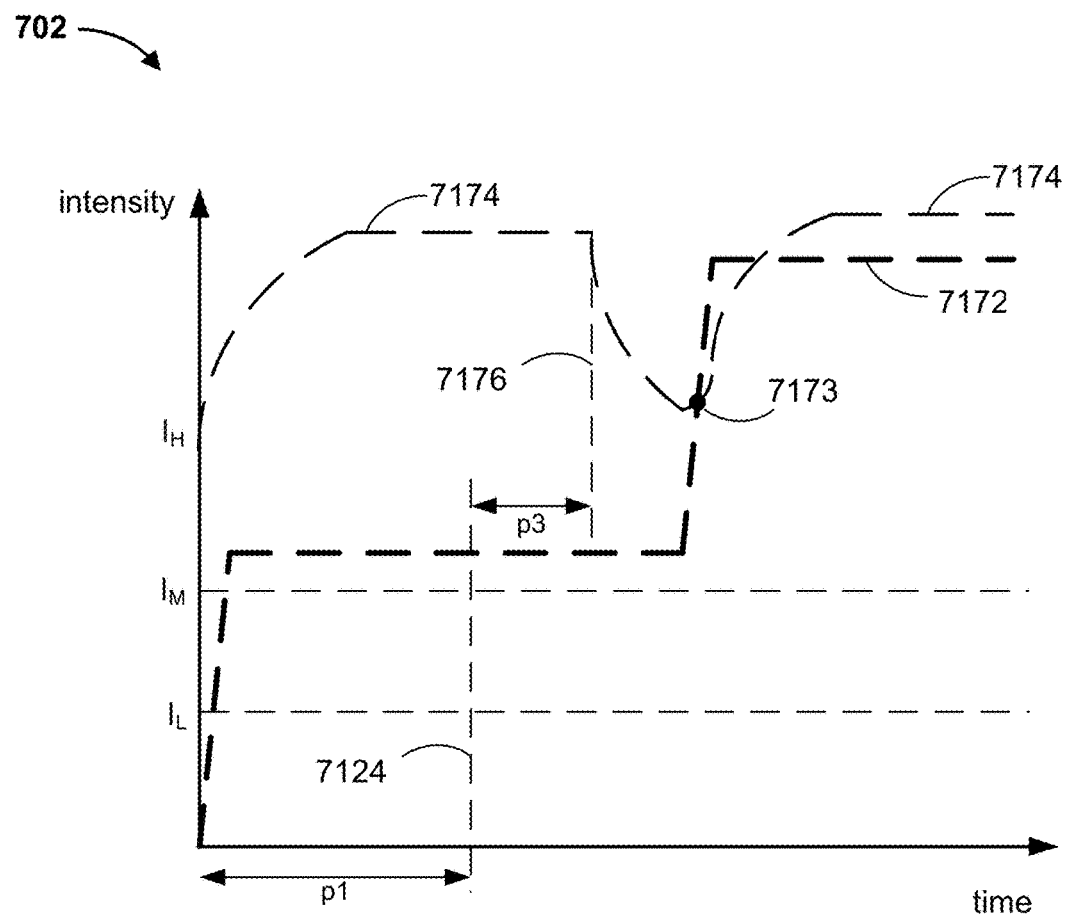
Figure 8A:
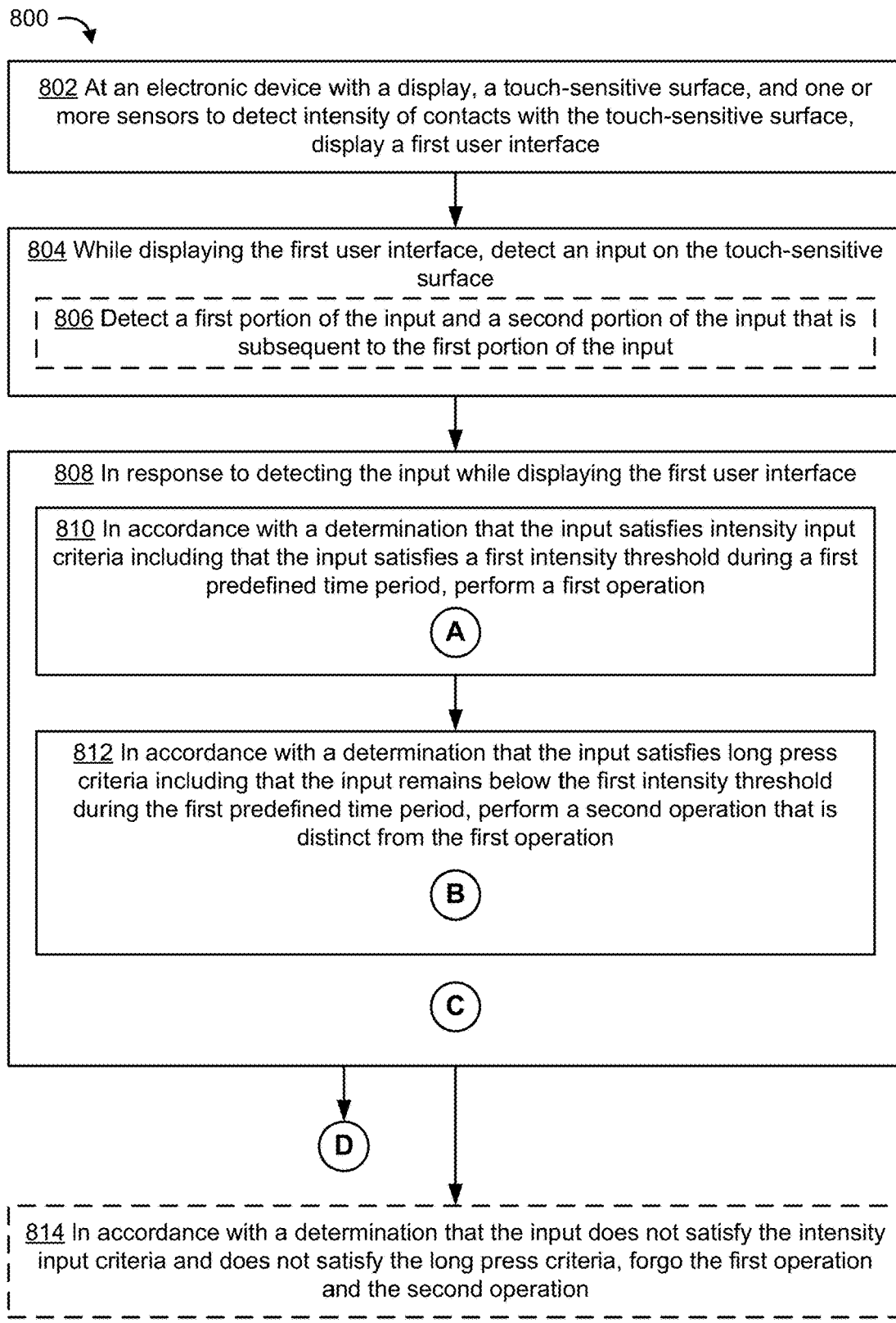
Figure 8D:
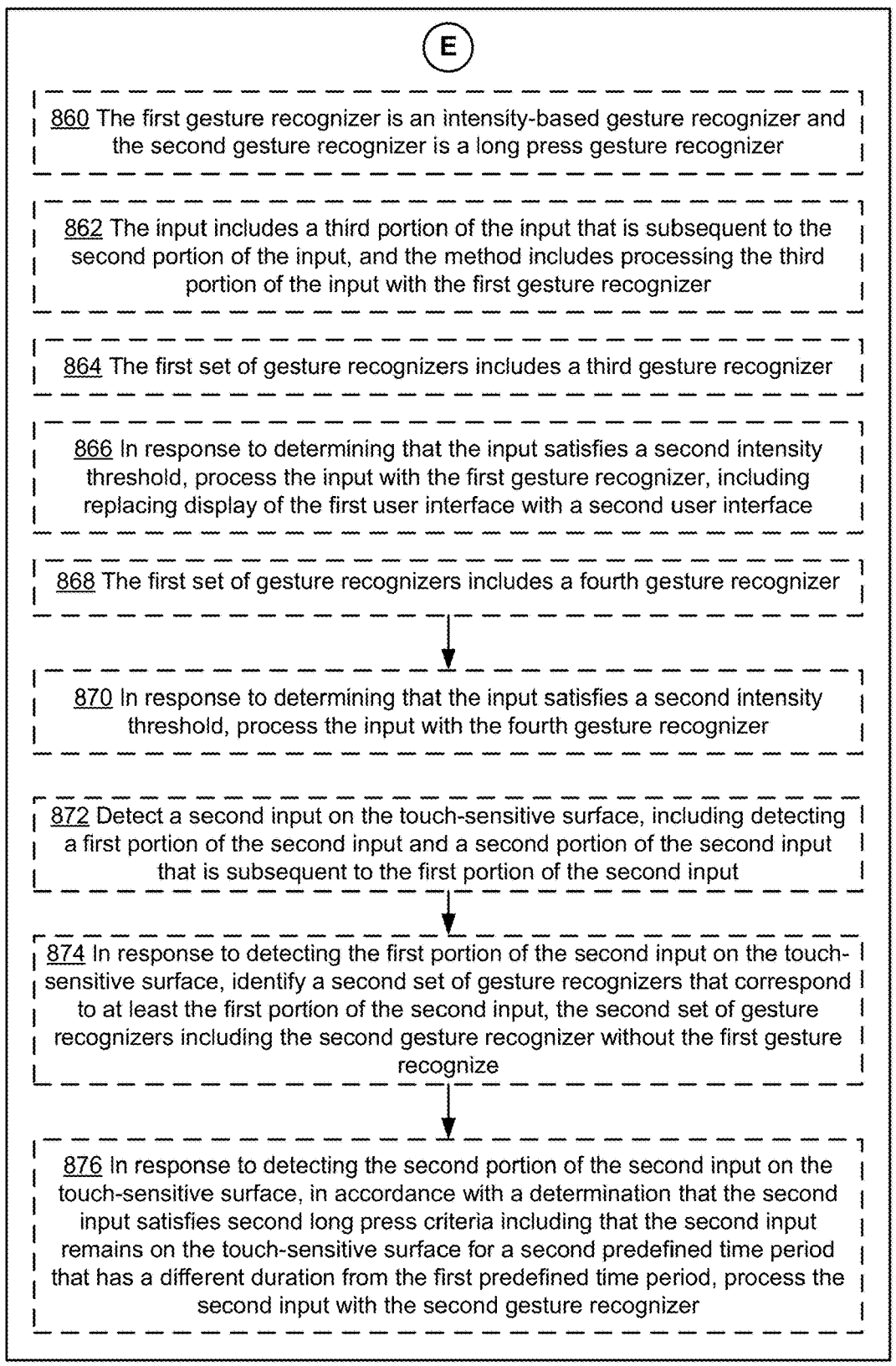
Figure 8E:
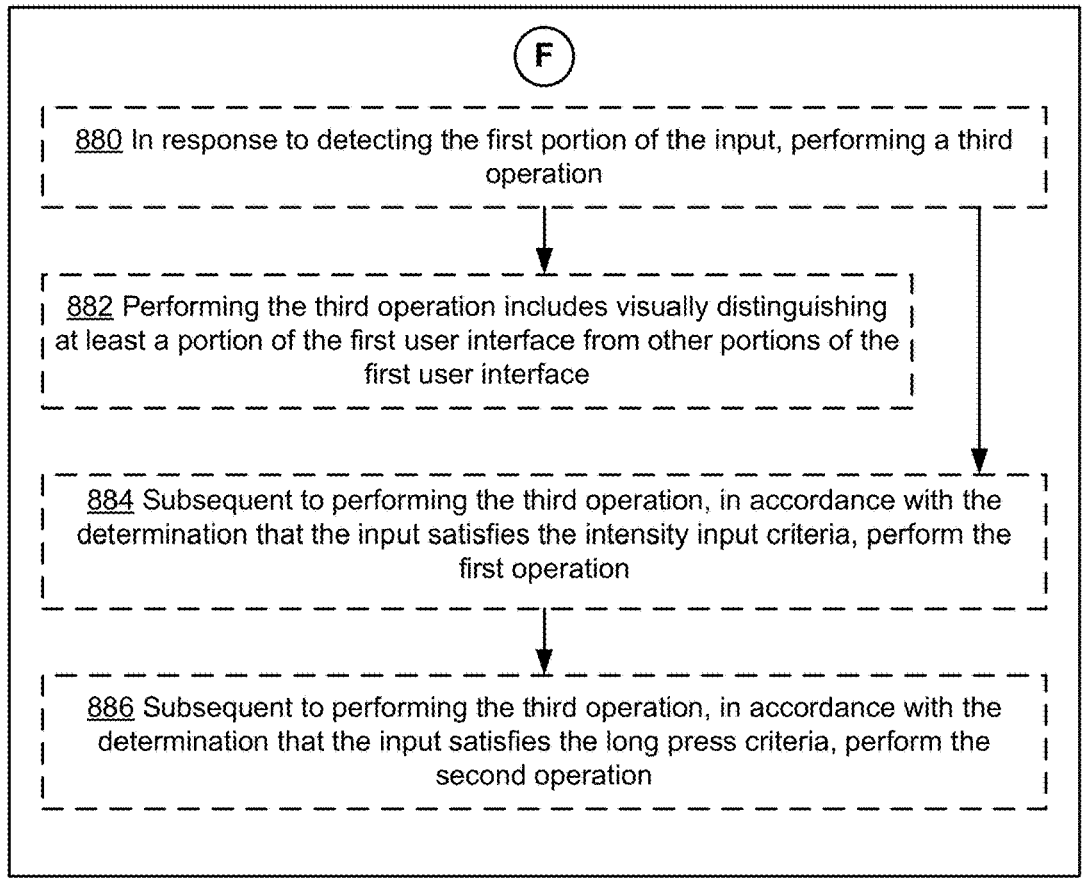
Figure 9A:
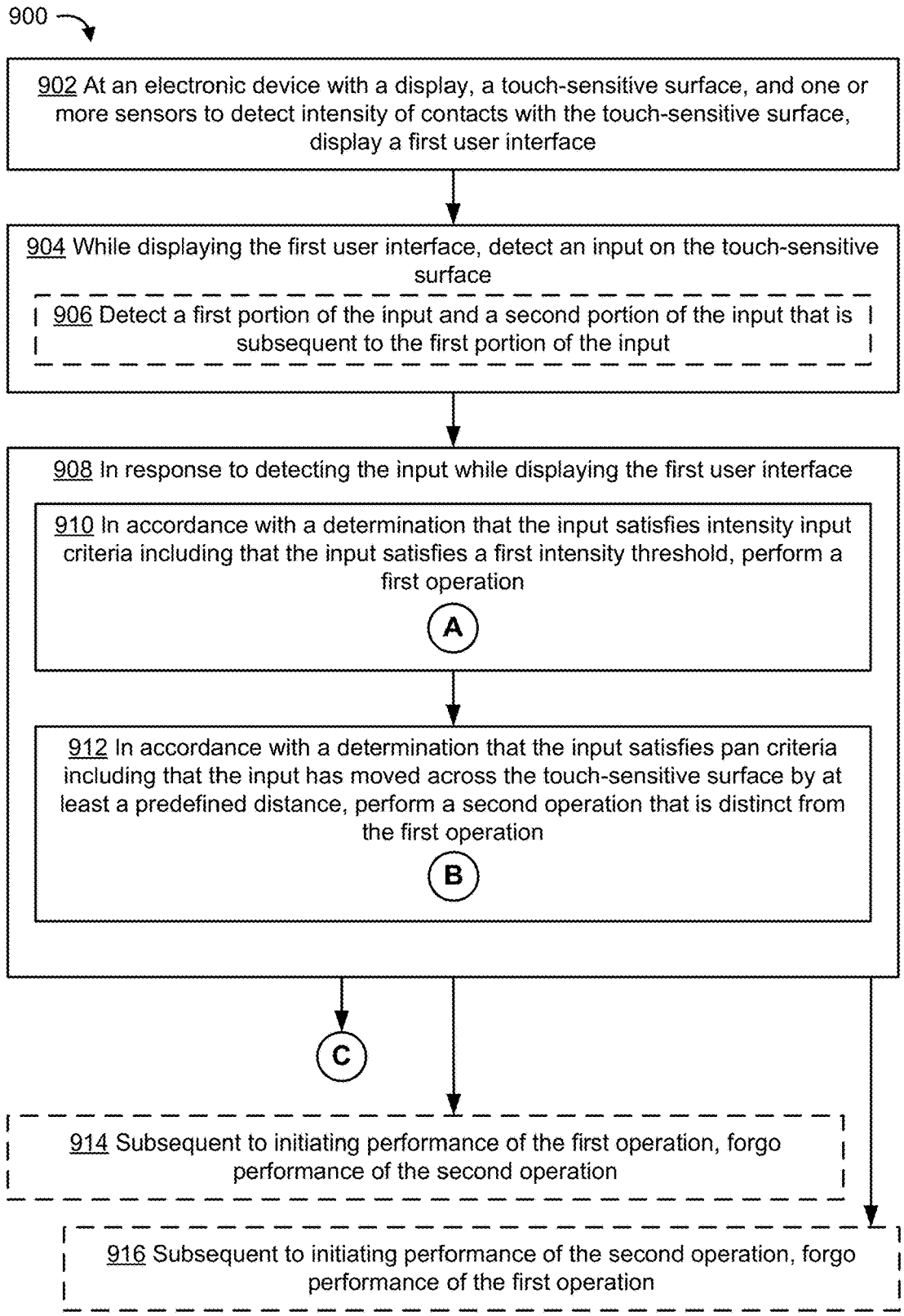
Figure 9C:
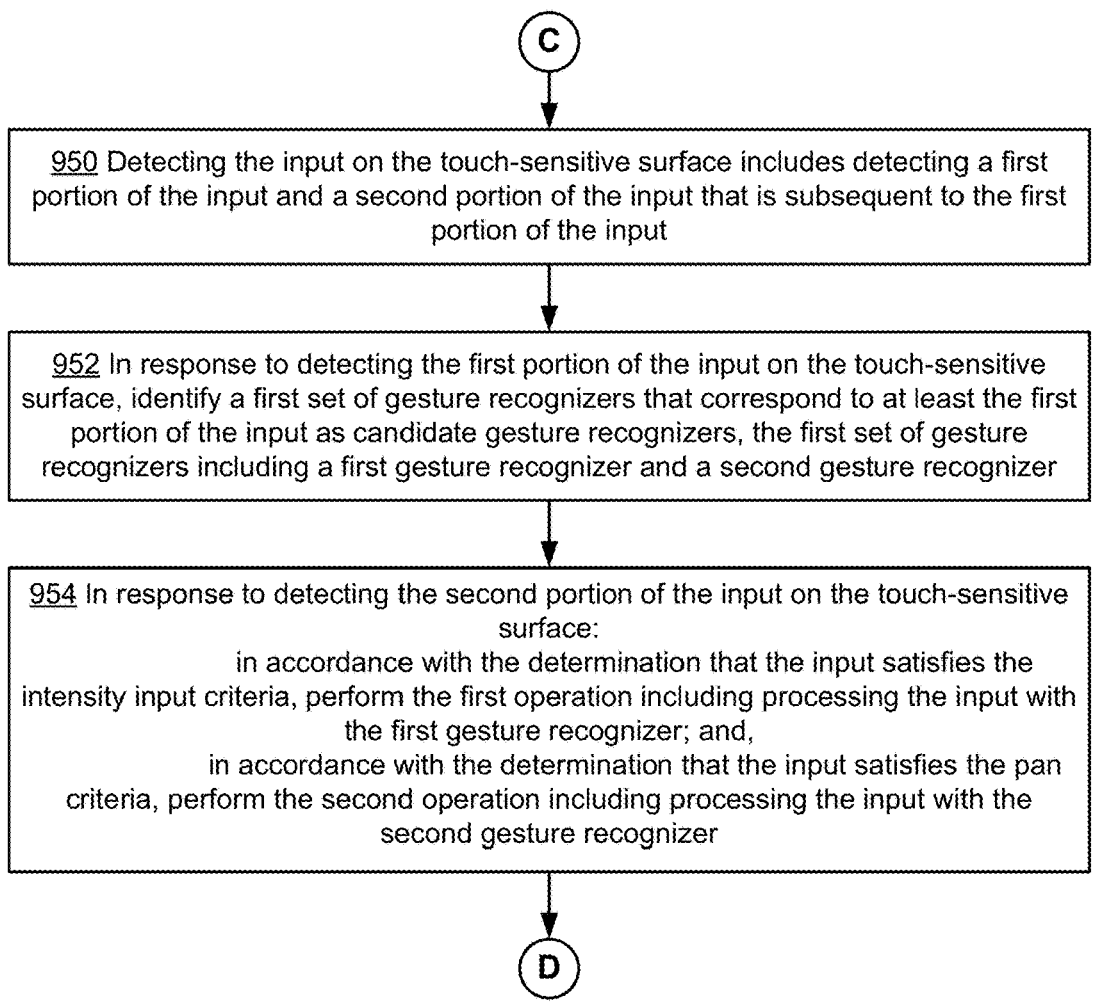
Figure 9D:
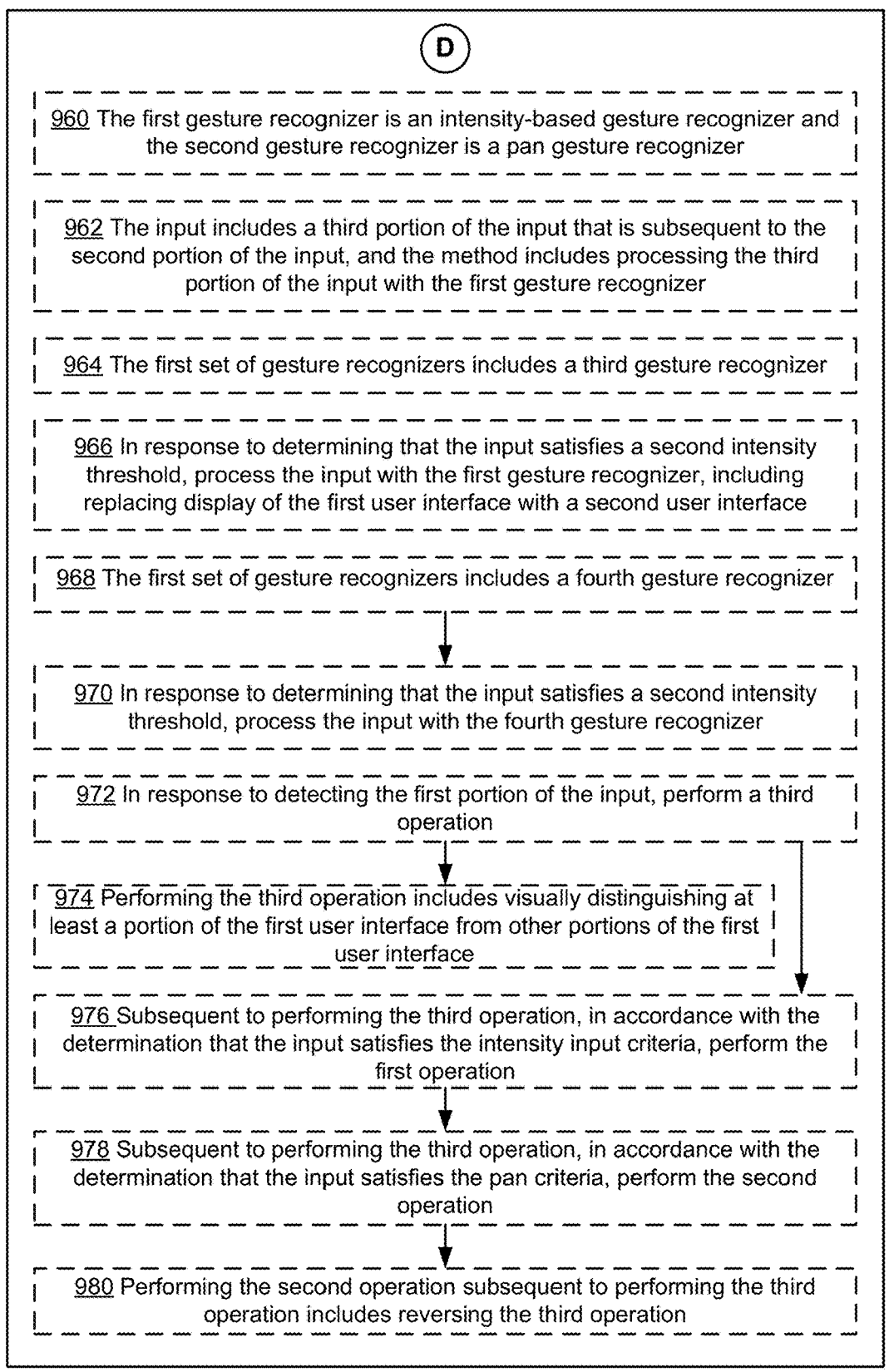
Figure 10A:
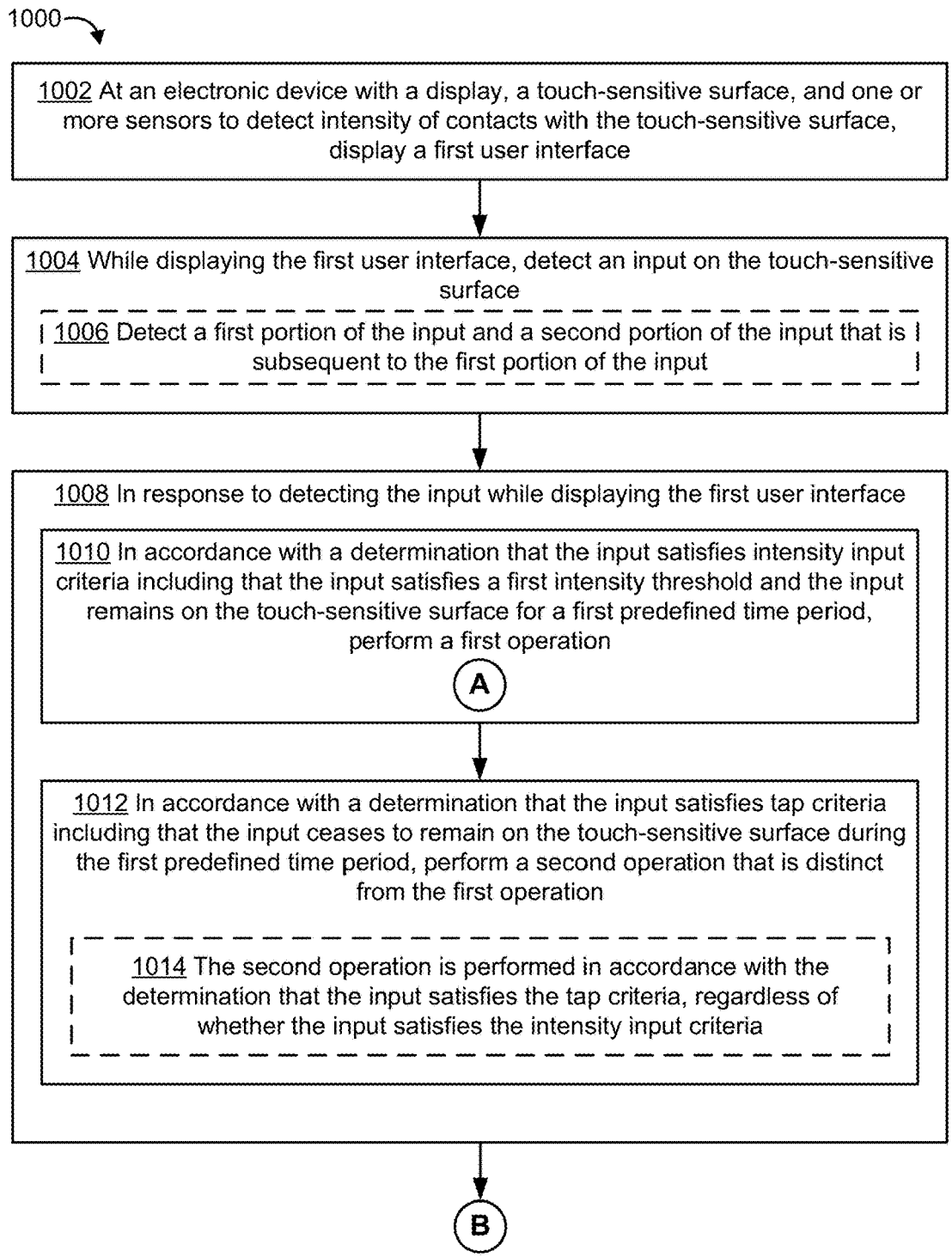
Figure 10C:
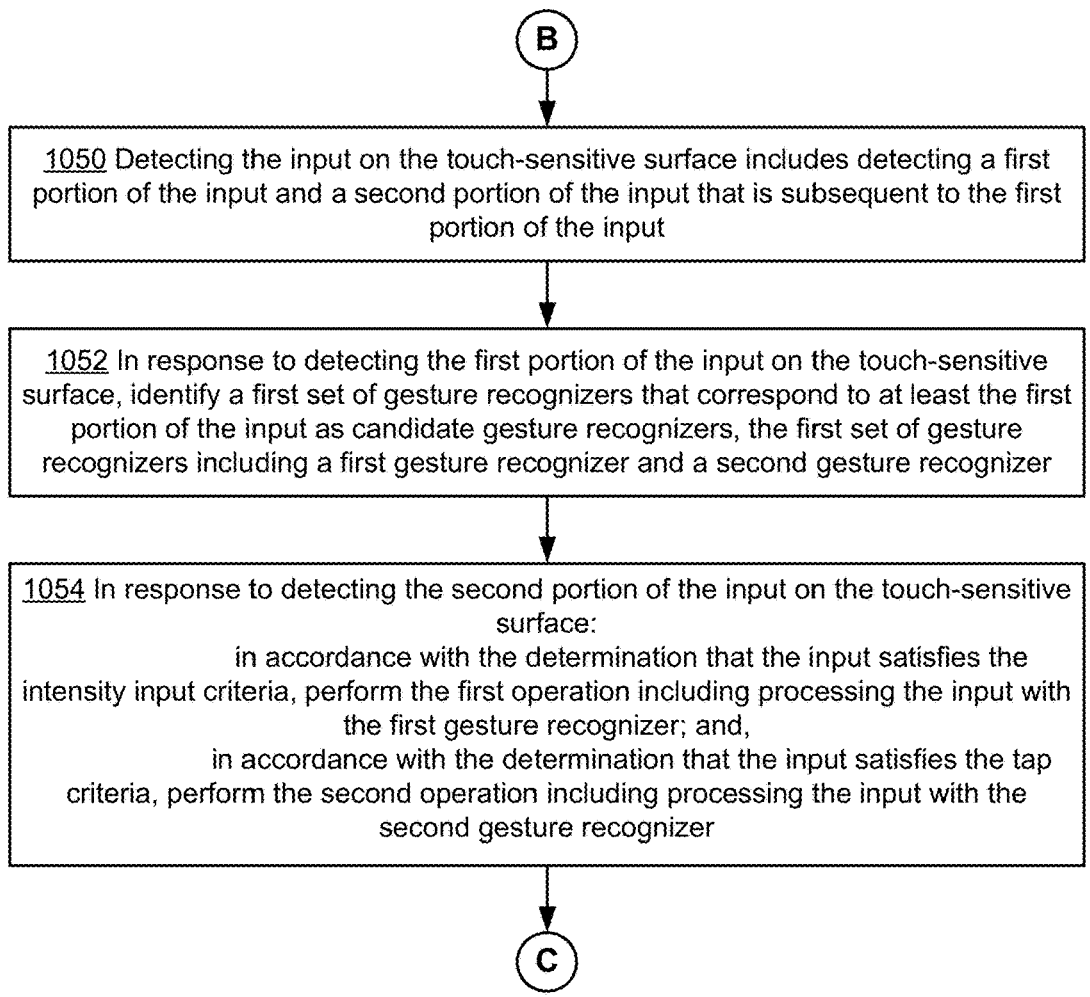

FIG. 7Z shows a change in user interface 706 from the view shown in FIG. 7T, in response to an input that fails to satisfy a first intensity threshold during a first predefined time period (e.g., the time period ending at time 7116), and ceases to remain on the touch-sensitive surface during the first predefined time period. In response to the input that fails to satisfy a first intensity threshold during a first predefined time period, and ceases to remain on the touch-sensitive surface during the first predefined time period, the reveal gesture recognizer (R), the preview gesture recognizer (P), the commit gesture recognizer (C), and the long press gesture recognizer (L) all transition to the Failed state.

FIG. 7AA shows a view of user interface 706 similar to the view shown in FIG. 7L, except that the pan gesture recognizer (S) has been replaced by the long press gesture recognizer (L), and focus selector 707 has been replaced by focus selector 709. FIG. 7AA, like FIG. 7L, shows an input movement limit zone or input movement limit perimeter 714, shown as a dashed line circle or other shape surrounding focus selector 709. Typically, input movement limit perimeter 714 is not actually displayed, and instead input movement limit perimeter 714 represents an input movement limit utilized by one or more of the gesture recognizers.

FIG. 7BB shows a change in user interface 706 from the view shown in FIG. 7AA. When the input corresponding to focus selector 709 moves from the position shown in FIG. 7AA to the position shown in FIG. 7BB, the input has moved across the touch-sensitive surface by at least a predefined distance, as reflected by focus selector 709 having moved at least partially past input movement limit perimeter 714. As a result, the graphical user interface 706 pans or scrolls by an amount corresponding to the distance moved by the input on the touch-sensitive surface. More generally, in response to the input moving across the touch-sensitive surface by at least the predefined distance, a second operation is performed. In some embodiments, the second operation includes scrolling at least a portion of the user interface.

Further, as shown in FIG. 7AA, in response to the input moving across the touch-sensitive surface by at least the predefined distance, the reveal gesture recognizer (R), the preview gesture recognizer (P), the commit gesture recognizer (C) and the long press gesture recognizer (L) all transition to the Failed state.

FIG. 7CC shows a change in user interface 706 from the view shown in FIG. 7BB. In FIG. 7CC, after the preview gesture recognizer (P), the commit gesture recognizer (C) and the long press gesture recognizer (L) have all transitioned to the Failed state, the intensity of the input either increases so as to satisfy the first predefined threshold $I_L$ or even the first predefined threshold $I_M$, as indicated by intensity profile 7118, or the input remains in contact with the touch sensitive screen, but below the first intensity threshold, during the first predefined time period (e.g., the time period ending at time 7116), as indicated by intensity profile 7120. In either circumstance, the reveal gesture recognizer (R), the preview gesture recognizer (P), the commit gesture recognizer (C) and the long press gesture recognizer (L) all remain in the Failed state. In some embodiments, the reason that reveal gesture recognizer (R), the preview gesture recognizer (P), the commit gesture recognizer (C) and the long press gesture recognizer (L) all remain in the Failed state is that once a gesture recognizer transitions to the Failed state, it cannot transition to any other state, such as the Recognized state or Began State, until the user input ceases (i.e., until the user lifts their finger or stylus or other instrument off the touch-sensitive surface).

FIG. 7DD shows a view of user interface 706 similar to the view shown in FIG. 7T, except that the pan gesture recognizer (S) has been replaced by the tap gesture recognizer (T), and focus selector 711 is located on email address 718. When the long press gesture recognizer (L) is used without a pan gesture recognizer (S) (e.g., the long press gesture recognizer (L) is the only gesture recognizer associated with the email address, or the long press gesture recognizer (L) and one or more other gesture recognizers, other than the pan gesture recognizer (S), are associated with the email address), a time period ending at time 7122 is used instead of a time period ending at time 7116, in determining whether the long press gesture recognizer (L) should transition to another state, such as the Began state.

In FIG. 7EE, in accordance with the determination that the input remains on the touch-sensitive surface during the time period ending at time 7122, a predefined operation of displaying menu 716 of items related to object 718 is performed regardless of whether the input remains on the touch-sensitive surface for the entire duration of the time period ending at time 7116.

FIG. 7FF shows that intensity 7204 of the input corresponding to focus selector 713 is detected and sent to application-independent module 220. In response to receiving intensity 7204, application-independent module 7220 sends one or more event objects 194 to application-specific module 230.

Event object 194 includes characteristic intensity 7206 that is based on detected intensity 7204. In some embodiments, event object 194 also includes reference intensity 7208. For example, in some embodiments, characteristic intensity 7206 is a normalized intensity value that corresponds to detected intensity 7204 divided by reference intensity 7208. In some embodiments, reference intensity 7208 corresponds to a maximum intensity that can be detected by the one or more intensity sensors. In some embodiments, reference intensity 7208 is a predefined intensity level for normalizing detected intensity 7204. Characteristic intensity 7206 typically has a range between 0 and 1. Because application-specific module 230 receives characteristic intensity 7206 instead of detected intensity 7204, application-specific module 230 is configured to receive and respond to intensity information that is independent from variations among intensity sensors. Thus, application-specific module 230 does not need to include instructions for handling variations among intensity sensors, and therefore, the size of the application-specific module 230 is reduced, and the performance of the application-specific module 230 is improved.

In some embodiments, when sensitivity 7210 is set, characteristic intensity 7206 is multiplied by sensitivity value 7210. In some embodiments, sensitivity 7210 has a default value of 1. However, for example, when sensitivity 7210 has a value of 2, characteristic intensity 7206 is doubled.

In FIG. 7GG, an exemplary settings user interface is shown on display 650. The settings user interface shown in FIG. 7GG includes area 720 with multiple intensity settings (e.g., low, medium, and high intensity settings). User input intensity graph 702 in FIG. 7GG shows that characteristic intensity 7304, which follows detected intensity 7302, is used when the low sensitivity setting is selected. To facilitate the comparison of intensity values, a reference intensity of 1 is used for user input intensity graph 702 in FIG. 7GG. When the medium setting is selected, characteristic intensity 7306, which has a higher intensity value than characteristic intensity 7304 (e.g., characteristic intensity 7306 is two times characteristic intensity 7304), is used; and, when the high setting is selected, characteristic intensity 7308, which has a higher intensity value than characteristic intensity 7306 (e.g., characteristic intensity 7308 is three times characteristic intensity 7304), is used.

FIG. 7HH is similar to FIG. 7GG, except that the settings user interface includes area 722 with a plurality of intensity setting options (e.g., more than three levels of intensity setting options). Although there are more than three levels of intensity setting options, user input intensity graph 702 in FIG. 7HH shows three levels of characteristic intensity lines (e.g., 7304, 7306, and 7308) so as not to obscure the understanding of user input intensity graph 702.

FIG. 7II shows that multiple focus selectors (e.g., 715 and 717) are concurrently detected, and intensities of respective focus selectors are separately determined. Application-independent module 220 receives intensity 7204 of focus selector 715 and intensity 7212 of focus selector 717, and sends respective event objects 194 and 7194 to application-specific module 230. Event object 194 corresponds to focus selector 715 and includes characteristic intensity 7206 of focus selector 715 as well as reference intensity 7208. The same reference intensity 7208 is used to normalize intensities of multiple touches. Thus, event object 7194, corresponding to focus selector 717, also includes the same reference intensity 7208 as well as characteristic intensity 7214 of focus selector 717 in event object 194.

FIG. 7JJ shows a depinch gesture by focus selectors 715 and 717 on mail application user interface 706. In FIG. 7JJ, state machines 704 for gesture recognizers show that mail application user interface 706 is associated with two pinch gesture recognizers: a first pinch gesture recognizer ($N_1$) for which a first intensity threshold (e.g., $I_1$) is specified (e.g., by e-mail client module 140 in FIG. 1A) and a second pinch gesture recognizer ($N_2$) for which an intensity threshold is not specified (e.g., by e-mail client module 140 in FIG. 1A).

User input intensity graph 702 in FIG. 7KK shows that the pinch or depinch gesture by focus selectors 715 and 717 satisfies the intensity threshold $I_1$. In response, the first pinch gesture recognizer ($N_1$) transitions to the Recognized state and a corresponding operation (e.g., displaying mail application user interface 724, showing an inbox view) is performed. In addition, the second pinch gesture recognizer ($N_2$) transitions to the Failed state (e.g., because the first pinch gesture recognizer ($N_1$) has transitioned to the Recognized state).

User input intensity graph 702 in FIG. 7LL shows a case in which the pinch or depinch gesture by focus selectors 715 and 717 does not satisfy the intensity threshold $I_1$. In response, the second pinch gesture recognizer ($N_2$) transitions to the Recognized state and a corresponding operation (e.g., displaying a zoomed-in view) is performed. In addition, the first pinch gesture recognizer ($N_1$) transitions to the Failed state (e.g., because the second pinch gesture recognizer ($N_2$) has transitioned to the Recognized state).

In FIG. 7MM, state machines 704 show that mail application user interface 706 is associated with the two pinch gesture recognizers ($N_1$) and ($N_2$), and a two-finger pan gesture recognizer (2S) for which a second intensity threshold (e.g., $I_2$) is specified (e.g., by e-mail client module 140 in FIG. 1A). FIG. 7MM also shows a two-finger pan gesture by focus selectors 719 and 721 on mail application user interface 706.

User input intensity diagram 702 in FIG. 7NN shows that the two-finger pan gesture satisfies the second intensity threshold. The two-finger pan gesture recognizer (2S) transitions to the Began state, and a corresponding operation (e.g., overlaying review window 726 showing a review of the linked website on mail application user interface 706) is performed. The first pinch gesture recognizer ($N_1$) and the second pinch gesture recognizer ($N_2$) transition to the Failed state (e.g., because the two-finger pan gesture recognizer (2S) has transitioned to the Recognized state).

FIG. 7OO shows browser application user interface 710 and a depinch gesture by focus selectors 723 and 725 on an address window of browser application user interface 710. State machines 704 for gesture recognizers in FIG. 7OO show that the address window of browser application user interface 710 is associated with a third pinch gesture recognizer ($N_3$) for which a third intensity threshold (e.g., $I_3$) is specified (e.g., by browser module 147 in FIG. 1A). User input intensity graph 702 in FIG. 7OO shows that the intensity of focus selectors 723 and 725 satisfy the third intensity threshold $I_3$, and the third pinch gesture recognizer ($N_3$) has transitioned to the Began state. The first pinch gesture recognizer ($N_1$) and the second pinch gesture recognizer ($N_2$) remain in the Possible state, because the third pinch gesture recognizer (N3) is not associated with the view, which corresponds to the first pinch gesture recognizer ($N_1$) and the second pinch gesture recognizer ($N_2$).

FIG. 7PP shows that focus selectors 723 and 725 cease to be detected.

However, because focus selectors 723 and 725 have satisfied the third intensity threshold $I_3$, the third pinch gesture recognizer ($N_3$) has transitioned to the Recognized state, and a corresponding operation (e.g., displaying tabs management view 728) is performed.

User input intensity graph 702 in FIG. 7QQ shows a case in which the intensity of focus selectors 723 and 725 does not satisfy the third intensity threshold (e.g., $I_3$). Thus, the third pinch gesture recognizer ($N_3$) transitions to the Failed state, and no action associated with the third pinch gesture recognizer is performed (e.g., tabs management view 728 shown in FIG. 7PP is not displayed).

FIG. 7RR shows focus selector 727 over user interface object 708 of mail application user interface 706.

User input intensity graph 702 in FIG. 7RR shows first timing criteria (e.g., an input needs to remain on the touch-sensitive surface for a period ending at time 7124) and first intensity input criteria (e.g., an input needs to satisfy an intensity threshold $I_L$ at time 7124 or thereafter), both of which need to be satisfied for performing a first predefined operation (e.g., dimming or blurring at least a portion of the user interface to provide a hint of an impending display of a preview window, or alternatively, displaying a preview window).

In FIG. 7RR, an input that follows intensity pattern 7126 satisfies both the first timing criteria (because the input remains on at least for a time period ending at time 7124) and the first intensity input criteria (because the input satisfies the intensity threshold $I_L$ at time 7124). Thus, the first predefined operation (e.g., dimming or blurring at least a portion of the user interface to provide a hint of an impending display of a preview window) is performed at time 7124.

An input that follows intensity pattern 7128 satisfies both the first timing criteria (because the input remains on at least for a time period ending at time 7124) and the first intensity input criteria (because intensity of the input increases and satisfies the intensity threshold $I_L$ after time 7124). Thus, the first predefined operation (e.g., dimming or blurring at least a portion of the user interface to provide a hint of an impending display of a preview window) is performed when intensity of the input satisfies the intensity threshold $I_L$.

An input that follows intensity pattern 7130 does not satisfy the first intensity input criteria, because intensity of the input does not satisfy the intensity threshold $I_L$ at any time. Although the first timing criteria are satisfied (because the input remains on the touch-sensitive surface at least for a period ending at time 7124), the first predefined operation (e.g., dimming or blurring at least a portion of the user interface to provide a hint of an impending display of a preview window) is not performed.

For an input that follows intensity pattern 7131 or intensity pattern 7132, although its input satisfies the intensity threshold $I_L$, the input does not satisfy the first intensity input criteria, because intensity of the input does not satisfy the intensity threshold $I_L$ at or subsequent to time 7124. The first timing criteria are not satisfied, because the input does not remain on the touch-sensitive surface at least for a period ending at time 7124. Thus, the first predefined operation (e.g., dimming or blurring at least a portion of the user interface to provide a hint of an impending display of a preview window) is not performed.

In some embodiments, because the input following intensity pattern 7132 is released before time 7134, a different operation (e.g., a tap gesture operation) is performed if the different operation is associated with user interface object 708. However, the input following intensity pattern 7131 is released after time 7134, the tap gesture operation is not performed in response to the input following intensity pattern 7131. In some embodiments, time 7134 corresponds to time 7002 shown in FIG. 7B.

FIG. 7SS shows mail application user interface 706, which is at least partially dimmed or blurred. In some embodiments, the partial dimming or blurring provides a visual cue indicating that a further increase in intensity of the input will initiate display of a preview window.

User input intensity graph 702 in FIG. 7TT shows second timing criteria (e.g., an input needs to remain on the touch-sensitive surface for a period ending at time 7136) and second intensity input criteria (e.g., an input needs to satisfy an intensity threshold $I_M$ at time 7136 or thereafter), both of which need to be satisfied for performing a second predefined operation (e.g., displaying a preview window). In some embodiments, time 7136 is distinct from time 7124, as shown in FIG. 7TT. In some embodiments, time 7136 and time 7124 are identical.

An input that follows intensity pattern 7128 satisfies both the second timing criteria (because the input remains on the touch-sensitive surface at least for a time period ending at time 7136) and the second intensity input criteria (because intensity of the input increases and satisfies the intensity threshold $I_M$ after time 7136). Thus, the second predefined operation (e.g., displaying preview window 712) is performed when intensity of the input satisfies the intensity threshold $I_M$.

An input that follows intensity pattern 7138 satisfies both the second timing criteria (because the input remains on the touch-sensitive surface at least for a time period ending at time 7136) and the second intensity input criteria (because the input satisfies the intensity threshold $I_M$ at time 7136). Thus, the second predefined operation (e.g., displaying a preview window 712) is performed at time 7136.

However, an input that follows intensity pattern 7140 does not satisfy the second intensity input criteria, because the input does not satisfy the intensity threshold $I_M$ at any time. Although the input satisfies the second timing criteria (e.g., the input remains on the touch-sensitive surface for a time period ending at time 7136), because the second intensity input criteria are not satisfied, the second predefined operation (e.g., displaying a preview window 712) is not performed.

An input that follows intensity pattern 7142 does not satisfy the second intensity input criteria. Although intensity of the input temporarily satisfies the intensity threshold $I_M$, the intensity of the input decreases below the intensity threshold $I_M$ before time 7136. Because the input does not satisfy the intensity threshold $I_M$ at time 7136 or thereafter, the second intensity input criteria are not satisfied. Although the input satisfies the second timing criteria (e.g., the input remains on the touch-sensitive surface for a time period ending at time 7136), because the second intensity input criteria are not satisfied, the second predefined operation (e.g., displaying a preview window 712) is not performed.

User input intensity graph 702 in FIG. 7UU shows that, in some embodiments, when intensity of the input decreases below a reference intensity $I_R$, the timing criteria are reset (e.g., instead of starting the time period from when the initial contact is detected, the time period restarts from when the intensity of the input decreases below the reference intensity). For example, in FIG. 7UU, the input remains on the touch-sensitive surface for a time period ending at time 7124 and the intensity of the input at time 7124 satisfies the intensity threshold $I_L$. However, the first predefined operation is not performed at time 7124, because the first timing criteria are reset when the intensity of the input falls below the reference intensity $I_R$ at time 7146. The first timing criteria are satisfied after the input remains on the touch-sensitive surface for time period $p_1$ ending at time 7148, and the first intensity input criteria are satisfied at time 7148, because the input satisfies the intensity threshold $I_L$ at time 7148. Thus, the first predefined operation (e.g., dimming or blurring at least a portion of the user interface to provide a hint of an impending display of a preview window) is performed at time 7148.

In some embodiments, the reference intensity $I_R$ is determined by using a representative intensity (e.g., a peak intensity) of the input and an intensity margin $I_{margin}$. For example, the reference intensity corresponds to the intensity margin $I_{margin}$ below the representative intensity (e.g., the peak intensity) of the input.

User input intensity graph 702 in FIG. 7VV shows that when intensity of the input decreases below a first reference intensity $I_{R1}$, which corresponds to the intensity margin $I_{margin}$ below the representative intensity (e.g., the peak intensity) of the input. In some embodiments, when the intensity of the input decreases below the first reference intensity $I_{R1}$, the first timing criteria are reset and a new (second) reference intensity $I_{R2}$ is determined so that the second reference intensity $I_{R2}$ corresponds to the intensity margin $I_{margin}$ below the first reference intensity $I_{R1}$. When the intensity of the input decreases even below the second reference intensity $I_{R2}$ at time 7150, the first timing criteria are again reset, and the first time period p1 ends at time 7152. The first timing criteria are satisfied, because the input remains on the touch-sensitive surface through the end of first time period p1 at time 7152, and the first intensity input criteria are satisfied, because the input satisfies the intensity threshold $I_L$ at the end of the first time period p1 at time 7152. Thus, the first predefined operation (e.g., dimming or blurring at least a portion of the user interface to provide a hint of an impending display of a preview window) is performed at time 7152.

Although FIGS. 7UU and 7VV illustrate resetting the first timing criteria, in some embodiments, the second timing criteria are reset in an analogous manner. For brevity, such details are omitted herein.

FIG. 7WW shows focus selector 729 over user interface object 708 of mail application user interface 706.

User input intensity graph 702 in FIG. 7WW shows first intensity threshold component 7154 for a predefined operation (e.g., replacing display of mail application user interface 706 with browser application user interface 710). First intensity threshold component 7154 has initially high value $I_H$ and decays over time, which reduces the chance of immediately performing the predefined operation with an unintentionally strong input during an initial time period. However, this does not prevent the predefined operation completely. If the input has a sufficient intensity, it can still satisfy first intensity threshold component 7154 and initiate the predefined operation. By decaying (e.g., reducing) first intensity threshold component 7154 over time, it becomes easier to perform the predefined operation after the input remains on the touch-sensitive surface for a while.

In FIG. 7WW, an input following intensity pattern 7156 satisfies first intensity threshold component 7154, and initiates performance of the predefined operation (e.g., replacing display of mail application user interface 706 with browser application user interface 710).

An input following intensity pattern 7158 (e.g., a short strong tap gesture) does not satisfy first intensity threshold component 7154, because the intensity of the input quickly drops and the input is released before first intensity threshold component 7154 begins to decay.

In some embodiments, first intensity threshold component 7154 begins to decay immediately from an initial detection of the input. In some embodiments, first intensity threshold component 7154 begins to decay after a predefined time interval p3 from the initial detection of the input, as shown in FIG. 7WW.

User input intensity graph 702 in FIG. 7XX shows that when the intensity of the input falls below the reference intensity $I_R$ at time 7162, first intensity threshold component 7164 begins the decay at time 7162, even before the predefined time interval p3 has elapsed. Thus, in FIG. 7XX, an input following intensity pattern 7160 satisfies first intensity threshold component 7164, and the predefined operation (e.g., replacing display of mail application user interface 706 with browser application user interface 710) is performed.

FIG. 7YY illustrates activation intensity threshold 7170, which is a sum of first intensity threshold component 7154 (described above with respect to FIG. 7WW) and second intensity threshold component 7168. As shown in FIG. 7YY, second intensity threshold component 7168 follows intensity of input 7166 with a delay. Second intensity threshold component 7168 reduces unintentional triggering of the predefined operation due to minor fluctuations in the intensity of input 7166 over time. For example, gradual changes in the intensity of input 7166 are less likely to trigger the predefined operation. In FIG. 7YY, input 7166 satisfies activation intensity threshold 7170 at time 7167, and the predefined operation (e.g., replacing display of mail application user interface 706 with browser application user interface 710) is performed at time 7167.

FIG. 7ZZ illustrates activation intensity threshold 7174, which is similar to activation intensity threshold 7170 (in FIG. 7YY) except that a first intensity threshold component of activation intensity threshold 7174 begins to decay at time 7176, which corresponds to a predefined time interval p3 after time 7124 when the first and second predefined operations are performed. In FIG. 7ZZ, input 7172 satisfies activation intensity threshold 7174 at time 7173, and the predefined operation (e.g., replacing display of mail application user interface 706 with browser application user interface 710) is performed at time 7173.

FIG. 7AAA illustrates activation intensity threshold 7180, which decays over time, while input 7178 satisfies the intensity threshold $I_M$ (and the second predefined operation is performed). The intensity of input 7178 decreases below the intensity threshold $I_M$ and $I_L$, which in some embodiments does not undo the second predefined operation. Because activation intensity threshold 7180 has decayed significantly over time, an increase in the intensity of input 7178 satisfies activation intensity threshold 7180 at time 7179, even though activation intensity threshold 7180 is below the intensity threshold $I_M$.

FIG. 7BBB shows the same activation intensity threshold 7180 and input 7178 shown in FIG. 7AAA. FIG. 7BBB also shows that activation intensity threshold 7180 does not fall below baseline threshold 7182, which reduces unintentional triggering of the predefined operation (e.g., replacing display of mail application user interface 706 with browser application user interface 710).

FIGS. 8A-8E are flow diagrams illustrating method 800 of disambiguating a long press input and a deep press input in accordance with some embodiments. Method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface (e.g., the touch-sensitive surface is a trackpad). Some operations in method 800 are, optionally, combined and/or the order of some operations is, optionally, changed.

As described below, method 800 provides an enhanced way to process touch inputs with instructions. Method 800 improves efficiency in processing touch inputs.

The device displays (802) a first user interface. While displaying the first user interface, the device detects (804) an input on the touch-sensitive surface. Examples of the first user interface and responses to the input on the touch-sensitive surface are described above with reference to FIGS. 7T through 7CC. In some embodiments, the first user interface includes a plurality of user interface objects, the input is detected while a focus selector (e.g., focus selector 709, FIG. 7T) is over a first user interface object (e.g., object 708, FIG. 7T) of the plurality of user interface objects, and the first user interface object is associated with at least a first gesture recognizer (e.g., a preview gesture recognizer) and a second gesture recognizer (e.g., a long press gesture recognizer).

In response to detecting the input (808) while displaying the first user interface, the device performs (810) a first operation (e.g., blurring a user interface, as shown in FIGS. 7D and 7V) in accordance with a determination that the input satisfies intensity input criteria including that the input satisfies a first intensity threshold during a first predefined time period. On the other hand, in response to detecting the input (808) while displaying the first user interface, the device performs (812) a second operation (e.g., displaying a menu or menu view 716, FIG. 7U) that is distinct from the first operation in accordance with a determination that the input satisfies long press criteria including that the input remains below the first intensity threshold during the first predefined time period. As noted above, in some embodiments the second operation includes displaying (830) a menu or menu view (e.g., menu view 716, FIG. 7U).

In some embodiments, the intensity input criteria include (840) that the input (while remaining in contact with the touch-sensitive surface) does not move across the touch-sensitive surface by more than a predefined distance (e.g., as discussed above with reference to input movement limit perimeter 714 in FIGS. 7L-7Q, and 7AA-7CC), and the long press criteria include (842) that the contact in the input does not move across the touch-sensitive surface by more than the predefined distance.

In some embodiments, method 800 includes, in accordance with a determination that the input does not satisfy the intensity input criteria and does not satisfy the long press criteria, forgoing (814) the first operation and the second operation.

In some embodiments, detecting (804) the input on the touch-sensitive surface includes detecting (806, 850) a first portion of the input and a second portion of the input that is subsequent to the first portion of the input. Furthermore, in some such embodiments, method 800 includes, in response (852) to detecting the first portion of the input on the touch-sensitive surface (e.g., detecting an initial contact of the input with the touch-sensitive surface), identifying a first set of gesture recognizers that correspond to at least the first portion of the input as candidate gesture recognizers, the first set of gesture recognizers including a first gesture recognizer (e.g., a preview gesture recognizer) and a second gesture recognizer (e.g., a long press gesture recognizer).

Further, in the aforementioned embodiments, in response to detecting the second portion of the input on the touch-sensitive surface, the device performs (854) the first operation, including processing the input with the first gesture recognizer (e.g., the preview gesture recognizer) in accordance with the determination that the input satisfies the intensity input criteria. In some embodiments, the first intensity threshold (e.g., $I_M$ in FIG. 7T) is distinct from an input detection intensity threshold (e.g., $I_L$ in FIG. 7T). In some embodiments, processing of the input with the first gesture recognizer also requires a determination that the second gesture recognizer does not recognize a gesture that corresponds to the input. In some embodiments, processing of the input with the first gesture recognizer also requires a determination that the second gesture recognizer has failed to recognize a gesture that corresponds to the input (i.e., that the second gesture recognizer has transitioned to the Failed state, as discussed above with reference to FIGS. 7X and 7Y).

Further, in the aforementioned embodiments, in response to detecting the second portion of the input on the touch-sensitive surface, the device performs (854) the second operation, including processing the input with the second gesture recognizer (e.g., with the long press gesture recognizer (L), FIGS. 7T-7U) in accordance with the determination that the input satisfies the long press criteria. In some embodiments, processing of the input with the second gesture recognizer also requires a determination that the first gesture recognizer has failed to recognize a gesture that corresponds to the input (e.g., the intensity of the input detected by the one or more sensors does not satisfy the first intensity threshold during the predefined time period). In the example discussed above with respect to FIG. 7U, the preview gesture recognizer has transitioned to the Failed state in accordance with a determination by the device that the intensity of the input detected by the one or more sensors does not satisfy the first intensity threshold (e.g., $I_M$, FIG. 7U) during the predefined time period (e.g., the time period ending at time 7116, FIG. 7U).

As indicated above, in some embodiments the first gesture recognizer (e.g., the preview gesture recognizer) is an intensity-based gesture recognizer and the second gesture recognizer is a long press gesture recognizer (860). In some embodiments, the second gesture recognizer (e.g., the long press gesture recognizer) recognizes a particular type or set of gestures independent of intensity of the input.

In some embodiments or circumstances, the input includes (862) a third portion of the input that is subsequent to the second portion of the input, and method 800 includes processing the third portion of the input with the first gesture recognizer. In some embodiments, in accordance with a determination that the input ceases to satisfy the first intensity threshold, the device displays the preview area at a reduced scale (e.g., reduces the size of the preview area), an example of which is shown in the transition from the user interface of FIG. 7H to the user interface of FIG. 7J (i.e., without transitioning through the user interface of FIG. 7I).

In some embodiments, the first set of gesture recognizers includes (864) a third gesture recognizer, such as a reveal gesture recognizer (e.g., gesture recognizer (R) in FIGS. 7A-7CC).

In some embodiments, in response to determining that the input satisfies (866) a second intensity threshold (e.g., a commit intensity threshold $I_H$ that is higher than the first intensity threshold $I_M$), the method includes, subsequent to performing the first operation, processing the input with the first gesture recognizer, including replacing display of the first user interface (e.g., user interface 706, FIG. 7H) with a second user interface (e.g., user interface 710, FIG. 7I), and ceasing to display the preview area (e.g., preview area 712, FIG. 7H). In some embodiments, the second user interface includes content that was displayed in the preview area.

In some embodiments, the first set of gesture recognizers includes (868) a fourth gesture recognizer (e.g., a commit gesture recognizer (C), as shown in FIGS. 7A-7CC), and method 800 includes, in response to determining (870) that the input satisfies a second intensity threshold (e.g., a commit intensity threshold $I_H$ that is higher than the first intensity threshold $I_M$), processing the input with the fourth gesture recognizer (e.g., the commit gesture recognizer). In some embodiments, processing the input with the fourth gesture recognizer includes replacing display of the first user interface with a second user interface (and ceasing to display the preview area), for example replacing display of user interface 706, FIG. 7H, with user interface 710, FIG. 7I, and ceasing to display preview area 712, FIG. 7H.

In some embodiments, method 800 includes detecting (872) a second input on the touch-sensitive surface, including detecting a first portion of the second input and a second portion of the second input that is subsequent to the first portion of the second input. For example, this may occur while the device is displaying the first user interface or a third user interface that is distinct from the first user interface and the second user interface.

In response to detecting (872) the first portion of the second input on the touch-sensitive surface, the method includes identifying (874) a second set of gesture recognizers that correspond to at least the first portion of the second input, the second set of gesture recognizers including the second gesture recognizer (e.g., the long press gesture recognizer) without the first gesture recognizer (e.g., the preview gesture recognizer). For example, the second input may be positioned over an object for which the first gesture recognizer is not relevant.

Furthermore, in some embodiments, method 800 includes, in response to detecting (876) the second portion of the second input on the touch-sensitive surface, in accordance with a determination that the second input satisfies second long press criteria including that the second input remains on the touch-sensitive surface for a second predefined time period that has a different duration from the first predefined time period (e.g., a longer duration or a shorter duration than the first predefined time period), processing the second input with the second gesture recognizer. For example, in a first user interface in which there is an intensity-based gesture recognizer and a long press gesture recognizer for a same respective object or region, the intensity-based gesture recognizer is given more time to recognize an intensity-based gesture by increasing the delay before the long press gesture recognizer recognizes a long press gesture. In contrast, in a third user interface in which there is an object or user interface region that has a tap/select gesture recognizer and a long press gesture recognizer without an intensity-based gesture recognizer, the tap/select gesture recognizer does not need as much time to recognize a tap/select gesture and thus the delay (i.e., the second predefined time period) before the long press gesture recognizer in third user interface recognizes a long press gesture can be shorter than the delay (i.e., the first predefined time period) required by the long press gesture recognizer for the first user interface before recognizing a long press gesture.

In some embodiments, in response to detecting the first portion of the input, the device performs (880) a third operation. In some embodiments, performing the third operation includes visually distinguishing (882) at least a portion of the first user interface from other portions of the first user interface. For example, the third operation may be blurring the user interface other than an object corresponding to a focus selector, by using a third gesture recognizer (e.g., a reveal gesture recognizer), as shown in FIG. 7V. In some embodiments, if the long press gesture recognizer succeeds after the third operation is performed by the third gesture recognizer, then the third gesture recognizer transitions to the Canceled state and the third operation is reversed (e.g., the blurring is reversed or undone). An example of the latter example is shown in the transition from FIG. 7V to FIG. 7W. On the other hand, if the deep press gesture recognizer (e.g., the preview gesture recognizer) succeeds, then the third operation (the blurring) by the third gesture recognizer (e.g., a reveal gesture recognizer) is canceled, and the first operation (e.g., displaying preview area 712, as shown in FIG. 7X) is performed by the deep press gesture recognizer (e.g., the preview gesture recognizer). In some embodiments, for an object having a reveal gesture recognizer and no long press gesture recognizer, the reveal operation (e.g., the blurring) is not automatically cancelled after the first predefined time period. However, in some such embodiments, for an object having both a reveal gesture recognizer and a long press gesture recognizer, the reveal operation is cancelled when the long press gesture recognizer succeeds.

In some embodiments, method 800 includes performing (884) the first operation (e.g., displaying the preview area) subsequent to performing (880) the third operation (e.g., the blurring) in accordance with the determination that the input satisfies the intensity input criteria (e.g., by reaching or exceeding $I_M$), and performing (886) the second operation (e.g., displaying a menu or menu view, 716, FIG. 7U) in accordance with the determination that the input satisfies the long press criteria. Thus, these determinations and operations are performed while the input remains in contact with the touch-sensitive surface. In some embodiments, while the third gesture recognizer (e.g., a reveal gesture recognizer) is processing inputs (e.g., generating touch events corresponding to the second portion of the input), the first gesture recognizer and the second gesture recognizer are evaluating the second portion of the input to determine whether the input matches gesture recognition criteria for those gesture recognizers. In such embodiments, processing the input with the third gesture recognizer does not block processing the input with the first gesture recognizer and processing the input with the second gesture recognizer.

As mentioned above, in some embodiments, performing the first operation includes (820) displaying a preview area (e.g., preview area 712, FIG. 7H). Furthermore, in some embodiments, performing the second operation includes (830) displaying a menu view (e.g., menu view, 716, FIG. 7U).

In some embodiments, the first intensity threshold is satisfied (822) in response to multiple contacts in the input satisfying the first intensity threshold. For example, in some such embodiments, an intensity of each contact is compared with the first intensity threshold. However, in some other embodiments, the first intensity threshold is satisfied (824) in response to a combination of the intensity applied by a plurality of contacts in the input satisfying the first intensity threshold (e.g., the intensity of multiple contacts is summed or otherwise combined and the resulting combined intensity is compared with the first intensity threshold).

In some embodiments, the first intensity threshold is adjustable (826). For example, in some such embodiments, method 800 includes updating (828) the first gesture recognizer to be activated in response to the intensity of the input satisfying a third intensity threshold that is distinct from the first intensity threshold. In some embodiments, the first intensity threshold is selected from a group of three or more predefined intensity thresholds (e.g., a reveal intensity threshold $I_L$, a preview intensity threshold $I_M$, and a commit intensity threshold $I_H$). In some embodiments, the third intensity threshold is selected from the group of three or more predefined intensity thresholds.

In some embodiments, the first intensity threshold is selected independent of any predefined intensity thresholds. In some embodiments, the first user interface is a user interface of a particular software application, and the first intensity threshold is selected or specified by the particular software application. In some embodiments, the first intensity threshold is a fixed intensity threshold that does not change while the contact is detected on the touch-sensitive surface. However, in some other embodiments, the first intensity threshold is a dynamic intensity threshold that changes over time based on predefined threshold-adjustment policies based on the activity of the user, and/or the condition of the device, and/or other environmental parameters. Adjustable intensity thresholds are discussed in more detail elsewhere in this document.

It should be understood that the particular order in which the operations in FIGS. 8A-8E have been described is merely exemplary and is not intended to indicate that the described order is the only order in which the operations could be performed. One of ordinary skill in the art would recognize various ways to reorder the operations described herein. For example, in some embodiments, a method performed at an electronic device with a touch-sensitive surface, a display, and one or more sensors to detect intensity of contacts with the touch-sensitive surface includes, while displaying a user interface that corresponds to at least a portion of a web page on the display, detecting a touch input on the touch-sensitive surface at a first location that corresponds to the displayed portion of the web page on the display. The method also includes, while detecting the touch input on the touch-sensitive surface, detecting an intensity of the touch input on the touch-sensitive surface (e.g., with the one or more sensors); determining whether the intensity of the touch input on the touch-sensitive surface has changed from below a first intensity threshold (e.g., a low intensity threshold, such as a mouse down intensity threshold) to above the first intensity threshold; and, in response to determining that the intensity of the touch input on the touch-sensitive surface has changed from below the first intensity threshold to above the first intensity threshold, generating a mouse down event (and optionally, processing instructions in the web page that correspond to a mouse down event). The method further includes, subsequent to determining that the intensity of the touch input on the touch-sensitive surface has changed from below the first intensity threshold to above the first intensity threshold, detecting the intensity of the touch input on the touch-sensitive surface; determining whether the intensity of the touch input on the touch-sensitive surface has changed from below a second intensity threshold (e.g., a high intensity threshold, such as a force down intensity threshold) that is distinct from the first intensity threshold to above the second intensity threshold; and, in response to determining that the intensity of the touch input on the touch-sensitive surface has changed from below the second intensity threshold to above the second intensity threshold, generating a force down event that is distinct from the mouse down event. For brevity, these details are not repeated herein.

Additionally, it should be noted that details of other processes described herein with respect to other methods described herein (e.g., methods 900, 1000, 1100, 1200, 1300, 1400, 1500, and 1600) are also applicable in an analogous manner to method 800 described above with respect to FIGS. 8A-8E. For example, the touch inputs, user interface objects, intensity thresholds, and animations described above with reference to method 800 optionally have one or more of the characteristics of the touch inputs, user interface objects, intensity thresholds, and animations described herein with reference to other methods described herein (e.g., methods 900, 1000, 1100, 1200, 1300, 1400, 1500, and 1600). For brevity, these details are not repeated here.

FIGS. 9A-9D are flow diagrams illustrating method 900 of disambiguating a pan gesture input and a deep press input in accordance with some embodiments.

The device displays (902) a first user interface. While displaying the first user interface, the device detects (904) an input on the touch-sensitive surface. Examples of the first user interface and responses to the input on the touch-sensitive surface are described above with reference to FIGS. 7L through 7S. In some embodiments, the first user interface includes a plurality of user interface objects, the input is detected while a focus selector (e.g., focus selector 707, FIG. 7L) is over a first user interface object (e.g., object 708, FIG. 7L) of the plurality of user interface objects, and the first user interface object is associated with at least a first gesture recognizer (e.g., a preview gesture recognizer) and a second gesture recognizer (e.g., a pan gesture recognizer (S)).

In response to detecting the input (908) while displaying the first user interface, the device performs (910) a first operation (e.g., blurring a user interface, as shown in FIGS. 7D and 7P) in accordance with a determination that the input satisfies intensity input criteria including that the input satisfies a first intensity threshold. On the other hand, in response to detecting the input (908) while displaying the first user interface, the device performs (912) a second operation (e.g., panning or scrolling at least a portion of the first user interface, FIG. 7M) that is distinct from the first operation in accordance with a determination that the input satisfies pan criteria including that the input has moved across the touch-sensitive surface by at least a predefined distance (while remaining in contact with the touch-sensitive surface). As noted above, in some embodiments the second operation includes scrolling (930) at least a portion of the first user interface (e.g., as shown in FIG. 7M).

In some embodiments, performing the first operation includes (920) displaying a preview area (e.g., preview area 712, FIGS. 7H, 7R, 7S).

In some embodiments, the intensity input criteria include (922) that the input (while remaining in contact with the touch-sensitive surface) does not move across the touch-sensitive surface by at least the predefined distance (e.g., as discussed above with reference to input movement limit perimeter 714 in FIGS. 7L-7Q, and 7AA-7CC).

In some embodiments, the first intensity threshold is adjustable (924). For example, in some such embodiments, method 900 includes updating (926) the first gesture recognizer to be activated in response to the intensity of the input satisfying a third intensity threshold that is distinct from the first intensity threshold. In some embodiments, the first intensity threshold is selected from a group of three or more predefined intensity thresholds (e.g., a reveal intensity threshold $I_L$, a preview intensity threshold $I_M$, and a commit intensity threshold $I_H$). In some embodiments, the third intensity threshold is selected from the group of three or more predefined intensity thresholds.

In some embodiments, the first intensity threshold is selected independent of any predefined intensity thresholds. In some embodiments, the first user interface is a user interface of a particular software application, and the first intensity threshold is selected or specified by the particular software application. In some embodiments, the first intensity threshold is a fixed intensity threshold that does not change while the contact is detected on the touch-sensitive surface. However, in some other embodiments, the first intensity threshold is a dynamic intensity threshold that changes over time based on predefined threshold-adjustment policies based on the activity of the user, and/or the condition of the device, and/or other environmental parameters. Adjustable intensity thresholds are discussed in more detail elsewhere in this document.

In some embodiments, method 900 includes, subsequent to performance of the first operation, forgoing (914) performance of the second operation. Similarly, in some embodiments, method 900 includes, subsequent to performance of the second operation, forgoing (916) performance of the first operation.

In some embodiments, detecting (904) the input on the touch-sensitive surface includes detecting (906, 950) a first portion of the input and a second portion of the input that is subsequent to the first portion of the input. Furthermore, in some such embodiments, method 900 includes, in response (952) to detecting the first portion of the input on the touch-sensitive surface (e.g., detecting an initial contact of the input with the touch-sensitive surface), identifying a first set of gesture recognizers that correspond to at least the first portion of the input as candidate gesture recognizers, the first set of gesture recognizers including a first gesture recognizer (e.g., a preview gesture recognizer) and a second gesture recognizer (e.g., a pan gesture recognizer).

In some embodiments or circumstances, the first user interface includes a plurality of user interface objects, the input is detected while a focus selector is over a first user interface object of the plurality of user interface objects, and the first user interface object is associated with at least the first gesture recognizer and the second gesture recognizer. Further, in some embodiments, processing the input with the first gesture recognizer includes placing the second gesture recognizer in a failed state.

Further, in the aforementioned embodiments, in response to detecting the second portion of the input on the touch-sensitive surface, the device performs (954) the first operation, including processing the input with the first gesture recognizer (e.g., the preview gesture recognizer) in accordance with the determination that the input satisfies the intensity input criteria. In some embodiments, the first intensity threshold (e.g., $I_M$ in FIG. 7L) is distinct from an input detection intensity threshold (e.g., $I_L$ in FIG. 7L). In some embodiments, processing of the input with the first gesture recognizer also requires a determination that the second gesture recognizer does not recognize a gesture that corresponds to the input. In some embodiments, processing of the input with the first gesture recognizer also requires a determination that the second gesture recognizer has failed to recognize a gesture that corresponds to the input (i.e., that the second gesture recognizer has transitioned to the Failed state, as discussed above with reference to FIGS. 7S and 7T).

Further, in the aforementioned embodiments, in response to detecting the second portion of the input on the touch-sensitive surface, the device performs (954) the second operation, including processing the input with the second gesture recognizer (e.g., with the pan gesture recognizer (S), FIGS. 7L-7S) in accordance with the determination that the input satisfies the pan criteria. In some embodiments, processing of the input with the second gesture recognizer also requires a determination that the first gesture recognizer has failed to recognize a gesture that corresponds to the input (e.g., the intensity of the input detected by the one or more sensors does not satisfy the first intensity threshold during the predefined time period). In the example discussed above with respect to FIG. 7Q, the preview gesture recognizer (P) has transitioned to the Failed state in accordance with a determination by the device that the intensity of the input detected by the one or more sensors does not satisfy the first intensity threshold (e.g., $I_M$, FIG. 7Q) and that the input satisfies the pan criteria.

As indicated above, in some embodiments the first gesture recognizer (e.g., the preview gesture recognizer) is an intensity-based gesture recognizer and the second gesture recognizer is a pan gesture recognizer (960). In some embodiments, the second gesture recognizer (e.g., the pan gesture recognizer) recognizes a particular type or set of gestures independent of intensity of the input.

In some embodiments or circumstances, the input includes (962) a third portion of the input that is subsequent to the second portion of the input, and method 900 includes processing the third portion of the input with the first gesture recognizer. In some embodiments, in accordance with a determination that the input ceases to satisfy the first intensity threshold, the device displays the preview area at a reduced scale (e.g., reduces the size of the preview area), an example of which is shown in the transition from the user interface of FIG. 7H to the user interface of FIG. 7J (i.e., without transitioning through the user interface of FIG. 7I).

In some embodiments, the first set of gesture recognizers includes (964) a third gesture recognizer, such as a reveal gesture recognizer (e.g., gesture recognizer (R) in FIGS. 7A-7CC).

In some embodiments, in response to determining that the input satisfies (966) a second intensity threshold (e.g., a commit intensity threshold $I_H$ that is higher than the first intensity threshold $I_M$), method 900 includes (e.g., subsequent to performing the first operation) processing the input with the first gesture recognizer, including replacing display of the first user interface (e.g., user interface 706, FIG. 7H) with a second user interface (e.g., user interface 710, FIG. 7I). In some embodiments in which the first operation includes displaying a preview area, performing the second operation includes ceasing to display the preview area (e.g., preview area 712, FIG. 7H). In some embodiments, the second user interface includes content that was displayed in the preview area.

In some embodiments, the first set of gesture recognizers includes (968) a fourth gesture recognizer (e.g., a commit gesture recognizer (C), as shown in FIGS. 7A-7CC), and method 900 includes, in response to determining (970) that the input satisfies a second intensity threshold (e.g., a commit intensity threshold $I_H$ that is higher than the first intensity threshold $I_M$), processing the input with the fourth gesture recognizer (e.g., the commit gesture recognizer). In some embodiments, processing the input with the fourth gesture recognizer includes replacing display of the first user interface with a second user interface (and ceasing to display the preview area), for example replacing display of user interface 706, FIG. 7H, with user interface 710, FIG. 7I, and ceasing to display preview area 712, FIG. 7H.

In some embodiments, method 900 includes performing (972) a third operation in response to detecting the first portion of the input. In some embodiments, performing the third operation includes visually distinguishing (974) at least a portion of the first user interface from other portions of the first user interface. For example, the third operation may be blurring the user interface other than an object corresponding to a focus selector, by using a third gesture recognizer (e.g., a reveal gesture recognizer), as shown in FIG. 7V. In some embodiments, if the pan gesture recognizer succeeds after the third operation is performed by the third gesture recognizer, then the third gesture recognizer transitions to the Canceled state and the third operation is reversed (e.g., the blurring is reversed or undone). An example of the latter example is shown in the transition from FIG. 7P to FIG. 7Q. On the other hand, if the deep press gesture recognizer (e.g., the preview gesture recognizer) succeeds, then the third operation (the blurring) by the third gesture recognizer (e.g., a reveal gesture recognizer) is canceled, and the first operation (e.g., displaying preview area 712, as shown in FIG. 7R) is performed by the deep press gesture recognizer (e.g., the preview gesture recognizer).

In some embodiments, method 900 includes performing (976) the first operation (e.g., displaying the preview area) subsequent to performing (972) the third operation (e.g., the blurring) in accordance with the determination that the input satisfies the intensity input criteria (e.g., by reaching or exceeding $I_M$), and performing (978) the second operation (e.g., panning or scrolling at least a portion of the first user interface, FIGS. 7M-7N, FIG. 7Q, etc.) in accordance with the determination that the input satisfies the pan criteria. Typically, these determinations and operations are performed while the input remains in contact with the touch-sensitive surface. In some embodiments, while the third gesture recognizer (e.g., a reveal gesture recognizer) is processing inputs (e.g., generating touch events corresponding to the second portion of the input), the first gesture recognizer and the second gesture recognizer are evaluating the second portion of the input to determine whether the input matches gesture recognition criteria for those gesture recognizers. In such embodiments, processing the input with the third gesture recognizer does not block processing the input with the first gesture recognizer and processing the input with the second gesture recognizer.

In some embodiments, performing the second operation subsequent to performing the third operation (978) includes (980) reversing the third operation. For example, in some embodiments, an animation is displayed as the third operation is reversed (e.g., the blurring is reduced to zero over a short period of time as the user interface begins to scroll). Furthermore, in some embodiments, performing the second operation subsequent to performing the third operation includes placing the third gesture recognizer in a cancelled state.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. For example, in some embodiments, a method performed at an electronic device with a touch-sensitive surface, a display, and one or more sensors to detect intensity of contacts with the touch-sensitive surface includes, while displaying a user interface that corresponds to at least a portion of a web page on the display, detecting a touch input on the touch-sensitive surface at a first location that corresponds to the displayed portion of the web page on the display. The method also includes, while detecting the touch input on the touch-sensitive surface, detecting an intensity of the touch input on the touch-sensitive surface (e.g., with the one or more sensors); determining whether the intensity of the touch input on the touch-sensitive surface has changed from below a first intensity threshold (e.g., a low intensity threshold, such as a mouse down intensity threshold) to above the first intensity threshold; and, in response to determining that the intensity of the touch input on the touch-sensitive surface has changed from below the first intensity threshold to above the first intensity threshold, generating a mouse down event (and optionally, processing instructions in the web page that correspond to a mouse down event). The method further includes, subsequent to determining that the intensity of the touch input on the touch-sensitive surface has changed from below the first intensity threshold to above the first intensity threshold, detecting the intensity of the touch input on the touch-sensitive surface; determining whether the intensity of the touch input on the touch-sensitive surface has changed from below a second intensity threshold (e.g., a high intensity threshold, such as a force down intensity threshold) that is distinct from the first intensity threshold to above the second intensity threshold; and, in response to determining that the intensity of the touch input on the touch-sensitive surface has changed from below the second intensity threshold to above the second intensity threshold, generating a force down event that is distinct from the mouse down event. For brevity, these details are not repeated herein.

Additionally, it should be noted that details of other processes described herein with respect to other methods described herein (e.g., methods 800, 1000, 1100, 1200, 1300, 1400, 1500, and 1600) are also applicable in an analogous manner to method 800 described above with respect to FIGS. 9A-9D. For example, the touch inputs, user interface objects, intensity thresholds, and animations described above with reference to method 900 optionally have one or more of the characteristics of the touch inputs, user interface objects, intensity thresholds, and animations described herein with reference to other methods described herein (e.g., methods 800, 1000, 1100, 1200, 1300, 1400, 1500, and 1600). For brevity, these details are not repeated here.

FIGS. 10A-10D are flow diagrams illustrating method 1000 of disambiguating a tap gesture input and a deep press input in accordance with some embodiments. Method 1000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface (e.g., the touch-sensitive surface is a trackpad). Some operations in method 800 are, optionally, combined and/or the order of some operations is, optionally, changed.

As described below, method 1000 provides an enhanced way to process touch inputs with instructions. Method 1000 improves efficiency in processing touch inputs.

The device displays (1002) a first user interface. While displaying the first user interface, the device detects (1004) an input on the touch-sensitive surface. Examples of the first user interface and responses to the input on the touch-sensitive surface are described above with reference to FIGS. 7A through 7K. In some embodiments, the first user interface includes a plurality of user interface objects, the input is detected while a focus selector (e.g., focus selector 705, FIG. 7A) is over a first user interface object (e.g., object 708, FIG. 7A) of the plurality of user interface objects, and the first user interface object is associated with at least a first gesture recognizer (e.g., a preview gesture recognizer) and a second gesture recognizer (e.g., a long press gesture recognizer).

In response to detecting the input (1008) while displaying the first user interface, the device performs (1010) a first operation (e.g., blurring a user interface, as shown in FIG. 7D) in accordance with a determination that the input satisfies intensity input criteria including that the input satisfies a first intensity threshold and the input remains on the touch-sensitive surface for a first predefined time period. On the other hand, in response to detecting the input (1008) while displaying the first user interface, the device performs (1012) a second operation (e.g., selecting an object, or launching an application, corresponding to a current position of the focus selector 705 and displaying the application user interface, FIG. 7B) that is distinct from the first operation in accordance with a determination that the input satisfies tap criteria, including that the input ceases to remain on the touch-sensitive surface during the first predefined time period. Stated another way, the input meets the tap criteria if the input is removed from the touch-sensitive surface prior to the end of the first predefined time period (e.g., the time period ending at time 7002, FIG. 7B). In some embodiments, the second operation is performed (1014) in accordance with the determination that the input satisfies the tap criteria, regardless of whether the input satisfies the intensity input criteria.

In some embodiments, performing the first operation includes (1020) displaying a preview area (e.g., preview area 712, FIG. 7G). Furthermore, in some embodiments, performing the second operation includes (1220) replacing display of the first user interface (e.g., user interface 706, FIG. 7A) with a third user interface (e.g., user interface 710, FIG. 7B) of a software application that corresponds to a location of the input on the touch-sensitive surface. For example, in some embodiments, a tap gesture on an object causes the display of the user interface of a software application corresponding to the object.

In some embodiments, the first intensity threshold is adjustable (1024). For example, in some such embodiments, method 1000 includes updating (1026) the first gesture recognizer to be activated in response to the intensity of the input satisfying a third intensity threshold that is distinct from the first intensity threshold. In some embodiments, the first intensity threshold is selected from a group of three or more predefined intensity thresholds (e.g., a reveal intensity threshold $I_L$, a preview intensity threshold $I_M$, and a commit intensity threshold $I_H$). In some embodiments, the third intensity threshold is selected from the group of three or more predefined intensity thresholds.

In some embodiments, the first intensity threshold is selected independent of any predefined intensity thresholds. In some embodiments, the first user interface is a user interface of a particular software application, and the first intensity threshold is selected or specified by the particular software application. In some embodiments, the first intensity threshold is a fixed intensity threshold that does not change while the contact is detected on the touch-sensitive surface. However, in some other embodiments, the first intensity threshold is a dynamic intensity threshold that changes over time based on predefined threshold-adjustment policies based on the activity of the user, and/or the condition of the device, and/or other environmental parameters. Adjustable intensity thresholds are discussed in more detail elsewhere in this document.

In some embodiments, method 1000 includes (1028), in response to detecting the input while displaying the first user interface, performing the second operation in accordance with a determination that the input remains on the touch-sensitive surface for the first predefined time period followed by the input subsequently ceasing to be detected on the touch-sensitive surface and the input does not satisfy the intensity input criteria. For example, For example, an input having intensity profile 7110 in FIG. 7B satisfies these criteria, and thus satisfies the tap criteria, despite the fact that the input remains on the touch-sensitive surface longer than the first predefined time period.

On the other hand, method 1000 includes (1028), in response to detecting the input while displaying the first user interface, forgoing performance of the second operation in accordance with a determination that the input remains on the touch-sensitive surface for the first predefined time period followed by the input subsequently ceasing to be detected on the touch-sensitive surface and the input satisfies the intensity input criteria. For example, an input having intensity profile 7112 or 7114 in FIG. 7K does not satisfy the tap criteria, because the input both extends past the first predefined time period and satisfies the intensity input criteria (e.g., the input has an intensity that exceeds intensity threshold $I_L$ or $I_M$).

In some embodiments, detecting (1004) the input on the touch-sensitive surface includes detecting (1006, 1050) a first portion of the input and a second portion of the input that is subsequent to the first portion of the input. Furthermore, in some such embodiments, method 1000 includes, in response (1052) to detecting the first portion of the input on the touch-sensitive surface (e.g., detecting an initial contact of the input with the touch-sensitive surface), identifying a first set of gesture recognizers that correspond to at least the first portion of the input as candidate gesture recognizers, the first set of gesture recognizers including a first gesture recognizer (e.g., a preview gesture recognizer) and a second gesture recognizer (e.g., a tap gesture recognizer).

In some embodiments or circumstances, the first user interface includes a plurality of user interface objects, the input is detected while a focus selector is over a first user interface object of the plurality of user interface objects, and the first user interface object is associated with at least the first gesture recognizer and the second gesture recognizer. Further, in some embodiments, processing the input with the first gesture recognizer includes placing the second gesture recognizer in a failed state.

Further, in the aforementioned embodiments, in response to detecting the second portion of the input on the touch-sensitive surface, the device performs (1054) the first operation, including processing the input with the first gesture recognizer (e.g., the preview gesture recognizer) in accordance with the determination that the input satisfies the intensity input criteria. In some embodiments, the first intensity threshold (e.g., $I_M$ in FIG. 7A) is distinct from an input detection intensity threshold (e.g., $I_L$ in FIG. 7A). In some embodiments, processing of the input with the first gesture recognizer also requires a determination that the second gesture recognizer does not recognize a gesture that corresponds to the input. In some embodiments, processing of the input with the first gesture recognizer also requires a determination that the second gesture recognizer has failed to recognize a gesture that corresponds to the input (i.e., that the second gesture recognizer has transitioned to the Failed state, as shown in the transition from the user interface in FIG. 7F to the user interface in FIG. 7G).

Further, in the aforementioned embodiments, in response to detecting the second portion of the input on the touch-sensitive surface, the device performs (1054) the second operation, including processing the input with the second gesture recognizer (e.g., with the tap gesture recognizer (T), FIGS. 7A-7K) in accordance with the determination that the input satisfies the tap criteria. In some embodiments, processing of the input with the second gesture recognizer also requires a determination that the first gesture recognizer has failed to recognize a gesture that corresponds to the input (e.g., because the input has ceased to remain on the touch-sensitive surface for the first predefined time period). In the example discussed above with respect to FIG. 7B, the preview gesture recognizer (P) has transitioned to the Failed state in accordance with a determination by the device that the input has ceased to remain on the touch-sensitive surface during (i.e., for the entirety of) the first predefined time period.

As noted above, in some embodiments the first gesture recognizer (e.g., the preview gesture recognizer) is an intensity-based gesture recognizer and the second gesture recognizer is a tap gesture recognizer (1060). In some embodiments, the second gesture recognizer (e.g., the tap gesture recognizer) recognizes tap gestures independent of intensity of the input.

In some embodiments or circumstances, the input includes (1062) a third portion of the input that is subsequent to the second portion of the input, and method 1000 includes processing the third portion of the input with the first gesture recognizer. In some embodiments, in accordance with a determination that the input ceases to satisfy the first intensity threshold, the device displays the preview area at a reduced scale (e.g., reduces the size of the preview area), an example of which is shown in the transition from the user interface of FIG. 7H to the user interface of FIG. 7J (i.e., without transitioning through the user interface of FIG. 7I).

In some embodiments, the first set of gesture recognizers includes (1064) a third gesture recognizer, such as a reveal gesture recognizer (e.g., gesture recognizer (R) in FIGS. 7A-7CC).

In some embodiments, in response to determining that the input satisfies (1066) a second intensity threshold (e.g., a commit intensity threshold $I_H$ that is higher than the first intensity threshold $I_M$), method 1000 includes (e.g., subsequent to performing the first operation) processing the input with the first gesture recognizer, including replacing display of the first user interface (e.g., user interface 706, FIG. 7H) with a second user interface (e.g., user interface 710, FIG. 7I). In some embodiments in which the first operation includes displaying a preview area, performing the second operation includes ceasing to display the preview area (e.g., preview area 712, FIG. 7H). In some embodiments, the second user interface includes content that was displayed in the preview area.

In some embodiments, the first set of gesture recognizers includes (1068) a fourth gesture recognizer (e.g., a commit gesture recognizer (C), as shown in FIGS. 7A-7CC), and method 1000 includes, in response to determining (1070) that the input satisfies a second intensity threshold (e.g., a commit intensity threshold $I_H$ that is higher than the first intensity threshold $I_M$), processing the input with the fourth gesture recognizer (e.g., the commit gesture recognizer). In some embodiments, processing the input with the fourth gesture recognizer includes replacing display of the first user interface with a second user interface (and ceasing to display the preview area), for example replacing display of user interface 706, FIG. 7H, with user interface 710, FIG. 7I, and ceasing to display preview area 712, FIG. 7H.

In some embodiments, method 1000 includes performing (1072) a third operation in response to detecting the first portion of the input. In some embodiments, performing the third operation includes visually distinguishing (1074) at least a portion of the first user interface from other portions of the first user interface. For example, the third operation may be blurring the user interface other than an object corresponding to a focus selector, by using a third gesture recognizer (e.g., a reveal gesture recognizer), as shown in FIG. 7D. In some embodiments, if the tap gesture recognizer succeeds after the third operation is performed by the third gesture recognizer, then the third gesture recognizer transitions to the Canceled state and the third operation is reversed (e.g., the blurring is reversed or undone). On the other hand, if the deep press gesture recognizer (e.g., the preview gesture recognizer) succeeds, then the third operation (the blurring) by the third gesture recognizer (e.g., a reveal gesture recognizer) is canceled, and the first operation (e.g., displaying preview area 712, as shown in FIGS. 7E-7H) is performed by the deep press gesture recognizer (e.g., the preview gesture recognizer).

In some embodiments, method 1000 includes performing (1076) the first operation (e.g., displaying the preview area) subsequent to performing (1072) the third operation (e.g., the blurring) in accordance with the determination that the input satisfies the intensity input criteria (e.g., by reaching or exceeding $I_M$), and performing (1078) the second operation (e.g., selecting an object and displaying the user interface of an application associated with the selected object, FIG. 7I) in accordance with the determination that the input satisfies the tap criteria. In some embodiments, while the third gesture recognizer (e.g., a reveal gesture recognizer) is processing inputs (e.g., generating touch events corresponding to the second portion of the input), the first gesture recognizer and the second gesture recognizer are evaluating the second portion of the input to determine whether the input matches gesture recognition criteria for those gesture recognizers. In such embodiments, processing the input with the third gesture recognizer does not block processing the input with the first gesture recognizer and processing the input with the second gesture recognizer.

In some embodiments, performing the third operation is initiated (1080) during the first predefined time period. For example, the hint/reveal animation (e.g., progressive blurring of the first user interface in accordance with the intensity of the input on the touch-sensitive surface) is displayed even before the first predefined time period has elapsed if (i.e., in accordance with a determination that) the intensity of the input exceeds the input detection intensity threshold (e.g., $I_L$, FIG. 7D) before the first predefined time period has elapsed.

It should be understood that the particular order in which the operations in FIGS. 10A-10D have been described is merely exemplary and is not intended to indicate that the described order is the only order in which the operations could be performed. One of ordinary skill in the art would recognize various ways to reorder the operations described herein. For example, in some embodiments, a method performed at an electronic device with a touch-sensitive surface, a display, and one or more sensors to detect intensity of contacts with the touch-sensitive surface includes, while displaying a user interface that corresponds to at least a portion of a web page on the display, detecting a touch input on the touch-sensitive surface at a first location that corresponds to the displayed portion of the web page on the display. The method also includes, while detecting the touch input on the touch-sensitive surface, detecting an intensity of the touch input on the touch-sensitive surface (e.g., with the one or more sensors); determining whether the intensity of the touch input on the touch-sensitive surface has changed from below a first intensity threshold (e.g., a low intensity threshold, such as a mouse down intensity threshold) to above the first intensity threshold; and, in response to determining that the intensity of the touch input on the touch-sensitive surface has changed from below the first intensity threshold to above the first intensity threshold, generating a mouse down event (and optionally, processing instructions in the web page that correspond to a mouse down event). The method further includes, subsequent to determining that the intensity of the touch input on the touch-sensitive surface has changed from below the first intensity threshold to above the first intensity threshold, detecting the intensity of the touch input on the touch-sensitive surface; determining whether the intensity of the touch input on the touch-sensitive surface has changed from below a second intensity threshold (e.g., a high intensity threshold, such as a force down intensity threshold) that is distinct from the first intensity threshold to above the second intensity threshold; and, in response to determining that the intensity of the touch input on the touch-sensitive surface has changed from below the second intensity threshold to above the second intensity threshold, generating a force down event that is distinct from the mouse down event. For brevity, these details are not repeated herein.

Additionally, it should be noted that details of other processes described herein with respect to other methods described herein (e.g., methods 800, 900, 1100, 1200, 1300, 1400, 1500, and 1600) are also applicable in an analogous manner to method 800 described above with respect to FIGS. 10A-10D. For example, the touch inputs, user interface objects, intensity thresholds, and animations described above with reference to method 900 optionally have one or more of the characteristics of the touch inputs, user interface objects, intensity thresholds, and animations described herein with reference to other methods described herein (e.g., methods 800, 900, 1100, 1200, 1300, 1400, 1500, and 1600). For brevity, these details are not repeated here.

Figure 11A:
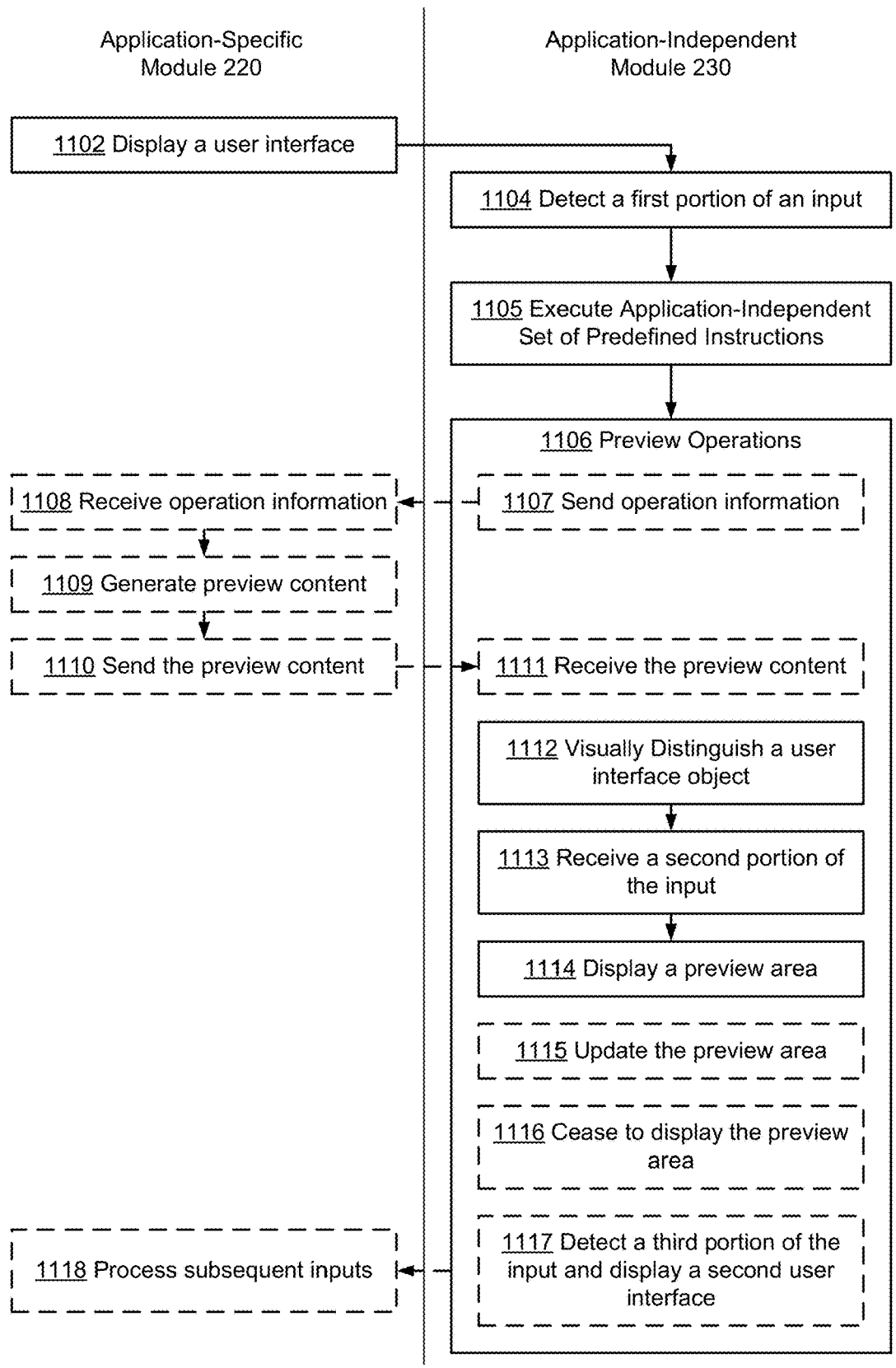
FIG. 11A is a high level flow diagram illustrating a method of processing touch inputs using application-independent set of predefined instructions in accordance with some embodiments.

FIG. 11A is a high level flow diagram illustrating a method of processing touch inputs using application-independent set of predefined instructions (e.g., application-independent module 220) in accordance with some embodiments.

Application-specific module 230 displays (1102) a user interface (e.g., mail application user interface 706 in FIG. 7C).

While the user interface is displayed, application-independent module 220 detects (1104) a first portion of an input (e.g., contact 705 in FIG. 7C), and executes (1105) application-independent set of predefined instructions for providing preview operations. In some embodiments, the control of application-specific module 230 is given to application-independent module 220. By using application-independent module 220 for the preview operations, the computational burdens and the size of application-specific module 230 are reduced. The same application-independent module 220 can be used by multiple software applications for providing the preview operations, thereby reducing the memory usage. In some embodiments, application-independent module 220 is provided in an operating system or a standard library of the device, which also reduces the development time by software developers. Furthermore, application-independent module 220 provides standardized methods for interaction, which facilitate users to learn the methods quickly and reduce the cognitive burden on users.

Application-independent module 220 performs (1106) the preview operations.

In some embodiments, application-independent module 220 sends (1107) to application-specific module 230 operation information (e.g., information indicating that the preview operations have started). Application-specific module 230 receives (1108) the operation information, generates (1109) preview content, and sends (1110) the preview content to application-independent module 220. Application-independent module 220 receives (1111) the preview content.

Application-independent module 220 visually distinguishes (1112) a user interface object (e.g., mail application user interface 706 in FIG. 7D).

Application-independent module 220 receives (1113) a second portion of the input (e.g., an increased intensity of the input is detected as shown in FIG. 7E).

Application-independent module 220 displays (1114) a preview area (e.g., preview area 712 in FIG. 7G).

In some embodiments, application-independent module 220 updates (1115) the preview area (e.g., as shown in FIG. 7H, a further increase in the intensity of the input is detected and the size of preview area 712 is increased).

In some embodiments, application-independent module 220 ceases (1116) to display the preview area (e.g., as shown in FIGS. 7J-7K, preview area 712 ceases to be displayed when the intensity of the input falls below the intensity threshold $I_L$).

In some embodiments, application-independent module 220 detects (1117) a third portion of the input and display a second user interface (e.g., as shown in FIG. 7I, browser application user interface 710 is displayed in response to the intensity of the input reaching the intensity threshold $I_H$). At this time, the control of application-specific module 230 is given back to application-specific module 230, and application-specific module 230 processes (1118) subsequent inputs.

It should be understood that the particular order in which the operations in FIG. 11A have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1150, 1200, 1300, 1400, 1500, and 1600) are also applicable in an analogous manner to the method described above with respect to FIG. 11A. For brevity, these details are not repeated here.

FIGS. 11B-11C are flow diagrams illustrating method 1100 of processing touch inputs using application-independent set of predefined instructions in accordance with some embodiments. Method 1100 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

As described below, method 1100 provides an enhanced way to process touch inputs with application-independent set of instructions. Method 1100 improves efficiency in processing touch inputs. By reducing the size of a software application, improving the speed of the software application, and potentially reducing the memory usage, such methods and interfaces provide a more efficient human-machine interface, thereby improving overall operational time and user experience. For battery-operated devices, such methods and interfaces conserve battery power and increase the time between battery charges. In addition, such methods reduce the burden on application developers and facilitate development of software applications that can more efficiently process touch inputs. Furthermore, such methods and user interfaces provide standardized ways in interacting with the user interfaces, thereby reducing the cognitive burden on the users and further improving the operational time and user experience.

The device displays (1130) a first user interface of a first software application (e.g., mail application user interface 706 in FIG. 7C), the first user interface including a plurality of user interface objects (e.g., user interface object 708, buttons such as "Integrate Us" and "Subtract," an email address, and other controls), a first user interface object of the plurality of user interface objects being associated with an application-independent set of predefined instructions for preview operations (e.g., user interface object 708 is configured, for example by preregistering user interface object 708 with application-independent module 220 for the preview operations before receiving an input by a contact, to operate with the application-independent set of predefined instructions for preview operations). In some embodiments, the application-independent set of predefined instructions for preview operations is distinct from a portion of the first software application that is unique to the first software application. For example, the application-independent set of predefined instructions for preview operations is part of an application development framework that is provided to the application developer either as a drop-in module (e.g., touch processing module 220 in FIG. 1C) that is integrated with the first software application (e.g., application 1 (136-1)) and enables the first software application to interact with touch input information provided by the operating system on which the first application is running, or the application-independent set of predefined instructions for preview operations is part of the operating system that updates the first user interface for the first software application according to an API that provides consistent user interfaces for the first software application. In some embodiments, multiple different third-party applications running on the device include independent access to the application-independent set of predefined instructions. In some embodiments, multiple different third-party applications running on the device include independent instances of the application-independent set of predefined instructions. In some embodiments, multiple different applications on the device include code for interfacing with the application-independent set of predefined instructions that support with all of the third-party applications. In some embodiments, the application-independent set of predefined instructions for preview operations is separate from the first software application. In some embodiments, the application-independent set of predefined instructions for preview operations is included in the first software application.

The device detects (1132) a first portion of an input (e.g., a press input, such as input 705 in FIG. 7C) by a contact while a focus selector is over the first user interface object, in the plurality of user interface objects, on the display. In some embodiments, the input is made by a single contact on the touch-sensitive surface. In some embodiments, the input is a stationary input. In some embodiments, the contact in the input moves across the touch-sensitive surface during the input.

The device, in response to detecting the first portion of the input and in accordance with a determination that the first portion of the input satisfies reveal criteria including that the input satisfies a first intensity threshold (e.g., a "reveal" intensity threshold at which the device starts to blur the first user interface, such as $I_L$ in FIG. 7C), executes (1134) the application-independent set of predefined instructions for preview operations, including providing preview content to the application-independent set of predefined instructions (e.g., operation 1110 in FIG. 11A). The preview operations performed by executing the application-independent set of predefined instructions include: visually distinguishing the first user interface object in the first user interface (e.g., blurring the first user interface other than the first user interface object as shown in FIG. 7D) (e.g., prior to displaying the preview area as shown in FIGS. 7D-7G); and, subsequent to initiation of the visual distinction of the first user interface object in the first user interface: receiving a second portion of the input that is subsequent to the first portion of the input (e.g., an increased intensity of focus selector 705 in FIG. 7G); and, in accordance with a determination that the second portion of the input satisfies preview criteria including that the input satisfies a second intensity threshold (e.g., a "preview" intensity threshold, that is higher than the first intensity threshold, at which the device starts to display a preview of another user interface that can be reached by pressing harder on the first user interface object, such as $I_M$ in FIG. 7G), displaying a preview area overlaid on the first user interface (e.g., preview area 712 in FIG. 7G). The preview area includes the preview content. In some embodiments, the preview content is a reduced-size view of a user interface that is presented when the first user interface object is activated (e.g., the preview content in preview area 712 is a reduced-size view of browser application user interface 710 that is displayed in response to a tap gesture while the focus selector is on user interface object 708 as shown in FIG. 7B).

In some embodiments, subsequent to initiation of the preview operations, the preview operations are (1136) performed independent of the first software application (e.g., independent of the portion of the first software application that is unique to the first software application). For example, as shown in FIG. 11A, the preview operations, subsequent to receiving the preview content, are performed by application-independent module 220 independently of application-specific module 230.

In some embodiments, the preview operations include (1138) updating the preview area in accordance with intensity of the contact (e.g., as shown in FIG. 7H, a further increase in the intensity of the input is detected and the size of preview area 712 is increased).

In some embodiments, the preview operations include (1140), in response to detecting the second portion of the input, in accordance with a determination that the second portion of the input meets preview-area-disappearance criteria (e.g., the input ends, such as liftoff of the contact), ceasing to display the preview area and maintaining display of the first user interface (e.g., as shown in FIGS. 7J-7K, preview area 712 ceases to be displayed when the intensity of the input falls below the intensity threshold $I_L$). In some embodiments, subsequent to the device ceasing to display the preview area, the device processes a subsequent input using at least a portion of the first software application that is unique to the first software application.

In some embodiments, the preview operations include (1142): after detecting the second portion of the input, detecting a third portion of the input by the contact; and, in response to detecting the third portion of the input by the contact, in accordance with a determination that the third portion of the input satisfies user-interface-replacement criteria, replacing display of the first user interface (and an overlay of the preview area) with a second user interface that is distinct from the first user interface (e.g., as shown in FIG. 7I, browser application user interface 710 is displayed in response to the intensity of the input reaching the intensity threshold $I_H$).

In some embodiments, the preview operations include (1144): sending from the application-independent set of predefined instructions information indicating operation for the first user interface object (e.g., selection or activation of the first user interface object) (e.g., to a portion of the first software application that is unique to the first software application, such as application core 1 (230-1) in FIG. 1C) for generating a second user interface; and receiving at the application-independent set of predefined instructions the second user interface (e.g., using operations 1107 and 1111 in FIG. 11A, application-independent module 220 receives preview content, such as browser application user interface 710 in FIG. 7B, for presenting the preview content in the preview area as shown in FIG. 7G and, optionally replacing the first user interface with a second user interface that includes the preview content in response to a further increase in the intensity of the input as shown in FIG. 7I). The preview content includes at least a portion of the second user interface. In some embodiments, the preview content includes the entirety of the second user interface.

In some embodiments, the preview operations include (1146): at the first software application (e.g. a portion of the first software application that is unique to the first software application): receiving the information indicating operation for the first user interface object; generating the second user interface; and sending the second user interface to the application-independent set of predefined instructions (e.g., operations 1108, 1109, and 1110 performed by application-specific module 230 as shown in FIG. 11A). In some embodiments, other than providing the preview content, application-specific module 230 is not used for performing the preview operations.

It should be understood that the particular order in which the operations in FIGS. 11B-11C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1150, 1200, 1300, 1400, 1500, and 1600) are also applicable in an analogous manner to method 1100 described above with respect to FIGS. 11B-11C. For example, the touch inputs, user interface objects, intensity thresholds, and animations described above with reference to method 1100 optionally have one or more of the characteristics of the touch inputs, user interface objects, intensity thresholds, and animations described herein with reference to other methods described herein (e.g., methods 800, 900, 1000, 1150, 1200, 1300, 1400, 1500, and 1600). For brevity, these details are not repeated here.

FIG. 11D is a flow diagram illustrating method 1150 of processing touch inputs using application-independent set of predefined instructions in accordance with some embodiments. Method 1150 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1150 are, optionally, combined and/or the order of some operations is, optionally, changed.

As described below, method 1150 provides an enhanced way to process touch inputs with application-independent set of instructions. Method 1150 improves efficiency in processing touch inputs. By reducing the size of a software application, improving the speed of the software application, and potentially reducing the memory usage, such methods and interfaces provide a more efficient human-machine interface, thereby improving overall operational time and user experience. For battery-operated devices, such methods and interfaces conserve battery power and increase the time between battery charges. In addition, such methods reduce the burden on application developers and facilitate development of software applications that can more efficiently process touch inputs. Furthermore, such methods and user interfaces provide standardized ways in interacting with the user interfaces, thereby reducing the cognitive burden on the users and further improving the operational time and user experience.

The device displays (1152) a first user interface of a first software application (e.g., mail application user interface 706 in FIG. 7C), the first user interface including a plurality of user interface objects (e.g., user interface object 708, buttons such as "Integrate Us" and "Subtract," an email address, and other controls), a first user interface object of the plurality of user interface objects being associated with an application-independent set of predefined instructions for preview operations (e.g., user interface object 708 is configured to operate with the application-independent set of predefined instructions for preview operations).

The device detects (1154) a first portion of an input (e.g., a press input, such as input 705 in FIG. 7G) by a contact while a focus selector is over the first user interface object, in the plurality of user interface objects, on the display.

The device, in response to detecting the first portion of the input and in accordance with a determination that the first portion of the input meets preview criteria, executes (1156) the application-independent set of predefined instructions for preview operations (e.g., operation 1105 in FIG. 11A). The preview operations performed by executing the application-independent set of predefined instructions include: displaying a preview area overlaid on the first user interface (e.g., preview area 712 overlaid on mail application user interface 706 as shown in FIG. 7G); after detecting the first portion of the input, detecting a second portion of the input; and, in response to detecting the second portion of the input by the contact, in accordance with a determination that the second portion of the input meets user-interface-replacement criteria, replacing display of the first user interface with a second user interface that is distinct from the first user interface (e.g., in response to the intensity of contact 705 reaching the intensity threshold $I_H$, mail application user interface 706, together with preview area 712, is replaced with browser application user interface 710 shown in FIG. 7I).

In some embodiments, subsequent to initiation of the preview operations, the preview operations are (1158) performed independent of the first software application (e.g., as shown in FIG. 11A, subsequent to receiving the preview content from application-specific module 230, preview operations 1106 are performed independent of application-specific module 230). In some embodiments, preview content is obtained prior to initiation of the preview operations (e.g., the preview content is obtained before operation 1112 in FIG. 11A).

In some embodiments, inputs on the touch-sensitive surface detected subsequent to replacing the display of the first user interface with the second user interface are (1160) processed with the first software application. For example, as shown in FIG. 11I7, after the second user interface, such as browser application user interface 710 in FIG. 7I, is displayed, the control is given back to the first software application (e.g., browser module 147) and the first software application processes subsequent inputs on the touch-sensitive surface (e.g., by using application core 1 (230-1) alone, or optionally using application core 1 (230-1) in conjunction with touch processing module 220).

It should be understood that the particular order in which the operations in FIG. 11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1200, 1300, 1400, 1500, and 1600) are also applicable in an analogous manner to method 1150 described above with respect to FIG. 11D. For example, the touch inputs, user interface objects, intensity thresholds, and animations described above with reference to method 1150 optionally have one or more of the characteristics of the touch inputs, user interface objects, intensity thresholds, and animations described herein with reference to other methods described herein (e.g., methods 800, 900, 1000, 1100, 1200, 1300, 1400, 1500, and 1600). For brevity, these details are not repeated here.

FIGS. 12A-12B are flow diagrams illustrating method 1200 of processing a touch input using a predefined data structure in accordance with some embodiments. Method 1200 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

As described below, method 1200 provides an enhanced way to process touch inputs with a predefined data structure. Method 1200 improves efficiency in processing touch inputs. Such methods and interfaces provide a more efficient human-machine interface, thereby improving overall operational time and user experience. For battery-operated devices, such methods and interfaces conserve battery power and increase the time between battery charges.

The device displays (1202), on the display, a user interface of a software application (e.g., mail application user interface 706 in FIG. 7FF).

The device, while displaying the user interface of the software application on the display, detects (1204) an input (e.g., the input corresponding to focus selector 713 in FIG. 7FF) on the touch-sensitive surface at a location that corresponds to the user interface of the software application.

The device, in response to detecting the input, sends (1206) from an application-independent set of instructions to the software application intensity information that corresponds to the input (e.g., as shown in FIG. 7FF, application-independent module 220 sends event object 194 to application-specific module 230). The intensity information includes: a reference intensity assigned to the one or more sensors (e.g., reference intensity 7208); and a characteristic intensity that corresponds to a detected (e.g., measured) intensity of the input (e.g., characteristic intensity 7206). In some embodiments, an application-independent set of instructions is an application-independent software entity (e.g., touch processing module 220 in FIG. 1C).

In some embodiments, the characteristic intensity is (1208) further adjusted by a sensitivity value (e.g., sensitivity 7210 in FIG. 7FF). In some embodiments, the characteristic intensity includes the sensitivity value (e.g., the characteristic intensity is multiplied by the sensitivity value). For example, at 1× sensitivity, an intensity of 100 g equals a normalized intensity of 1.0, and at 2× intensity, an intensity of 50 g equals a normalized intensity of 1.0 (when the reference intensity is 100 g). In comparison, at 1× intensity, an intensity of 50 g equals a normalized intensity of 0.5.

In some embodiments, the characteristic intensity of the input is (1210) a normalized intensity value that is normalized based on the reference intensity (e.g., the normalized intensity 1.0=the characteristic intensity 100 g/the reference intensity 100 g).

In some embodiments, the intensity information includes (1212) intensity state information that is determined by one or more heuristics based on a combination of intensity-based criteria (e.g., measured contact intensity) and non-intensity-based criteria (e.g., movement of contact, duration of contact, location of contact, etc.). For example, the thresholds for determining the intensity state vary depending on movement of the contact, duration of the contact, and a location of the contact. In some embodiments, one or more of the intensity states include a dynamically determined intensity state (e.g., as described in greater detail below with reference to methods 1500 and 1600).

In some embodiments, the intensity state information is (1214) provided based on an indication from the device as to whether or not a current intensity state matches an intensity state requirement for a gesture recognizer (e.g., intensity criteria specified by a third-party application for a first gesture in a first class of gestures as described below with reference to method 1400).

In some embodiments, the intensity information includes (1216) intensity state information that has a plurality of different available state values (e.g., no-force state, hint/reveal state, peek/preview state, pop/commit state) and transitions between intensity states are used throughout the operating system to trigger operating-system driven user interactions (e.g., peek and pop, quick action menus, etc.).

In some embodiments, the characteristic intensity of the input is (1218) provided via one or more touch events that each include a characteristic intensity of a contact corresponding to the touch event (e.g., in FIG. 7II, two event objects 194 and 7194 are provided). In some embodiments, touch events are delivered to a view after a gesture recognizer associated with the view has recognized a gesture. For example, touch events that are delivered after a gesture recognizer recognizes a gesture include intensity information. In some embodiments, touch events are delivered to a view that is not associated with a gesture recognizer and the operations are performed by an application corresponding to the view based on the touch events (e.g., drawing a line with a thickness that is determined based on an intensity of one or more of the contacts in the gesture).

In some embodiments, the device displays (1220), on the display, a sensitivity control for selecting a respective intensity sensitivity setting between a plurality of intensity sensitivity settings (e.g., area 720 in FIG. 7GG or area 722 in FIG. 7HH with a plurality of intensity sensitivity settings); while displaying the sensitivity control, receives a user input corresponding to selection of the respective intensity sensitivity setting of the plurality of intensity sensitivity settings; and, in response to receiving the user input corresponding to selection of the respective intensity sensitivity setting, adjusts characteristic intensity values for a plurality of subsequent inputs by a respective sensitivity value that corresponds to the respective intensity sensitivity setting selected by the user. For example, the intensity sensitivity setting for all inputs is adjustable by the user without changing the applications that are interpreting the inputs, because the input values are adjusted before they are delivered to the applications (e.g., by same application-independent module 220).

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1150, 1300, 1400, 1500, and 1600) are also applicable in an analogous manner to method 1200 described above with respect to FIGS. 12A-12B. For example, the touch inputs, user interface objects, intensity thresholds, and animations described above with reference to method 1200 optionally have one or more of the characteristics of the touch inputs, user interface objects, intensity thresholds, and animations described herein with reference to other methods described herein (e.g., methods 800, 900, 1000, 1100, 1150, 1300, 1400, 1500, and 1600). For brevity, these details are not repeated here.

FIGS. 13A-13B are flow diagrams illustrating a method of processing a touch input using a force gesture progress indicator in accordance with some embodiments. Method 1300 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1300 are, optionally, combined and/or the order of some operations is, optionally, changed.

Method 1300 provides an enhanced way to process touch inputs with a force gesture progress indicator. Method 1300 improves efficiency in processing touch inputs. Such methods and interfaces provide a more efficient human-machine interface, thereby improving overall operational time and user experience. For battery-operated devices, such methods and interfaces conserve battery power and increase the time between battery charges.

The device displays (1302), on the display, a first user interface of a software application (e.g., mail application user interface 706 in FIG. 7A).

The device, while displaying the first user interface of the software application, detects (1304) an input on the touch-sensitive surface (e.g., focus selector 705 in FIG. 7A).

The device, while detecting the input: in response to detecting changes to intensity of the input, provides (1306) from an application-independent set of instructions to the software application a value of a first progress indicator that represents the changes to the intensity of the input (e.g., event object 194 conveyed from application-independent module 220 to application-specific module 230 as shown in FIG. 7FF); and updates the first user interface in accordance with a set of instructions in the software application that is different from the application-independent set of instructions (e.g., the first user interface is updated, for example to show the visual distinction as shown in FIG. 7D, using application-specific module 230 in FIG. 7FF) and the value of the first progress indicator (e.g., progress indicator 750 in FIG. 7D). In some embodiments, the method includes monitoring the value of the first progress indicator and updating the first user interface based on the value of the first progress indicator in response to changes to the first progress indicator. In some embodiments, the set of instructions in the software application are application-specific instructions.

In some embodiments, the value of the first progress indicator is (1308) a normalized value that indicates a status of the input between a first initial state (e.g., a hint/reveal intensity state) and a first terminal state (e.g., a peek/preview intensity state). For example, the first progress indicator has a value between 0 and 1, where 0 represents an initial state (e.g., an initial intensity, such as a beginning of the hint/reveal intensity state as shown in FIG. 7C) and 1 represents a terminal state (e.g., a terminal or target intensity, such as the peek/preview intensity state as shown in FIG. 7G).

In some embodiments, the first initial state and the first terminal state are (1310) specified by the software application (e.g., application 1 (136-1) in FIG. 1C). In some embodiments, application core 1 (230-1) of application 1 (136-1) specifies the first initial state and the first terminal state (e.g., the software application specifies whether the first terminal state is to correspond to a peek/preview intensity state or a pop/commit intensity state.

In some embodiments, progress between different states is (1312) determined by one or more heuristics based on a combination of intensity-based criteria (e.g., measured contact intensity) and non-intensity-based criteria (e.g., movement of contact, duration of contact, location of contact, etc.). In some embodiments, one or more of the intensity states is a dynamically determined intensity state (e.g., as described in greater detail below with reference to methods 1500 and 1600).

In some embodiments, the states are (1314) selected from a set of state values provided by an operating system of the device (e.g., no-force state, hint/reveal state, peek/preview state, pop/commit state) and transitions between these states are used throughout the operating system to trigger operating-system driven user interactions (e.g., peek and pop, quick action menus, etc.).

In some embodiments, the device, while detecting the input: in response to detecting changes to intensity of the input over (or to) the first terminal state: provides (1316) from the application-independent set of instructions to the software application a value of a second progress indicator (e.g., second progress indicator 752 in FIG. 7G) that represents the changes to the input. The value of the second progress indicator is a normalized value that indicates a status of the input between a second initial state and a second terminal state (e.g., between the peek/preview intensity state and the pop/commit intensity state). The device updates the first user interface in accordance with the set of instructions in the software application that is different from the application-independent set of instructions and the value of the second progress indicator. In some embodiments, the second initial state corresponds to the first terminal state. This allows the device to monitor changes to intensity of the input continuously from the first initial state to the second terminal state without a gap.

In some embodiments, updating the first user interface in accordance with the set of instructions in the software application and the value of the second progress indicator includes (1318) replacing the first user interface with a second user interface (e.g., in FIG. 7I, when second progress indicator 752 reaches the second terminal state, mail application user interface 706 is replaced with browser application user interface 710).

In some embodiments, the set of instructions in the software application is (1320) configured to provide a customized animation graphically representing changes to the intensity of the input. In some embodiments, the set of instructions in the software application is configured to provide a customized animation that graphically represents an initiation of the input. For example, the set of instructions in the software application is used to blur at least a portion of the first user interface. In some embodiments, the set of instructions in the software application is configured to provide a customized animation that graphically represents a completion of the input (e.g., the input reaching the terminal state). For example, the set of instructions in the software application is used to display a preview window. In some embodiments, the preview window in the customized animation has a non-rectangular shape (e.g., a circle). The use of the customized animation allows the device to provide an animation that is not predefined by application-independent module 220.

In some embodiments, the device, while detecting the input: in response to detecting that the input satisfies first intensity criteria (e.g., the first initial state), initiates (1322) the first progress indicator so that the value of the first progress indicator represents the changes to the intensity of the input (between the first initial state and the first terminal state). For example, in FIGS. 7B-7C, first progress indicator 750 is initiated only when the input reaches the intensity threshold $I_L$. This avoids updating and tracking the first progress indicator when the first progress indicator is not needed (e.g., when the intensity of the input is below an intensity range represented by the first progress indicator).

It should be understood that the particular order in which the operations in FIGS. 13A-13B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1150, 1200, 1400, 1500, and 1600) are also applicable in an analogous manner to method 1300 described above with respect to FIGS. 13A-13B. For example, the touch inputs, user interface objects, intensity thresholds, and animations described above with reference to method 1300 optionally have one or more of the characteristics of the touch inputs, user interface objects, intensity thresholds, and animations described herein with reference to other methods described herein (e.g., methods 800, 900, 1000, 1100, 1150, 1200, 1400, 1500, and 1600). For brevity, these details are not repeated here.

FIGS. 14A-14C are flow diagrams illustrating a method of processing touch inputs based on intensity criteria specified by third-party applications in accordance with some embodiments. Method 1400 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1400 are, optionally, combined and/or the order of some operations is, optionally, changed.

As described below, method 1400 provides an enhanced way to process touch inputs with dynamic thresholds. Method 1400 improves efficiency in processing touch inputs. By reducing unnecessary/extraneous/repetitive inputs, such methods and interfaces provide a more efficient human-machine interface, thereby improving overall operational time and user experience. For battery-operated devices, such methods and interfaces conserve battery power and increase the time between battery charges.

The device displays (1402), on the display, a user interface of a first third-party application that runs within an operating system (e.g., mail application user interface 706 in FIG. 7JJ). Capabilities of the device are exposed to the first third-party application through an operating system framework of the operating system (e.g., a Touch Event API within UI Kit). For example, information about available gesture classes is provided to the first third-party application. The operating system framework defines a plurality of gesture classes that can be recognized by the device. A first gesture class is associated with first gesture recognition criteria for recognizing input detected on the touch-sensitive surface as a first gesture when the first gesture recognition criteria are met. The first third-party application has associated a first portion of the user interface with the first gesture from the first gesture class for a first operation (e.g., an operation performed when first pinch gesture recognizer ($N_1$) transitions to the Recognized state). The first third-party application has specified first intensity criteria for the first gesture associated with the first portion of the user interface for the first operation. In some embodiments, the first operation is performed when both the first gesture recognition criteria and the first intensity criteria are satisfied.

In some embodiments, the first intensity criteria include (1404) an intensity threshold (e.g., the intensity threshold $I_1$ in FIG. 7JJ). For example, the first intensity criteria are (at least partly) satisfied when the intensity of the input reaches the intensity threshold.

In some embodiments, the intensity threshold is selected (1406) from a set of predefined thresholds (e.g., the intensity threshold is selected from a set of predefined thresholds, such as the hint/reveal threshold, the peek/preview threshold, and the pop/commit threshold, or their corresponding intensity values, such as 100 g, 200 g, and 300 g).

In some embodiments, the intensity threshold is selected (1408) from a range of values detectable by the device (e.g., in some embodiments, the intensity threshold can be any value between 1 g and 500 g, such as 1 g, 10 g, 100 g, 450 g, etc.).

In some embodiments, the first intensity criteria include a rate of change of intensity over time, intensity of multiple contacts, a time duration of the input, a distance traveled by the input across the touch-sensitive surface, a number of contacts in the input, a direction of movement of the input, a relative timing of touchdown of contacts in the input, a motion of contacts in the input, etc. In some embodiments, the first intensity criteria includes a dynamic intensity threshold (e.g., as described in greater detail below with reference to methods 1500 and 1600).

While displaying the user interface of the first third-party application on the display, the device detects (1410) an input on the touch-sensitive surface at a location that corresponds to the first portion of the user interface of the first third-party application (e.g., a depinch gesture represented by focus selectors 715 and 717 in FIG. 7JJ).

In response to detecting the input: the device, in accordance with a determination that the input meets the first gesture recognition criteria and that the input meets the first intensity criteria specified by the first third-party application, perform (1412) the first operation associated with the first portion of the user interface of the first third-party application (e.g., in FIG. 7JJ-7KK, mail application user interface 706 is replaced with mail application user interface 724 when the depinch gesture represented by focus selectors 715 and 717 satisfies the intensity threshold $I_1$); and, in accordance with a determination that the input meets the first gesture recognition criteria but does not meet the first intensity criteria specified by the first third-party application, forgoes (1414) performance of the first operation associated with the first portion of the user interface of the first third-party application (e.g., in FIG. 7LL, mail application user interface 706 is not replaced with mail application user interface 724 when the depinch gesture represented by focus selectors 715 and 717 does not satisfy the intensity threshold $I_1$, but optionally, a zoom-in operation associated with a non-intensity based depinch gesture is performed in response to the depinch gesture represented by focus selectors 715 and 717).

In some embodiments, the first third-party application has associated (1416, FIG. 14B) the first portion of the user interface with the first gesture from the first gesture class for a second operation (e.g., a non-intensity based pinch gesture recognizer is associated with zoom-in/zoom-out operations). The first third-party application has not specified the first intensity criteria for the first gesture associated with the first portion of the user interface for the second operation. In some embodiments, the first third-party application has not specified any intensity criteria for the first gesture associated with the first portion of the user interface for the second operation. In response to detecting the input, the device, in accordance with a determination that the input meets the first gesture recognition criteria but does not meet the first intensity criteria specified by the first third-party application, performs the second operation associated with the first portion of the user interface of the first third-party application (e.g., in FIG. 7LL, when the depinch gesture represented by focus selectors 715 and 717 does not satisfy the intensity threshold $I_1$, mail application user interface 706 is zoomed in); and, in accordance with a determination that the input meets the first gesture recognition criteria and that the input meets the first intensity criteria specified by the first third-party application, forgoes performance of the second operation associated with the first portion of the user interface of the first third-party application (e.g., in FIG. 7KK, when the depinch gesture represented by focus selectors 715 and 717 satisfies the intensity threshold $I_1$, mail application user interface 724 is not zoomed in).

In some embodiments, a second gesture class is associated (1418) with second gesture recognition criteria for recognizing input detected on the touch-sensitive surface as a second gesture when the second gesture recognition criteria are met. The first third-party application has associated the first portion of the user interface with the second gesture from the second gesture class for a third operation (e.g., in FIG. 7MM, the two-finger pan gesture recognizer (2S) is associated with the first portion of mail application user interface 706). The first third-party application has specified second intensity criteria (e.g., intensity threshold $I_2$ in FIG. 7MM) for the second gesture associated with the first portion of the user interface for the third operation. In response to detecting the input, the device, in accordance with a determination that the input meets the second gesture recognition criteria and that the input meets the second intensity criteria specified by the first third-party application, performs the third operation associated with the first portion of the user interface of the first third-party application (e.g., displaying review window 726 showing a review of the linked website on mail application user interface 706 as shown in FIG. 7NN); and, in accordance with a determination that the input meets the second gesture recognition criteria but does not meet the second intensity criteria specified by the first third-party application, forgoes performance of the third operation associated with the first portion of the user interface of the first third-party application (e.g., when the input does not meet the intensity threshold $I_2$, review window 726 is not displayed).

In some embodiments, the device displays (1420, FIG. 14C), on the display, a user interface of a second third-party application that runs within the operating system and is different from the first third-party application (e.g., browser module 147 in FIG. 1A). The second third-party application has associated a second portion of the user interface of the second third-party application with the first gesture from the first gesture class for a first operation (e.g., the address window of browser application user interface 710 is associated with the third pinch gesture recognizer ($N_3$) for replacing browser application user interface 710 with tabs management view 728 shown in FIG. 7PP). The second third-party application has specified third intensity criteria (e.g., the intensity threshold $I_3$ in FIG. 7PP) for the first gesture associated with the second portion of the user interface for the first operation. The third intensity criteria are different from the first intensity criteria (and, optionally, the third intensity criteria are different from the second intensity criteria). While displaying the user interface of the second third-party application on the display, the device detects an input on the touch-sensitive surface at a location that corresponds to the second portion of the user interface of the second third-party application (e.g., a depinch gesture represented by focus selectors 723 and 725 is detected on the address window of browser application user interface 710 in FIG. 7OO). In response to detecting the input a location that corresponds to the second portion of the user interface of the second third-party application, the device, in accordance with a determination that the input at the location that corresponds to the second portion of the user interface of the second third-party application meets the first gesture recognition criteria and that the input meets the third intensity criteria specified by the second third-party application, performs the first operation associated with the second portion of the user interface of the second third-party application (e.g., browser application user interface 710 is replaced with tabs management view 728 as shown in FIG. 7PP); and, in accordance with a determination that the input at the location that corresponds to the portion of the user interface of the second third-party application meets the first gesture recognition criteria but does not meet the third intensity criteria specified by the second third-party application, forgoes performance of the first operation associated with the second portion of the user interface of the second third-party application. For example, when the intensity of the depinch gesture represented by focus selectors 723 and 725 is below the intensity threshold $I_3$, no action is performed as shown in FIG. 7QQ (e.g., tabs management view 728 shown in FIG. 7PP is not displayed).

It should be understood that the particular order in which the operations in FIGS. 14A-14B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1150, 1200, 1300, 1500, and 1600) are also applicable in an analogous manner to method 1400 described above with respect to FIGS. 14A-14B. For example, the touch inputs, user interface objects, intensity thresholds, and animations described above with reference to method 1400 optionally have one or more of the characteristics of the touch inputs, user interface objects, intensity thresholds, and animations described herein with reference to other methods described herein (e.g., methods 800, 900, 1000, 1100, 1150, 1200, 1300, 1500, and 1600). For brevity, these details are not repeated here.

FIGS. 15A-15B are flow diagrams illustrating a method of processing touch inputs based on dynamic thresholds in accordance with some embodiments. Method 1500 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1500 are, optionally, combined and/or the order of some operations is, optionally, changed.

As described below, method 1500 provides an enhanced way to process touch inputs with dynamic thresholds. Method 1500 improves efficiency in processing touch inputs. By reducing unnecessary/extraneous/repetitive inputs, such methods and interfaces provide a more efficient human-machine interface, thereby improving overall operational time and user experience. For battery-operated devices, such methods and interfaces conserve battery power and increase the time between battery charges.

The device displays (1502), on the display, a user interface (e.g., mail application user interface 706 in FIG. 7RR).

While displaying the user interface, the device detects (1504) an input on the touch-sensitive surface (e.g., the input corresponding to focus selector 727 in FIG. 7RR).

In response to detecting the input while displaying the first user interface, and while detecting the input, the device, in accordance with a determination that the input satisfies first timing criteria and first intensity input criteria, performs (1506) a first operation (e.g., visually distinguishing user interface object 708 as shown in FIG. 7SS). The first timing criteria require that the input remain on the touch-sensitive surface while a first time period elapses (e.g., through a time period p1 ending at time 7124, as shown in FIG. 7SS). The first intensity input criteria require that the input satisfy a first intensity threshold (e.g., the intensity threshold $I_L$ as shown in FIG. 7SS) at an end of or subsequent to the first time period (e.g., at a time subsequent to or at an end of the first time period).

In some embodiments, the first time period starts (1508) in response to detecting the input on the touch-sensitive surface (e.g., in FIG. 7SS, the time period p1 starts from the initial detection of focus selector 727).

In some embodiments, while detecting the input, the device, in accordance with a determination that intensity of the input has decreased below a reference intensity threshold, restarts (1510) the first time period (e.g., as shown in FIG. 7UU, when the intensity of the input decreases below the reference intensity threshold $I_R$, the first time period restarts from time 7146 when the intensity of the input has fallen below the reference intensity threshold $I_R$). In some embodiments, the reference intensity threshold is determined based on a maximum intensity detected during a predefined detection time period and an intensity reduction margin (e.g., a fixed margin such as 10 g, 20 g, 30 g, or 40 g, or a dynamic margin such as 5%, 10%, 20%, or 30% of the maximum intensity of the contact), such as $I_{margin}$ in FIG. 7UU. In some embodiments, reference intensity threshold is determined based on the maximum intensity detected since the time period started (e.g., since moment the input was detected or since the last time the time period restarted) and the intensity reduction margin. For example, the reference intensity threshold corresponds to the maximum detected intensity minus the intensity reduction margin (e.g., $I_{margin}$ in FIG. 7UU). In some embodiments, the reference intensity threshold continues to be updated while the input is detected (e.g., as shown in FIG. 7VV, the reference intensity threshold is updated based on changes to the intensity of the input).

In some embodiments, while detecting the input, the device, in accordance with the determination that the intensity of the input has decreased below the reference intensity threshold, resets (1512) the reference intensity threshold (e.g., in FIG. 7VV, when the intensity of the input decreases below a first reference intensity $I_{R1}$, the reference intensity is reset to a second reference intensity $I_{R2}$). In some embodiments, the reference intensity threshold is changed based on the intensity of the input detected when the reference intensity threshold is reset (e.g., the second reference intensity $I_{R2}$ is determined based on the intensity of the input when the reference intensity threshold is reset, which is $I_{R1}$).

For example, the reference intensity threshold is reset to the intensity of the input, detected when (or immediately before) the reference intensity threshold is reset, minus the intensity reduction margin (e.g., in FIG. 7VV, the second reference intensity $I_{R2}$ is the first reference intensity $I_{R1}$ minus the intensity margin $I_{margin}$).

In some embodiments, in response to detecting the input while displaying the first user interface, in accordance with a determination that the input does not satisfy the first timing criteria and/or the first intensity input criteria, the device forgoes (1514) the first operation (e.g., when the input follows intensity pattern 7130 or intensity pattern 7132 in FIG. 7RR, the first operation, such as visually distinguishing user interface object 708 as shown in FIG. 7SS, is not performed).

In some embodiments, in response to detecting the input while displaying the first user interface, the device, in accordance with a determination that the input satisfies second timing criteria and second intensity input criteria, performs (1516, FIG. 15B) a second operation that is distinct from the first operation (e.g., as shown in FIG. 7TT, when the input satisfies the second timing criteria based on the time period p2 ending at time 7136 and the second intensity input criteria based on the intensity threshold $I_M$, preview area 712 is displayed). The second timing criteria require that the input remain on the touch-sensitive surface while a second time period elapses. In some embodiments, the second time period is identical to the first time period. In some embodiments, the second time period is distinct from the first time period. The second intensity input criteria require that the input satisfy a second intensity threshold, that is distinct from the first intensity threshold (e.g., the second intensity threshold is higher than the first intensity threshold), at an end of or subsequent to the second time period (e.g., at a time subsequent to or at an end of the second time period).

In some embodiments, the device, in response to detecting the input and in accordance with the determination that the input satisfies the first timing criteria and the first input criteria, performs (1518) the first operation including processing the input with a first gesture recognizer (e.g., the reveal gesture recognizer (R) described above with respect to FIGS. 7A-7CC); and, in response to detecting the input and in accordance with a determination that the input satisfies the second timing criteria and the second intensity input criteria, performs the second operation including processing the input with a second gesture recognizer (e.g., the preview gesture recognizer (P) described above with respect to FIGS. 7A-7CC). In some embodiments, processing the input with the second gesture recognizer includes placing the first gesture recognizer in a failed state.

In some embodiments, processing the input with the first gesture recognizer initiates placing a tap gesture recognizer in a cancelled state. In some embodiments, processing the input with a tap gesture recognizer initiates placing the first gesture recognizer in a cancelled state. In some embodiments, processing the input with a long press gesture recognizer initiates placing the first gesture recognizer in a cancelled state.

In some embodiments, the device detects (1520) an end of the input (e.g., detecting liftoff of a contact that corresponds to the input from the touch-sensitive surface); and, in response to detecting the end of the input, in accordance with a determination that the input satisfies third timing criteria distinct from the first timing criteria (and from the second timing criteria), performs a third operation that is distinct from the first operation (and from the second operation). For example, if the device detects a quick tap input (e.g., an input following input pattern 7132 in FIG. 7RR) even if that tap input satisfies the first intensity threshold, the device performs an operation that is associated with (e.g., mapped to or assigned to) the tap input (e.g., displaying browser application user interface 710 shown in FIG. 7B) rather than performing an operation that is associated with (e.g., mapped to or assigned to) the first intensity threshold.

In some embodiments, in response to detecting the end of the input, in accordance with a determination that the input does not satisfy the third timing criteria or the first timing criteria, the device forgoes (1522) performance of any operation. For example, if the device detects a long contact that is longer than the third timing criteria and satisfies the first intensity threshold but does not satisfy the first timing criteria (e.g., an input following input pattern 7131 in FIG. 7RR), the device does not perform either the operation that is associated with (e.g., mapped to or assigned to) the tap input or the operation that is associated with (e.g., mapped to or assigned to) the first intensity threshold.

It should be understood that the particular order in which the operations in FIGS. 15A-15B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1150, 1200, 1300, 1400, and 1600) are also applicable in an analogous manner to method 1500 described above with respect to FIGS. 15A-15B. For example, the touch inputs, user interface objects, intensity thresholds, and animations described above with reference to method 1500 optionally have one or more of the characteristics of the touch inputs, user interface objects, intensity thresholds, and animations described herein with reference to other methods described herein (e.g., methods 800, 900, 1000, 1100, 1150, 1200, 1300, 1400, and 1600). For brevity, these details are not repeated here.

FIGS. 16A-16B are flow diagrams illustrating method 1600 of processing touch inputs based on dynamic thresholds in accordance with some embodiments. Method 1600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1600 are, optionally, combined and/or the order of some operations is, optionally, changed.

As described below, method 1600 provides an enhanced way to process touch inputs with dynamic thresholds. Method 1600 improves efficiency in processing touch inputs. By reducing unnecessary/extraneous/repetitive inputs, such methods and interfaces provide a more efficient human-machine interface, thereby improving overall operational time and user experience. For battery-operated devices, such methods and interfaces conserve battery power and increase the time between battery charges.

The device displays (1602), on the display, a user interface (e.g., mail application user interface 706 in FIG. 7WW).

While displaying the user interface, the device detects (1604) an input on the touch-sensitive surface (e.g., the input corresponding to focus selector 729 in FIG. 7WW).

In response to detecting the input while displaying the first user interface, and while detecting the input, in accordance with a determination that the input satisfies an activation intensity threshold, the device performs (1606) a first operation (e.g., when the intensity of input 7156 exceeds first intensity threshold component 7154, mail application user interface 706 is replaced with browser application user interface 710). The activation intensity threshold includes a first intensity threshold component (e.g., first intensity threshold component 7154 in FIG. 7WW) that decreases from a first intensity value (e.g., the initial intensity threshold $I_H$) over time.

In some embodiments, the activation intensity threshold includes (1608) a second intensity threshold component (e.g., second intensity threshold component 7168 in FIG. 7YY) that follows intensity of the input with a delay. In some embodiments, the second intensity threshold component is obtained by applying a low pass filter on the intensity of the input.

In some embodiments, the activation intensity threshold is (1610) a sum of the first intensity threshold component and the second intensity threshold component (e.g., in FIG. 7YY, activation intensity threshold 7170 is a sum of first intensity threshold component 7154 and second intensity threshold component 7168). In some embodiments, the activation intensity threshold is set in a way such that it is no less than a minimum activation intensity threshold (e.g., as shown in FIG. 7BBB, activation intensity threshold 7180 is no less than baseline threshold 7182).

In some embodiments, the first intensity threshold component decreases (1612) after a predefined time interval from a moment the input is detected (e.g., in FIG. 7WW, first intensity threshold component 7154 decreases after the predefined time interval p3, which begins when the input is initially detected).

In some embodiments, in accordance with a determination that the first intensity threshold component is not below a reference intensity threshold, the first intensity threshold component follows (1614) a decay curve that decreases after a predefined time interval (e.g., from a moment the input is detected as shown in FIG. 7WW or from a moment the peak operation has been performed), and, in accordance with a determination that the first intensity threshold component is below the reference intensity threshold, the first intensity threshold component follows a decay curve that decreases starting at a time determined without reference to the predefined time interval (e.g., as shown in FIG. 7XX, first intensity threshold component 7164 starts to decay when the intensity of the input falls below the reference intensity threshold $I_R$). In some embodiments, the reference intensity threshold is determined based on a maximum intensity detected during a predefined detection time period and an intensity reduction margin. In some embodiments, reference intensity threshold is determined based on the maximum intensity detected since the moment the input is detected and the intensity reduction margin. For example, the reference intensity threshold corresponds to the maximum detected intensity minus the intensity reduction margin. In some embodiments, the reference intensity threshold continues to be updated while the input is detected.

In some embodiments, in response to detecting the input while displaying the first user interface, and while detecting the input, in accordance with a determination that the input satisfies first timing criteria and first intensity input criteria, the device performs (1616, FIG. 16B) a second operation (e.g., a peek/preview operation). For example, as shown in FIG. 7ZZ, when input 7172 satisfies the first timing criteria and the first intensity input criteria at time 7124, the second operation (e.g., displaying preview area 712 as shown in FIG. 7G) is performed, before performing the first operation (e.g., replacing mail application user interface 706 with browser application user interface 710 as shown in FIGS. 7G-7I). The first timing criteria require that the input remain on the touch-sensitive surface while a first time period elapses. The first intensity input criteria require that the input satisfy a first intensity threshold at an end of or subsequent to the first time period (e.g., at a time subsequent to or at an end of the first time period).

In some embodiments, the first intensity threshold component follows (1618) a decay curve that decreases after a predefined time interval from a moment the input satisfies the first timing criteria and the first intensity input criteria. For example, as shown in FIG. 7ZZ, the decay of the first intensity threshold component in activation intensity threshold 7174 starts at time 7176, which corresponds to the predefined time interval p3 after time 7124 when the input satisfies the first timing criteria and the first intensity input criteria.

In some embodiments, the input is (1620) a continuous gesture that includes a first increase in intensity and a second increase in intensity that is subsequent to the first increase in intensity and a decrease in intensity between the first increase in intensity and the second increase in intensity (e.g., in FIG. 7AAA, input 7178 includes a first increase in intensity from below $I_L$ to above $I_M$, followed by a decrease in intensity from above $I_M$ to below $I_L$, followed by a second increase in intensity from below $I_L$ to above $I_L$ (and above $I_M$) without releasing input 7178), while the input remains in contact with the touch-sensitive surface between the first increase in intensity and the second increase in intensity. The device, in response to detecting the first increase in intensity of the input, performs the second operation (e.g., input 7178 satisfies the first timing criteria and the first intensity input criteria at time 7124, and initiates the second operation, such as displaying preview area 712 as shown in FIG. 7G); and, in response to detecting the second increase in intensity of the input, performs the first operation (e.g., input 7178 satisfies activation intensity threshold 7180 at time 7179, and initiates the first operation, such as replacing mail application user interface 706 with browser application user interface 710 as shown in FIGS. 7G-7I).

It should be understood that the particular order in which the operations in FIGS. 16A-16B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1150, 1200, 1300, 1400, and 1500) are also applicable in an analogous manner to method 1600 described above with respect to FIGS. 16A-16B. For example, the touch inputs, user interface objects, intensity thresholds, and animations described above with reference to method 1600 optionally have one or more of the characteristics of the touch inputs, user interface objects, intensity thresholds, and animations described herein with reference to other methods described herein (e.g., methods 800, 900, 1000, 1100, 1150, 1200, 1300, 1400, and 1500). For brevity, these details are not repeated here.

Figure 17:
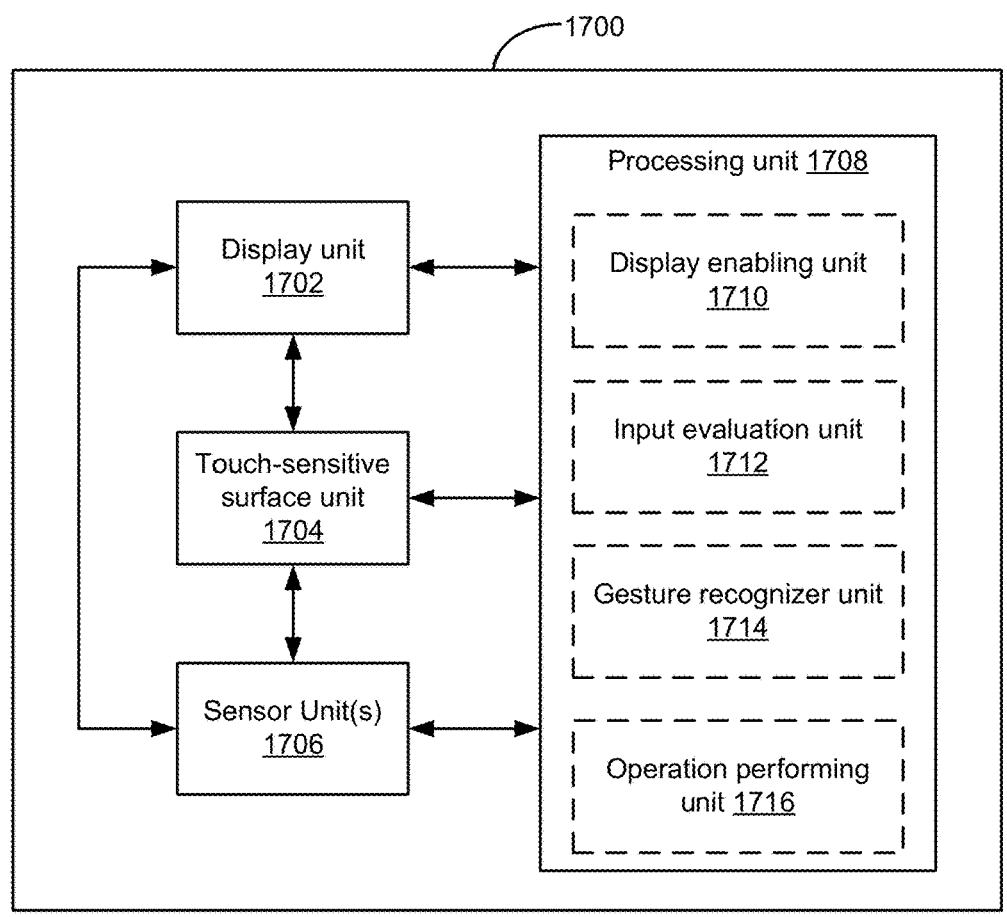
FIGS. 17-23 are functional block diagrams of an electronic device in accordance with some embodiments.

In accordance with some embodiments, FIG. 17 shows a functional block diagram of electronic device 1700 configured in accordance with the principles of the various described embodiments. The functional blocks of device 1700 are, optionally, implemented by hardware, software, firmware, or a combination thereof to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, electronic device 1700 includes display unit 1702 configured to display one or more user interfaces; touch-sensitive surface unit 1704 configured to receive user inputs; one or more sensor units 1706 configured to detect intensity of contacts with the touch-sensitive surface unit 1704; and processing unit 1708 coupled to display unit 1702, touch-sensitive surface unit 1704 and one or more sensor units 1706. In some embodiments, processing unit 1708 includes display enabling unit 1710, input evaluation unit 1712, gesture recognizer unit 1714, and operations performing unit 1716.

In some embodiments, electronic device 1700 is configured to distinguish between a long press gesture and a deep press input and to perform distinct operations in response to the long press gesture and the deep press input. In such embodiments, processing unit 1708 is configured to enable display of a first user interface, and processing unit 1708 is further configured to detect an input on the touch-sensitive surface unit (e.g., with input evaluation unit 1712) while enabling display of the first user interface (e.g., with display enabling unit 1710), and in response to detecting the input while enabling display of the first user interface, perform a first operation (e.g., with operation performing unit 1716) in accordance with a determination that the input satisfies intensity input criteria including that the input satisfies a first intensity threshold during a first predefined time period, and perform a second operation (e.g., with operation performing unit 1716) in accordance with a determination that the input satisfies long press criteria including that the input remains below the first intensity threshold during the first predefined time period. In some implementations of these embodiments, the first user interface is the user interface of a first software application, the first user interface includes a plurality of user interface objects, including a first user interface object associated with an application-independent set of predefined instructions for preview operations (e.g., with display enabling unit 1710 and/or operation performing unit 1716). In some embodiments, electronic device 1700 is configured to perform any of the methods described above with reference to FIGS. 8A-8E.

In some embodiments, electronic device 1700 is configured to distinguish between a pan gesture and a deep press input and to perform distinct operations in response to the pan gesture and the deep press input. In such embodiments, processing unit 1708 is configured to enable display of a first user interface, and processing unit 1708 is further configured to detect an input on the touch-sensitive surface unit (e.g., with input evaluation unit 1712) while enabling display of the first user interface (e.g., with display enabling unit 1710), in response to detecting the input while enabling display of the first user interface, perform a first operation (e.g., with operation performing unit 1716) in accordance with a determination that the input satisfies intensity input criteria including that the input satisfies a first intensity threshold, and perform a second operation (e.g., with operation performing unit 1716) in accordance with a determination that the input satisfies pan criteria including that the input has moved across the touch-sensitive surface by at least a predefined distance. In some implementations of these embodiments, the first user interface is the user interface of a first software application, the first user interface includes a plurality of user interface objects, including a first user interface object associated with an application-independent set of predefined instructions for preview operations (e.g., with display enabling unit 1710 and/or operation performing unit 1716). In some embodiments, electronic device 1700 is configured to perform any of the methods described above with reference to FIGS. 9A-9D.

In some embodiments, electronic device 1700 is configured to distinguish between a tap gesture input and a deep press input and to perform distinct operations in response to the tap gesture and the deep press input. In such embodiments, processing unit 1708 is configured to enable display of a first user interface, and processing unit 1708 is further configured to detect an input on the touch-sensitive surface unit (e.g., with input evaluation unit 1712) while enabling display of the first user interface (e.g., with display enabling unit 1710), and in response to detecting the input while enabling display of the first user interface, perform a first operation (e.g., with operation performing unit 1716) in accordance with a determination that the input satisfies intensity input criteria including that the input satisfies a first intensity threshold and the input remains on the touch-sensitive surface for a first predefined time period, and perform a second operation (e.g., with operation performing unit 1716) in accordance with a determination that the input satisfies long press criteria including that the input ceases to remain on the touch-sensitive surface during the first predefined time period. In some implementations of these embodiments, the first user interface is the user interface of a first software application, the first user interface includes a plurality of user interface objects, including a first user interface object associated with an application-independent set of predefined instructions for preview operations (e.g., with display enabling unit 1710 and/or operation performing unit 1716). In some embodiments, electronic device 1700 is configured to perform any of the methods described above with reference to FIGS. 10A-10D.

Figure 18:
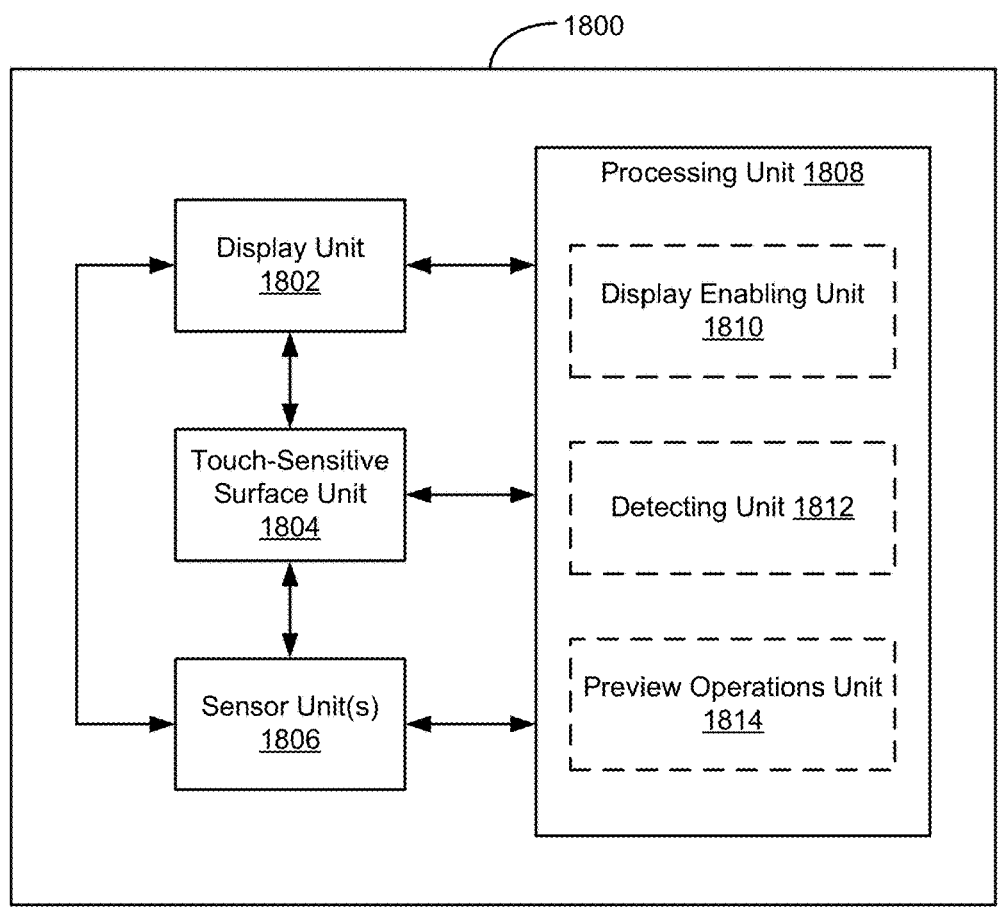

In accordance with some embodiments, FIG. 18 shows a functional block diagram of electronic device 1800 configured in accordance with the principles of the various described embodiments. The functional blocks of device 1800 are, optionally, implemented by hardware, software, firmware, or a combination thereof to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, electronic device 1800 includes display unit 1802 configured to display one or more user interfaces; touch-sensitive surface unit 1804 configured to receive user inputs; one or more sensor units 1806 configured to detect intensity of contacts with the touch-sensitive surface unit 1804; and processing unit 1808 coupled to display unit 1802, touch-sensitive surface unit 1804 and one or more sensor units 1806. In some embodiments, processing unit 1808 includes display enabling unit 1810, detecting unit 1812, and preview operations unit 1814.

In some embodiments, processing unit 1808 is configured to: enable display of a first user interface of a first software application, the first user interface including a plurality of user interface objects, a first user interface object of the plurality of user interface objects being associated with an application-independent set of predefined instructions for preview operations (e.g., with display enabling unit 1810); detect a first portion of an input by a contact (e.g., with detecting unit 1812) while a focus selector is over the first user interface object, in the plurality of user interface objects, on display unit 1802; and in response to detecting the first portion of the input and in accordance with a determination that the first portion of the input satisfies reveal criteria including that the input satisfies a first intensity threshold, execute the application-independent set of predefined instructions for preview operations (e.g., with preview operations unit 1814), including providing preview content to the application-independent set of predefined instructions. The preview operations performed by executing the application-independent set of predefined instructions include: visually distinguishing the first user interface object in the first user interface; and, subsequent to initiation of the visual distinction of the first user interface object in the first user interface: receiving a second portion of the input that is subsequent to the first portion of the input; and, in accordance with a determination that the second portion of the input satisfies preview criteria including that the input satisfies a second intensity threshold, enabling display of a preview area overlaid on the first user interface. The preview area includes the preview content.

In some embodiments, processing unit 1808 is configured to: enable display of a first user interface of a first software application, the first user interface including a plurality of user interface objects, a first user interface object of the plurality of user interface objects being associated with an application-independent set of predefined instructions for preview operations (e.g., with display enabling unit 1810); detect a first portion of an input by a contact (e.g., with detecting unit 1812) while a focus selector is over the first user interface object, in the plurality of user interface objects, on display unit 1802; and in response to detecting the first portion of the input and in accordance with a determination that the first portion of the input meets preview criteria, execute the application-independent set of predefined instructions for preview operations (e.g., with preview operations unit 1814). The preview operations performed by executing the application-independent set of predefined instructions include: enabling display of a preview area overlaid on the first user interface; after detecting the first portion of the input, detecting a second portion of the input; and, in response to detecting the second portion of the input by the contact, in accordance with a determination that the second portion of the input meets user-interface-replacement criteria, replacing display of the first user interface with a second user interface that is distinct from the first user interface.

Figure 19:
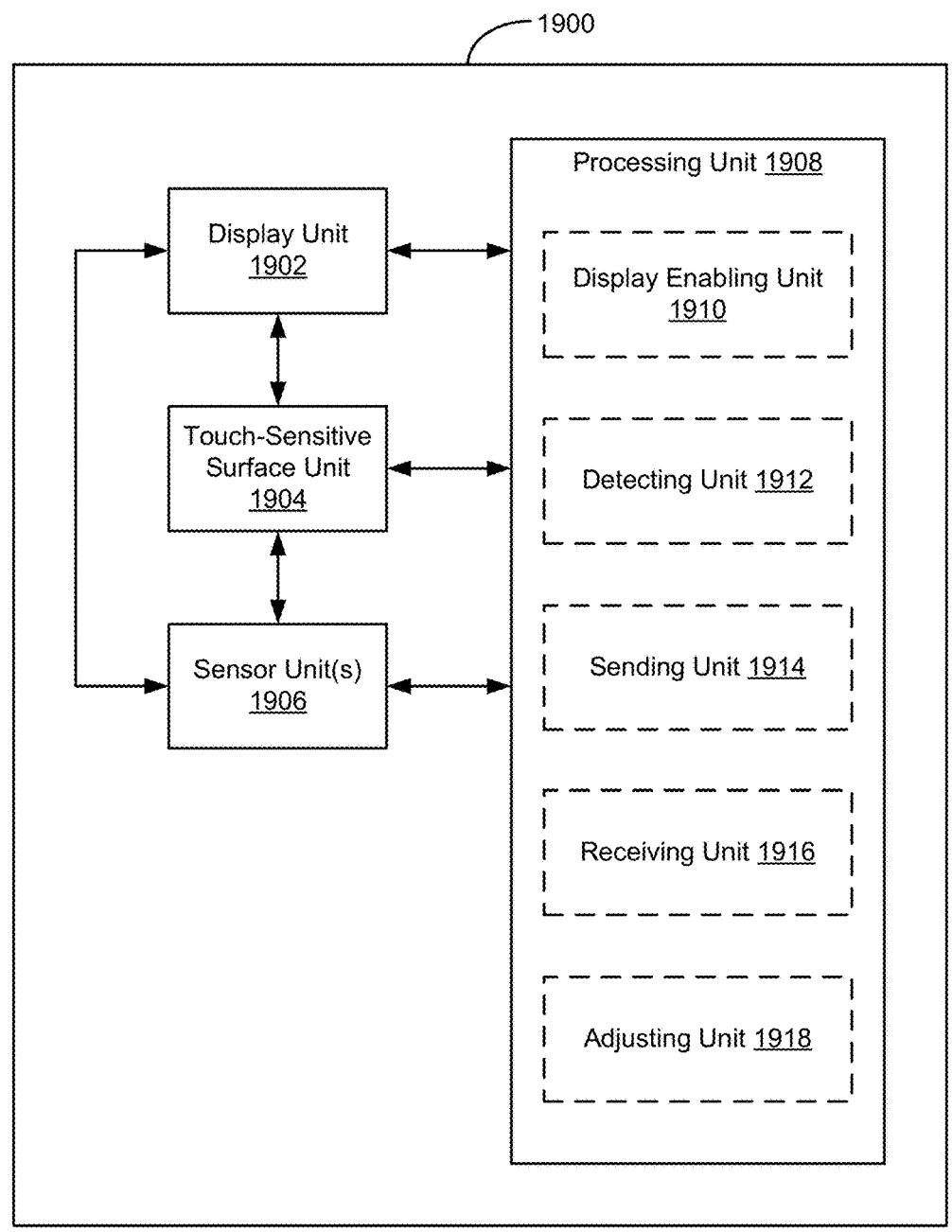

In accordance with some embodiments, FIG. 19 shows a functional block diagram of electronic device 1900 configured in accordance with the principles of the various described embodiments. The functional blocks of device 1900 are, optionally, implemented by hardware, software, firmware, or a combination thereof to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, electronic device 1900 includes display unit 1902 configured to display a user interface; touch-sensitive surface unit 1904 configured to receive user inputs; one or more sensor units 1906 configured to detect intensity of contacts with touch-sensitive surface unit 1904; and processing unit 1908 coupled to display unit 1902, touch-sensitive surface unit 1904 and one or more sensor units 1906. In some embodiments, processing unit 1908 includes display enabling unit 1910, detecting unit 1912, sending unit 1914, receiving unit 1916, and adjusting unit 1918.

Processing unit 1908 is configured to: enable display, on display unit 1902, of a user interface of a software application (e.g., with display enabling unit 1910); while enabling display of the user interface of the software application on display unit 1902, detect an input (e.g., with detecting unit 1912) on touch-sensitive surface unit 1904 at a location that corresponds to the user interface of the software application; and, in response to detecting the input, send from an application-independent set of instructions to the software application intensity information (e.g., with sending unit 1914) that corresponds to the input. The intensity information includes: a reference intensity assigned to the one or more sensors; and a characteristic intensity that corresponds to a detected intensity of the input.

Figure 20:
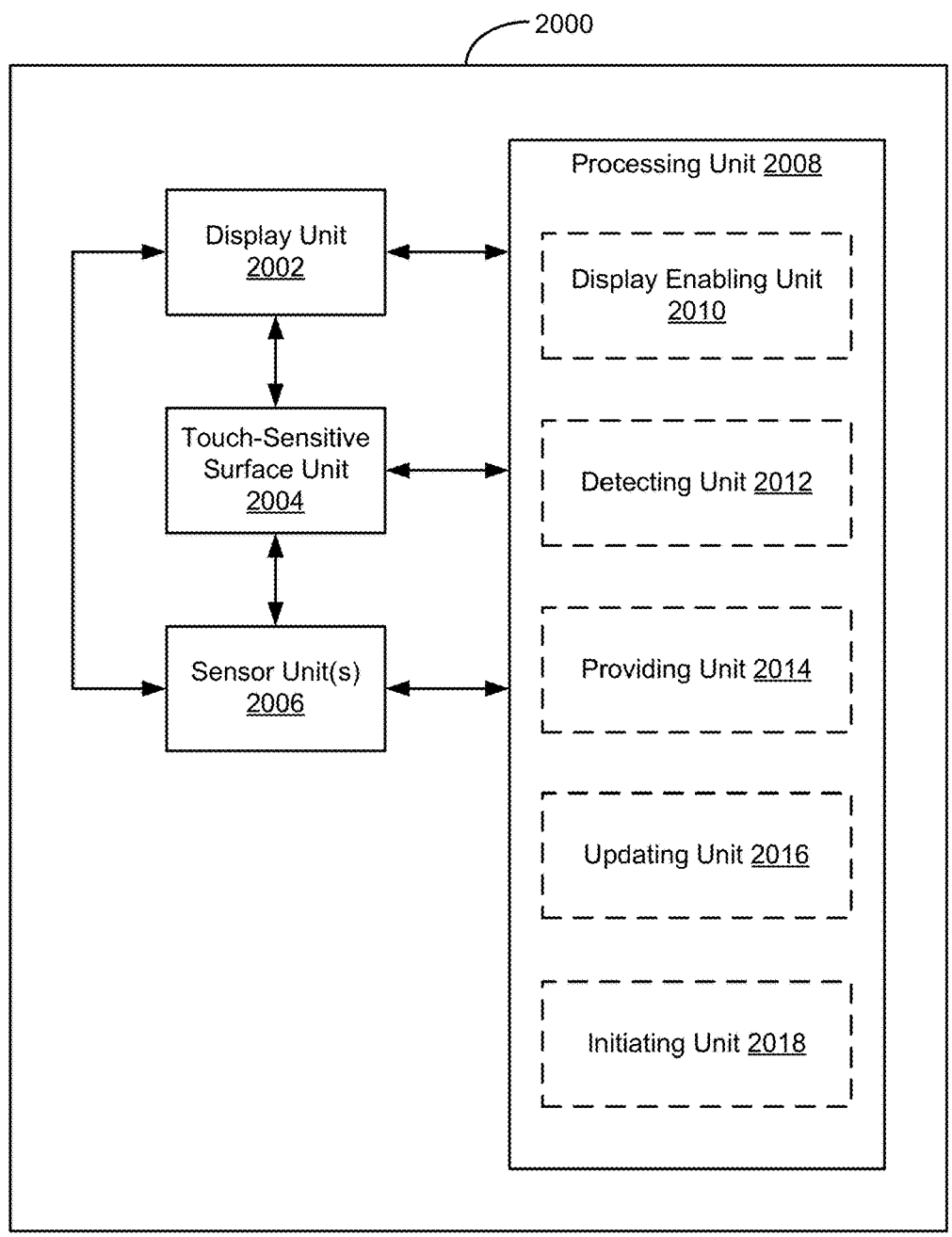

In accordance with some embodiments, FIG. 20 shows a functional block diagram of electronic device 2000 configured in accordance with the principles of the various described embodiments. The functional blocks of device 2000 are, optionally, implemented by hardware, software, firmware, or a combination thereof to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, electronic device 2000 includes display unit 2002 configured to display a user interface; touch-sensitive surface unit 2004 configured to receive user inputs; one or more sensor units 2006 configured to detect intensity of contacts with touch-sensitive surface unit 2004; and processing unit 2008 coupled to display unit 2002, touch-sensitive surface unit 2004 and one or more sensor units 2006. In some embodiments, processing unit 2008 includes display enabling unit 2010, detecting unit 2012, providing unit 2014, updating unit 2016, and initiating unit 2018.

Processing unit 2008 is configured to: enable display, on display unit 2002, of a first user interface of a software application (e.g., with display enabling unit 2010); while enabling display of the first user interface of the software application, detect an input on touch-sensitive surface unit 2004 (e.g., with detecting unit 2012); and, while detecting the input: in response to detecting changes to intensity of the input, provide from an application-independent set of instructions to the software application a value of a first progress indicator (e.g., with providing unit 2014) that represents the changes to the intensity of the input; and update the first user interface (e.g., with updating unit 2016) in accordance with a set of instructions in the software application that is different from the application-independent set of instructions and the value of the first progress indicator.

Figure 21:
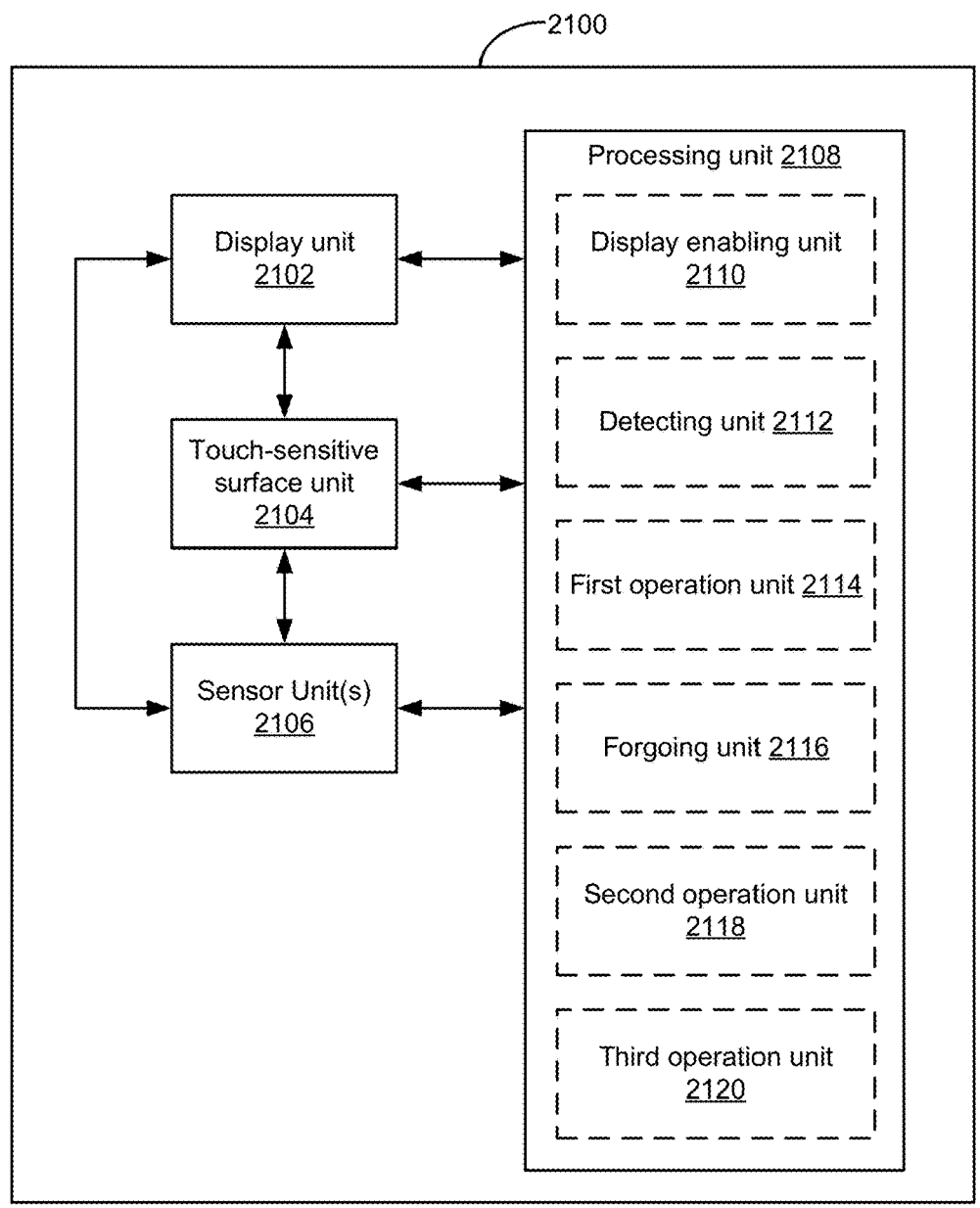

In accordance with some embodiments, FIG. 21 shows a functional block diagram of electronic device 2100 configured in accordance with the principles of the various described embodiments. The functional blocks of device 2100 are, optionally, implemented by hardware, software, firmware, or a combination thereof to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, electronic device 2100 includes display unit 2102 configured to display user interfaces, touch-sensitive surface unit 2104 configured to detect contacts, one or more sensor units 2106 configured to detect intensity of contacts with touch-sensitive surface unit 2104; and processing unit 2108 coupled with display unit 2102, touch-sensitive surface unit 2104 and one or more sensor units 2106. In some embodiments, processing unit 2108 includes: display enabling unit 2110, detecting unit 2112, first operation unit 2114, time period restarting unit 2116, reference intensity resetting unit 2118, forgoing unit 2120, second operation unit 2122, and third operation unit 2124.

Processing unit 2108 is configured to enable display, on display unit 2102, of a user interface of a first third-party application that runs within an operating system (e.g., using display enabling unit 2110). Capabilities of the device are exposed to the first third-party application through an operating system framework of the operating system. The operating system framework defines a plurality of gesture classes that can be recognized by the device. A first gesture class is associated with first gesture recognition criteria for recognizing input detected on touch-sensitive surface unit 2104 as a first gesture when the first gesture recognition criteria are met. The first third-party application has associated a first portion of the user interface with the first gesture from the first gesture class for a first operation. The first third-party application has specified first intensity criteria for the first gesture associated with the first portion of the user interface for the first operation. Processing unit 2108 is configured to, while enabling display of the user interface of the first third-party application on display unit 2102, detect an input on touch-sensitive surface unit 2104 at a location that corresponds to the first portion of the user interface of the first third-party application (e.g., using detecting unit 2112); and, in response to detecting the input: in accordance with a determination that the input meets the first gesture recognition criteria and that the input meets the first intensity criteria specified by the first third-party application, perform the first operation associated with the first portion of the user interface of the first third-party application (e.g., using first operation unit 2114); and, in accordance with a determination that the input meets the first gesture recognition criteria but does not meet the first intensity criteria specified by the first third-party application, forgo performance of the first operation associated with the first portion of the user interface of the first third-party application (e.g., using forgoing unit 2116).

Figure 22:
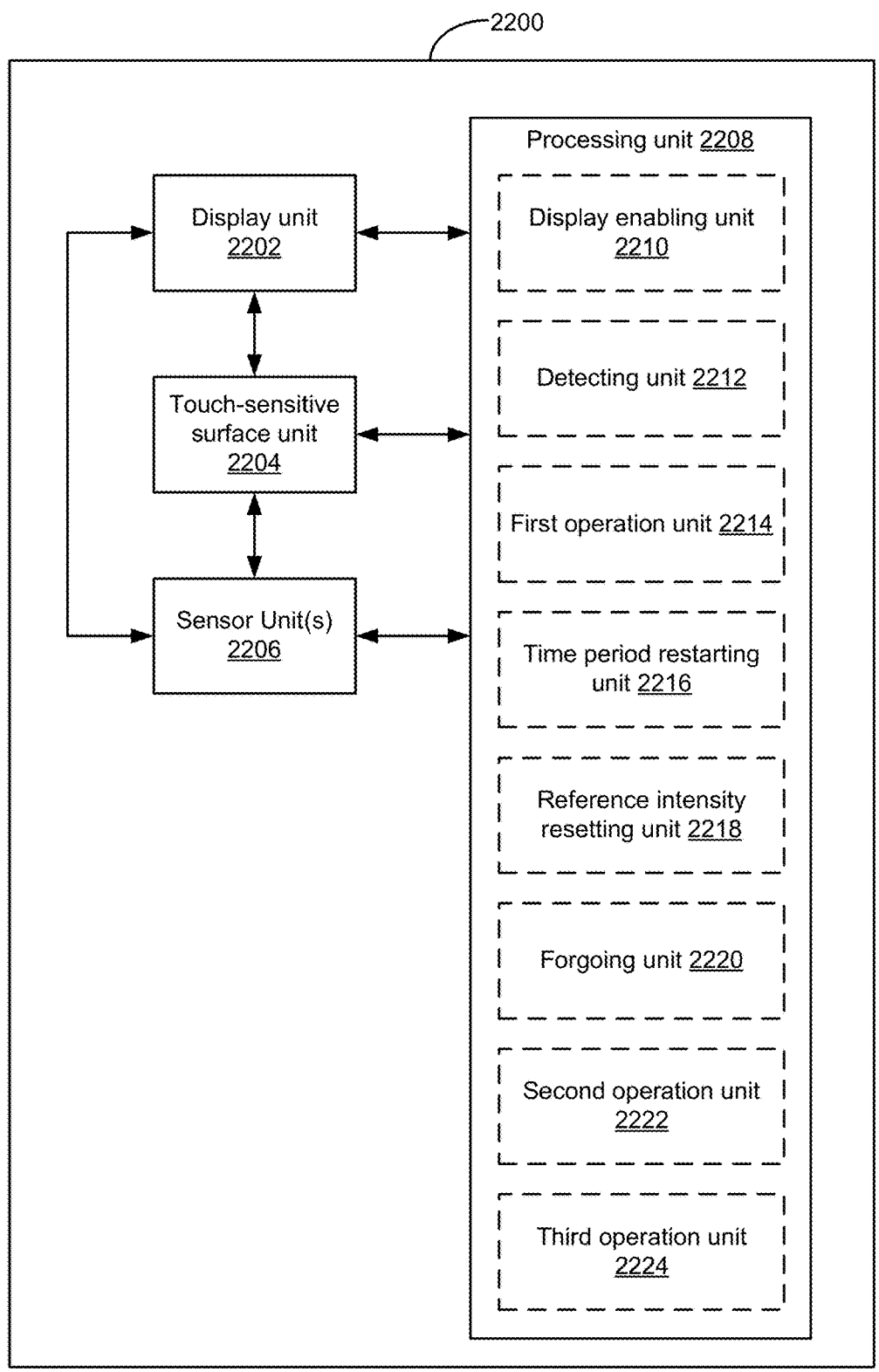

In accordance with some embodiments, FIG. 22 shows a functional block diagram of electronic device 2200 configured in accordance with the principles of the various described embodiments. The functional blocks of device 2200 are, optionally, implemented by hardware, software, firmware, or a combination thereof to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, electronic device 2200 includes display unit 2202 configured to display user interfaces, touch-sensitive surface unit 2204 configured to detect contacts, one or more sensor units 2206 configured to detect intensity of contacts with touch-sensitive surface unit 2204; and processing unit 2208 coupled with display unit 2202, touch-sensitive surface unit 2204 and one or more sensor units 2206. In some embodiments, processing unit 2208 includes: display enabling unit 2210, detecting unit 2212, first operation unit 2214, time period restarting unit 2216, reference intensity resetting unit 2218, forgoing unit 2220, second operation unit 2222, and third operation unit 2224.

Processing unit 2208 is configured to: enable display, on display unit 2202, a user interface (e.g., using display enabling unit 2210); while enabling display of the user interface, detect an input on touch-sensitive surface unit 2204 (e.g., using detecting unit 2212); and, in response to detecting the input while enabling display of the first user interface, and while detecting the input: in accordance with a determination that the input satisfies first timing criteria and first intensity input criteria, perform a first operation (e.g., using first operation unit 2214). The first timing criteria require that the input remain on touch-sensitive surface unit 2204 while a first time period elapses. The first intensity input criteria require that the input satisfy a first intensity threshold at an end of or subsequent to the first time period.

Figure 23:
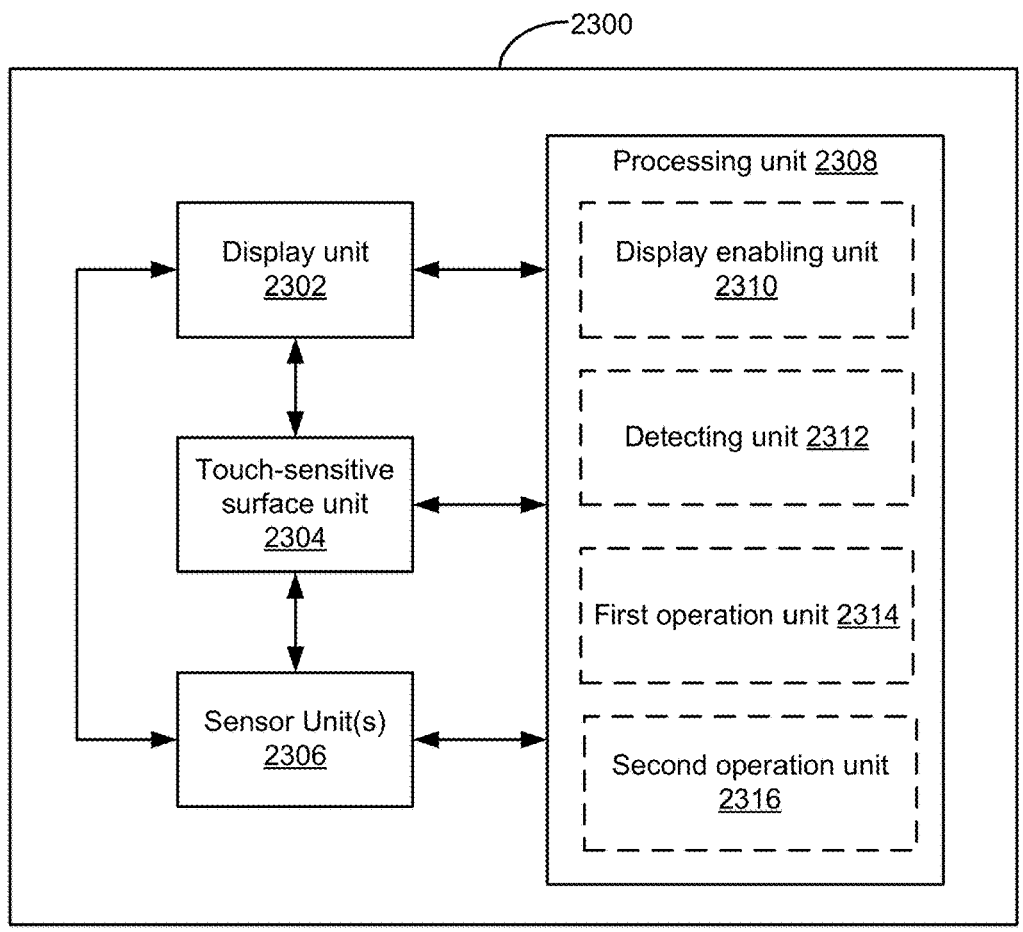

In accordance with some embodiments, FIG. 23 shows a functional block diagram of electronic device 2300 configured in accordance with the principles of the various described embodiments. The functional blocks of device 2300 are, optionally, implemented by hardware, software, firmware, or a combination thereof to carry out the principles of the various described embodiments. It is understood by persons of skill in the art that the functional blocks described in FIG. 23 are, optionally, combined or separated into sub-blocks to implement the principles of the various described embodiments. Therefore, the description herein optionally supports any possible combination or separation or further definition of the functional blocks described herein.

As shown in FIG. 23, electronic device 2300 includes display unit 2302 configured to display user interfaces, touch-sensitive surface unit 2304 configured to detect contacts, one or more sensor units 2306 configured to detect intensity of contacts with touch-sensitive surface unit 2304; and processing unit 2308 coupled with display unit 2302, touch-sensitive surface unit 2304 and one or more sensor units 2306. In some embodiments, processing unit 2308 includes: display enabling unit 2310, detecting unit 2312, first operation unit 2314, and second operation unit 2316.

Processing unit 2308 is configured to: enable display, on display unit 2302, of a user interface (e.g., using display enabling unit 2310); while enabling display of the user interface, detect an input on touch-sensitive surface unit 2304 (e.g., using detecting unit 2312); and, in response to detecting the input while enabling display of the first user interface, and while detecting the input: in accordance with a determination that the input satisfies an activation intensity threshold, perform a first operation (e.g., using first operation unit 2314). The activation intensity threshold includes a first intensity threshold component that decreases from a first intensity value over time.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8E, 9A-9D, 10A-10D, 11A-11D, 12A-12B, 13A-13B, 14A-14C, 15A-15B, and 16A-16B are, optionally, implemented by components depicted in FIGS. 1A-1B. For example, intensity detection operation 804, first operation 810, and second operation 812 are, optionally, implemented by event sorter 170, event recognizer 180, and event handler 190. In another example, input detection operation 1410, first operation performance operation 1412, and second operation performance operation 1414 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display, a touch-sensitive surface, and one or more sensors to detect intensity of contacts with the touch-sensitive surface:
   displaying a first user interface;
   while displaying the first user interface, detecting an input on the touch-sensitive surface that includes movement across the touch-sensitive surface by at least a predefined distance; and,
   in response to detecting the input while displaying the first user interface:

monitoring the input using a first gesture recognizer having a first state and a second gesture recognizer having a second state;

in accordance with a determination that the input includes an increase in intensity that satisfies intensity input criteria, the intensity input criteria including that the input satisfies a first intensity threshold before moving across the touch-sensitive surface by the predefined distance:

transitioning the first state of the first gesture recognizer to a predefined gesture recognition state and performing a corresponding first operation; and, transitioning the second state of the second gesture recognizer to a state other than the predefined gesture recognition state or maintaining the second state of the second gesture recognizer in a state other than the predefined gesture recognition state; and, in accordance with a determination that the input satisfies pan criteria including that the input has moved across the touch-sensitive surface by at least the predefined distance before satisfying the intensity input criteria:

transitioning the second state of the second gesture recognizer to an updated state and performing a corresponding second operation that is distinct from the first operation; and, transitioning the first state of the first gesture recognizer to a state other than the updated state;

wherein the state other than the predefined gesture recognition state is a failed state; and the method further includes:

in accordance with a determination that the input includes an increase in intensity that satisfies the intensity input criteria, transitioning the second gesture recognizer from the second state to the failed state;

in accordance with a determination that the input satisfies pan criteria, transitioning the first gesture recognizer from the first state to the failed state; and subsequent to transitioning a respective gesture recognizer to the failed state, maintaining the respective gesture recognizer in the failed state until ceasing to detect the input.

2. The method of claim 1, wherein:

detecting the input on the touch-sensitive surface includes detecting a first portion of the input and a second portion of the input that is subsequent to the first portion of the input; and the method includes:

in response to detecting the first portion of the input on the touch-sensitive surface, identifying a first set of gesture recognizers that correspond to at least the first portion of the input as candidate gesture recognizers, the first set of gesture recognizers including the first gesture recognizer and the second gesture recognizer; and, in response to detecting the second portion of the input on the touch-sensitive surface:

in accordance with the determination that the input satisfies the intensity input criteria, performing the first operation; and, in accordance with the determination that the input satisfies the pan criteria, performing the second operation.

3. The method of claim 1, wherein the first gesture recognizer is an intensity-based gesture recognizer and the second gesture recognizer is a pan gesture recognizer.

4. The method of claim 2, wherein the input includes a third portion of the input that is subsequent to the second portion of the input, and the method includes processing the third portion of the input with the first gesture recognizer.

5. The method of claim 2, wherein the first set of gesture recognizers includes a third gesture recognizer.

6. The method of claim 1, including:

in response to determining that the input satisfies a second intensity threshold, processing the input with the first gesture recognizer, including replacing display of the first user interface with a second user interface.

7. The method of claim 2, wherein:

the first set of gesture recognizers includes a fourth gesture recognizer; and the method includes, in response to determining that the input satisfies a second intensity threshold, processing the input with the fourth gesture recognizer.

8. The method of claim 2, including:

in response to detecting the first portion of the input, performing a third operation.

9. The method of claim 8, wherein performing the third operation includes visually distinguishing at least a portion of the first user interface from other portions of the first user interface.

10. The method of claim 8, including, subsequent to performing the third operation:

in accordance with the determination that the input satisfies the intensity input criteria, performing the first operation; and, in accordance with the determination that the input satisfies the pan criteria, performing the second operation.

11. The method of claim 10, wherein performing the second operation subsequent to performing the third operation includes reversing the third operation.

12. The method of claim 1, wherein:

performing the first operation includes displaying a preview area.

13. The method of claim 1, wherein:

performing the second operation includes scrolling at least a portion of the first user interface.

14. The method of claim 1, wherein the first intensity threshold is adjustable.

15. The method of claim 14, including updating a first gesture recognizer to be activated in response to input satisfying a third intensity threshold that is distinct from the first intensity threshold.

16. The method of claim 1, including subsequent to initiating performance of the first operation, forgoing performance of the second operation.

17. The method of claim 1, including:

subsequent to initiating performance of the second operation, forgoing performance of the first operation.

18. An electronic device, comprising:

a display;

a touch-sensitive surface;

one or more sensors to detect intensity of contacts with the touch-sensitive surface;

one or more processors;

memory; and one or more programs, wherein the one or more programs are stored in the memory and configured to be executed by the one or more processors, the one or more programs including instructions for:
displaying a first user interface;
while displaying the first user interface, detecting an input on the touch-sensitive surface that includes movement across the touch-sensitive surface by at least a predefined distance; and,
in response to detecting the input while displaying the first user interface:
monitoring the input using a first gesture recognizer having a first state and a second gesture recognizer having a second state;
in accordance with a determination that the input includes an increase in intensity that satisfies intensity input criteria, the intensity input criteria including that the input satisfies a first intensity threshold before moving across the touch-sensitive surface by the predefined distance:
transitioning the first state of the first gesture recognizer to a predefined gesture recognition state and performing a corresponding first operation; and,
transitioning the second state of the second gesture recognizer to a state other than the predefined gesture recognition state or maintaining the second state of the second gesture recognizer in a state other than the predefined gesture recognition state; and,
in accordance with a determination that the input satisfies pan criteria including that the input has moved across the touch-sensitive surface by at least the predefined distance before satisfying the intensity input criteria:
transitioning the second state of the second gesture recognizer to an updated state and performing a corresponding second operation that is distinct from the first operation; and,
transitioning the first state of the first gesture recognizer to a state other than the updated state
wherein the state other than the predefined gesture recognition state is a failed state; and
the one or more programs further include instructions for:
in accordance with a determination that the input includes an increase in intensity that satisfies the intensity input criteria, transitioning the second gesture recognizer from the second state to the failed state;
in accordance with a determination that the input satisfies pan criteria, transitioning the first gesture recognizer from the first state to the failed state; and
subsequent to transitioning a respective gesture recognizer to the failed state, maintaining the respective gesture recognizer in the failed state until ceasing to detect the input.

19. The device of claim 18, wherein:
detecting the input on the touch-sensitive surface includes detecting a first portion of the input and a second portion of the input that is subsequent to the first portion of the input; and
the one or more programs include instructions for:
in response to detecting the first portion of the input on the touch-sensitive surface, identifying a first set of gesture recognizers that correspond to at least the first portion of the input as candidate gesture recognizers, the first set of gesture recognizers including the first gesture recognizer and the second gesture recognizer; and,
in response to detecting the second portion of the input on the touch-sensitive surface:
in accordance with the determination that the input satisfies the intensity input criteria, performing the first operation; and,
in accordance with the determination that the input satisfies the pan criteria, performing the second operation.

20. The device of claim 18, wherein the one or more programs include instructions for, in response to determining that the input satisfies a second intensity threshold, processing the input with the first gesture recognizer, including replacing display of the first user interface with a second user interface.

21. The device of claim 19, wherein:
the first set of gesture recognizers includes a fourth gesture recognizer; and
the one or more programs include instructions for, in response to determining that the input satisfies a second intensity threshold, processing the input with the fourth gesture recognizer.

22. The device of claim 19, wherein the one or more programs include instructions for, in response to detecting the first portion of the input, performing a third operation.

23. The device of claim 22, wherein the one or more programs include instructions for:
subsequent to performing the third operation:
in accordance with the determination that the input satisfies the intensity input criteria, performing the first operation; and,
in accordance with the determination that the input satisfies the pan criteria, performing the second operation.

24. The device of claim 18, wherein the one or more programs include instructions for, subsequent to initiating performance of the first operation, forgoing performance of the second operation.

25. The device of claim 18, wherein the one or more programs include instructions for, subsequent to initiating performance of the second operation, forgoing performance of the first operation.

26. The device of claim 18, wherein the first gesture recognizer is an intensity-based gesture recognizer and the second gesture recognizer is a pan gesture recognizer.

27. The device of claim 19, wherein the input includes a third portion of the input that is subsequent to the second portion of the input, and the one or more programs include instructions for processing the third portion of the input with the first gesture recognizer.

28. The device of claim 19, wherein the first set of gesture recognizers includes a third gesture recognizer.

29. The device of claim 22, wherein performing the third operation includes visually distinguishing at least a portion of the first user interface from other portions of the first user interface.

30. The device of claim 23, wherein performing the second operation subsequent to performing the third operation includes reversing the third operation.

31. The device of claim 18, wherein:
performing the first operation includes displaying a preview area.

32. The device of claim 18, wherein:
performing the second operation includes scrolling at least a portion of the first user interface.

33. The device of claim 18, wherein the first intensity threshold is adjustable.

34. The device of claim 33, wherein the one or more programs include instructions for updating a first gesture recognizer to be activated in response to input satisfying a third intensity threshold that is distinct from the first intensity threshold.

35. A non-transitory computer readable storage medium storing one or more programs, the one or more programs comprising instructions, which when executed by an electronic device with a display, a touch-sensitive surface, and one or more sensors to detect intensity of contacts with the touch-sensitive surface cause the device to:
  display a first user interface;
  while displaying the first user interface, detect an input on the touch-sensitive surface that includes movement across the touch-sensitive surface by at least a predefined distance; and,
  in response to detecting the input while displaying the first user interface:
    monitor the input using a first gesture recognizer having a first state and a second gesture recognizer having a second state;
    in accordance with a determination that the input includes an increase in intensity that satisfies intensity input criteria, the intensity input criteria including that the input satisfies a first intensity threshold before moving across the touch-sensitive surface by the predefined distance:
      transition the first state of the first gesture recognizer to a predefined gesture recognition state and perform a corresponding first operation; and,
      transition the second state of the second gesture recognizer to a state other than the predefined gesture recognition state or maintain the second state of the second gesture recognizer in a state other than the predefined gesture recognition state; and,
    in accordance with a determination that the input satisfies pan criteria including that the input has moved across the touch-sensitive surface by at least the predefined distance before satisfying the intensity input criteria:
      transition the second state of the second gesture recognizer to an updated state and perform a corresponding second operation that is distinct from the first operation; and,
      transition the first state of the first gesture recognizer to a state other than the updated state;
  wherein the state other than the predefined gesture recognition state is a failed state; and
  the one or more programs include instructions, which when executed by the electronic device, cause the device to:
    in accordance with a determination that the input includes an increase in intensity that satisfies the intensity input criteria, transition the second gesture recognizer from the second state to the failed state;
    in accordance with a determination that the input satisfies pan criteria, transition the first gesture recognizer from the first state to the failed state; and
    subsequent to transitioning a respective gesture recognizer to the failed state, maintain the respective gesture recognizer in the failed state until ceasing to detect the input.

36. The non-transitory computer readable storage medium of claim 35, wherein:
  detecting the input on the touch-sensitive surface includes detecting a first portion of the input and a second portion of the input that is subsequent to the first portion of the input; and
  the one or more programs include instructions, which when executed by the electronic device, cause the device to:
  in response to detecting the first portion of the input on the touch-sensitive surface, identify a first set of gesture recognizers that correspond to at least the first portion of the input as candidate gesture recognizers, the first set of gesture recognizers including the first gesture recognizer and the second gesture recognizer; and,
  in response to detecting the second portion of the input on the touch-sensitive surface:
    in accordance with the determination that the input satisfies the intensity input criteria, perform the first operation; and,
    in accordance with the determination that the input satisfies the pan criteria, perform the second operation.

37. The non-transitory computer readable storage medium of claim 35, wherein the one or more programs include instructions, which when executed by the electronic device, cause the device, in response to determining that the input satisfies a second intensity threshold, to process the input with the first gesture recognizer, including replacing display of the first user interface with a second user interface.

38. The non-transitory computer readable storage medium of claim 36, wherein:
  the first set of gesture recognizers includes a fourth gesture recognizer; and
  the one or more programs include instructions, which when executed by the electronic device, cause the device, in response to determining that the input satisfies a second intensity threshold, to process the input with the fourth gesture recognizer.

39. The non-transitory computer readable storage medium of claim 36, wherein the one or more programs include instructions, which when executed by the electronic device, cause the device, in response to detecting the first portion of the input, to perform a third operation.

40. The non-transitory computer readable storage medium of claim 39, wherein the one or more programs include instructions, which when executed by the electronic device, cause the device, subsequent to performing the third operation, to:
  in accordance with the determination that the input satisfies the intensity input criteria, perform the first operation; and,
  in accordance with the determination that the input satisfies the pan criteria, perform the second operation.

41. The non-transitory computer readable storage medium of claim 35, wherein the one or more programs include instructions, which when executed by the electronic device, cause the device, subsequent to initiating performance of the first operation, to forgo performance of the second operation.

42. The non-transitory computer readable storage medium of claim 35, wherein the one or more programs include instructions, which when executed by the electronic device, cause the device, subsequent to initiating performance of the second operation, to forgo performance of the first operation.

43. The non-transitory computer readable storage medium of claim 35, wherein the first gesture recognizer is an intensity-based gesture recognizer and the second gesture recognizer is a pan gesture recognizer.

44. The non-transitory computer readable storage medium of claim 36, wherein the input includes a third portion of the input that is subsequent to the second portion of the input, and the one or more programs include instructions, which when executed by the electronic device, cause the device to process the third portion of the input with the first gesture recognizer.

45. The non-transitory computer readable storage medium of claim 36, wherein the first set of gesture recognizers includes a third gesture recognizer.

46. The non-transitory computer readable storage medium of claim 39, wherein performing the third operation includes visually distinguishing at least a portion of the first user interface from other portions of the first user interface.

47. The non-transitory computer readable storage medium of claim 40, wherein performing the second operation subsequent to performing the third operation includes reversing the third operation.

48. The non-transitory computer readable storage medium of claim 35, wherein:

performing the first operation includes displaying a preview area.

49. The non-transitory computer readable storage medium of claim 35, wherein:

performing the second operation includes scrolling at least a portion of the first user interface.

50. The non-transitory computer readable storage medium of claim 35, wherein the first intensity threshold is adjustable.

51. The non-transitory computer readable storage medium of claim 50, wherein the one or more programs include instructions, which when executed by the electronic device, cause the device to update a first gesture recognizer to be activated in response to input satisfying a third intensity threshold that is distinct from the first intensity threshold.

* * * * *